(12) United States Patent
Bruner et al.

(10) Patent No.: US 7,162,578 B2
(45) Date of Patent: Jan. 9, 2007

(54) DIGITAL DEVICE CONFIGURATION AND METHOD

(75) Inventors: Curtis H. Bruner, Longmont, CO (US); Lance R. Carlson, Niwot, CO (US); Jeffrey E. Mast, Loveland, CO (US)

(73) Assignee: Cornice, Inc., Longmont, CO (US)

( * ) Notice: Subject to any disclaimer, the term of this patent is extended or adjusted under 35 U.S.C. 154(b) by 0 days.

(21) Appl. No.: 11/074,105

(22) Filed: Mar. 7, 2005

(65) Prior Publication Data

US 2005/0160220 A1 Jul. 21, 2005

Related U.S. Application Data

(60) Division of application No. 10/447,544, filed on May 28, 2003, now Pat. No. 6,973,535, which is a continuation-in-part of application No. 10/313,550, filed on Dec. 6, 2002, now Pat. No. 6,791,799, which is a continuation-in-part of application No. 09/952,998, filed on Sep. 14, 2001, now Pat. No. 7,106,541.

(60) Provisional application No. 60/466,221, filed on Apr. 28, 2003.

(51) Int. Cl.
*G06F 9/44* (2006.01)
*G06F 12/00* (2006.01)

(52) U.S. Cl. ............... 711/112; 710/8; 717/168

(58) Field of Classification Search ............ None
See application file for complete search history.

(56) References Cited

U.S. PATENT DOCUMENTS

| | | | |
|---|---|---|---|
| 4,773,004 A | 9/1988 | Gershenson et al. |
| 4,933,785 A | 6/1990 | Morehouse et al. |
| 4,980,786 A | 12/1990 | O'Sullivan et al. |
| 5,014,237 A | 5/1991 | Masters et al. |
| 5,030,260 A | 7/1991 | Beck et al. |
| 5,051,868 A | 9/1991 | Leverault et al. |
| 5,075,805 A | 12/1991 | Peddle et al. |
| 5,253,129 A | 10/1993 | Blackborow et al. |
| 5,261,058 A | 11/1993 | Squires et al. |
| 5,274,773 A | 12/1993 | Squires et al. |
| 5,289,325 A | 2/1994 | Morehouse et al. |
| 5,337,414 A | 8/1994 | Hashemi et al. |
| 5,379,171 A | 1/1995 | Morehouse et al. |
| 5,442,266 A | 8/1995 | Morehouse et al. |

(Continued)

OTHER PUBLICATIONS

Peter T. McLean, Information Technology—AT Attachment with Packet Interface Extension (ATA/ATAPI-4), Aug. 19, 1998, Maxtor Corporation.

(Continued)

*Primary Examiner*—Gary Portka
(74) *Attorney, Agent, or Firm*—Pritzkau Patent Group LLC

(57) ABSTRACT

An electromechanical data storage arrangement is interfaced with a host. The interface may include a conductor that carries read and write gate signals. Another conductor carries both a servo sync mark and an error signal. The storage arrangement includes an external serial interface connected to a host serial interface applying a device identification to a portion of serial control-related data that travels over the interface. A serial router in the storage arrangement uses the device identification to manage the control-related data between the interface and a number of serial devices and associated interfaces within the storage arrangement. The serial router is in selective data communication with each of the device serial interfaces, for using the device identification to direct a host-asserted command to a targeted device where each device is controlled by a different command set such that the system can be customized for different command sets of different devices.

25 Claims, 44 Drawing Sheets

U.S. PATENT DOCUMENTS

| | | | |
|---|---|---|---|
| 5,491,395 A | 2/1996 | Hutsell et al. | |
| 5,587,854 A | 12/1996 | Sato et al. | |
| 5,594,600 A | 1/1997 | Bruner et al. | |
| 5,627,990 A | 5/1997 | Cord et al. | |
| 5,640,286 A | 6/1997 | Acosta et al. | |
| 5,677,813 A | 10/1997 | Yoshida et al. | |
| 5,680,293 A | 10/1997 | McAnally et al. | |
| 5,706,168 A | 1/1998 | Erler et al. | |
| 5,760,986 A | 6/1998 | Morehouse et al. | |
| 5,760,998 A | 6/1998 | Berberich et al. | |
| 5,793,566 A | 8/1998 | Scura et al. | |
| 5,914,828 A | 6/1999 | Bruner et al. | |
| 5,969,905 A | 10/1999 | Iwamoto et al. | |
| 5,974,544 A * | 10/1999 | Jeffries et al. | 713/1 |
| 5,995,330 A | 11/1999 | Furay et al. | |
| 6,015,196 A | 1/2000 | Welsh et al. | |
| 6,057,987 A | 5/2000 | Furay et al. | |
| 6,061,751 A | 5/2000 | Bruner et al. | |
| 6,144,532 A | 11/2000 | Khan et al. | |
| 6,178,056 B1 | 1/2001 | Cloke et al. | |
| 6,229,663 B1 | 5/2001 | Yoneda et al. | |
| 6,236,527 B1 | 5/2001 | Uchiike et al. | |
| 6,260,106 B1 | 7/2001 | Vogley | |
| 6,278,568 B1 | 8/2001 | Cloke et al. | |
| 6,304,440 B1 | 10/2001 | Lin | |
| 6,308,961 B1 | 10/2001 | Kunikane et al. | |
| 6,369,988 B1 | 4/2002 | Yoshida et al. | |
| 6,411,452 B1 | 6/2002 | Cloke | |
| 6,415,349 B1 | 7/2002 | Hull et al. | |
| 6,445,587 B1 | 9/2002 | Pavol | |
| 6,570,736 B1 | 5/2003 | Noda | |
| 6,941,453 B1 | 9/2005 | Rao | |
| 6,944,854 B1 | 9/2005 | Kehne et al. | |
| 6,976,062 B1 * | 12/2005 | Denby et al. | 709/220 |
| 2001/0012175 A1 | 8/2001 | Williams et al. | |
| 2002/0043608 A1 | 4/2002 | Nakata et al. | |
| 2003/0015639 A1 | 1/2003 | Smith | |
| 2005/0066119 A1 | 3/2005 | Azimi | |

OTHER PUBLICATIONS

CompactFlash Association, CF+ and CompactFlash Specification Revision 1.4, 1998, CompactFlash Association.

Apple Computer, Apple iPod, Oct. 23, 2001, Apple Computer Website.

IBM, IBM Microdrive, Jun. 15, 1999, IBM Website.

Nomad, Nomad Jukebox, Aug. 1, 2000, Nomadworld Website.

R. W. Clough et al, Dynamics of Structures, Jan. 1975, McGraw Hill, pp. 87-96.

* cited by examiner

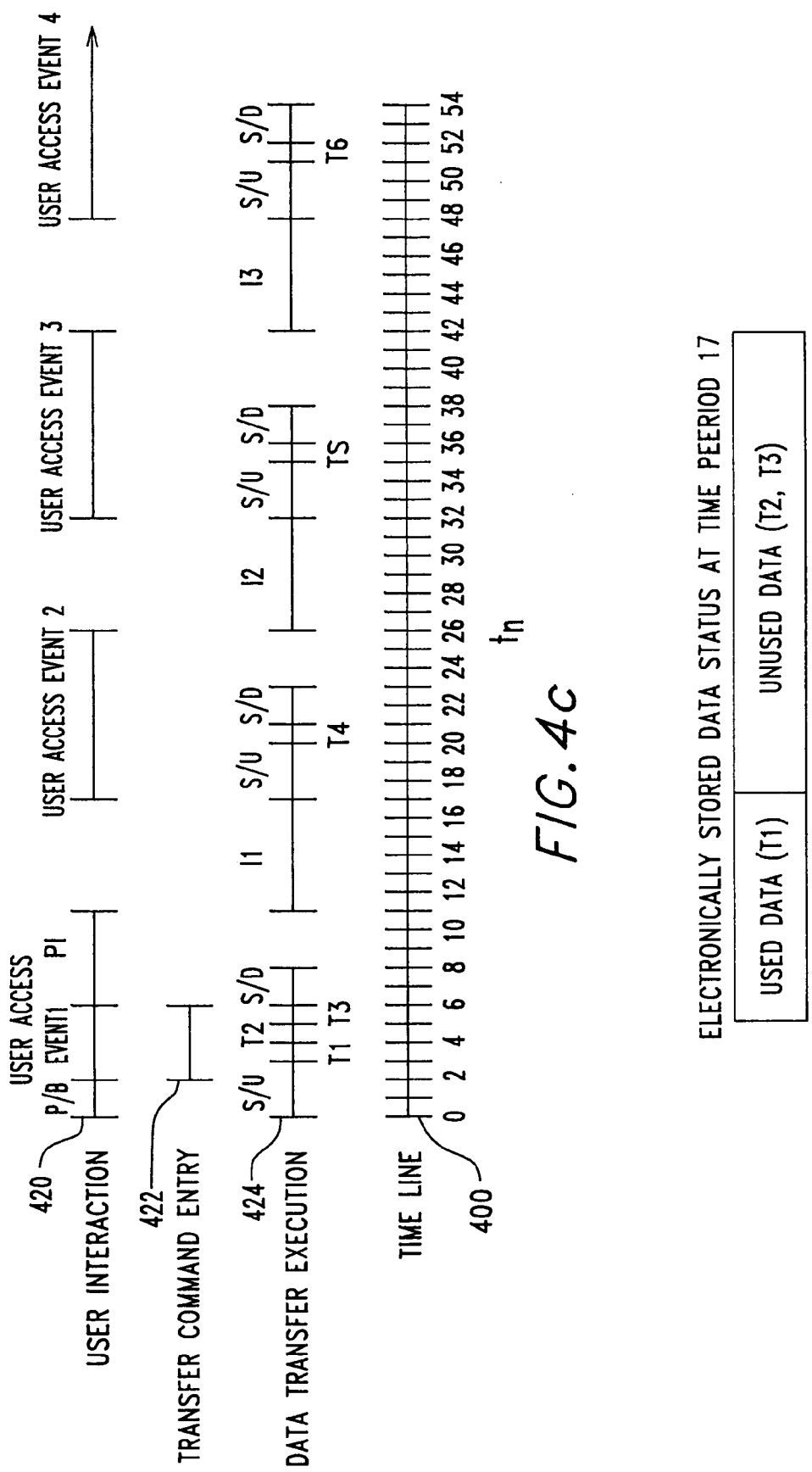

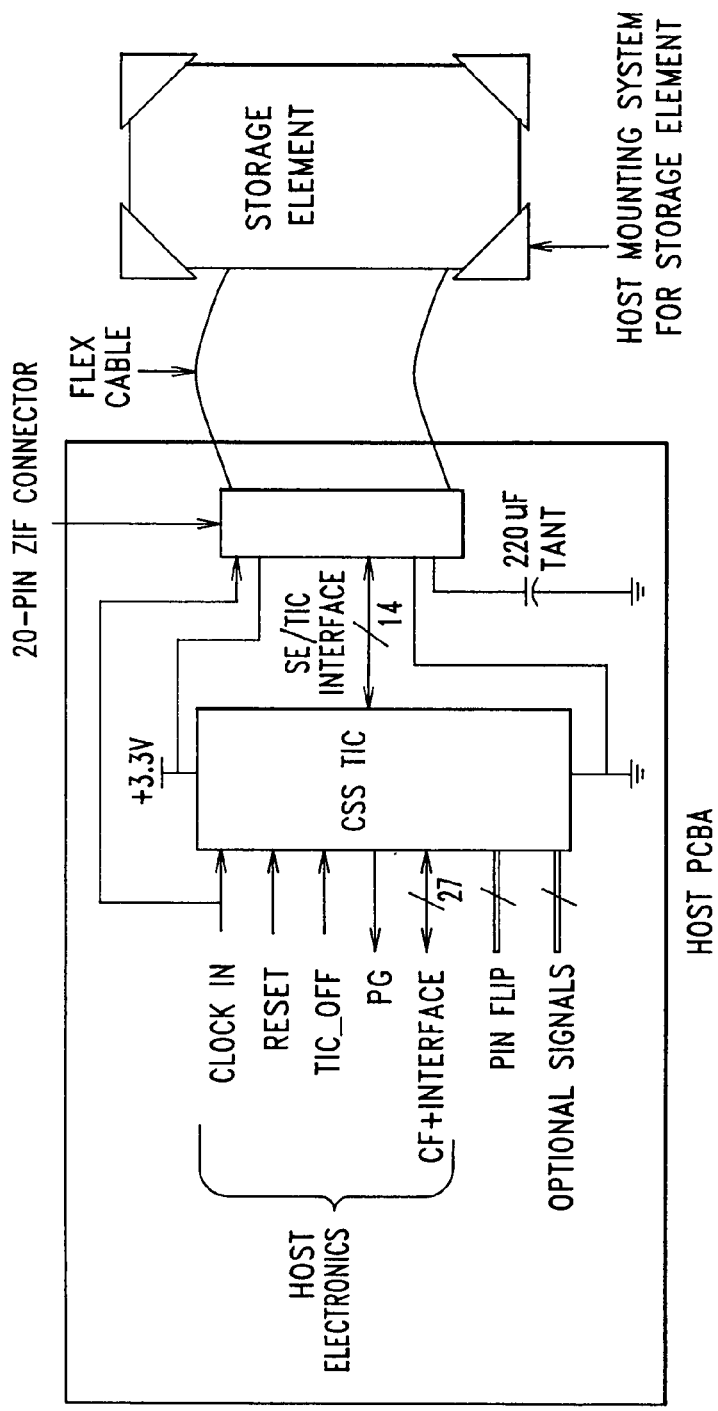
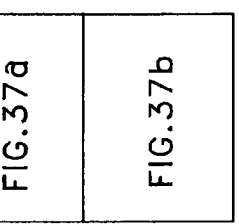
FIG.35
FIG.37c

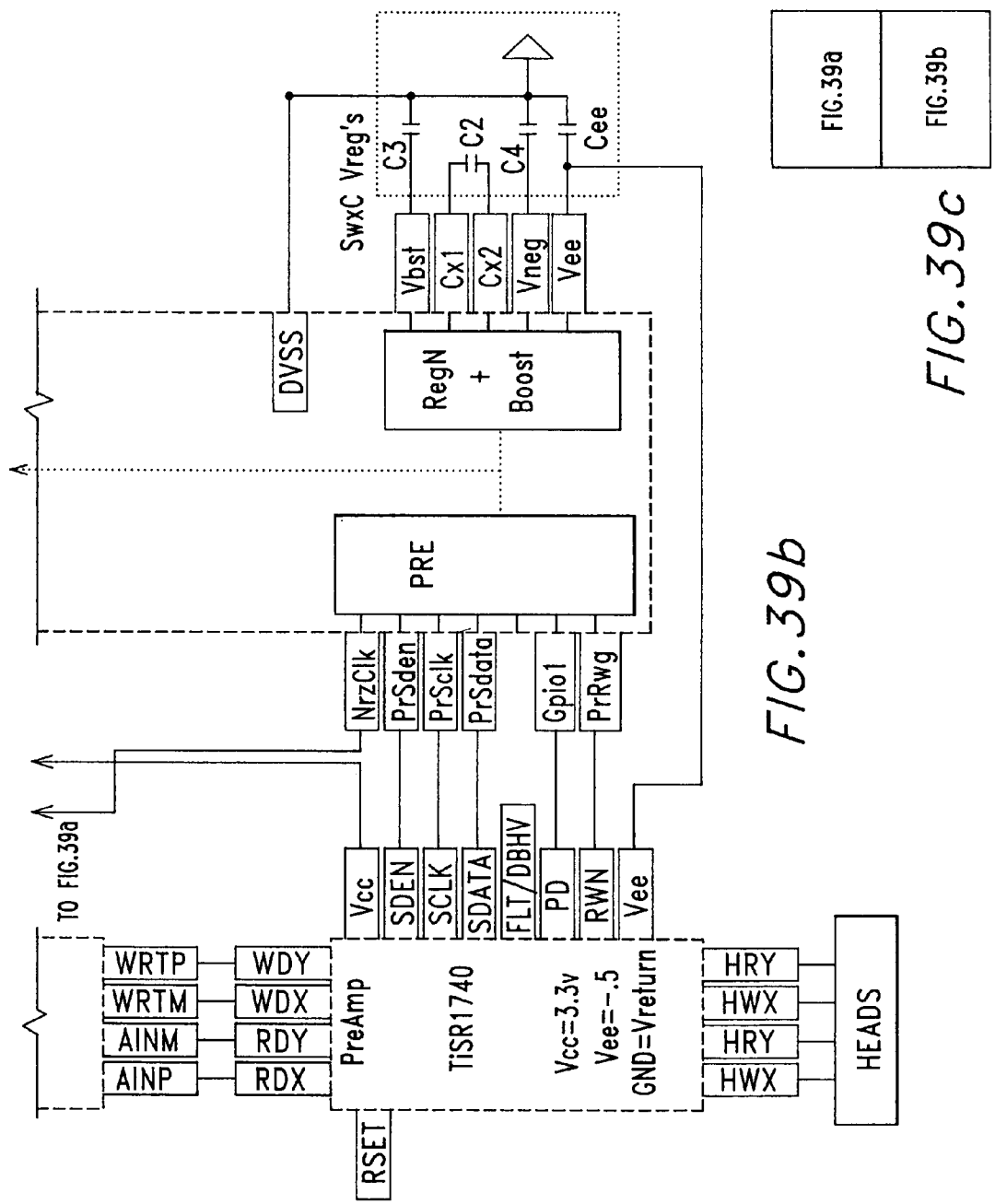

DIGITAL DEVICE CONFIGURATION AND METHOD

RELATED APPLICATIONS

The present application is a divisional application of U.S. patent application Ser. No. 10/447,544, filed on May 28, 2003 now U.S. Pat. No. 6,973,535; which is a Continuation-in-Part of U.S. patent application Ser. No. 10/313,550, filed on Dec. 6, 2002 now U.S. Pat. No. 6,791,799; which is a Continuation-in-Part of U.S. patent application Ser. No. 09/952,998 filed on Sep. 14, 2001, now U.S. Pat. No. U.S. Pat. No. 7,106,541 all of which are incorporated herein by reference in their entirety. The present application further claims priority from U.S. Provisional Application Ser. No. 60/466,221, filed on Apr. 28, 2003, which is incorporated herein by reference in its entirety.

BACKGROUND OF THE INVENTION

The present application is related generally to a digital device architecture and, more particularly, to a digital system configuration and associated method for devices including an electromechanical data Storage Element. The invention is particularly well suited for use in a portable device.

One need only briefly survey virtually any public area in modem society in order to gain an appreciation for the popularity of electronic devices. Such devices include, but are not limited to cellular phones, music players, portable computers, personal digital assistants, pagers, digital cameras, digital camcorders, personal gaming devices and e-books. Continuous improvement has been seen in the capabilities present in these devices attributable, at least in part, to a movement into digital implementations.

Demands, with regard to future electronic devices, include further miniaturization coupled with still further improvements in performance. These demands are markedly intense with regard to portable devices. A particular area of concern resides in a desire to store ever-increasing amounts of digital information. At the same time, it should be appreciated that an electronic device, especially in a portable or miniaturized form, is likely to be subjected to a somewhat harsh environment, particularly with regard to mechanical shock. In an attempt to cope with the need for a significant amount of digital data storage while, at the same time, dealing with the problem of mechanical shock, designers resorted to the use of electronic memory, particularly in the form of flash memory. This solution is evident in the instance of state-of-the-art music players, including MP3 players. As of this writing, the popular configuration of these players is to use a removable flash memory card having a size of approximately 32 MB. Unfortunately, several problems are associated with this solution, as will be described.

One problem seen with regard to the flash memory solution resides in the fact that 32 MB is, in itself, a somewhat limited amount of storage. It is not unforeseeable that in the near future even amounts less than 512 MB will be considered as small. Considering present day devices, the owner of a portable device that relies on the use of flash memory cards typically must own a number of the cards in order to provide a sufficient overall amount of storage. Otherwise, the portable device owner may be forced to frequently reload the flash memory card via a personal computer or otherwise be subjected, for example, to listening to a quite limited music selection in the instance of an MP3 player. Moreover, the cost of flash memory cards is currently somewhat prohibitive. Many portable device owners simply choose not to incur the expense of buying numbers of additional flash memory cards.

In coping with the problems inherent in the use of flash memory cards, a recent alternative solution has been the provision of a larger, electromechanical digital storage arrangement that is nonetheless removable. This solution is exemplified by the IBM Microdrive™. The latter is a removable miniaturized computer hard disk drive provided with a connector that mates with a corresponding connector incorporated within the portable device to be served. It is noted that such miniature hard drives, including the Microdrive, have essentially the same configuration as prior art hard drives seen in personal computers. That is, the miniature hard drive is made up of two general assemblies including a head disk assembly (HDA) and a printed circuit board assembly (PCBA). The HDA itself includes a rotatable magnetic media, a sensor assembly for reading from and writing to the rotatable media and motors for accomplishing rotation of the rotatable media and positioning of the sensor assembly. The PCBA includes essentially all of the electronics needed to operate the HDA with the common exception of a preamplifier. While the Microdrive brings improvement in data capacity, as of this writing, the cost of the Microdrive is quite high in terms of megabytes per dollar and absolute cost when compared to such costs in conventional drives. It is submitted that this absolute cost, in and by itself, will prove to be a significant barrier with regard to broad-based use of the product.

The Microdrive utilizes a CompactFlash interface. This interface raises concerns for a number of reasons, not the least of which is the requirement for a rather bulky interface connector having fifty pins, as described in the CF+ and CompactFlash Specification Revision 1.4. Further concerns with regard to CompactFlash will be addressed below.

With regard to the removable configuration of the Microdrive, it is noted that the perceived need for removable media has been greatly reduced in certain environments once viable, significant levels of "permanently" installed storage space has been provided. Available embedded storage has traditionally taken a precedent over removable storage, as evidenced in desktop computers. Still further concerns are associated with removable storage, as will be discussed below.

While the use of a miniaturized hard disk drive effectively resolves the problem of limited storage by providing many times the storage currently available in a typical flash memory card, the issue of the use of such a component in the potentially harsh environment of a portable device is once again brought to the forefront. It should be appreciated that, under certain circumstances, prior art hard disk drives tolerate relatively high levels of mechanical shock—even as high as 1500 Gs. Under operational circumstances, unfortunately, hard disk drives are generally quite susceptible to mechanical shock events, for example, during the time that the head or sensing assembly is actually accessing the rotating media. Consequences of a mechanical shock event occurring at precisely the most inopportune time include potential drive failure. For instance, a drive may fail when subjected to a 175 G event during an access. In this regard, Applicants are unaware of a miniaturized hard drive or overall device architecture incorporating effective features specifically intended to cope, for example, with the potentially harsh environment of a portable electronic device.

U.S. Pat. No. 6,061,751 (hereinafter the '751 patent), sharing the lead inventor of the present application, serves as one reference point with regard to several suggestions which may be utilized within a system incorporating a hard drive.

The framework of the '751 patent, however, resides not in the area of drive miniaturization, ruggedization or portability, but primarily in reducing the cost of a hard disk drive as provided in an overall computer system. One approach taken by the patent encompasses moving all possible functionality out of the overall hard disk drive, including the controller, and onto the motherboard of the host device. For example, unused silicon "real estate" might be utilized for implementation of the controller. Moreover, such a controller may utilize memory that is already present on the host side. Thus, the drive cost is reduced to some extent. At the same time, it should be appreciated that the prior art functional control implemented as between the CPU and the controller is unchanged with respect to locating the controller on the motherboard. Specifically, the controller includes processing power which executes control code that is "native" to the peripheral device. As used herein, "native code" refers to the lowest level control code required to control a particular peripheral device. It is that code which is customarily executed by a device controller in a fashion that is isolated from the CPU resident within the host system.

FIG. 1 is a representation of FIG. 2 of the '751 patent, including alternative reference numbers assigned consistent with the present discussion. Accordingly, a prior art computer system 10 includes a host circuit board 12. A controller 14 is included as a single integrated circuit having further functions, as will be mentioned. A servo integrated circuit 16 is used to spin motors in any attached peripheral devices. Three peripheral devices are shown including a head disk assembly (HDA) 20, a CDROM/DVD 22 and a floppy drive 24. Alternatively, the latter may comprise a high capacity floppy drive, a miniature drive, or other suitable device.

One advantage, alluded to above, in the patent is the use of the HDA as an alternative to a complete hard disk drive (HDD) since costs are lessened by including components such as, for example, controller 14 within the host system. Components of the HDA (described above, but not illustrated) include a data media, a sensor/head mechanism to read and/or write data to and from the media, and motors to spin the media and position the sensor/head mechanism. A preamplifier is included to amplify the data read from or to be written to the media. The preamplifier may be installed on a flex circuit (see item 17 in FIG. 1A of the '751 patent) that electrically connects the HDA to the PCBA. It is appropriate to note, at this juncture, that the '751 patent also describes the location of a read/write channel, electrically in communication with the preamplifier, as potentially being arranged in the host system, distributed between the host system and the peripheral device or being within the peripheral device. The conventional location of the read/write channel in prior art HDD's is on the PCBA in close physical proximity to the electrical connection point of the HDA, for reasons described below.

Continuing with a description of FIG. 1, each peripheral device may also have an associated personality ROM 26. The specific location of the personality ROM is shown for an individual component in FIG. 3 (item 64) of the '751 patent. It is noted that the personality ROM is isolated from the rest of the individual component and is accessed via the PCI arrangement. It is important to understand that the personality ROM contains information which may define characteristics of controller firmware that is required to operate a particular component (see the table beginning in cols. 7 and 8 of the patent), however, the disclosure presents no way in which to update the firmware with code provided from the personality ROM. As an example, if the host system in the '751 patent is to operate four different types of HDA, each of which requires completely different firmware, four sets of different firmware must be stored in the host device. As will be discussed below, the present invention considers this approach as unacceptable, at least for the reason that a great deal of storage space is required as a tradeoff for flexibility. Integrated circuit 14, in FIG. 1, further includes peripheral component interconnect (PCI) bus functionality such that the integrated circuit is interfaced to a PCI bus 28. It is noted that PCI bus 28 comprises one example of a number of possible bus mastering buses. A CPU 30 and chipset 32 are provided with the chipset connected to PCI bus 28. CPU 30 is, in turn, interfaced with chipset 32. A RAM section 34 is also interfaced to chipset 32. It is important to note that CPU 30 is indirectly connected to the peripheral components. Specifically, PCI bus 28 is interposed between the peripheral components, including HDA 26, and the CPU. While this arrangement may be advantageous with regard to cost reduction, certain disadvantages that accompany this configuration will be considered at appropriate points below. For the moment, it is noted that system control is accomplished by the CPU issuing commands that are placed on PCI bus 28 in accordance with mandated PCI protocol. It is submitted that certain penalties are associated with this style of command configuration. For example, commands issued through levels or layers of protocol higher than the native code are particularly inflexible.

Attention is now directed to FIG. 2I, which illustrates a prior art computer system that is generally indicated by the reference numeral 50. System 50 includes a conventional HDD 52 that is connected to a host computer 54 by a parallel interface arrangement 56 such as, for example, an IDE or SCSI interface. Only selected electronic components of HDD 52 have been illustrated for purposes of clarity, however, it is to be understood that these electronic components are connected in a conventional manner with their typical electromechanical counterparts, as will be understood by one having ordinary skill in the art. The electronic components of HDD 52 include a servo IC 58, a read/write IC 60 and a preamp IC 62. Further, a controller IC 64 is individually interfaced with each of the servo IC, read/write IC and preamp IC. While the present figure illustrates one prior art configuration, there have been a number of modifications in the individual interfaces with ICs that are serviced by controller 64. As one example, functionality has been moved from the controller IC into servo IC 58 in a way which eliminates the Zero-Crossing and Commutate lines. As another example, servo IC 58 and Read/Write IC 60 can share a serial clock line and a serial data line, however, each IC is provided with a unique enable line.

Still referring to FIG. 2I, controller 64 is also externally connected with interface arrangement 56 for communication with host computer 54. Individual signals that are present within the interfaces between controller IC 64 have been labeled in the figure, but will not be described in detail since these signals will be familiar to one having ordinary skill in the art. For present purposes, it is important to understand, however, that each of the servo IC, the read/write IC and the preamp IC includes a dedicated serial interface indicated by the reference numbers 70, 72 and 74, respectively, that is connected to controller IC 64 for control purposes. Each serial IC interface includes a dedicated serial port enable line, a dedicated serial port clock line and a dedicated serial port data line. Accordingly, controller IC 64 must include individual serial interfaces that are adapted for each of the individual ICs which the controller services. Share serial port data and serial port clock but with unique enable signals In addition to each serial device requiring a dedicated serial interface and port, each serial device is configured to operate responsive to a particular, customized command set that is often quite unlike the command sets that are associated with other serial devices that are present. Often, commands, as well as device responses thereto, are issued utilizing internal registers within each serial device. In order to access one of these internal registers, a command must include some sort of address field, identifying the internal register, and may include a data field. The response to the command may comprise a response data field. Unfortunately, there is no standardization from device to device with respect to the registers used, the command set, the address field length or data field length. In the general context of the prior art, this configuration has not been a concern since the controller is co-located with the serial devices. While the '751 patent moves the controller to the host device, PCI mass storage IC 14 is provided to cope with disk data transfer issues, rather than serial control-related data issues. The patent appears to leave the serial control-related data issue in a still further complicated state, as is particularly evidenced with regard to the servo IC. Specifically, FIG. 3 of the '751 patent shows the servo IC in the host device and merely extends the drive interface between the servo IC and the servo motor such that individual, "analog" drive signals for each coil of the motor are present in the interface. The present invention considers this approach as unacceptable at least for the reason that the number of signals present in the interface is unduly multiplied.

With continuing reference to FIG. 21, traditional disk drives, as well as other forms of data storage devices, contain a control arrangement such as controller IC 64. This IC traditionally provides all of the control functions for the disk drive including, but not limited to:

Receiving, interpreting, and executing commands from the host system;

Operating and controlling the spindle motor system, using Servo IC 58 in the present example;

Operating and controlling the VCM/Actuator (again, using Servo IC 58);

Managing writes and reads of data to/from the disk by controlling other ICs such as Preamp IC 62 and Read/Write IC 60; and Detecting various error conditions, as well as executing recovery algorithms, if appropriate.

While the traditional controller IC includes many circuits to assist in these functions, much of the functionality is optimally implemented in firmware algorithms. This firmware is traditionally large and complex in order to provide all the required functionality.

The firmware is traditionally stored on a separate IC (not shown) from the Controller/Processor IC within the drive. This IC is usually some type of programmable ROM device such as one-time-programmable ROM, Flash, EEPROM or other suitable device. Such programmable electronic devices as these are typically used because the firmware for a disk drive or any data storage device, for that matter, often must be revised and/or improved frequently as the product evolves. These changes are usually to improve manufacturing yields, operational reliability or to add new functionality, all of which improve the cost or competitive advantage of the product. The firmware change being described here is not so much a field upgrade, but a revision to the firmware incorporated in the product at the time of manufacture.

The frequency of firmware changes is typically highest during early product introduction and manufacturing (early in the product's life cycle). As a product continues to be manufactured over time, the firmware is often stabilized and, as a cost reduction, the programmable ROM parts mentioned above are changed to either one-time-only programmable parts or mask-programmed parts. The point being that, early in a product's life cycle, it is necessary to have a design which allows for rapid revision of the firmware placed onto the product during manufacture so that problems can be resolved, yields improved and the like.

The prior art has developed a number of approaches in coping with these concerns. For example, as time and experience accumulate on a family of products, the firmware becomes stable. When, at some point a new product is introduced, the firmware can include a "core" set of firmware that is based on stable firmware for the family of products from which the new product was derived. This stable core of firmware can be implemented in masked ROM which is incorporated into the controller IC. This core firmware is, ideally, functional, reliable and able to operate the product to a level which enables additional firmware (for full product functionality) to be read from the disk into RAM memory may also be co-located on in the controller IC. This additional firmware can be easily revised and written onto the disk at the time of manufacture. Accordingly, this prior art solution eliminates the need for a separate ROM device, thereby reducing cost and providing for revisions of the additional firmware which is located on the disk. It is important to recognize, however, that a very stable/reliable "core" firmware must be available. Thus, this prior art approach is not well suited for a completely new product/technology introduction.

In view of the foregoing, it would be desirable to provide a new approach allowing for flexible firmware development, particularly in new, early generation product lines.

The present invention provides a highly advantageous digital device configuration and method that are submitted to resolve the foregoing problems and concerns while providing still further advantages, as described hereinafter.

SUMMARY OF THE INVENTION

As will be described in more detail hereinafter, there is disclosed herein a Storage Element as well as associated devices and method. In one aspect of the invention, a device is configured for access by a user and includes an assembly having an electromechanical digital data storage arrangement configured for operation responsive to a native control code. The device further includes a processing arrangement which executes a control program for controlling the overall device and which executes at least a portion of the native control code, as part of the control program, for use in directly interfacing with the storage arrangement.

In another aspect of the present invention, an assembly includes a digital data storage arrangement made up of a rotatable read/write media, a head arrangement configured for reading and writing the rotatable media and a programmable channel at least for forming an interface between the rotatable media and the head arrangement. Additionally, a programming arrangement, produced separate from the digital storage arrangement, is electrically connectable with the digital storage arrangement at least sufficient to program the channel in a particular way that serves to customize the interface formed by the channel between the rotatable media and the head arrangement such that the digital storage arrangement is later to be used, without the programming arrangement, in an end installation including the customized channel.

In yet another aspect of the present invention, a system is described for providing a digital storage arrangement for end use in an end device. The system includes a rotatable read/write media forming a first part of the digital storage arrangement and a head arrangement forming a second part of the digital storage arrangement and configured for reading and writing the rotatable media. A programmable channel forms a third part of the digital storage arrangement and is configured at least for forming an interface between the rotatable media and the head arrangement. A programming arrangement, produced separate from the digital storage arrangement, is configured for electrical connection with the digital storage arrangement at least sufficient to program the channel in a particular way that serves to customize the interface formed by the channel between the rotatable media and the head arrangement such that the digital storage arrangement is later used in the end device including the customized channel.

In still another aspect of the present invention, in a device having a user access arrangement for receiving a user interaction and including a processing arrangement, the improvement includes a command execution arrangement for interpreting the user interaction in a way that defines a command to be executed by the processing arrangement and for initiating the execution of the command prior to termination of the user interaction. In one feature, a digital data storage arrangement is further included for storing digital information under control of the processing arrangement wherein the command defines a data access that uses the digital storage arrangement and the processing arrangement is programmed to initiate execution of the data access responsive to partial entry of the command during the user interaction. In another feature, the digital storage arrangement utilizes a rotatable media and an electronic memory arrangement is provided wherein the processing arrangement is programmed to execute the data access by reading certain information from the digital storage arrangement, after spinning up the rotatable media on which the certain information is stored, and for transferring that certain information to an electronic memory arrangement such that the certain information is available without the need to access the digital data storage arrangement.

In a further aspect of the present invention, within a device including an electromechanical digital storage arrangement and configured for receiving a plurality of external interactions, at least some of which require one or more data transfers using the storage arrangement, and at least some, but not all of which are user interactions, an assembly includes: a first arrangement for receiving a first one of the interactions requiring a first data transfer by the storage arrangement, a second arrangement for determining that the first interaction is a non-user interaction, and a third arrangement for delaying execution of the first data transfer, associated with the first non-user interaction, at least until a next user interaction.

In a continuing aspect of the present invention, within a device including an electronic memory arrangement having a capacity wherein the device is configured for responding to a plurality of external interactions including user interactions, at least a specific one of which interactions requires a specific data transfer to the electronic memory arrangement such that the specific data transfer is of a size that exceeds the capacity of the electronic memory arrangement, an assembly includes a first arrangement for loading the electronic memory arrangement with an initial portion of the specific data transfer to fill the electronic memory arrangement to its capacity such that the initial portion of data is available for use in a predetermined way. A second arrangement monitors the use, in the predetermined way, of any data stored in the electronic memory arrangement and a third arrangement is provided for loading an additional portion of the specific data transfer into the electronic memory arrangement to replace that part of the initial portion of the specific data transfer which has been used in the predetermined way such that an unused part of the initial portion of the specific data transfer and the additional portion of the specific data transfer are concurrently stored in the electronic memory arrangement. In one feature, the assembly includes an electromechanical digital storage arrangement such that the specific data transfer is stored by the electromechanical digital storage arrangement for transfer to the electronic storage arrangement in the first and additional portions.

In an ongoing aspect of the present invention, within a portable electronic device configured for receiving a user interaction and for operating in an overall environment which may subject the portable electronic device to mechanical shock, the device including an electromechanical Storage Element which is susceptible to such mechanical shock when reading and/or writing data and which is otherwise substantially less susceptible to mechanical shock, the electromechanical Storage Element is protected from shock at least to a limited extent by providing an electronic memory arrangement in the portable device. The user interaction is monitored to define a particular use of a selection of data stored on the electromechanical Storage Element. The selection of data is copied from the electromechanical Storage Element to the electronic memory arrangement. After using the electromechanical Storage Element in the copying step, availability of the selection of data for the particular use is indicated such that the user is able to initiate the particular use of the selection of data, through accessing the electronic memory arrangement, only after the electromechanical Storage Element is not in use and is substantially less susceptible to mechanical shock.

In another aspect of the present invention, in a device configured for access by a user and including a processing arrangement which executes a control program for controlling the overall device, an assembly includes an electromechanical digital data storage arrangement responsive to a native control code and a peripheral control arrangement configured such that the processing arrangement executes at least a portion of the native control code of the storage arrangement as part of the control program. The peripheral control arrangement includes an interface configured for implementing the native code between the processing arrangement and the electromechanical digital storage arrangement.

In still another aspect of the present invention, a digital data storage arrangement includes a rotatable media as well as a head arrangement configured for accessing the rotatable media by first initiating a control sequence intended to move the head arrangement from an unparked position to a parked position. Thereafter, a predetermined status is detected, related to head arrangement position which confirms that the head arrangement is in the parked position. An indication is then produced based on the predetermined status. In one feature, the indication is stored at a predetermined register location. In another feature, the storage arrangement is configured with a ramp for receiving the head arrangement in its parked position such that, when so received, the ramp and the head arrangement cooperate in a way which produces the indication thereby confirming that the head is in the parked position.

In another aspect of the present invention, in a digital data storage arrangement including a rotatable media as well as a head arrangement configured for accessing the rotatable media and for moving to a parked position, an apparatus includes a first arrangement for initiating a control sequence intended to move the head arrangement to the parked position after having accessed the rotatable media, a second arrangement for thereafter detecting a predetermined status related to head arrangement position by testing the head arrangement for reading from the rotatable media such that an inability of the head arrangement to read indicates that the head arrangement is at least away from the rotatable media, and a third arrangement for producing an indication based on the predetermined status.

In yet another aspect of the present invention, in a device including a processing arrangement for controlling operation of the device and including an electromechanical digital storage arrangement is described. A status of a particular attribute is established related to operation of the electromechanical digital storage arrangement. Using the processing arrangement, the status of the particular attribute is monitored for use in a further control operation.

In a continuing aspect of the present invention, in an electromechanical storage device including a rotatable magnetic media and a head arrangement configured for movement to access the rotatable media and for moving to a parked position, an assembly includes a first arrangement for producing a position signal which confirms that the head arrangement is in the parked position and an electrical interconnection arrangement in electrical communication with the head arrangement for use in controlling the head arrangement and which electrical interconnection arrangement is configured for receiving the position signal from the first arrangement for a control use.

In a further aspect of the present invention, in an electromechanical storage device including a housing supporting a spin motor for rotating a magnetic media disk and supporting an actuator arrangement for accessing the magnetic media disk using at least one head positioned on a distal end of the actuator arrangement, an assembly includes an electrical interconnection arrangement in electrical communication with said actuator arrangement and configured for forming an external interface to the storage device. The assembly is further configured such that at least a portion of the electrical interconnection arrangement is supported by the housing and includes a parking arrangement supported by the housing supported portion of the electrical interconnection arrangement for receiving the distal end of the actuator arm in a parked position.

In another aspect of the present invention, as applied to an electromechanical storage device including a rotatable magnetic media and a head arrangement configured for movement to access the rotatable media and for moving to a parked position responsive to at least one parameter in a parking sequence, an arrangement is provided as part of the electromechanical storage device, for producing a position signal which confirms the parked position of the head arrangement when so positioned. A calibration procedure is performed using the position signal to establish an operational value of the parameter for later use in parking the head arrangement.

In still another aspect of the present invention, as applied to a plurality of electromechanical storage devices each of which includes a rotatable magnetic media and a head arrangement configured for movement to access the rotatable media and for moving to a parked position responsive to a parking sequence, an arrangement is provided, as part of each electromechanical storage device, for producing a position signal which confirms the parked position of the head arrangement when so positioned. A calibration procedure is performed on each electromechanical storage device, in which the parking sequence is applied to each electromechanical storage device with the head arrangement initially in a data access position intended to move the head arrangement to the parked position. The parking sequence being repeatedly performed in a way which establishes a failure configuration of the parking sequence for each electromechanical storage device in which failure configuration the head arrangement at least once fails to achieve the parked position. A set of failure configurations, including at least one failure configuration for each electromechanical storage device, is tracked across the plurality of electromechanical storage devices.

Further in accordance with the present invention, a digital data storage apparatus and associated method are described wherein a housing defines a housing interior. A rotatable magnetic media is supported for rotation within the housing interior. A head arrangement is supported within the housing interior, including an actuator arm configured for pivotally accessing the rotatable media and for pivotally moving to a parked position from an access position. A flexible circuit arrangement is configured to include a flexible circuit stiffener having a major surface defining a stiffener plane and which is directly attached to the housing within the housing interior. A ramp arrangement is directly attachable to the flexible circuit stiffener and is configured for receiving the actuator arm in the parked position when so attached. The ramp arrangement further includes an indexing arrangement for engaging the housing in a way which positions the ramp arrangement with at least one controlled tolerance relative to the head arrangement. In one feature, the indexing arrangement and the flexible circuit stiffener are cooperatively configured such that attachment of the ramp arrangement to the flexible circuit stiffener captures at least a selected part of the indexing arrangement between the housing and the flexible circuit stiffener so as to resiliently bias the indexing arrangement against the housing. In a related feature, the housing defines a ramp indexing recess and the indexing arrangement of the ramp arrangement includes a ramp indexing pin which is resiliently biased into the ramp indexing recess to locate the ramp indexing pin with a first controlled tolerance.

In one aspect of the present invention, within a digital system, an assembly includes an electromechanical digital data storage arrangement including a rotatable disk and the assembly is at least responsive to a read gate signal for initiating a read therefrom and responsive to a write gate signal for initiating a write thereto. A host device, within the system, is configured for controlling the data storage arrangement and for generating the read gate signal and the write gate signal in a mutually exclusive way. An interface electrically interconnects the data storage arrangement and the host device using a plurality of electrical conductors such that a selected one of the conductors carries both the read gate signal and the write gate signal.

In another aspect of the present invention, within a system, an assembly includes an electromechanical digital data storage arrangement including a rotatable disk having servo information and user data storable thereon and is configured for generating a servo synchronization signal responsive to the servo information and for generating an error signal responsive to detection of an error relating at least to the user data. A host device, as part of the system, is configured for controlling the data storage arrangement, at least in part, by using the servo synchronization signal and the error signal. An interface electrically interconnects the data storage arrangement and the host device using a plurality of electrical conductors such that a selected one of the conductors carries both the servo synchronization signal and the error signal in a mutually exclusive manner.

In still another aspect of the present invention, a system includes an electromechanical digital data storage arrangement having a rotatable disk and an actuator arm for performing write operations to and read operations from the disk under the control of a servo electronics device having a servo serial interface, in cooperation with a read/write electronics device having a read/write serial interface for control thereof, and a preamp electronics device having a preamp serial interface for control thereof, such that digital data can be written to or read from the disk responsive to a host device, the storage arrangement thereby including a plurality of device serial interfaces. An interface arrangement includes an external serial interface, forming part of the storage arrangement, for use in externally electrically connecting the storage arrangement and for bi-directionally externally transferring a serial control-related data, for use in operating each of the servo device, the read/write device and the preamp device. A host serial interface, forms part of the host device, in data communication with the external serial interface of the storage arrangement, configured for applying a device identification on the external serial interface in a way which directly associates at least a portion of the serial control-related data with each of the device serial interfaces. A serial router, forms part of the storage arrangement, in data communication with each of the device serial interfaces, for using the device identification to manage the serial control-related data bi-directionally between the device serial interfaces and the external serial interface.

In yet another aspect of the present invention, as part of an electromechanical digital data storage arrangement having a rotatable disk and an actuator arm for performing write operations to and read operations from the disk under the control of a servo electronics device having a servo serial interface, in cooperation with a read/write electronics device having a read/write serial interface for control thereof, and a preamp electronics device having a preamp serial interface for control thereof, such that digital data can be written to or read from the disk, and the storage arrangement thereby including a plurality of device serial interfaces, an external interface arrangement includes a primary serial gateway for implementing external bi-directional transfer of a serial control-related data that is used in operating each of the servo device, the read/write device and the preamp device, consistent with a serial protocol. A serial router is placed in data communication with the primary serial gateway for using the serial protocol to manage the serial control-related data bi-directionally between the primary serial gateway and each of the device serial interfaces.

In a continuing aspect of the present invention, in a system including an electromechanical digital data storage arrangement having a rotatable disk and an actuator arm for performing write operations to and read operations from the disk under the control of a servo electronics device having a servo serial interface, in cooperation with a read/write electronics device having a read/write serial interface for control thereof, and a preamp electronics device having a preamp serial interface for control thereof, such that digital data can be written to or read from the disk responsive to a host device, and said storage arrangement thereby including a plurality of device serial interfaces, an interface arrangement including a primary serial gateway, forming part of the storage arrangement for externally bi-directionally transferring a serial control-related data, which is used in operating each of the servo device, the read/write device and the preamp device. A host serial interface, forming part of the host device and in data communication with the primary serial gateway of the storage arrangement, is configured for applying a serial protocol to the serial control-related data passing between the host device and the storage arrangement. A serial router, forming part of the storage arrangement and in data communication with the primary serial gateway, uses the serial protocol to manage the serial control-related data between the primary serial gateway and each of the device serial interfaces.

In a further aspect of the present invention, in a system including an electromechanical digital data storage arrangement having a rotatable disk and an actuator arm for performing write operations to and read operations from the disk under the control of a servo device having a servo serial interface, in cooperation with a read/write device having a read/write serial interface for control thereof, and a preamp device having a preamp serial interface for control thereof, such that digital data can be written to or read from the disk responsive to a host device, and the storage arrangement thereby including a plurality of device serial interfaces each of which is associated with a device such that each device is operated responsive to a read and write command set that is unique to that device, an interface arrangement includes a primary serial gateway, forming part of the storage arrangement, for electrically interconnecting the storage arrangement to the host device to implement external bi-directional transfer of a serial control-related data which is used in operating each of the servo device, the read/write device and the preamp device. A host serial interface, forming part of the host device and in data communication with the primary serial gateway of the storage arrangement, is configured for use in selectively asserting each read and write command set to each of said devices on said primary serial gateway for use in managing each device and for identifying a command that is asserted by the host device to a targeted one of the devices using a device identification. A serial router, forming part of the storage arrangement, in selective data communication with each of the device serial interfaces, uses the device identification to direct the asserted command to the targeted device.

In another aspect of the present invention, in an electromechanical digital data storage arrangement having a rotatable disk and an actuator arm for use in electromagnetically writing user data to the disk and for use in electromagnetically reading the user data from the disk under the control of an electronics arrangement through the use of control-related data, and which electronics arrangement is externally interfaced for transferring the user data, a data interface arrangement includes at least one data line that carries said user data during said read operations and said write operations. A configuration, forming part of the data interface arrangement, uses the data line during operation of the storage arrangement to carry at least a portion of said control related data at a time when the data line is not carrying the user data.

In still another aspect of the present invention, in an electromechanical digital data storage arrangement including a disk for storing user data thereon which user data is transferred through a data port, a configuration including a serial port for operating the storage arrangement using bi-directional control-related serial data that is clocked using a clock signal and means for using the clock signal as a time base reference for writing the user data to the disk.

In a continuing aspect of the present invention, in an overall system including a host device for operational support of an electromechanical storage arrangement, which is provided separate from the host device, and which stores digital data on a rotatable disk, and the host device is provided with a particular firmware configuration for controlling a particular version of the storage arrangement and the storage arrangement may be provided in a updated version which requires an updated firmware configuration in the host device, such that the particular firmware configuration, provided with the host device, is unable to control the updated version of the storage arrangement, the updated firmware configuration is provided as part of the updated version of the storage arrangement. The particular firmware configuration of the host device is configured to automatically query, irrespective of the version of the storage arrangement, any storage arrangement with which the host device is connected for the presence of the updated firmware configuration such that connecting the host device to an updated version of the storage arrangement, upon detection of the updated firmware configuration responsive to the query, causes the host device to operate the system using the updated firmware configuration.

In a system including a host device having a host processing arrangement for controlling the overall host device and for operational support of an electromechanical storage arrangement, which is initially provided separate from the host device, and which stores digital data on a rotatable disk, and a particular firmware configuration is used for controlling a particular version of the storage arrangement such that a first portion of the particular firmware configuration is required to allow the storage arrangement to access any digital data that is stored on the rotatable disk, and where the storage arrangement may be provided in an updated version which requires an updated firmware configuration that changes at least the first portion of the updated firmware configuration, compared to the first portion of the particular firmware configuration, in a way which would at least limit access to the digital data that is stored on the rotatable disk, a firmware control arrangement is provided. The firmware control arrangement includes storage arrangement control means electrically interfaced with the host processing arrangement of the host device and with the updated version of the storage arrangement. The storage arrangement control means includes the particular firmware configuration for controlling the particular version of the storage arrangement. A firmware update is stored in the host device and corresponds at least to a difference between the first portion of the particular firmware and the first portion of the updated firmware configuration in a way that is accessible to the host processing arrangement. Means is provided for transferring the firmware update to the storage arrangement control means, using the host processing arrangement, in a way that causes the storage arrangement control means to, thereafter, execute the first portion of the updated firmware configuration in controlling the storage arrangement. In one feature, the firmware control arrangement includes a second firmware update stored on the rotatable disk, approximately at a time of manufacture of the storage arrangement, corresponding to an additional difference between a second portion of the particular firmware configuration, as compared to a second portion of the updated firmware configuration. The storage arrangement control means is configured for accessing the second firmware update, using the storage arrangement control means, after installing the first portion of the updated firmware configuration, to install the second portion of the updated firmware configuration.

BRIEF DESCRIPTION OF THE DRAWINGS

The present invention may be understood by reference to the following detailed description taken in conjunction with the drawings briefly described below.

FIGS. 4a–4c are diagrammatic timelines illustrating various approaches for performing data transfers in accordance with the present invention.

FIG. 4d is a diagram illustrating the status of data stored in an electronic memory arrangement of the device of the present invention at a particular point in time.

FIG. 35 is a schematic representation of one embodiment of the TIC interfaced with the Storage Element, shown here to illustrate various electrical interconnects and signals on the host side.

FIGS. 37a–c are a block diagram of one embodiment of the Servo/Control (Nova) IC of the present invention, shown here to illustrate details with respect to its highly advantageous structure.

FIGS. 39a–c are a block diagram of one implementation of the overall system of the present invention.

DETAILED DESCRIPTION OF THE INVENTION

Figure 2:
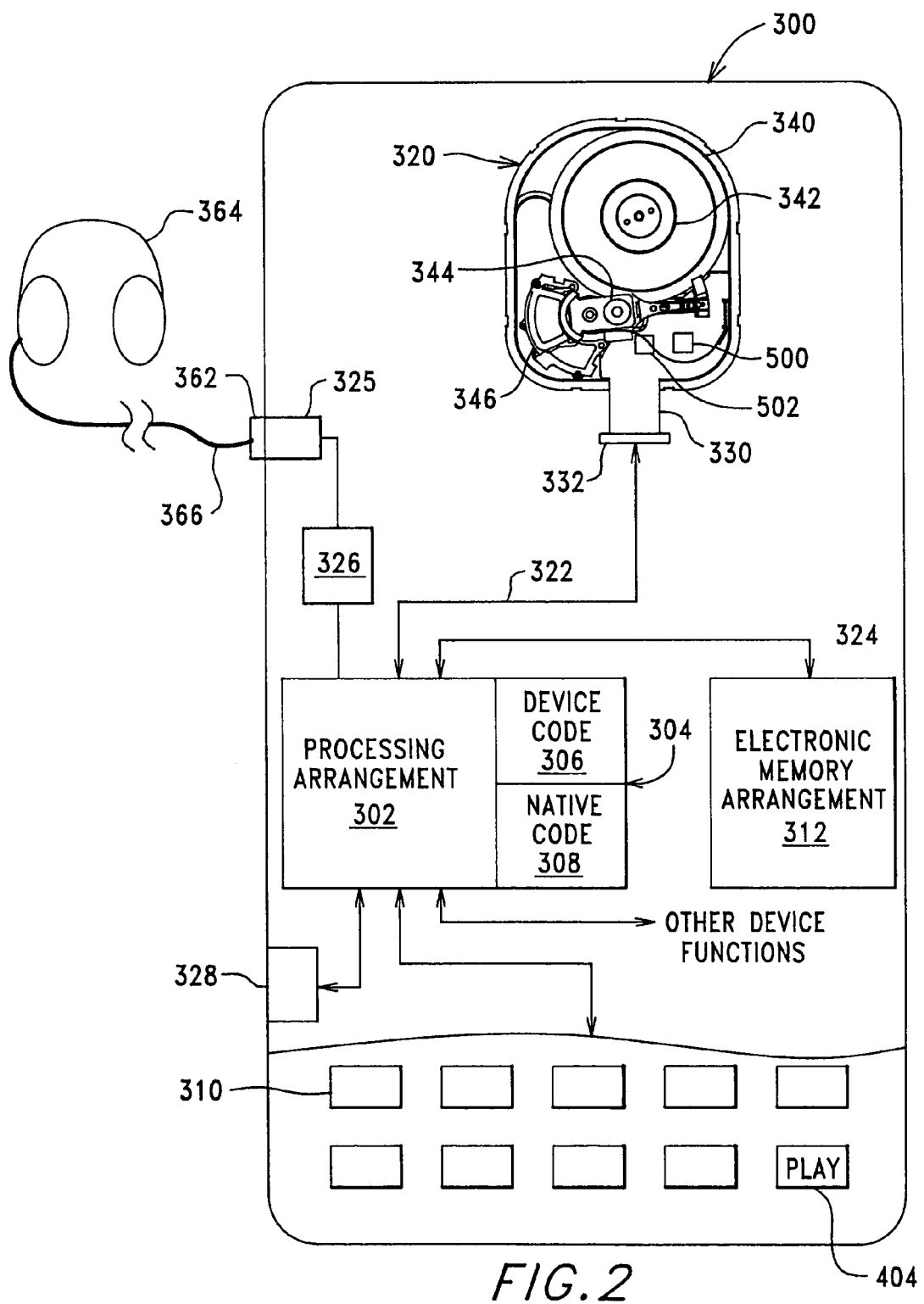
FIG. 2 is a diagrammatic block diagram illustrating one embodiment of a device implemented including a Storage Element of the present invention.

Returning now to the drawings, wherein like components are indicated by like reference numbers throughout the various figures, attention is immediately directed to FIG. 2, which illustrates an electronic device, generally indicated by the reference number 300, manufactured in accordance with the present invention. It is to be understood that device 300 is intended to be representative of any number of digitally implemented device types including, but not limited to wireless telephones, Internet appliances, personal digital assistants, music players, multi-function pagers, multimedia devices or any other device adaptable to use permanently installed digital storage of a size that is typically provided using electromechanical, rather than electronic storage. Moreover, the present invention facilitates the inclusion of additional functionality in devices traditionally having more limited, dedicated functionality. For example, a wireless phone may be provided including such features as a digital camera and/or a digital music player. Specific teachings with regard to integration of such functionality in particular device types will be provided at appropriate points below. The present invention is particularly suited for use in devices which may, at times, be subjected to use in a "hostile" environment in which the device experiences large mechanical shock forces. Portable devices are commonly exposed to such an environment. The present invention, however, is in no way limited to use in portable devices, but finds application in essentially any form of device that is likely to be subjected, at least briefly, to mechanical shock.

Continuing with a description of FIG. 2, device 300 includes a processing arrangement 302 configured for operating the overall device. Processing arrangement 302 includes at least one processor or central processing unit (CPU, not shown). Such a CPU may be designed to cooperate with a chipset (not shown) forming part of the processing arrangement. At the same time, additional, slave CPU's or chips (not shown) may operate at the behest of a master CPU, all of which are considered to form the processing arrangement. It should be appreciated that all of these configurations are considered as being within the scope of the present invention so long as certain teachings are practiced, as will be described.

A memory section 304 is associated with processing section 302 which may be, for example, a suitable form of ROM. Alternatively, the memory section can be made up of a suitable combination of ROM and RAM wherein a volatile RAM portion of the memory section is loaded for device operation during an initial boot-up. Memory section 304 itself includes device code 306 and native code 308. The latter will be described in detail below. Device code 306 enables functionality dedicated to operational and housekeeping tasks common to any particular type of device that is implemented. Moreover, it should be appreciated that the minimum amount of computational power that is commonly needed to operate a device, having somewhat limited dedicated functionality, is correspondingly quite limited with respect to the capabilities of the processors that are commonly employed in such state-of-the-art devices. As one example, processors in wireless telephones may typically be idle for a majority of the time. The present invention may rely on under-utilized capabilities of the processing arrangement in a highly advantageous way, as will be described hereinafter.

With continuing reference to FIG. 2, device 300 further comprises a user interface arrangement 310, for example, in the form of a keypad (only partially illustrated). Other items include an electronic memory arrangement 312 and a Storage Element 320, all of which are connected to processing arrangement 302. Buses/interfaces 322 and 324 connect the processing arrangement to the Storage Element and electronic memory arrangement, respectively. Electronic memory arrangement 312 may comprise volatile memory such as RAM having a predetermined size for use in performing particular operations under control of processing arrangement 302. As one example, the electronic memory arrangement may be loaded, in a manner yet to be described, with digital music that is later read by the processing arrangement, processed and, thereafter, provided to an audio output jack 325 via a suitable audio section 326. It is noted that, while certain features are described herein with regard to processing and handling digital audio, these descriptions are intended for illustrative purposes only and that the underlying concepts of the present invention enjoy a broad range of applicability. A digital interface 328 is provided having an external connection such that device 300 may be connected to an external computer. Suitable interface configurations include, for example, a Universal Serial Bus (USB) interface and IEEE 1394. With appropriate software installed on the external computer, a user may perform maintenance operations with regard to the content available on Storage Element 320. For example, a user may create playlists which are loaded onto the Storage Element. It should be appreciated that any form of digital information may be transferred to or from the Storage Element in this manner.

Storage Element 320 comprises electromechanical storage interfaced to device 300 by a flexible circuit 330 to be described in further detail along with descriptions of other components which make up the Storage Element. For the moment, it is sufficient to note that a connector 332 is provided which accepts a free end of flexible circuit 330 for purposes of interfacing Storage Element 320 to processing arrangement 302 within device 300 via bus 322.

Native code 308, used by processing arrangement 302, is directed to the sole purpose of operating Storage Element 320. The term native code, as mentioned above, encompasses code that is used in the direct control of a device that is peripheral to the processing arrangement. Native code is typically executed by a prior art controller chip and represents the lowest and most direct level of control of the peripheral device. In accordance with the present invention, processing arrangement 302 controls Storage Element 320 using its native code with no intervening protocol layers; comprising instructions that are directly received and acted on by components (to be described) in the Storage Element. No translation of these native code instructions is performed. In essence, native code is the inherent, executable language of the Storage Element. Prior art controllers serve to receive higher level protocol commands and interpret these into native code. In view of the foregoing discussions, direct control of the Storage Element exemplifies an advantageous application of potentially unused, but available processing power of processing arrangement 302. In the event that otherwise unused capability is used, device 300 generally exhibits no user-perceptible performance degradation, as compared to the same device operating conventionally; that is, compared to a device in which a dedicated controller executes native code. Moreover, processing power dedicated to the operation of the Storage Element may deliberately be limited to unused capabilities of a host processor (CPU) already present in the architecture of a particular device. Further, a "transitional" configuration may be provided as an interim solution which includes a transitional IC assisting the host processor in the execution of the native code of the Storage Element. The transitional implementation is advantageous in requiring minimal hardware changes in a preexisting host processor. Cost associated with the modification in the host processor may be limited so as to be essentially insignificant. That is, the modified processor may be provided for any application previously employing the unmodified processor as well as for new applications including Storage Element control functionality.

The transitional IC may be integrated in the chipset of the host IC using, for example, an interface made up of a clock line, one or more control lines and one or more data lines such as NRZ lines. The width of this interface may be limited to further reduce impact on the host processor in terms of pin count. The control line or lines, separate from the data line or lines, is considered to be advantageous in providing direct and immediate control over the Storage Element. In the instance of an interface requiring sharing of control, data and disk-related data (i.e., servo or "user" data stored by the Storage Element), control delays may be encountered as a result of waiting while disk-related data is being transferred. The present invention contemplates a need for immediate control, for example, when a sufficiently high probability of mechanical shock is predicted. Over time, functionality present in a transitional IC may migrate into the host processor. It should be appreciated that the host IC and the transitional IC may utilize vendor unique commands with regard to implementation of specialized features of the present invention within a prior art interface arrangement so long as such commands are compatible with the overall interface protocol that is used. Where the transitional IC is configured to respond to one or more vendor unique commands, the host side requires knowledge of the commands and appropriate programming on the host side to implement the vendor unique commands. For example, a Compact Flash Interface may be implemented between the transitional IC and the host IC utilizing one or more vendor unique commands. The foregoing feature will be discussed further at an appropriate point below.

Figure 3:
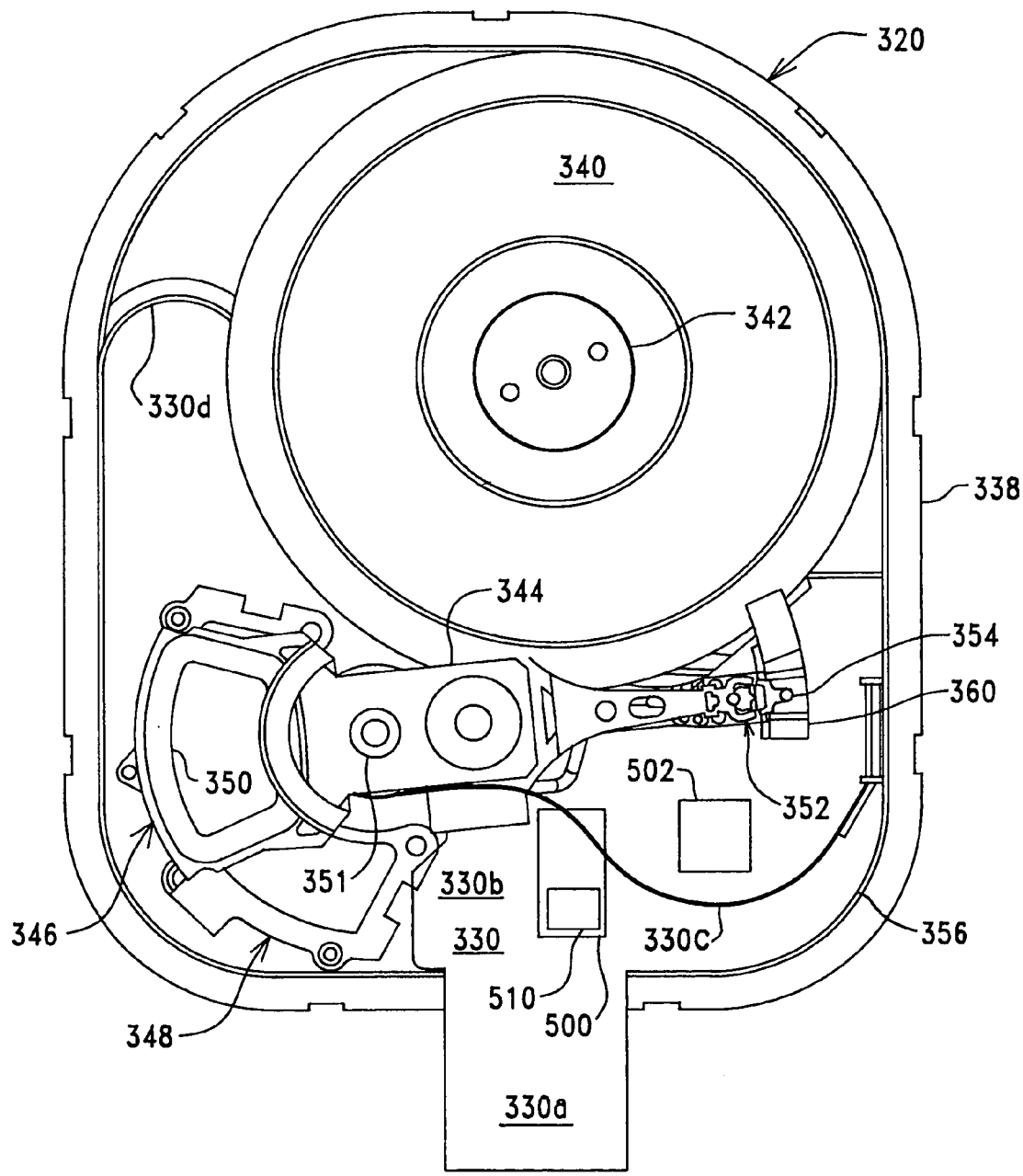
FIG. 3 is a diagrammatic plan view illustrating one possible physical embodiment of the Storage Element of the present invention.

Referring to FIG. 3 in conjunction with FIG. 2, a further advantage of the present invention resides in the "visibility" of the Storage Element to the processing arrangement. Since virtually every aspect of the operation of the Storage Element is controlled by processing arrangement 302 via native code 308, certainty as to the exact operational status of the Storage Element is achieved. In this regard, Storage Element 320 includes a housing 338. A rotatable magnetic media 340 is rotated by a spin motor 342 which is, in turn, supported by housing 338. A sensor arrangement 344 is positioned by a voice coil motor (VCM) 346 (only a portion of which is shown). The term sensor arrangement is interchangeable with the terms head arrangement and actuator arm. As is best seen in FIG. 3, illustrated portions of the VCM include a lower magnet assembly 348 and a voice coil 350 which is supported on the VCM end of actuator arm 346. The upper magnet assembly is not illustrated for purposes of clarity. The actuator arm is supported by an actuator pivot 351 which is, in turn, supported by housing 338 such that the distal end of the actuator arm opposing the VCM may engage magnetic media 340. The Storage Element of the present invention is not limited to the use of magnetic media. Any suitable media may be used such as, for example, optical media so long as the teachings herein are practiced. It should be appreciated that awareness of the status of the components of the Storage Element is important with regard to exposure to external mechanical shock and further in consideration of other attributes of the operation of the Storage Element such as, for example, power consumption wherein the status of spin motor 342 is crucial.

Still referring to FIG. 3, the distal end of the actuator arm opposing the VCM includes a transducer arrangement 352 and a lift tab 354. It should be appreciated that flexible circuit 330 includes various portions serving different components within the Storage Element. A free end 330a of the flexible circuit is configured for engaging connector 332 (see FIG. 2). A flex carrier platform 356 supports a main portion 330b of the flexible circuit. Flex carrier platform 356 is mounted (not shown) in a suitable way such as, for example, using stand-offs which engage housing 338. In one highly advantageous feature, a ramp 360 is supported by flex circuit main portion 330b. Ramp 360 is engaged by tab 354 on the outermost end of the actuator arm when the actuator arm is moved into its illustrated parked configuration. Supporting the ramp in this manner, having the parked actuator arm proximate to the flexible circuit, facilitates application of the flexible circuit in confirming the parked position of the actuator arm, as will be further described. Other parts of the flexible circuit include an actuator arm connection 330c (also referred to as a dynamic loop of the flexible circuit), which is connected to main portion 330b, and a flex loop portion 330d which is connected between spindle motor 342 and main portion 330b.

Figure 1:
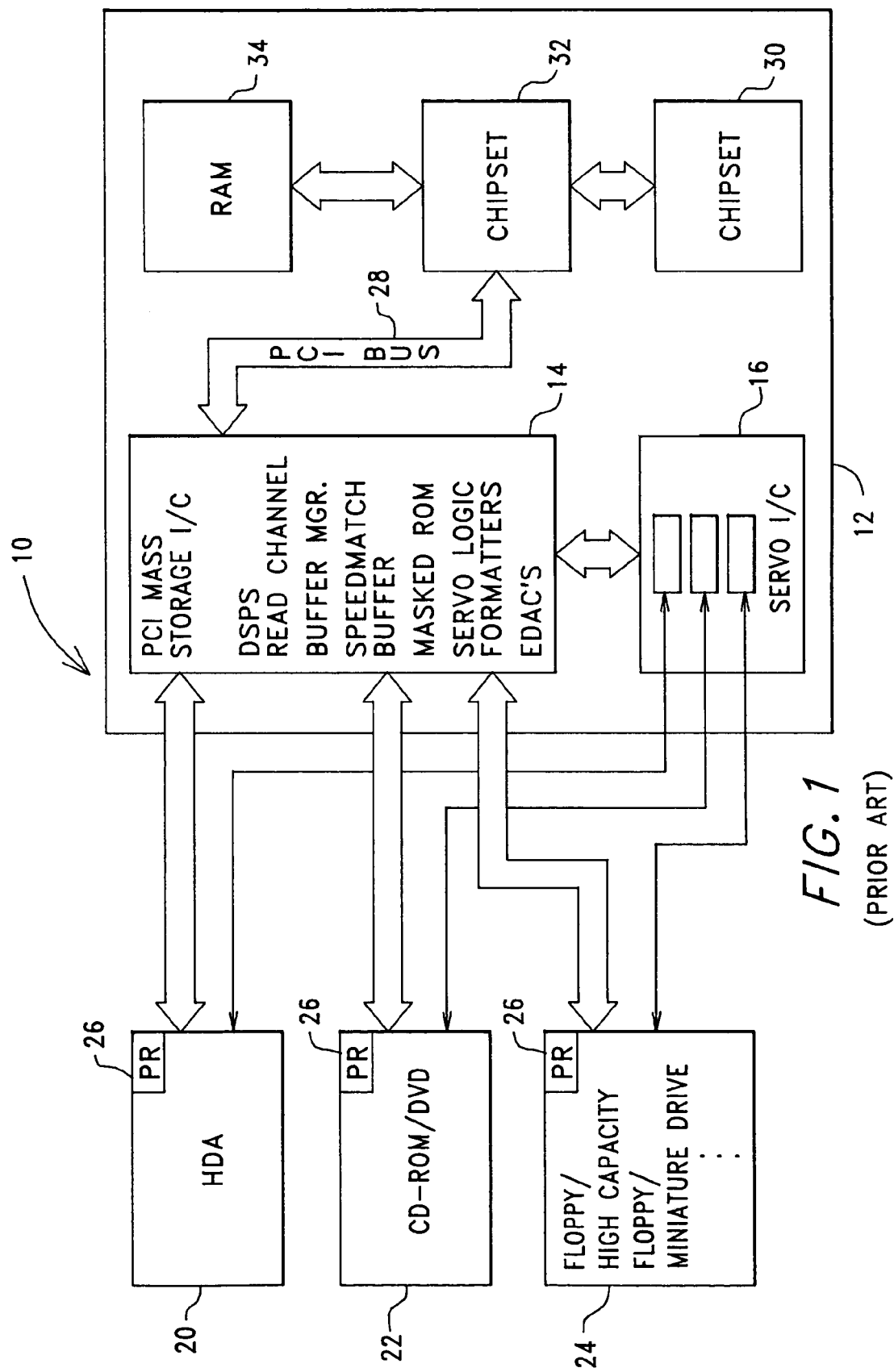
FIG. 1 is a block diagram taken directly from U.S. Pat. No. 6,061,751 shown here to serve as one focal point for discussion relative to prior art design considerations regarding hard disk drives.

Attention is now directed to FIG. 1 for the purpose of continuing the discussion of the visibility aspect of the present invention relative to the '751 patent. It is important to understand, with regard to prior art FIG. 1, that visibility of peripheral components to the processing arrangement, consisting of CPU 30 and chipset 32, is limited based on constraints imposed by PCI bus 28. An associated penalty, alluded to above, resides in a degree of uncertainty accompanying issuance of commands through the PCI bus to a controller which interprets the commands and, in turn, issues native code directly to the peripheral. Applicants are aware that, in some instances, discretion is present in the way that commands are implemented within the controller. As an example, in the context of the '751 patent, it is assumed that a read command is issued by CPU 30 for the purpose of transferring certain data from HDA 28 to RAM 34. Accordingly, the disk (not shown) of the HDA will spin-up prior to reading the data and a sensor (not shown) will then be used to read from the disk. As is well known to one having ordinary skill in the art, the HDA is especially susceptible to external mechanical shock during sensor access to the disk. At some point thereafter, the requested data will return via the PCI bus. From the perspective of the present invention, it is of interest that the status of the HDA disk motor and the sensor may be unknown. Specifically, the time at which the spin motor spins down and the sensor is parked are under control of the metrics of PCI mass storage IC 14, serving here as a controller. For example, the HDA spin motor may spin down if an additional command is not received within a predetermined period of time. Thus, spin down may occur long after completion of the requested data transfer. CPU 30 has no way of establishing the status of the HDA disk motor beyond issuing a "spin down" command, which may or may not be available, depending upon the protocol in use. Essentially, this is an open loop arrangement which is considered by Applicants as being unacceptable.

Attention is now directed to another prior art interface, CF+ which is mentioned above with regard to its use in the IBM Microdrive, in further examining discretion in command implementation with its accompanying problems. CF+ is an expanded version of CompactFlash that is enhanced to encompass various I/O devices including magnetic disk data storage. CF+ implements a CF-ATA command set which is taken from the ATA interface of IDE (Integrated Drive Electronics). One aspect of drive operation that is of particular interest with regard to the present invention resides in an awareness of the status of the head arrangement. Generally, as described, the head arrangement may be parked so as to provide its highest resistance to mechanical shock. It should be appreciated, however, that even though a head arrangement is not reading or writing data, it may be left in a floating state. One IDE command encompassed by CF+ is "Idle Immediate" (see page 74 of the CF+ specification). Typically, an idle state means that the spin motor is spinning, but there is no required status as to the head arrangement. That is, the head arrangement could be parked or floating. The actual status is left to the discretion of the implementer. The CF+ specification and IDE/ATA itself are therefore ambiguous with regard to head arrangement status in Idle. Other CompactFlash commands which exhibit similar ambiguity include Idle, Standby, Standby Immediate and Set Sleep Mode. While the designers of the interface perhaps considered this ambiguity as advantageous in allowing design flexibility, the present invention considers this ambiguity as unacceptable in view of the contemplated operating environment.

Unfortunately, the commands described immediately above are implemented in an open loop manner whereby no confirmation of actually accomplishing a physical act thought to be associated with the command is provided. The commands merely require clear BSY and generate an interrupt without defining an associated hardware status. The response may be generated as a mere response to receipt of the command by the receiving electronics. Thus, the capability to be certain as to the operational state or condition of a peripheral is limited at best and may be essentially nonexistent.

The present invention, in contrast, resolves this ambiguity through operating using the processing arrangement of the overall device in direct native code communication with the Storage Element while, at the same time, serving the entire device. That is, among many available control actions, the processing arrangement directly executes head parking using native code. In this way, there is no discretion as to implementation of an "intermediate" command which requires translation by a controller to, in turn, operate the peripheral device. Further, as will be seen, highly advantageous provisions are available for confirming the positional status of the head arrangement as well as other operational aspects of the Storage Element of the present invention. Again, such monitoring provisions, in being implemented with direct control by the processing arrangement, do not exhibit the command ambiguity seen, for example, in IDE and PCI. Moreover, the present invention incorporates highly advantageous status monitoring capabilities which are implemented via native code control and which are submitted to provide sweeping advantages when operating in a potentially hostile environment, as will be described in detail at an appropriate point hereinafter.

Any degree of discretion permitted in command execution is considered as problematic, particularly with respect to operation where potential exposure to mechanical shock is a reality. The processing arrangement and Storage Element of the present invention cooperate in a heretofore unseen way wherein the processing arrangement directly controls the Storage Element in a series of control events forming a data interchange sequence. The latter is typically initiated when no more than an initial portion of the user interaction defines no more than an initial portion of the data interchange sequence. Entry of a command during a user interaction is interpreted "on-the-fly" by processing arrangement 302 in a way that serves to define control events that are related to the native code of the device that is being controlled. Additional control events are then executable immediately upon interpretation, with continuing command entry by the user. Thus, the present invention copes with potential exposure to mechanical shock, in the first instance, through an intimate awareness of the operational status of a shock-sensitive peripheral. Still further features cooperate with this initial feature, as will be seen.

As described above, even prior art hard drives resist mechanical shock at relatively high levels when the actuator is parked and the spin motor is not spinning. Storage Element 320 is similar in this regard, including still further features which enhance its resistance to mechanical shock beyond the capabilities of prior art drives. Various ones of these features will be taken up at appropriate points in the discussion below. Electronic memory, on the other hand, is immune to mechanical shock for practical purposes. In this context, the present invention recognizes that placing Storage Element 320 into its most mechanical shock-resistant state, which may be referred to as its "safe state", is highly advantageous when exposure to shock events is more likely. Of course, electronic memory arrangement 312 remains usable irrespective of the potential mechanical shock exposure environment.

Under the assumption that device 300 comprises a cellular telephone incorporating a music player, it should be appreciated that such portable device genres may be subjected to significant levels of mechanical shock, for example, in being dropped or hit. The present invention recognizes that a device such as a cellular telephone is used in a general way which characteristically includes periods of time during which the phone/player combo is not likely to receive a significant mechanical shock. In particular, during actual access by the user of the device, for example, participating in a call, the device experiences a stable environmental condition. At other times, when the phone is not in use, the environment, relative to mechanical shock, is not so predictable. Such times include storage of the phone, for example, on a belt clip or in a purse. Even more precarious times include those times during which the user transitions the device from actual use to storage and vice versa. It is submitted that the transition time is the most hazardous since the user may drop the device, thereby subjecting it to high mechanical shock. Therefore, device 300 is configured so as to utilize Storage Element 320 primarily during user access while avoiding the use of the Storage Element during transition times which immediately precede and follow user access periods. Details with regard to implementation of this highly advantageous configuration are provided immediately hereinafter.

Referring to FIG. 2, in order to further mitigate the potential for subjecting device 300 to mechanical shock, the device includes a headphone receptacle disconnect feature. Accordingly, processing arrangement 302 unloads the Storage Element heads responsive to disconnect of a headphone plug 362 from device receptacle 325. Hence, if the device has been dropped, the heads are unloaded prior to contact of the device with the ground. In order to further enhance this feature and assuming that a headset 364 (or earpiece) is positioned on the user's head during playback, the length of a cable 366 leading to the headset and connected to the receptacle may be selected whereby disconnection will generally occur prior to the device contacting the ground.

Still further benefit may be derived by providing elasticity in the headset cable. In an associated feature, head unloading time defines a minimum headphone disconnect drop height, above which there is sufficient time to accomplish the unloading operation, but below which there is insufficient time to perform head unloading. When the device is dropped below the minimum headphone disconnect height, shock susceptibility may be reduced or effectively eliminated due to protection imparted by a shock isolation mounting system provided for the Storage Element in conjunction with initial near proximity to the ground.

Figure 4A:
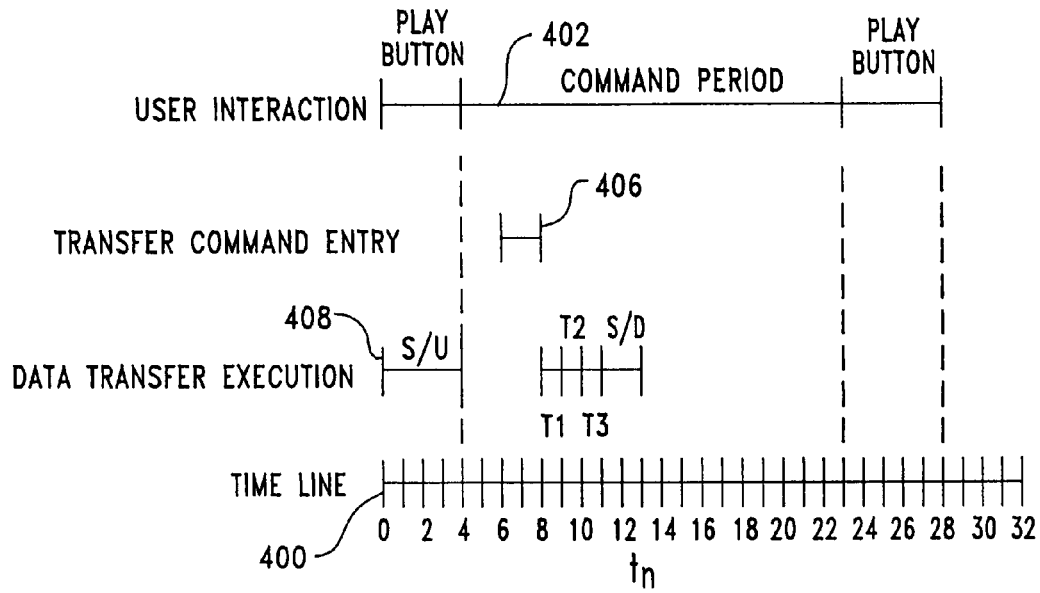

Having described certain physical attributes of device 300, attention is now directed to FIG. 4a in conjunction with FIG. 2. The former figure illustrates the operation of device 300, in accordance with the present invention, under a first operational scenario. A timeline is indicated by the reference number 400 with individual time periods from $t_0$ to $t_{32}$. A user interaction 402 takes place via user interface arrangement 310 and is made up of a sequence of individual commands. Initiation of the user interaction begins with the user actuating a song selection/play button 404 (FIG. 2). Thereafter, commands are used to select three songs to be played by the device. It is noted that selection of each individual song is not illustrated in the user interaction for purposes of simplicity. One example of a command sequence in selecting songs to play might be to initially depress play button 404. The initial actuation of the play button occurs over time periods $t_0$ to $t_4$. The user might then use numerical menu indications (not shown) within a song menu to enter specific songs from the list over the interval comprising time periods $t_4$ to $t_{23}$. Songs may be selected either as a group or individually. It is noted that a limited number of song titles are selected in the present example for clarity of illustration; however, any number of song titles may be selected, limited only by the constraints of the physical storage available in device 300.

For further purposes of the present example, all three selections are made in the form of a set at one point in time such that associated data transfers may be performed without intervening delays. Having selected these songs, the user concludes the command by again engaging play button 404 in a predetermined way, as will be described, over $t_{23}$ to $t_{28}$.

Initially, the digital data representative of each of the song selections is stored by Storage Element 320. Conversion of the digital information to an audio signal by processing arrangement 302, ultimately to be made available to a user at audio jack 325, first requires moving the data associated with the songs from Storage Element 320 to electronic memory arrangement 312. As mentioned above, playing the songs from electronic memory arrangement 320 is performed with relative immunity to mechanical shock, after moving the corresponding data from Storage Element 320 to the electronic memory arrangement. During the course of user interaction 402, processing arrangement 302 monitors the user interaction to interpret user input commands, as represented by a command entry line 406.

Processing arrangement 302 monitors user interaction 402 for the earliest possible indication that a data transfer involving Storage Element 320 is imminent. That point may be chosen, for example, as that time when the user views a song selection menu on a display screen (not shown) of the cell phone/music player device, when the user first depresses play button 404, when the user depresses a player selection button or device operation branches to player-oriented features during a menu-driven selection sequence being performed by the user. Rather than wait until user command period 402 is complete at $t_{28}$, processing arrangement 302 immediately readies Storage Element 320 for the access.

In the present example, the chosen point in time is selected as to, when play button 404 is first actuated. Accordingly, processing arrangement 302 responds by spinning up rotatable media 340. The spin-up event is shown in a data transfer execution line 408, indicated as S/U, beginning at time $t_0$ and continuing up to time $t_4$. It is noted that the spin-up process can comprise the most time consuming event in the overall operation of Storage Element 320. For this reason, anticipation of the pending data access, in the manner taught by the present invention, is considered to be highly advantageous. Further in this regard, spin-up time is not an arbitrary factor, but rather, can be controlled to provide optimum results. A number of factors should be weighed in this optimization including, for example, the fact that mandating a very fast spin-up in a portable device may result in shortened battery life. Still other factors affect the rate at which data transfers can be accomplished. Among these are the speed at which the magnetic media disk is rotated. It is noted that the typical point at which the prior art initiates command execution (i.e., spin-up) is typically at $t_{28}$. The present invention achieves a sweeping advantage, in terms of mechanical shock protection, by initiating command execution at a far earlier chosen point in time.

Having accomplished spin-up, data transfers can be accomplished in very rapid succession thereafter. In this regard, transfers illustrated in the present figures are shown as each taking one time period, while the spin-up time is shown as taking four time periods. It should be appreciated, however, that the time durations of the spin-up and data transfers may vary relative to one another according to particular implementations. The data transfers are indicated as T1–T3 wherein one of the transfers is associated with each song to be played. The present invention recognizes that the duration of data transfers to and from the electronic memory arrangement can be controlled in an affirmative manner that is not only operationally effective with regard to limiting exposure of Storage Element 320 to mechanical shock, but is also cost-effective.

Still referring to FIGS. 2 and 4a, data transfer T1 begins at time $t_8$, immediately upon completion of entry of transfer command 406. Transfers T2 and T3 begin at times $t_9$ and $t_{10}$, respectively. In essence, each transfer requires a data interchange sequence defining a series of control events that are discreetly executable by processing arrangement 302. As noted above, each transfer is completed in a single time period. Following completion of transfer T3 at time $t_{11}$, processing arrangement 302 "shuts down" the Storage Element spin motor and parks its head sensor arrangement over time periods $t_{11}$ and $t_{12}$, indicated as S/D, to place the Storage Element in the safe state. In this regard, it is noted that the shut-down process may be somewhat long compared to the data transfer times, again depending upon the particular implementation. The more important component of the process essentially consists of unloading sensor arrangement 344 to its mechanical shock-resistant parked position. It should be appreciated that this latter operation can be performed in a rapid manner. For example, prior art hard drives are capable of parking the actuator or sensor arrangement in time periods on the order of 200 milliseconds. With certain enhancements, the present invention contemplates parking of sensor arrangement 344 of Storage Element 320 in a time period of no more than approximately 100 milliseconds. In any case, time periods of these orders of magnitude are typically far shorter than responses seen as a result of human interaction. In the present example, the command period of user interaction 402 extends considerably beyond completion of transfer command 406 such that the Storage Element has long since been placed into its safe state pending a potential mechanical shock event during a subsequent transitional movement by the user. Alternative scenarios will be presented below.

Still considering FIG. 4a, it is important to understand that the capability of the present invention to provide for the best protection against mechanical shock for the Storage Element during the transitory period is derived from beginning the command execution sequence at the soonest possible moment. This precept allows for completion of associated data transfers at the soonest possible time, even prior to conclusion of the user interaction. The beginning of data transfer execution may be delayed somewhat, for example, by initiating the spin-up at the conclusion of the initial actuation of play button 404 at time $t_4$ or even until conclusion of transfer command entry at time $t_8$. In this regard, it is noted that nine time periods make up the actual spin-up, data transfer and spin down operations. Therefore, spin-up could be initiated as late as time $t_{19}$ in order to successfully complete all of the operations by time $t_{28}$. It should be mentioned that this capability is available, at least in part, as a result of the intimate control and awareness present between processing arrangement 302 and Storage Element 320 enabled by running native code in the processing arrangement. As will be described below, a number of features may be provided to ensure that data transfer operations are at least partially complete and return to the safe state is accomplished prior to a user transition of the device.

Figure 4B:
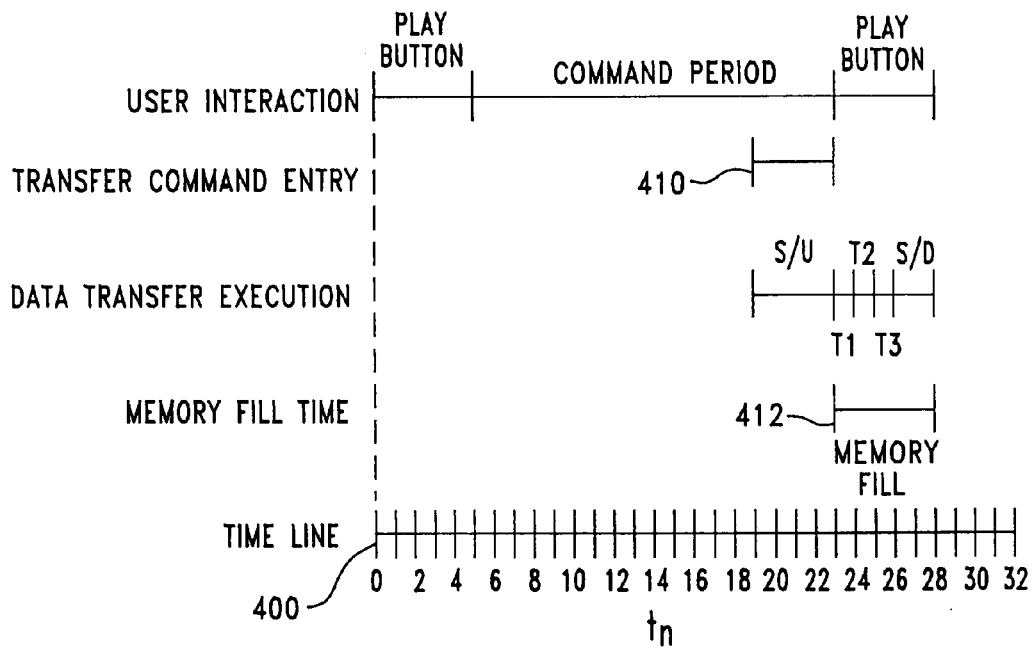

Referring now to FIGS. 2 and 4b, one highly advantageous feature of the present invention, relating to mechanical shock resistance of Storage Element 320, resides in control of the size of data transfers to and from the Storage Element. For descriptive purposes, FIG. 4b illustrates a transfer command entry 410 interpreted over time periods $t_{19}$ through $t_{23}$ to define T1–T3. It should be appreciated that these transfers utilize electronic memory arrangement 312. Spin-up occurs concurrent with transfer command entry. By sufficiently limiting the overall storage capacity of the electronic memory arrangement, the duration of time required by any data transfer is limited to the corresponding time that is required to fill electronic memory arrangement 312. In the example of FIG. 4b, it is assumed that the electronic memory arrangement can be filled (or completely written to Storage Element 320) and then spun down by processing arrangement 302 in no more than five time periods, providing for completion of data transfers T1–T3. Hereinafter, this specific length of time may be referred to as the "memory fill" time period indicated by the reference number 412. In this connection, the reader is reminded that the user of device 300 is required to actuate play button 404 so as to conclude the user interaction. In order to ensure that all data transfers involving Storage Element 320 are completed at or before the conclusion of the user interaction, the user is required to press play button 404 for a time period that is at least as long as the memory fill time or may require a confirmation action (such as, for example, subsequently depressing a button). This actuation of the play button may be referred to hereinafter as "play initiation" or "command initiation". Again, such time durations, as contemplated here, are extremely short in terms of human perception. As a practical example, the present invention contemplates a memory fill time of approximately 2–4 seconds using an electronic memory arrangement having a capacity of 32 MB. It should be mentioned that limiting the size of the electronic memory arrangement is attended by the further advantage of cost savings. As will be seen, the present invention uses the electronic memory arrangement in ways that might lead a user to believe that an electronic memory of a much greater size has been provided. Of course, larger size electronic memories may be employed while still practicing the teachings disclosed herein by appropriately setting a maximum size data transfer.

Other modifications are equally within the scope of the present invention. For example, the Storage Element spin-up time may be included as part of the memory fill time to define an "extended memory fill time". In this instance, the user is required to press play button 404 for the additional length of time encompassing the drive spin-up time. The Storage Element spin-up time may be on the order of, for example, less than 500 milliseconds. In the event that the user fails to depress the play button for a sufficient period of time, an audio and/or visual alert may be provided. Moreover, insufficient actuation of the play button may trigger an immediate shutdown of the Storage Element, ignoring any pending data transfers in order to avoid the mechanical shock threat which is present during user transitioning of the device, following the incomplete user interaction. In the presence of such constraints placed upon the user, it is considered that the user will quickly learn to use the device consistent with imposed requirements for best protecting Storage Element 320 from the risk presented by mechanical shock. Even with the foregoing operational constraints in place, it is considered that a user may operate and treat device 300 in essentially the same manner as a device conventionally configured without Storage Element 320. That is, any differences are intended to be essentially inconsequential from the viewpoint of the user. As an alternative, presentation of a play option may be precluded until such time that data transfers from the Storage Element to memory have been completed.

Turning now to FIGS. 2 and 4c, in one feature associated with the use of a limited size electronic memory arrangement, the present invention operates in an opportunistic manner when handling data transfers that are larger than the memory fill size. FIG. 4c illustrates a user interaction sequence 420 having a first User Access Event which itself defines six data transfers having a combined size that is twice the size of electronic memory arrangement 312. That is, the user interaction defines a total transfer size that exceeds the capacity of the electronic memory arrangement. The first user interaction begins at $t_0$ and continues until time $t_{11}$ upon release of play button 404 or other such identifiable event. The six transfer commands are entered during a transfer command entry period 422. In the present example, the first three transfers are selected as a group while the last three are individually selected. The user may have selected the song items to be played by viewing different song lists in some random order, thereby creating an extended command entry period having idle times between selections. Again, this command entry period has been shown in a way that accommodates illustrative limitations of the present forum which, when drawn in proportion, would appear much longer in duration compared, for example, to transfer times. Individual transfer commands are not shown in User Access Event 1 for purposes of simplicity.

Spin-up of rotatable media 340 of Storage Element 320 is initiated at time to with actuation of play button 404 (indicated as P/B), prior to transfer selections made by the user. Transfer of the digital data corresponding to the first song selection ensues on a data transfer execution line 424 at a time during the transfer command entry when the user selects the song corresponding to T1. Thus, in the present example, command execution begins not only prior to the end of user interaction 400, but even before actual completion of command entry 422 by the user. Alternatively, spin-up of the Storage Element magnetic media may be delayed until time $t_2$, corresponding to the definition of transfer T1 being available, in view of the ongoing entry of the transfer command sequence during transfer command entry 422; however, entry into the safe state of the Storage Element is thereafter delayed by a portion of the spin-up time.

By initiating spin-up upon detection of actuation of the play button, each of the T1–T3 data transfers may be performed almost simultaneously with the associated command defined within User Access Event 1. As mentioned above, it is also considered to be advantageous to spin-up responsive to a menu selection sequence initiated by the user at a point which branches to player functionality. In any case, for play initiation, the user is required to depress play button 404 for the predetermined period of time from $t_6$ to $t_{11}$, corresponding to that time which is required to completely fill electronic memory arrangement 312 after the command entry selections. The actuation is indicated as play initiate (PI) in user interaction 420. It is observed that the transfers are complete and the Storage Element is placed into its safe state well before the earliest time ($t_{11}$) at which the user may release the play button for play initiation of all pending data transfers. In the event that the user fails to successfully play initiate the selections, the pending transfers may be canceled and the Storage Element immediately placed into its safe state. At the same time, an error signal may be provided to the user. The error signal serves at least two purposes. First, it informs the user that an error was made such that the user may modify future selection entry to avoid the inconvenience of canceled selection transfers. Second, the error signal is intended to introduce a delay prior to the user transitioning the device, for example, to a belt clip or purse. In this regard, it is considered that even the slightest delay on behalf of the user will provide for proper entry of the Storage Element into the safe state prior to transitioning of the device. As another alternative, the Storage Element may be placed in the safe state immediately upon indication by the user that no additional selections are to be made which would require an associated transfer. For example, upon being presented with a screen display asking, either alone or as one choice in an overall menu, "Make another selection? y=1, n=2. x?", an "n" or "no" choice may result in immediately placing the Storage Element into the safe state, irrespective the status of ongoing and/or pending transfers. In most cases, it is considered that a majority of the transfers requested by the user will opportunistically be completed while the user interaction is underway. Still further alternatives may be developed by one having ordinary skill in the art in view of this overall disclosure.

Having filled the electronic memory arrangement using T1–T3, the data stored therein may be used in any suitable way. For exemplary purposes, the present discussion assumes that the data is used to generate a music signal during an interval labeled as I1. The present example further assumes that the data is used to form the music signal at a rate that is one-sixth the rate at which the data may be transferred. Of course, such data is much more likely to be used at a far slower rate, in comparison with the data transfer times. For the purpose of playing music files with state-of-the-art compression, Applicants contemplate a play time of approximately 60 minutes where the electronic memory arrangement has a size of approximately 32 MB. Because the user-defined transfer is incomplete until such time that all six song selections have been made available for listening, processing arrangement 302 is advantageously configured for tracking use of the data that is stored by the electronic memory arrangement.

With regard to mechanical shock, it is desirable to perform the remaining data transfers, comprising T4–T6, so as to limit potential exposure of Storage Element 320. In accordance with the present invention, the remaining data transfers are performed at one or more opportune times. In the present example, one additional transfer of all three remaining song titles is capable of completely filling electronic memory arrangement 312. Such a transfer would include all of T4-T6. According to the teachings above, the most opportune time to perform data transfers is generally during a user access. Unfortunately, because the precise timing of subsequent user accesses is unknown, there is no certainty as to a user access taking place at the precise time when playback of the three initial transfers concludes. As will be seen, the present invention provides a highly advantageous feature to address this problem in an effective manner.

It should be remembered that user accesses are performed for various purposes. In the present example, accesses may be performed for the purpose of selecting songs to be played or to use other features of device 300, for example, in telecommunications modes which may include receiving and originating telephone calls and/or the implementation of other messaging services such as paging and sending and/or receiving e-mails. When device 300 is used for any of these other intended purposes, the associated user access, like the access for the purpose of entering song selections, is likewise less subject to the receipt of a mechanical shock. For this reason, device 300 is configured to opportunistically execute data transfers involving Storage Element 320 during user accesses whenever possible.

Referring to FIG. 4d in conjunction with FIGS. 2 and 4c, one important feature associated with this opportunistic configuration resides in replacing "used" data resident in electronic memory arrangement 312 during subsequent user accesses, irrespective of the specific purpose to which the subsequent user accesses might be directed. For purposes of illustrating this feature, user interaction 420 includes a series of interactions, labeled as User Access Events 2–4, subsequent to User Access Event 1. It is assumed, for illustrative purposes, that each of these subsequent events involves using device 300 in a telecommunications mode, for example, receiving or originating a telephone call, such that playback of audio data stored in the electronic memory arrangement 312 ceases for the duration of the call. At time $t_{17}$, User Access Event 2 is initiated. Playback of audio data stored by electronic memory arrangement 312 takes place during an interval I1 from the conclusion of playback initiation at $t_{11}$ to $t_{17}$. At the onset of User Access Event 2, six playback time periods have elapsed, corresponding to the playback of the song associated with the T1 transfer. It should be remembered that the duration of the subsequent user events has been illustrated as being extremely short in order to fit these events into FIG. 4d. In reality, it is likely that these user events would appear extremely long relative to events such as placing Storage Element 320 into its safe state. Nonetheless, the concepts of the present invention remain effective, even in the face of the extremely short user access intervals illustrated.

FIG. 4d illustrates the state of electronic memory arrangement 312 at $t_{17}$. One-third of the stored data has been used during I1; while the data transferred in T2 and T3 remains unused, filling the remaining two-thirds of the capacity of the electronic memory arrangement. When User Access Event 2 is initiated at $t_{17}$, processing arrangement 302 recognizes the opportunity to safely replace the used T1 data contained by the electronic memory arrangement. Accordingly, magnetic media 340 of the Storage Element is spun up at $t_{17}$ for the purpose of transferring T4 at time $t_{20}$. Immediately thereafter, the Storage Element is placed into its safe state. As illustrated in FIG. 4c, this process is repeated for transfers T5 and T6 at User Access Events 3 and 4, respectively. The data stored in the electronic memory arrangement 312 corresponding to the T2 transfer is replaced by the T5 transfer, while the data corresponding to the T3 transfer is replaced by the T6 transfer, respectively. Processing arrangement 302, operating as described, has orchestrated a highly advantageous cooperation taking place between the electronic memory arrangement and the Storage Element that is transparent to the user. In the instance of events which necessitate ceasing audio playback such as, for example, receipt or initiation of a call, it is generally considered to be desirable to require the user to re-initiate audio playback even though audio playback could resume automatically. Re-initiation serves the purpose of confirming that the user indeed wishes to continue listening to audio that is electronically saved. This subsequent event re-initiation has not been illustrated in FIG. 4c due to drawing space limitations. In one feature, the user may receive a prompt to view a menu with various selections as to the use of electronically saved data. As an example, the menu selections might include: 1) Resume audio playback; 2) Add more playback selections; 3) Edit playback selections; 4) Suspend playback until later; and 5) Erase current selections.

It should be appreciated that there may be times when no subsequent user access events occur to enable opportunistic performance of data transfers. The behavior of device 300 can be controlled, under such circumstances, so as to implement a desired level of mechanical shock protection for the Storage Element. In order to provide the highest possible level of protection, the device may signal to the user, via processing arrangement 302, that it has run out of data to play and, thereafter, stop playing. For example, an audio statement may voiceover the playback audio saying, for example, "Please refresh the song play list." Visual notifications may be provided as an alternative or accompanying the voiceover. Alternatively, the device may be configured to repeat playback of the data that is already present in the electronic memory arrangement. The user then has the option of initiating a user interaction in order to permit an opportunity to refresh data stored by the electronic memory arrangement.

The present invention provides a particular feature which is considered to be highly advantageous, for example, in the context of refreshing the electronic memory arrangement. Specifically, an arrangement and method are disclosed for monitoring the environment of the Storage Element. One aspect of environmental monitoring that is encompassed is measurement of mechanical shock at the location of the Storage Element. Thus, rather than attempting to control the environment by requiring a user interaction to refresh the electronic memory, the processing arrangement may observe the current shock environment and/or a record thereof in making an assessment as to whether the current environment is safe enough to proceed with a "refresh" transfer. These environmental monitoring features will be described in detail at appropriate points below.

Inputs or events, other than user accesses, may take place which ultimately require use of the Storage Element so as to create pending data transfers. In the absence of a user access coincident with the input, however, it is preferred to store data in the electronic memory arrangement. For example, an incoming email or voice message may be received. Under such circumstances, the present invention contemplates electronic storage, at least temporarily, within electronic memory arrangement 312. For example, an incoming email or voicemail message may always be given storage priority over digital music stored in the electronic memory arrangement. Initially, audio data that has already been played back may be replaced. When a user access is thereafter initiated, such as a telephone call, the electronically stored messages may opportunistically be moved from electronic storage to the Storage Element in a manner that is consistent with the foregoing descriptions.

Under the aforedescribed situation in which pending data transfers are defined as a result of the limited storage capacity of the electronic memory arrangement, another operational condition may arise wherein a subsequent event itself requires access to the Storage Element. In this instance, the associated transfers may be performed in a sequential or interleaved manner. The reader is again reminded that the combined size of all transfers is limited by the capacity of the electronic memory arrangement which, in turn, limits the potential time duration of a "memory fill" transfer. Additional priorities may be prescribed such that communications transfers (e.g., voice and email) have priority over music data transfers.

When an incoming message such as, for example, a voice mail or email is of a size that is larger than the electronic memory arrangement, storage of the message may begin in the electronic memory arrangement. In the absence of a user interaction, the user may be notified of the incoming message in a suitable manner so as to initiate a user interaction. If the user is unavailable, the highest level of protection for the Storage Element mandates postponing receipt of that particular message until a more opportune time.

In view of the foregoing, attention is now directed to the command design concept and command interpreter of the present invention. Having the highly advantageous recognition in hand that command entry and execution may occur concurrently, rather than sequentially, Applicants further recognize that cooperation between the processing arrangement, Storage Element and electronic memory arrangement can provide even more enhancement with regard to completion of data transfers in the most expedient manner possible, relative to a specific command. In particular, the present invention provides for "building" or designing commands in a way which is thought to implement the most rapid possible execution of associated data transfers. One example, seen frequently in the foregoing discussions, resides in when the command specifies spin-up of the rotatable media of the Storage Element. In one feature, spin-up of media 340 of Storage Element 320 takes place once the number of defined transfers have a combined capacity that approaches or exceeds the storage capacity of electronic memory arrangement 312. Thus, referring again to FIG. 4c, assuming that transfers T1–T3 equal the capacity of electronic memory arrangement 340 and further assuming that T1–T3 are all defined at time $t_4$ (during entry of transfer command 422), spin-up (not shown) takes place at $t_4$. In association with this feature, the command interpreter may on-the-fly examine the size of each transfer as it is defined to monitor the overall size of the combination of defined transfers. A determination may be made, for example, of an average size transfer. At a point during user selections when the combined total size of all transfers leaves less space available in the electronic memory arrangement than one average size transfer, spin-up may be initiated. In other words, spin-up occurs when the user is within one average size selection of memory fill.

The command interpreter of the present invention may also establish optimum spin-up time based on the rate of user activity during entry of transfer commands. For example, the command interpreter of the present invention may monitor the rate at which a user makes selections. In this way, an average selection rate can be established such that optimum spin-up time is determinable based, at least in part, on the average selection rate. The optimum spin-up time is determined, in essence, based on the user's history in making selections, it can be estimated at what time the user will have made a sufficient number of selections to fill or nearly fill the electronic memory. It should be appreciated that the objective of these various features is to spin the rotatable media for a minimal amount of time necessary. In other words, it is desirable to begin transfers as soon as possible during a command entry sequence, but to avoid idle times between defined transfers such that the Storage Element is generally experiencing data transfers when it is spinning whereby to save battery power as one advantage. The described features may be combined in any suitable manner in order to accomplish these objectives.

Command design is also important with regard to implementation of other features such as the play initiate feature, described above, which serves to ensure that the Storage Element is in its safe state prior to the conclusion of a user interaction. In this connection, it should be appreciated that commands issued through the present invention encompass the complexity of the native code of the device being controlled. It is submitted that the absence of intervening layers of protocol provides, to a large degree, the capability to design commands in accordance with the teachings herein. Other features, typical of control events, that are at the discretion of the command designer include but are not limited to head and spin motor status. As will be further described, the present invention contemplates environmental status as a factor in command execution.

Figure 5A:
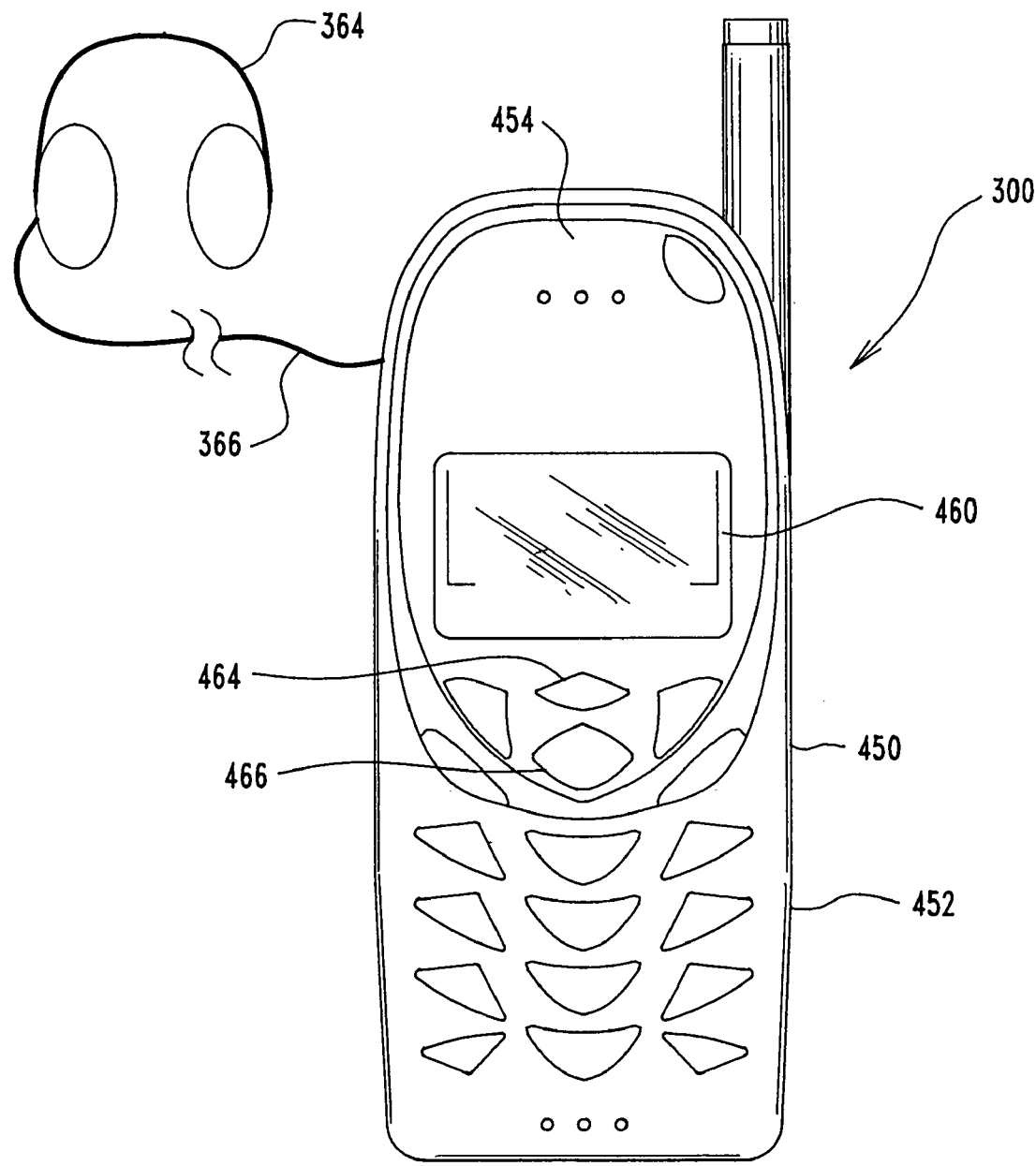
FIG. 5a is an illustration of one possible appearance of the device of FIG. 2 produced in accordance with the present invention including a display screen and connectable, for example, with a headset, as shown.

Attention is now directed to FIG. 5a which illustrates an external view of one potential implementation of device 300. Device 300 may selectively incorporate any of the features and concepts described herein with regard to those described in this overall disclosure. Accordingly, the device may comprise a hybrid combining the functionality of two or more separate prior art devices. Specifically, the combination of a wireless or cellular telephone and a digital music player is implemented in device 300. The latter includes a housing 450, a user accessible keypad 452, a speaker area 454 positionable proximate to a user's ear, a microphone having a sound pickup (neither of which is shown) at an appropriate location on housing 450 and a display screen 460. Storage Element 320 is mounted using mechanical shock isolation features within housing 450, but is not visible in the present illustration. Since the capability to play digital music is provided, device 300 further includes an audio output jack such as indicated by the reference number 325 in FIG. 2. The audio output jack is selectively connectable, for example, with audio headset 364 or any other earpiece arrangement suited for individual listening. Alternatively, the output may be provided to an audio or computer system. As described above, device 300 may incorporate a digital interface (see interface 328 in FIG. 2) at a suitable location on the housing. In this way, the device may interface with a user's computer at least for purposes of monitoring and controlling the digital music or other data saved on the Storage Element. The present invention further contemplates connection of device 300 to another portable device including, but not limited to another, identical portable device for purposes of data sharing.

Figure 5C:
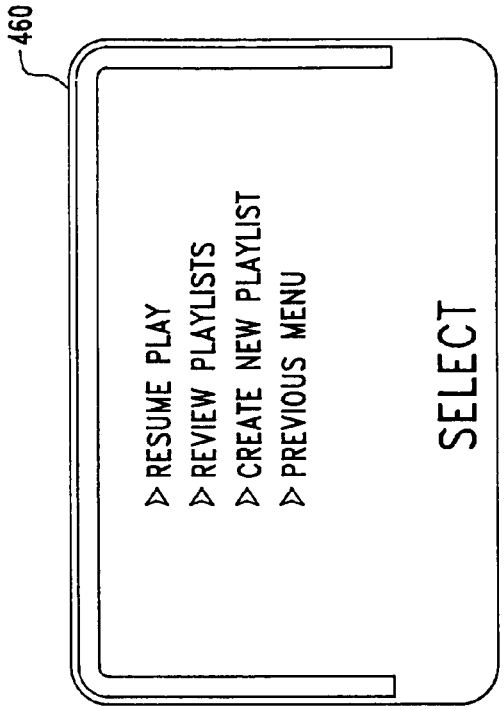
FIGS. 5b–5g are diagrammatic illustrations of the appearance of the display screen of the device of FIG. 5a, shown here to illustrate potential operational sequences occurring during interactions with a user of the device performed in accordance with the teachings of the present invention.
Figure 5E:
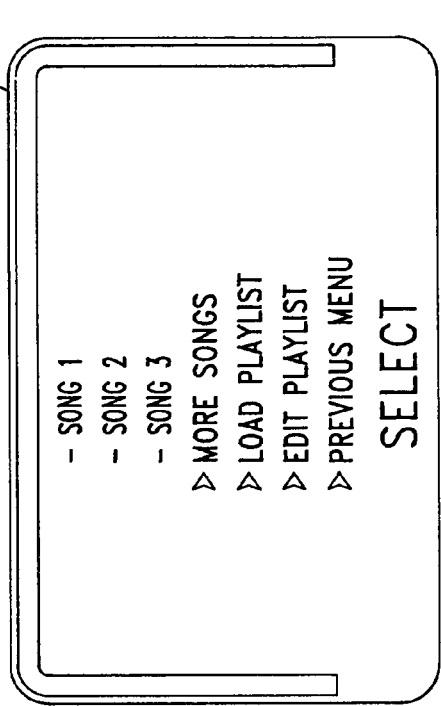
Figure 5B:
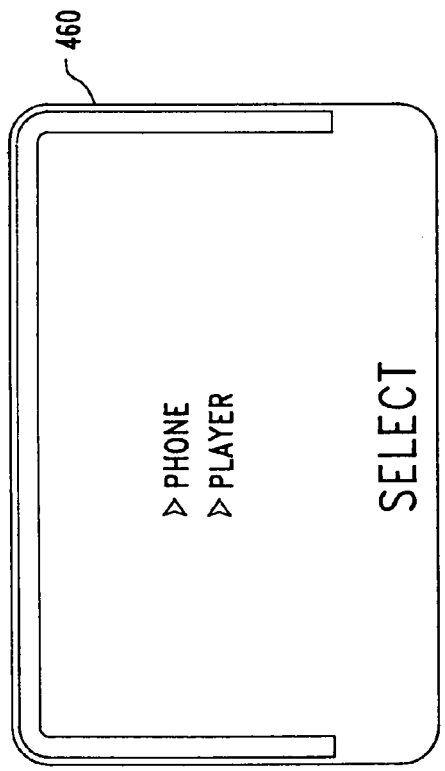

Turning now to FIG. 5b in conjunction with FIG. 5a, a series of screen shots will be described illustrating the operation of device 300 primarily with respect to its digital music mode and associated features. FIG. 5b illustrates screen 460 of device 300 wherein a selection menu is presented to the user. The user may select either "Phone" or "Player", for example, by using up and down arrow keys 464 and 466, respectively, on keypad 452. In the present example, it is assumed that the user selects the Player option.

After selection of the Player mode, FIG. 5c illustrates one possible presentation given on screen 460. Upon entering the player mode, it should be appreciated that the user may have previously been using the player only to be interrupted by a telephone call or perhaps may have stopped playback for some other reason at a point during a playlist. Accordingly, a menu is presented having four choices including "Resume Play", "Review Playlists", "Create New Playlist" and "Previous Menu". The "Resume Play" selection starts play of a previously selected playlist at the point where playback was last stopped or paused. Such a previously selected playlist will remain available in electronic memory arrangement 312 (see FIG. 2) until such time that the user chooses to replace it. The "Review Playlists" selection permits the user to select any previously created playlist available on the Storage Element. Playlists may be created using keypad 452 and display 460 or may be created using an external computer interfaced with device 300 via its USB interface port (FIG. 2) or other suitable interface arrangements. The former process is initiated with the selection of the "Create New Playlist" selection. Selection of "Previous Menu" returns the user to the display of FIG. 5b.

Figure 5D:
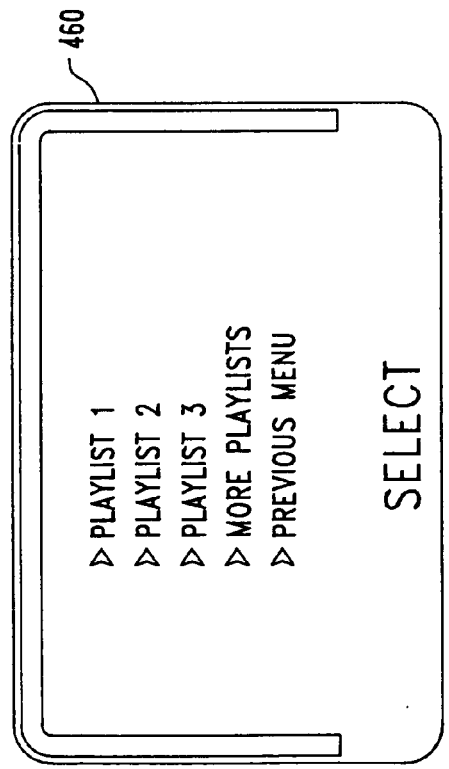

Turning to FIG. 5d, for purposes of this figure, it is assumed that the "Review Playlist" selection was made in FIG. 5c. Consistent with this selection, a playlist menu is illustrated in FIG. 5d. The present example illustrates the display of Playlists 1–3 as well as the option to select "More Playlists" wherein the choices corresponding to Playlists 4–6 may be displayed (not shown) along with continuing to display the "More Playlists" selection where still further playlists are available. While the playlists described here are generically numbered, the user may create customized names that are displayed in association with each playlist. For example, the artist's name and/or the title of the work may be displayed.

Selection of one of the playlists on the screen of FIG. 5d results in the presentation of screen 460 of FIG. 5e. Selection options are presented for "Song 1", "Song 2" and "Song 3". Selection of any one of these initiates playback of the associated song from electronic memory arrangement 300. Again, the songs have been generically numbered here, but the user is readily provided with the option of customizing the song names, for example, with the actual song title. Additional options may be selected in FIG. 5e including "More Songs" which presents the next three song selections and which may be repeated until the playlist has been exhausted. A "Load Playlist" selection returns the user to the display of FIG. 5d. The user may alternatively select "Edit Playlist" for the purpose of modifying an existing playlist or for creating a new playlist.

Figure 5G:
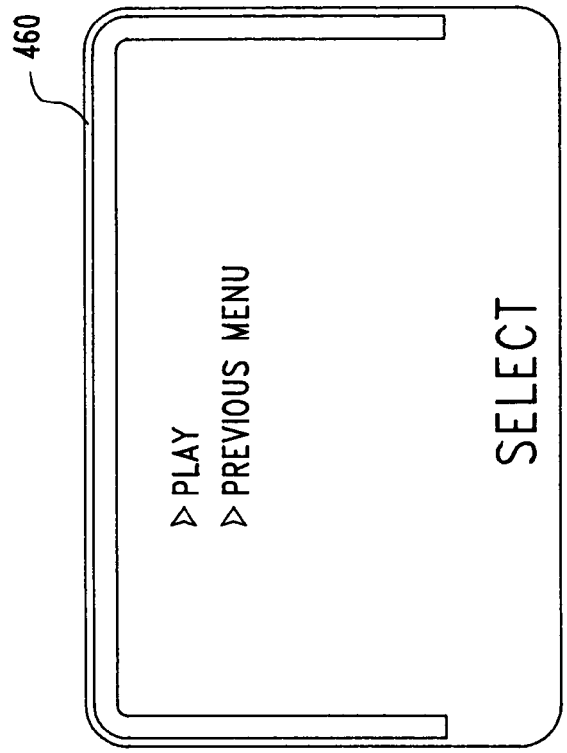
Figure 5F:
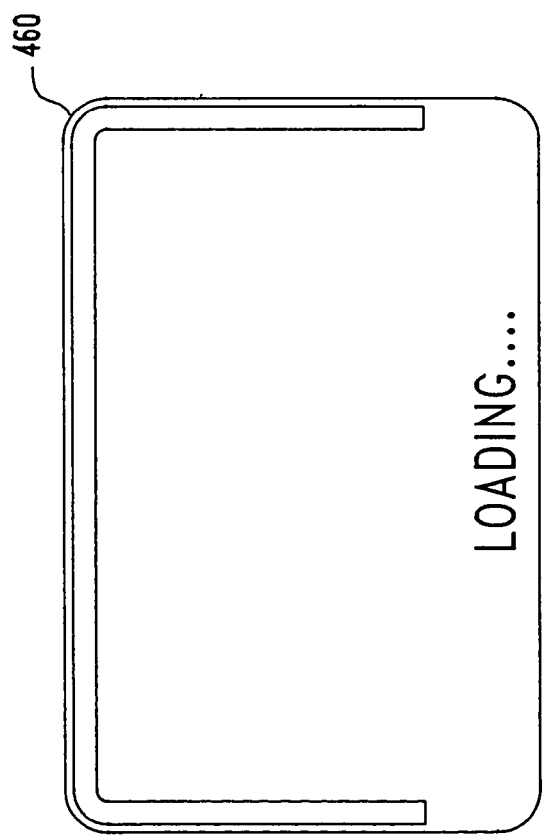

Referring to FIGS. 5d and 5f, selection of one of the playlists shown in the display of FIG. 5d that is available on Storage Element 320, but which is not currently available in electronic memory arrangement 312 requires transfer of the associated data from the Storage Element to the electronic memory arrangement. Consistent with the desire to protect the Storage Element during data accesses, as described above, the illustrated "Loading" screen or a similar such display may be presented to the user during the data transfer. This screen may be presented, for example, corresponding to the time during which the Storage Element is not in its aforedescribed safe state.

Referring to FIG. 5g in conjunction with FIG. 5f, after the Storage Element has returned to its safe state, a "Play" and "Previous Menu" selection are presented to the user. Generally, in this situation the user is awaiting availability of the playlist for immediate listening (i.e., viewing the display of FIG. 5f) and is thought to be very likely to wait the few seconds required until the display of FIG. 5g is presented in order to make the "Play" selection. Thus, the user is given the option to initiate playback only after the Storage Element is in its safe state. Any of the foregoing screen displays may be modified in any suitable manner while remaining within the scope of the present invention.

Referring again to FIG. 3, attention is now directed to certain aspects of the arrangement and operation of electronic components as part of Storage Element 300. In particular, a channel IC 500 is physically supported by and in electrical communication via main portion 330b of flexible circuit 330. A pre-amp IC 502 is also supported on portion 330b of the flexible circuit. One advantage attendant to positioning the channel IC on the flexible circuit resides in eliminating the need for a printed circuit board (PCB) as part of the Storage Element. It should be mentioned that main portion 330b of the flexible circuit is "wrapped" around flex carrier platform 356 such that signal routing and components may be mounted on the flexible circuit below the flex carrier platform. One component so positioned, in the present example, is a servo IC. Of course, such components are not visible in the present illustration. Main portion 330b of the flexible circuit may be bonded to platform 356 in any appropriate manner including, but not limited to the use of a suitable adhesive.

At first blush, it may appear that locating these three ICs in the Storage Element is readily accomplished. However, in the instance of channel IC 500, a number of complications, which are neither trivial nor obvious, must be overcome in order to locate it on the flexible circuit. Not the least of these complications relates to noise encountered on the flexible circuit. The various signals carried by the flexible circuit include, for example, control signals that are digitally generated with extremely fast rise and fall times; also referred to as "sharp edges". One of ordinary skill in the art appreciates that the edges of such high level control signals produce considerable interference in the form of radiated energy. At the same time, raw data passes through pre-amp IC 502 enroute to channel IC 500 after having been read by sensor arrangement 346. The combined presence of the low-signal-level raw data and the control signals at the flexible circuit is of concern with regard to potential corruption of the low-level signals. Processing performed by channel IC 500 on the flexible circuit introduces still further concern.

Still considering the location of channel IC 500, it is submitted that one of ordinary skill in the art, in order to cope with this interference problem, would position the channel IC almost anywhere but the flexible circuit, for example, on a printed circuit board. As exemplified by the IBM Microdrive, discussed above, the channel IC is part of the PCBA external to the HDA. The PCBA, in being isolated from and a separate part with respect to the HDA, is less subject to the interference that is present at the flexible circuit. Moreover, special interference provisions may be built into the area of circuitry associated with the channel IC. Such provisions can be quite intricate, based on the relatively vast amount of space available on the PCBA. Alternatively, one of ordinary skill in the art may place a separate PCB within the HDA assembly for mounting the channel IC. This latter arrangement is attractive to one of ordinary skill in the art again for the reason that the PCB can isolate the channel IC from the interference. One appealing aspect, stemming from the prior art and which is applicable to locating the channel IC on either form of printed circuit board, resides in the fact that locating components on printed circuit boards is far less expensive than locating such components on the flexible circuit.

The present invention resolves the foregoing interference problem by controlling signal characteristics using low level signaling (for example, 1–1.8 volts or less), as well as signal routing on the flexible circuit and IC pin-out locations.

With continuing reference to FIG. 2, the present invention recognizes a particular advantage that results from locating channel IC 500 on flexible circuit 330. In order to achieve optimized performance from a controller and particular HDA, the channel IC must be customized to the particular media and sensor combination of that HDA. That is, during normal production of a prior art hard drive, a programming step must be performed which controls the specific way in which the channel IC interacts with the HDA. Applicants are aware of no other way to achieve such optimized performance, short of programming yet another channel IC. Thus, in order to achieve optimum performance, the present invention recognizes that a "customized" channel IC must remain with its associated HDA after programming. In the prior art, programming functions directed to this customization or at least resources directed to executing them are generally permanently incorporated in memory associated with a hard drive controller on the PCBA of the hard drive. In the absence of channel customization, degraded or what may be referred to as "generic" performance is obtained from a particular channel and HDA combination.

Briefly considering the '751 patent, Applicants find no teachings with regard to customizing a channel IC that remains permanently associated with a particular HDA without an associated control arrangement. While the patent suggests locating the channel IC in the HDA, in the host computer or distributed therebetween, the patent is devoid of teachings with regard to selecting any one of these locations as being advantageous. Thus, only generic performance appears to be available.

With the channel IC in a distributed configuration or wholly within the host computer, customizing the channel is still further complicated. In particular, it should be understood that the '751 patent embraces a modular system approach wherein peripherals such as an HDA are provided separate from the host computer and typically originate from different vendors. One advantage of such modular systems is seen in the ability of even an end user to initially assemble the system and to add components, as needed. Under these circumstances, with all of the components coming together at the hands of the end user, there is no way in which a customized channel can be provided for any particular HDA and channel combination. In this regard, the present invention considers channel customization by an end user as impractical. The channel customization procedure, normally performed during manufacture, is generally time consuming. For example, customizing the channel for a 20 GB (capacity) hard drive may readily require 60 to 90 minutes. An even more compelling reason for avoiding the idea of end user customization of the channel IC is evidenced by the fact that the channel programming and test process serves in a quality control sense during manufacture. That is, an HDA/channel combination may be rejected at manufacture by failing to perform above a specified threshold.

The present invention considers dismissal of a quality control function, placed out of reach of the manufacturer, as unacceptable. Shifting such a manufacturing-oriented quality control function to the end user is likewise considered as virtually inconceivable. The alternative, inherently exhibited by the '751 patent, is to settle for generic performance levels. The present invention further rejects this latter alternative and provides a highly advantageous and heretofore unseen solution which is described hereinafter.

Referring to FIG. 3, it is initially important to understand that channel IC 500 is customized to magnetic media 340 and sensor arrangement 344 of Storage Element 320. The ability to provide a customized channel is attributable, in part, to the recognition that the channel IC is only programmable, from any standard of practicality, by the manufacturer of Storage Element 320. In this way, a value-added reseller may provide a device such as, for example, device 300 including Storage Element 320 configured for optimized performance, including a customized channel.

Still referring to FIG. 3, attention is turned to an additional advantage related to channel IC 500. Specifically, the latter includes a channel characteristics section 510 comprising a nonvolatile area which contains certain information related to the configuration of the Storage Element. This information may include, for example, the storage capacity of the Storage Element, and the attributes of the section of the disk containing the system configuration. The purpose in providing channel characteristics section 510 resides in configuring the Storage Element such that anticipated and/or typical changes in the Storage Element do not necessitate changes in other portions of the Storage Element such as, for example, in processing arrangement 302. That is, the processing arrangement within an overall host device may be configured to read the channel characteristics section, for example, during an initial boot-up sequence to provide for appropriately accessing the Storage Element. In this way, a single processing arrangement may access a variety of different Storage Element configurations with no attendant modification of the processing arrangement required.

Attention is now directed to a number of other highly advantageous features of the present invention which protect the Storage Element from the effects of mechanical shock and which generally enhance its reliability. As described above, HDD's are susceptible to failure when the head or heads contact the media, for example, as a result of reception of a mechanical shock which is sufficient to move the head arrangement. In the absence of rotation of the media, the failure is usually catastrophic since the heads will become stuck to the media; relative movement will thereafter tear the head(s) from the actuator arm. One arrangement for parking the head arrangement is described in U.S. Pat. No. 4,933,785 issued to Morehouse et al (hereinafter Morehouse). The latter describes a ramp configuration wherein the head arrangement rides against the ramp to be received in its parked position by seating in some sort of detent formed in the ramp.

Once the head arrangement is in the parked position, latching arrangements are typically relied on to restrain movement of the head arrangement as a result of mechanical shock. While prior art ramp parking arrangements and cooperating latching arrangements are generally suited to their intended applications, it is submitted that such arrangements remain susceptible to certain problems which, until now, remain unresolved. For example, a controller may initiate parking of the head arrangement, however, the head arrangement may not fully transfer to its parked position. That is, the head arrangement may slide only partially up the ramp, failing to reach the detent. Alternatively, the head arrangement may engage the ramp with too much momentum—sliding up the ramp only to hit and bounce off of a hard stop at the end of the ramp, stopping away from the detent and out of position. In either situation, it is quite likely that a latching arrangement will thereafter be incapable of restraining movement of the head arrangement since such latching arrangements are normally designed under the presumption that the head arrangement is at least initially located in its parked position (i.e., seated in the detent). Moreover, particularly for shock forces which tend to move the head arrangement down the ramp and toward the magnetic media, the magnitude of force required to initiate movement is significantly reduced, as compared to starting with the head arrangement seated in the detent. At the same time, the controller (processing arrangement) is unaware of this status which is likely to soon result in a catastrophic drive failure.

The foregoing discussion evidences a void in the prior art with respect to recognizing a need for monitoring at least certain aspects or attributes which are related to the operational status of an environmentally sensitive electromechanical data storage arrangement. The present invention, in contrast, recognizes this need, particularly with regard to implementation in portable devices. Attributes of concern at the Storage Element of the present invention include, but are not limited to positional status of the head arrangement, rotational status of the spin motor, environmental temperature at the Storage Element and the shock environment being experienced. Once a view to these attributes is provided, appropriate responses may be formulated, as will be described in the context of a number of attributes immediately hereinafter.

Figure 6:
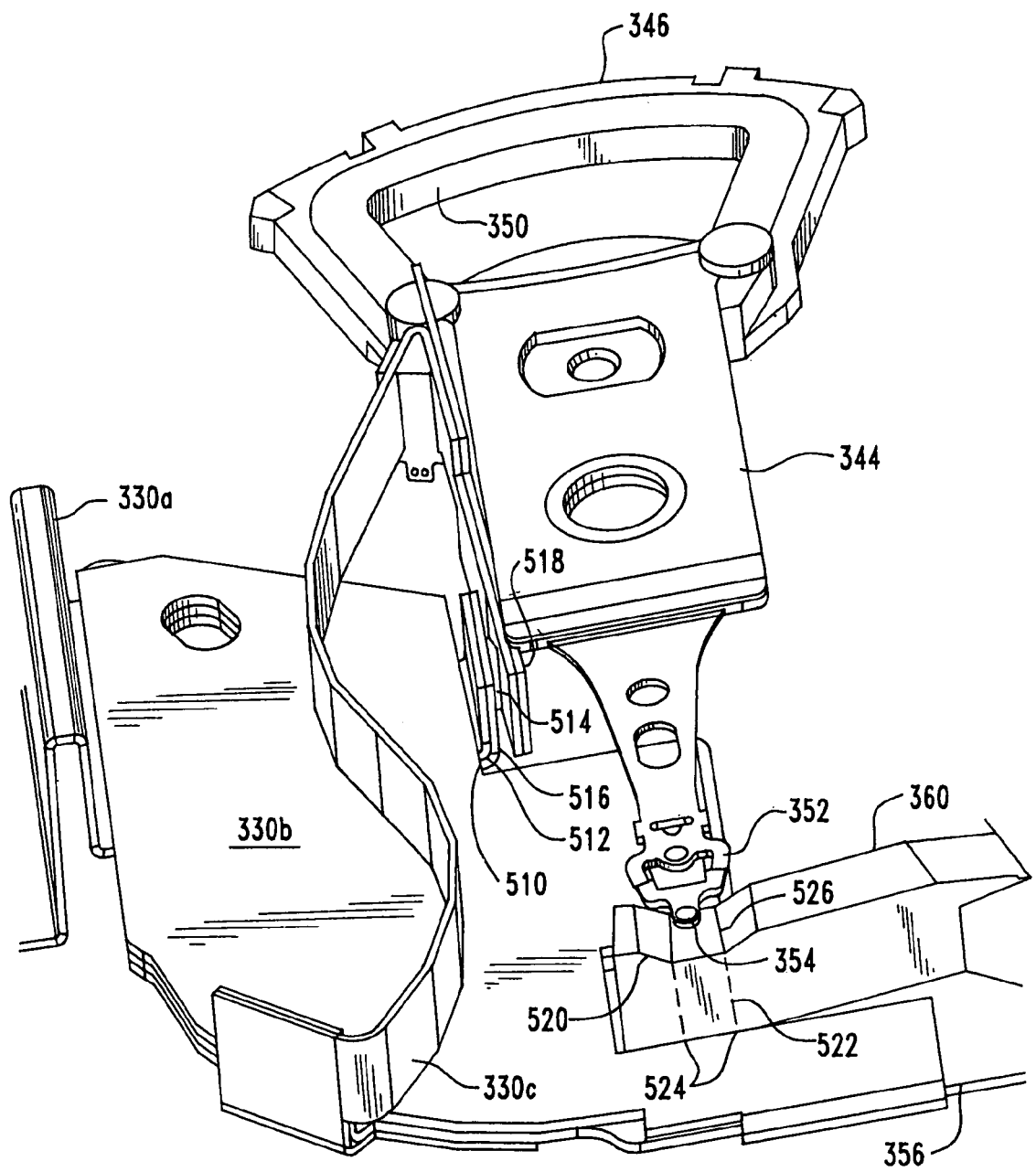
FIG. 6 is a diagrammatic illustration, in perspective, of a portion of the Storage Element of the present invention, shown here for the purpose of describing several embodiments of a highly advantageous head arrangement position sensor.

Referring to FIGS. 3 and 6, attention is now directed to a highly advantageous actuator arm position sensor. These figures illustrate actuator arm 344 in the parked position. Consistent with terminology of the art, this position may be referred to as having the "heads unloaded". Conversely, the term having the "heads loaded" may refer to the position when the actuator arm or head/transducer arrangement is positioned for reading magnetic media 340. FIG. 6 illustrates a portion of Storage Element 320 including actuator arm 344, portion 330b of flexible circuit 330 supported by flexible carrier platform 356 and ramp 360. It is noted again that the flexible circuit "sandwiches" flexible carrier platform 356. In the illustrated actuator arm position sensor implementation, a tab 510 is integrally formed using a portion of the flexible carrier platform, with the tab thereafter being bent upwardly. A tab portion 512 of the flexible circuit is formed integrally with that portion of the flexible circuit which is beneath flexible carrier platform 356, as seen in FIG. 6. Tab portion 512 of the flexible circuit may be attached to support tab 510 in any suitable manner such as, for example, using a suitable adhesive. A contact button 514 is arranged on and supported by tab portion 512. A conductive trace, which is not visible in the present illustration, is integrally formed with the flexible circuit and connects electrically with contact button 514. Electrical monitoring of the status of the contact button is thereby provided for any monitoring arrangement having access to the flexible circuit such as processing arrangement 302 shown in FIG. 2. Contact button 514 may be formed using, for example, a solder bump, a dimple formed in the flex circuit, a protrusion in the underlying flexible carrier platform which "outsets" the contact area or any suitable combination of such design concepts. It should be appreciated that the use of a flexible circuit and carrying platform is not a requirement. For example, a stationary contact configured to engage the actuator arm in the parked position may be supported in any suitable manner including directly by the housing of the Storage Element. Alternatively, a component carrying substrate may be used in place of the combination of the flexible circuit and carrying platform.

Still referring to FIG. 6, as previously described, a portion of the flexible circuit comprises flex actuator arm connection 330c. A portion of this latter element extends from the position at which it is received by the actuator arm along the length of the arm to an electrical contact area 516 supported by a contact support surface 518. The contact support surface may be integrally formed with the actuator arm or produced separately therefrom for suitable attachment to the actuator arm. Electrical contact area 516 may be fixedly attached to the contact support surface in any suitable manner such as, for example, by using an adhesive. Actuator arm 344 is shown in its parked position with lift tab 354 seated in a detent 520 formed in ramp 360. Contact button 514 and contact area 516 are arranged such that electrical contact is maintained between these latter two elements when the actuator arm is in its parked position. In this regard, flex actuator arm connection 330c (see FIG. 3) of the flexible circuit is used to apply a resilient bias whereby to maintain such electrical contact in the absence of mechanical shock forces below a predetermined threshold value. The flex actuator arm connection arm or dynamic loop may be configured in any suitable manner to this end. While FIG. 3 illustrates a configuration having primarily one bend, an "S" curve, as shown in FIG. 6, is considered as being particularly effective. It should be appreciated that this overall contacting arrangement may be modified by one having ordinary skill in the art in any number of alternative ways. For example, the actuator arm is generally at ground potential. Rather than button 514 contacting the flexible circuit, the button may contact the grounded body of the actuator arm so as to bring the button and flexible circuit trace in communication therewith to ground potential.

With continuing reference to FIG. 6, another actuator arm position sensor implementation will be described. Specifically, ramp 360 is formed having an electrically conductive volume 522 defined between a pair of dashed lines 524. Conductive volume 522 itself defines a landing surface 526 which contacts lift tab 354 in the parked position. Volume 522 extends to a lowermost surface of the ramp proximate to flexible circuit 330b. A contact pad (not shown) may be formed as part of the flexible circuit, having an associated trace for external communication, to maintain electrical contact between the ramp conductive volume and the flexible circuit contact pad. In accordance with this arrangement, ramp 360 may be formed, for example, by injection molding using Teflon® for non-conductive portions of the ramp and carbon filled Delrin® for electrically conductive volume 522. The lift tab is generally at ground potential by virtue of electrical communication with the actuator arm. When lift tab 354 contacts the landing surface, conductive volume 522 and the associated trace in the flexible circuit are brought to ground potential. Of course, as an alternative to a grounded lift tab, a separate, electrically isolated conductor [not shown] may be routed to the lift tab along the length of the actuator arm for purposes of contacting landing surface 526 using an appropriate arrangement on lift tab 354.

With regard to both implementations of head arrangement/actuator arm position monitoring mechanisms, it should be appreciated that an unlimited number of modifications may be made by one having ordinary skill in the art in view of this overall disclosure. All such modifications are considered to reside within the scope of the appended claims. Irrespective of the specific manner in which the actuator arm position monitoring arrangement is implemented, the advantages provided through its use are considered to provide sweeping and heretofore unavailable improvements in a number of areas, as will be described at appropriate points hereinafter.

Figure 7:
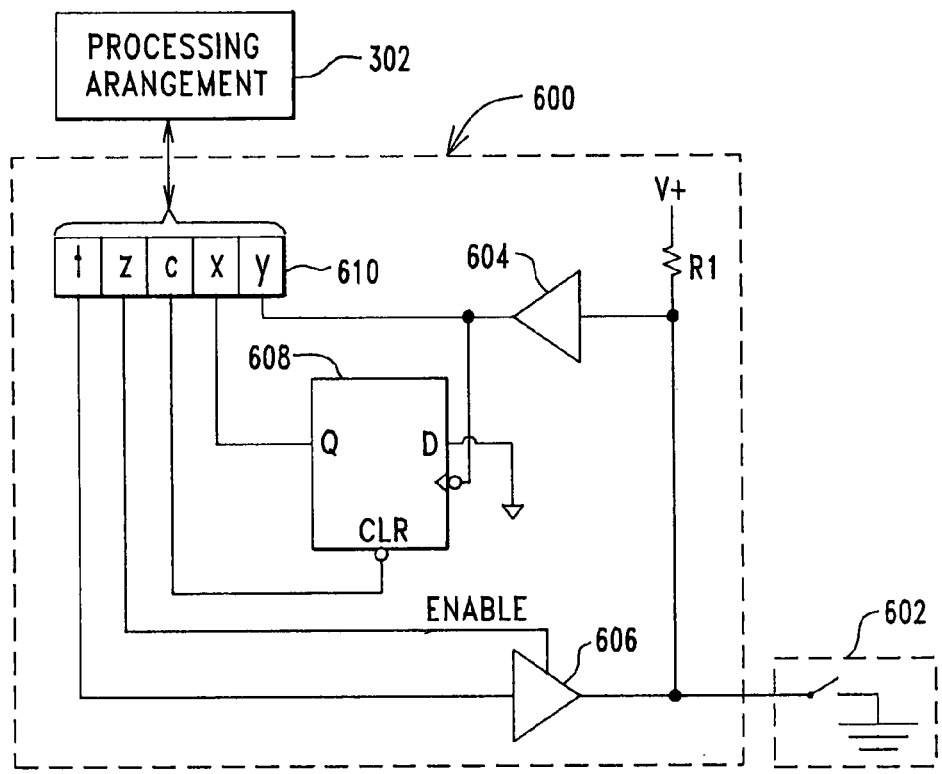
FIG. 7 is a schematic block diagram illustrating a position sensing circuit interfaced with the head arrangement position sensor of FIG. 6.

Turning now to FIG. 7, an actuator arm position monitoring circuit is generally indicated by the reference number 600, as shown within a dashed box. This latter circuit generally forms a portion of the Storage Element and cooperates with the actuator arm position monitoring sensor of the present invention, as diagrammatically illustrated and indicated by the reference number 602 in the form of a switch within a dashed box. Any form of actuator arm position monitoring sensor may be used, as described above or with suitable modifications. Circuit 600 includes signal drivers 604 and 606, a flip-flop 608 and a data register 610 storing five bits of information denoted as bits t, z, c, x and y. Register 610 is, in turn, accessible to previously described processing arrangement 302. As mentioned above, in certain implementations where a transitional IC is used, register 610 may be accessed by the processing arrangement using one or more vendor unique commands. Alternatively, the register is read directly by the processing arrangement. A resistor R1 is connected to a V+ power supply so as to pull-up the output of driver 606 along with the line leading to the actuator arm positioning arrangement, as will be described.

Processing arrangement 302 reads the status of actuator arm position monitoring circuit 600 using bits x and y. Bit y indicates a current status of the actuator arm position sensor. Signal driver 604 provides the current status value both to the y register position and to a clock input of flip-flop 608. Other implementations may set D to a high logic level. In the present example, the D input of flip-flop 608 is grounded. The x register value comprises an output Q of flip-flop 608, as will be further described. It should be appreciated that high and low logic levels are not generally used in the present discussion with regard to state indication since the circuitry is readily adaptable to use either logic value as a "true" value. Accordingly, a value indicative of the actuator arm sensor being in its closed position is considered as true. The z register comprises an enable signal provided to an enable input of signal driver 606 which may be set by processing arrangement 302, as desired. The t register position allows processing arrangement 302 to provide a logical value that is driven onto the output of signal driver 606 when the latter is enabled by the appropriate value stored in the z register position. In this way, test functionality is provided whereby a selected value may be placed on the output of signal driver 606, irrespective of whether the actuator arm sensor switch is in its open position. The test value is then available in register y via signal driver 604 for access by processing arrangement 302. The test value read from the y register location can then be compared by the processing arrangement with the expected value to confirm proper operation of the circuitry.

For purposes of monitoring the status of the actuator arm position sensor during operation of the Storage Element, flip-flop 608 may initially be reset by processing arrangement 302 upon movement of the actuator arm away from the parked position. That is, the x register value is reset while the actuator arm position sensing switch is open (false) using the c register position. Accordingly, during ongoing access of media 340 (FIG. 3) the x and y register locations both store a false value. The x and y register values will change, however, once the actuator arm returns even briefly to the parked position. Initially, it is assumed that the actuator arm reaches the parked position so that lift tab 354 seats properly in detent 520. Once the actuator arm position sensor (in any of the aforedescribed implementations) switches to the true state, a true value is presented by signal driver 604. This value is stored in register location y. At the same time, the true value is presented to the clock input of flip-flop 608. Any voltage waveform edge provided to the clock input of the flip-flop will cause the output of the flip-flop to toggle to the true value which is then saved in register location x, as provided from the Q output of the flip-flop. Thus, both the x and y registers store a true value. Upon reading this condition, processing arrangement 302 is substantially assured that the actuator arm is in the parked position. The foregoing describes parking in a "normal" manner. That is, the actuator arm is moved away from accessing the magnetic media with just enough energy to slide lift tab 354 up the sloped face of ramp 360 to thereafter seat and be captured in detent 520.

Having described the result that obtains relative to monitoring circuit 600 when the actuator arm parks normally, various scenarios will now be considered in which the actuator arm fails to reach the parked position in the normal manner. In a first scenario, the actuator arm is simply moved with an insufficient amount of energy such that lift tab 354 may engage the sloped face of ramp 360, but fails to reach detent 520. In this case, the x and y values will both remain false. Upon sensing this condition, processing arrangement 302 is substantially assured that the actuator arm is not parked or unloaded. One of ordinary skill in the art will appreciate that the Storage Element or any HDD, for that matter, is in grave danger of catastrophic failure in this scenario. The present invention, by producing an unequivocal indication of this danger, provides that appropriate remedial actions may then be taken, as described at appropriate points below.

In a second scenario wherein the actuator arm fails to park normally, the actuator arm is moved away from a loaded position with excessive force applied thereto by the voice coil motor. In this regard, it should be appreciated that the actuator arm is generally configured to encounter a stop (not shown) which prevents the actuator arm from overshooting ramp 360. Unfortunately, however, the actuator arm may bounce off of the stop. Actuator arm position sensor circuit 600 will initially toggle to true values for both the x and y registers. As a result of the bounce, however, the y register value then toggles to false. Processing arrangement 302 observes a true value for x and a false value for y. Generally, this status seen in the x and y registers is indicative of a bounce. The Storage Element or HDD employing this arrangement is again in danger of catastrophic failure. Upon this observation, remedial measures may be taken by processing arrangement 302 including modification of the drive signal provided to the voice coil motor, as will be further described.

Figure 8:
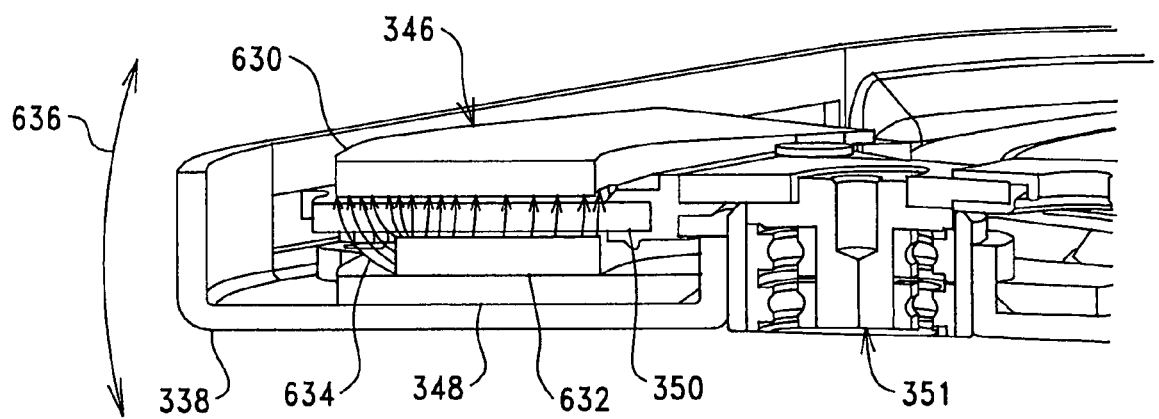
FIG. 8 is a partial cut-away diagrammatic view of the voice coil motor arm end of the Storage Element of the present invention, shown here to facilitate discussion of a highly advantageous mechanical shock sensing arrangement implemented in accordance with the present invention.

Attention is now directed to FIG. 8 which is a partial cut-away view of voice coil motor end 346 of actuator arm 344. Voice coil 350 is shown positioned between lower magnetic plate assembly 348 and an upper magnetic plate assembly 630. A magnet 632 forms part of the lower magnet assembly for producing a static magnetic field between the upper and lower assemblies. Actuator pivot 351 is also shown. Lines of magnetic flux are indicated by the reference number 634 extending between the lower and upper magnet plate assemblies, cutting through voice coil 350. Applicants have recognized that the voice coil end of the actuator arm exhibits a resonant frequency in a direction indicated by a double-headed arrow 636. Applicants, more importantly, have recognized that, because the voice coil is positioned in a magnetic field, an opportunity is provided for a remarkably advantageous technique and arrangement directed to monitoring the shock environment of the Storage Element as an operational attribute in the context of operation of the Storage Element of the present invention.

Figure 9:
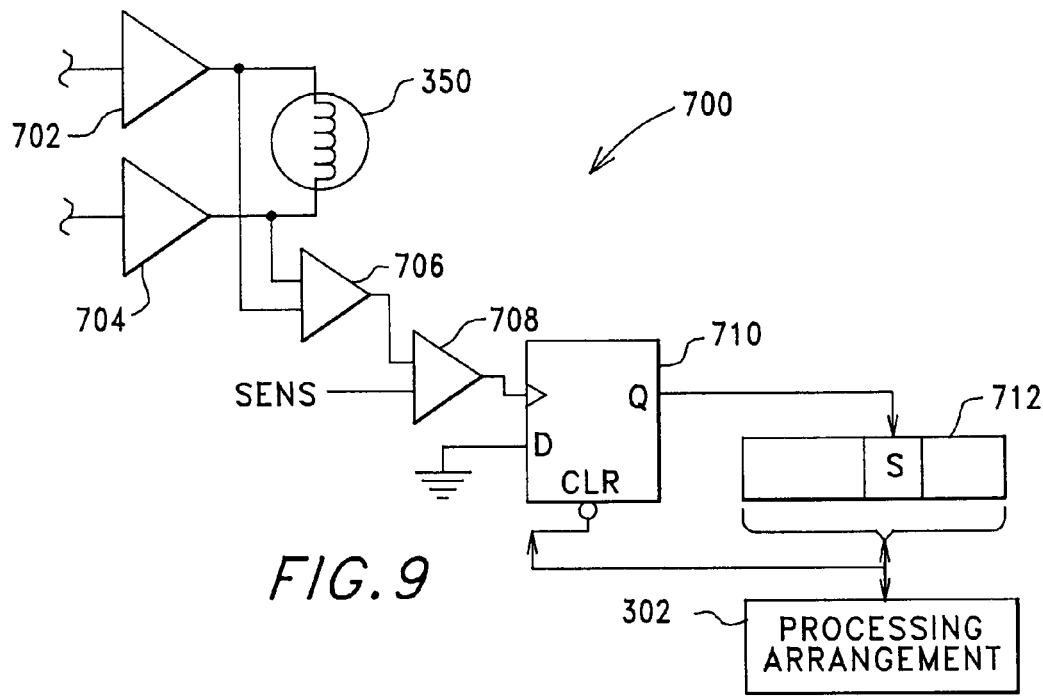
FIG. 9 is a schematic block diagram illustrating a mechanical shock sensing circuit interfaced with the mechanical shock sensing arrangement of FIG. 8.

Referring to FIG. 9 in conjunction with FIG. 8, details with regard to monitoring the shock environment of Storage Element 320 will be described. In view of the foregoing discussion, it should be appreciated that the voice coil motor end of actuator arm 344 vibrates normal to its plane of motion for data access at its resonant frequency responsive to the Storage Element being subjected to external shock forces having a component that is normal to the plane of the actuator arm. Accordingly, voice coil 350 will move consistent with the direction illustrated by arrow 636. Since the voice coil is exposed to magnetic flux lines 634, a voltage is generated by the voice coil responsive to this motion. Generation of this voltage has been empirically verified by Applicants. FIG. 9 illustrates one possible mechanical shock monitoring circuit, generally indicated by the reference number 700, for utilizing the shock voltage. Voice coil 350 is diagrammatically shown. The voice coil is electrically connected to a pair of drivers 702 and 704 that are themselves driven by control circuitry which has not been illustrated for purposes of simplicity. A conditioning circuit 706 includes high impedance inputs connected across voice coil 350 to pick up the shock voltage signal induced in the voice coil. Conditioning circuit 706 may include any necessary functions such as, for example, amplification and filtering. It should be appreciated that the signal level of the induced shock voltage may be quite small such that significant gain is required in order to increase the signal to a useful level dependent, of course, on the specific configuration of the voice coil motor arrangement and the level of shock to be detected.

Continuing with a description of the circuitry of FIG. 9, a comparator 708 compares the output of signal conditioner 395*a* to a set point input of the comparator provided on a line indicated as "sens". This latter line serves as a sensitivity adjustment which may be under the control of processing arrangement 302. Moreover, the processing arrangement may vary the sensitivity adjustment in accordance with various operational circumstances. Alternatively, the sensitivity may be set during factory calibration procedures. In the event that shock voltages are presented to the comparator which exceed the current sensitivity setting, comparator 708 produces a square wave output that is received by a clock input of a D type flip-flop 710. The D input of flip-flop 710 may be set to either a high or low logic level with the latter being illustrated. Upon receipt of an input edge from comparator 708, flip-flop 710 toggles output Q which then is loaded into a register 712 as a bit "s". Like previously described register 610, register 712 may be located within the Storage Element or on the host side proximate to processing arrangement 302. Any location is suitable so long as it is readable by processing arrangement 302. Flip-flop 710 is reset using its clear input connected to a line that is controlled by processing arrangement 302. The flip-flop may be reset immediately after reading the s bit or within the context of ongoing processing operations. Upon detecting that the s bit is set, processing arrangement 302 may respond in a number of alternative ways, as will be described below.

Referring to FIG. 2, as described above, entering the shock safe state of the Storage Element requires parking or unloading sensor/head arrangement 344. In this regard, the present invention recognizes that an awareness of the position of the head arrangement is critical to ensuring the reliability of Storage Element 320. Having described several implementations of the head arrangement sensing feature of the present invention, attention will now be directed to using this feature in the context of a number of highly advantageous techniques.

The shock environment sensing arrangement of the present invention is considered as being highly advantageous, particularly with regard to devices such as Storage Element 302 that are intended for use in portable applications. As described previously, the shock monitoring feature of the present invention allows the processing arrangement to gauge the shock environment of device 300 prior to initiating data storage or retrieval using the Storage Element. This feature is readily combined with any other provision described herein for the purpose of mitigation of mechanical shock effects on the operation of the Storage Element. Moreover, the shock environment is sensed within the Storage Element itself so as to account for attenuation of shock forces resulting from shock mounting the Storage Element within a portable device. Shock monitoring capability is also highly advantageous during test and development of the Storage Element and is readily suited to any form of device, including an HDD, which utilizes a voice coil motor.

Initially, it is noted that a number of prior art algorithms have been developed for the specific purpose of parking the head arrangement. Such an algorithm may be implemented in a variety of different ways for this intended purpose. Each individual algorithm may therefore operate incorporating one or more parameters, each of which influences the reliability or probability that the head arrangement will, in fact, properly reach the parked position. Such parameters may include, for example, the magnitude of a drive current which is used to drive the voice coil motor in moving to the parked position, a specified position of the head arrangement from which movement to the parked position is initiated and the velocity of the head arrangement. Accordingly, the focus of the present invention considers adjustment of any parameters that are in use within a particular algorithm in order to improve parking reliability. That is, the effect of adjusting any one parameter or parameter combination is discernible through the teachings herein.

Figure 10:
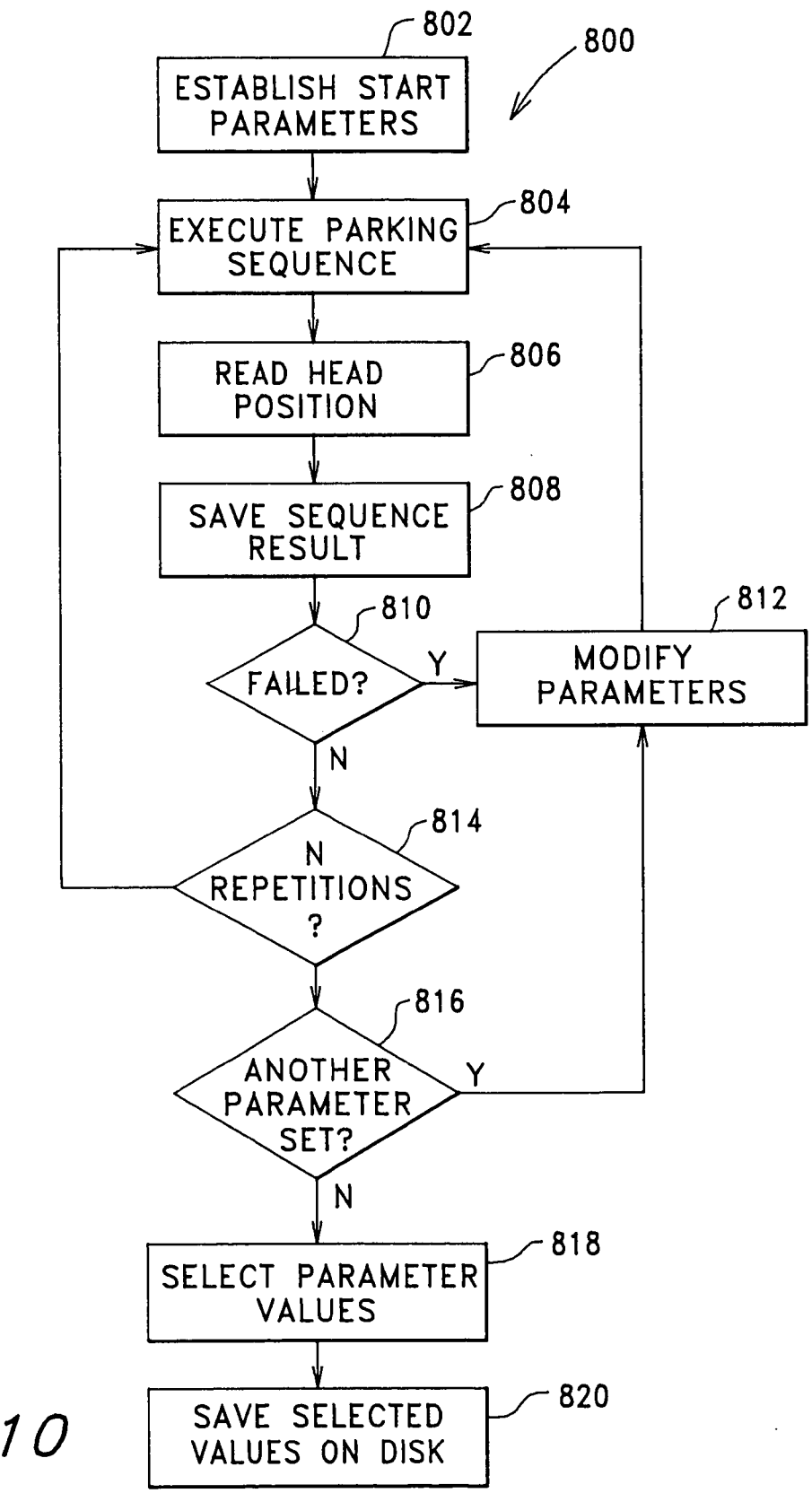
FIG. 10 is a flow diagram illustrating one possible implementation of a parking calibration method performed in accordance with the present invention and utilizing the highly advantageous head position sensing arrangement of the present invention.

Turning now to FIG. 10, a parking calibration method performed in accordance with the present invention is generally indicated by the reference number 800. Calibration method 800 begins with a step 802 in which initial values of the parameters are set within the particular parking sequence or algorithm to be applied. Thus, the initial values may represent values which have been developed in any suitable manner. Step 804 then proceeds by using the initial values of the parameters to actually execute the parking sequence. A read of the head position indicator of the present invention is subsequently performed by step 806. Step 808 then saves the result of this particular parking sequence execution, indexed against the specific values of parameters which were employed. Following step 808, step 810 tests the result of the current parking sequence. In the event that this sequence failed, execution moves to step 812 in which one or more parameters are modified, as desired. As described above, one significant parameter is the magnitude or duration of the signal used as a drive signal to drive the voice coil motor arrangement in order to move the head arrangement to the parked position. For illustrative convenience, parameter changes may be described with regard to modifying this voice coil motor drive signal. It is to be understood that this technique is equally applicable to virtually any parameter and, hence, is in no way limited to the voice coil motor drive signal.

For the voice coil motor drive signal, the initial parameter setting may use a particular magnitude that is changed by some predetermined increment with each successive repetition of the parking sequence. It is to be understood, in this regard, that a failure condition is typically encountered by both increasing and decreasing the voice coil motor drive from the particular magnitude. In one instance, increasing the drive current sufficiently results in the head arrangement bouncing off of the parking arrangement; the head arrangement passes through the parked position twice. In the other instance, decreasing the drive current sufficiently results in the head arrangement having insufficient momentum to fully reach the parked position. Therefore, the voice coil motor drive current exemplifies a parameter which exhibits both upper and lower failure values or thresholds. That is, this parameter is adjustable both up and down in order to find an optimum value. In one feature, the optimum value may be selected as that value which is approximately half-way in magnitude between the upper and lower magnitudes at which failure occurs. Other parameters likewise exhibit upper and lower failure values such that this precept remains equally applicable thereto. When performing calibration sequences relating to parameters having both upper and lower failure limits, it may be advantageous to vary the parameter from a higher or low magnitude which is almost certainly outside of the operational range that is defined between the upper and lower failure limits. In this way, the calibration procedure sweeps or passes through the entire operational range between the limits such that both the upper and lower limits can be found in one pass through the entire range of potential magnitude of that parameter. Following parameter modification, execution moves back to step 404 to begin the parking sequence with the modified parameters.

Still referring to FIG. 10, if step 810 does not detect a failure in the parking sequence, step 814 is entered. The latter step monitors the overall number of times that the parking sequence has been repeated for a particular configuration of the parameters. If the current configuration of parameter settings has not been repeated N times, execution is returned to step 804. The parking sequence will generally be repeated a statistically significant number of times, indicated here as N, for each configuration of the parameters so as to establish a probability of the head arrangement reaching the parked position for that particular configuration. For example, N might be equal to 100. A single failure in attempting to reach the parked position out of 100 tries will generally be considered as unacceptable, indicating a failure threshold.

If, on the other hand, the current parameter configuration has been successfully repeated N times, step 816 is entered. In step 816, a decision is made as to whether the parking sequence is to be repeated with a different configuration of the parameter settings. If that is the case, step 812 is executed whereby to modify the parameters followed again by step 804. It should be appreciated that the specific implementation of step 816 is dependent upon the particular algorithm that is employed by the parking sequence. Therefore, the parameter set may be modified in a manner that is suited to the particular algorithm. In this regard, it is considered that one having ordinary skill in the art is capable of modifying any known algorithm parameter set either currently known or yet to be developed in view of this overall disclosure. One possible implementation might optimize one of the parameters which is initially considered to be the most critical. Thereafter, other parameters within the group of parameters defined by the particular algorithm may be modified on an individual basis. Still further modifications may include changes made to more than one parameter at a time.

Different calibration procedures may be employed dependent upon the state of product development. For example, a rather exhaustive search for an optimum set of parameters may be performed using a relatively great number of parameter configurations on a certain number of units produced in an initial production run. Having found that initial set of optimum parameters, the parameter calibration process may thereafter be relaxed somewhat, using a lesser number of parameter configurations.

Once step 816 determines that all of the parameter modifications targeted for execution have been completed, a probability set comprising all of the values used in the parameter configurations is available. Step 818 is performed whereby to choose the set of parameters to be employed for operational purposes using the probability set. A number of different objectives may be brought to bear in selecting the optimized set of parameters. As mentioned above, one possible selection resides, for "two-valued" parameters, in choosing a midpoint between upper and lower failure values. It is to be understood, however, that other objectives may also be considered. In the example of the voice coil motor drive current parameter, a magnitude may be selected that is somewhat closer to the lower failure limit for purposes of power conservation. This objective is particularly applicable in the instance of portable devices which operate on battery power.

In one highly advantageous feature, step 820 saves the optimized parameters on the magnetic media using the head arrangement. During operation of the Storage Element, these parameters are retrieved and employed by the processing arrangement, as will be further described at an appropriate point below. Therefore, each and every unit produced may operate with a customized set of parameters in terms of parking calibration as well as other aspects of operation, as will be further described.

Figure 11:
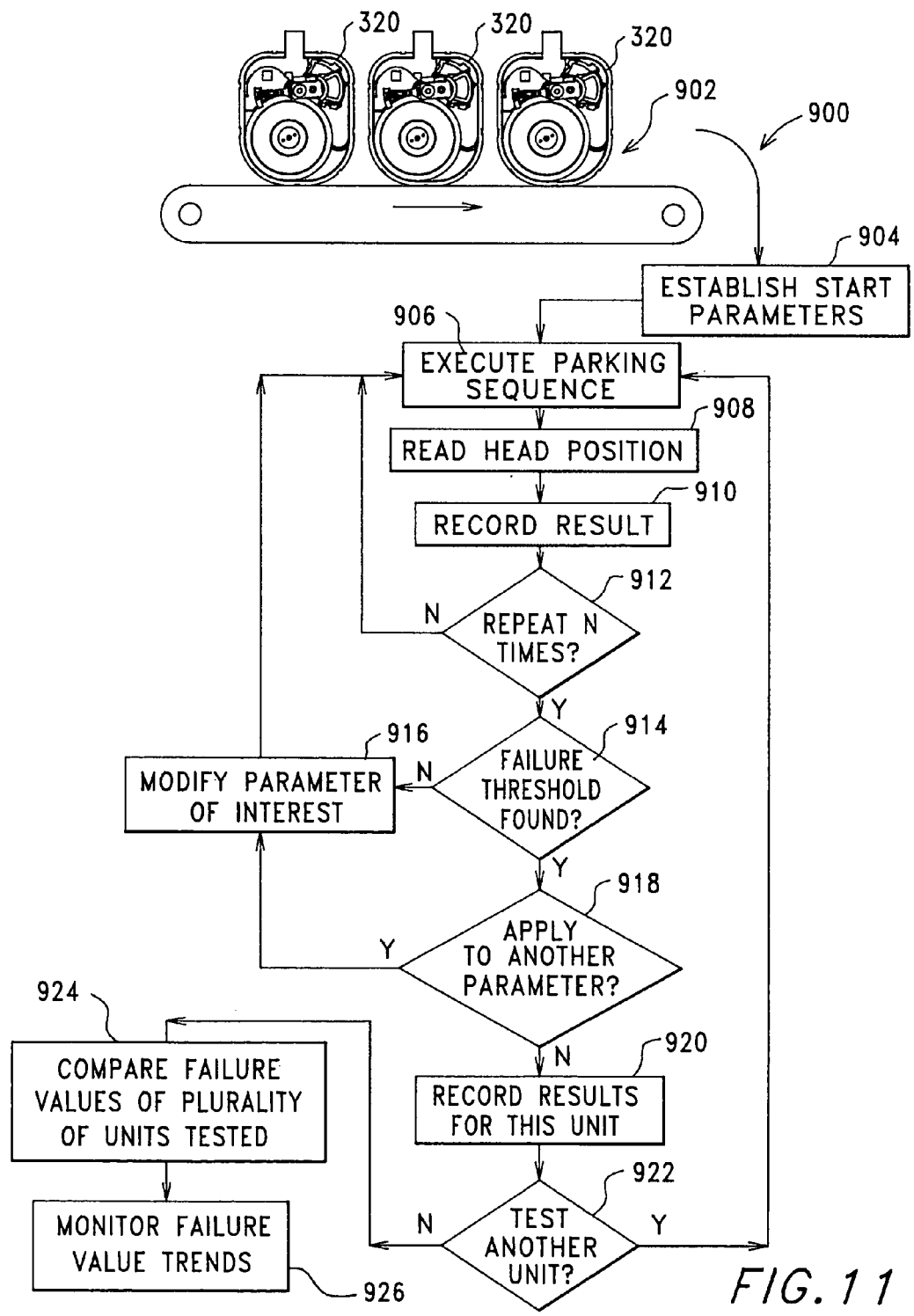
FIG. 11 is a flow diagram illustrating one possible implementation of a parameter tracking method performing in accordance with the present invention and utilizing the head position sensing arrangement of the present invention.

Referring now to FIG. 11, a highly advantageous parameter tracking method is generally indicated by the reference number 900. It is noted that this tracking method may be performed as an adjunct to the foregoing calibration procedure, as will be further described. A production line is generally indicated by the reference number 902 having a plurality of Storage Elements 320 coming off of the line for entry into method 900. Initially, it should be understood that this method is advantageous in tracking changes that are occurring in the Storage Element, but which nonetheless might otherwise go unnoticed, at least until these changes reach critical levels. Since different components which make up the Storage Element are likely to be sourced from different vendors, it is possible that sufficient changes in one of these components, even where the vendor is unaware of drifting tolerance or composition changes, could ultimately produce fatal problems during operation. The present invention, through the use of its head sensor position indication arrangement, contemplates tracking performance drift in relation to certain characterizable aspects of performance. This overall technique may be referred to hereinafter as "trend characterization" or "parameter tracking".

Still referring to FIG. 11, method 900 begins by initially establishing start parameters in step 904. It should be appreciated that several different approaches may be employed with regard to setting the start parameters. In one approach, the parameters may be set so that failure to reach the parked position is virtually assured. The parameters may then be adjusted in a direction toward what is known to be an operational value or range of operational values, in the case of a parameter having both upper and lower failure limits. In this manner, the failure threshold(s) for each individual parameter and for subsets and/or the overall set of parameters may be established, as desired. In another approach, the parameters are initialized in what is thought to be an optimized or at least operational state. The parameters are then adjusted in one or both directions toward the failure threshold(s). Again, individual parameters may be adjusted so as to find the failure threshold(s) of each parameter as well as finding associated failure thresholds for subsets of parameters and the overall collection of parameters. Any set of values for the parameters at which a failure threshold is present may be referred to as a failure configuration.

Step 906 executes the parking sequence using the initial set of starting parameters. It is noted that execution of the parking sequence throughout this overall disclosure is assumed to begin from having the head arrangement positioned for reading from the magnetic media or from some defined, but unparked position from which the parking sequence algorithm is designed to start. In fact, this starting position may comprise one of the parameters of the parking sequence algorithm. The starting position may define a lower failure limit or threshold nearest the parking arrangement and an upper failure limit somewhat further away from the parking arrangement.

Step 908 then reads the head position to establish whether or not the head arrangement reached the parked position. In step 910, the result of step 908 is recorded for subsequent use. Step 912 then tests the number of times that the parking sequence has been repeated. In this regard, the parking sequence may be repeated any number of times for a particular set-up of parameters so as to assure a sufficiently accurate determination of the probability of parking at those settings. As one alternative, during this repetition of the parking sequence, the incidence of one failure may immediately move the procedure to modification of the parking parameters.

Having repeated the parking sequence for a particular setting of the parameters N number of times, step 914 establishes whether or not a failure threshold was found in view of the results stored in step 910. If a failure threshold was not found, step 916 modifies the parameter settings in a manner that is consistent with the parking algorithm being employed. Thereafter, step 906 re-executes the parking sequence. Operation continues to establish whether or not a failure threshold is found for the new settings of the parameters. When a failure threshold is found for a particular configuration of the parking parameters, step 918 saves the failure configuration and determines whether the method is to be applied to a different parameter, subset or the overall group of parameters. If so, the foregoing process is repeated. Otherwise, step 920 records the results for the particular unit having just been tested in the form of all of its failure configurations of interest. Step 922 then checks for another unit to be tested. Accordingly, any number of units may be tested from an individual production run. More importantly, this overall process is applicable over long-term periods of time. For example, across the entire number of Storage Elements produced having a particular model number. From time to time, step 924 is employed whereby to compare the recorded failure configurations and specific values across all of these units. Step 925 is then used to establish trends in failure values with continued production of the unit. Thus, impending problems may be averted. As an example, if frictional coefficients are trending upward as a result of changes in the composition from which ramp 360 (see FIG. 3) is formed, the lower recorded failure threshold value for the drive current required to park the head arrangement will be observed to be trending upward. With this trend information in hand, an investigation may be undertaken to ascertain what is causing the increase in the required magnitude of current. In this manner, any number of developing problems may be identified. Applicants consider this process as being highly advantageous, since operational conditions are maintainable well separated from ascertained failure thresholds.

Although methods 800 and 900, illustrated in FIGS. 10 and 11 respectively, are described separately for purposes of clarity, it should be appreciated that these methods are combinable in view of this overall disclosure. That is, essentially all of the foregoing calibration and trend tracking information may be determined once threshold value limits embraced by failure configurations for the parameters in any particular parking algorithm have been established. In this regard, the steps of the described methods may be changed in sequence and/or modified in any suitable manner so long as the teachings herein are applied. Moreover, these methods are considered to be applicable to the production of virtually any hard disk drive. The benefit of an optimized parking algorithm will significantly enhance reliability of any hard disk drive through application of the teachings herein.

Having described the use of the head arrangement sensing feature of the present invention for the purpose of calibration and trend tracking, attention is now directed to certain aspects of the use of this feature during operation of the Storage Element or, of course, during the operation of any hard disk drive produced having the head arrangement sensing feature of the present invention. As mentioned above, an awareness of the position of the head arrangement is critical to reliable operation of any hard disk type storage arrangement, particularly when the head arrangement is supposed to be parked. That is, if the head arrangement is inadvertently moved away from its parked position, for example, due to the receipt of an external shock force, its transducer is likely to be torn lose as a result of non-rotational contact with the magnetic media disk. The head arrangement sensing feature of the present invention is highly advantageous, in the first instance, by providing the ability to actually confirm that the head arrangement has been received in the parked or unloaded position. Moreover, having initially confirmed that the head arrangement is received in the parked position, its status may readily be re-confirmed, as desired. One particular application for the use of head arrangement sensing feature of the present invention will be described immediately hereinafter.

Figure 12:
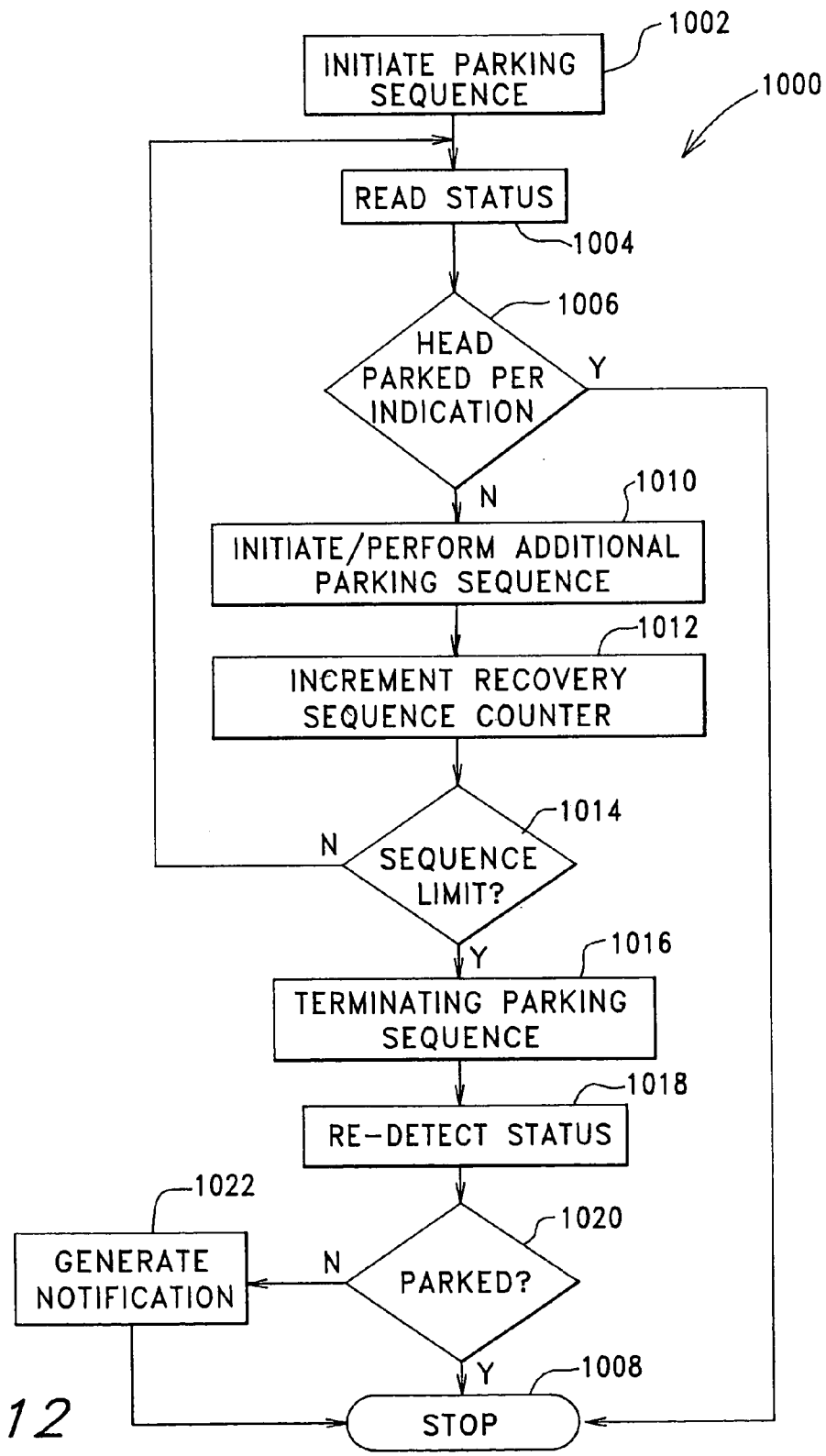
FIG. 12 is a flow diagram illustrating one possible implementation of an advanced parking control and monitoring sequence performed in accordance with the present invention and utilizing the head position sensing arrangement of the present invention.

Turning now to FIG. 12, an advanced parking control and monitoring sequence, performed in accordance with the present invention, is generally indicated by the reference number 1000. Method 1000 is performed by processing arrangement 302 within device 300. It should be appreciated, however, that the method is readily adapted for use in any form of hard disk drive arrangement. Method 1000 begins with step 1002 in which a parking sequence is initiated. The parking sequence employed may utilize parameters having values identified and selected, for example, using highly advantageous calibration procedure 800 described above. Again, any suitable parking algorithm may be employed within the overall context of this method. Following step 1002, in step 1004, the processing arrangement reads the positional status of the head arrangement. Step 1006 then produces an indication based on this read. The indication may be provided in a wide variety of different ways. In one feature, an interrupt may be generated for receipt by the processing arrangement. In another highly advantageous feature, the indication is produced and stored in a register. The latter may be located within the Storage Element itself for subsequent access by the processing arrangement. Alternatively, the register may be located at any suitable location within the overall device so long as the processing arrangement has access thereto. This read may be performed in any suitable manner. For example, the processing arrangement may directly read the head position sensing arrangement. As an alternative, register 610 described with respect to FIG. 3 may be read. If the indication, for example, per the x and y bits of register 610, shows the head arrangement to be properly parked, stop step 1008 is executed.

If, on the other hand, the bits indicate that the head arrangement is not parked, step 1010 is performed in which an additional parking sequence is executed using the same parameter settings. Thereafter, step 1012 increments a recovery sequence counter (not shown). As will be seen, the recovery sequence counter counts the number of times that the parking sequence is repeated using its initial set of parameters. Step 1014 then tests the number of times which the parking sequence has been repeated. This sequence continues until the limit is encountered. The limit may be set, for example, in the range from 1 to any useful number of attempts.

Once the limit has been encountered, step 1016 performs a terminating parking sequence which is different from the parking sequence that is employed in the initial part of the method. The terminating parking sequence may be developed in view of a number of different considerations. For example, terminating parking sequence may vary the parameter settings in view of the bit settings in register 610. Specifically, as mentioned above, if one of the bits is set, while the other bit is not set, the head arrangement has most likely bounced off of the parking arrangement. Accordingly, the parameter corresponding to the voice coil motor drive current may be reduced in magnitude for purposes of the terminating parking sequence. On the other hand, if both of the bits are not set, the head arrangement has most likely not reached the parked position by virtue of lack of momentum. Therefore, the parameter corresponding to the voice coil motor drive current may be increased in magnitude for use in the terminating parking sequence. Following step 1016, step 1018 again tests the status of the head arrangement's position.

While steps 1016 and 1018, in combination, illustrate the terminating parking sequence as a one pass-through procedure for purposes of clarity and for facilitating brevity of this discussion, it is to be understood that this terminating parking sequence may encompass a repetitive process which bears some relationship to the calibration procedure of method 400 described above. That is, parameter magnitudes may be varied in incremental steps with repetition of the parking sequence, accompanied by testing the result of each variation.

Step 1020 performs a final check of the head arrangement position. If a parked indication is obtained, the procedure may terminate at stop step 1008. If the indication continues to show that the head arrangement is not parked, step 1022 generates a notification indicating to the device user that a problem has been encountered which is apparently unrecoverable. The notification may be provided in any suitable form such as, for example, in an audio and/or visual form. The foregoing procedure may be modified to suit any number of operational considerations. For example, the number of times that the parking sequence is repeated with any configuration of its parameters may be controlled, at least in part, by time constraints imposed through the overall operation of the device. Still further steps may be added to the overall process with the intent of enhancing the probability of survival of the Storage Element or other such hard disk drive type device. For example, following failure of the terminating parking sequence to achieve an indication that the head arrangement is parked, the voice coil motor drive signal may be issued at a level which is intended to hold the transducer(s) of the head arrangement just outside the outer diameter of the magnetic media.

Having described the head position sensing arrangement of the present invention and its use in a number of highly advantageous processes, it will be appreciated that the present invention provides sweeping advantages over the state-of-the-art. As is the case with any of the methods described herein, the ordered sequence of steps and specific design of individual steps and/or combinations thereof which make up method 1000 are considered to be within the scope of the present invention, as modified by one having ordinary skill in the art in view of this disclosure.

Figure 13:
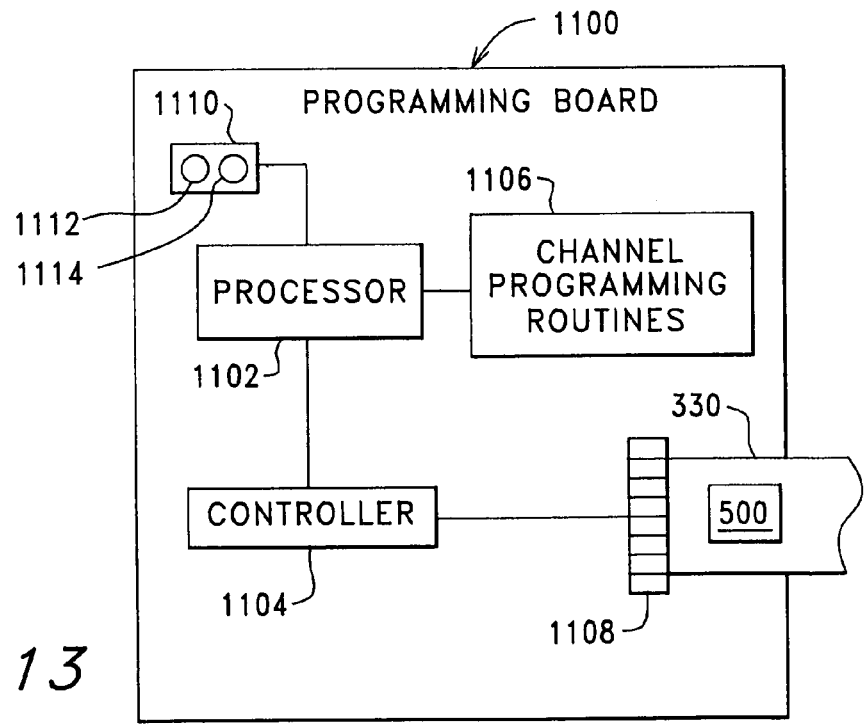
FIG. 13 is a block diagram of a test/programming board produced in accordance with the present invention and interfaced with the Storage Element (partially shown) of the present invention during manufacturing procedures.

Referring to FIG. 13 in conjunction with FIG. 2, attention is now directed to a highly advantageous test/programming board, generally indicated by the reference number 1100. Board 1100 includes a processor 1102, a controller 1104, a channel programming routines section 1106 and a connector 1108 configured for temporarily accepting the free end of flexible circuit 330 (partially shown) during the manufacturing process. Previously described connector 332 may be used as connector 1108, provided that it will accommodate repeated connect and disconnect cycles. In this regard, board 1100 is physically configured for temporary mating with Storage Element 320 during manufacturing for the purpose of customizing channel IC 500. This physical connection may be accomplished, for example, using plastic clips. Because the physical arrangement of board 1100 and Storage Element 320 may be accomplished in an unlimited number of ways, within the capability of one having ordinary skill in the art, a particular physical arrangement has not been illustrated. For example, an electrical interconnection arrangement may include a first portion forming one part of the Storage Element and having a second portion forming another part of the test/programming board for detachably electrically connecting the digital storage arrangement to the programming arrangement. In one embodiment, one of the first and second portions of the said interconnection arrangement may include a set of resilient contact members and the other one of the first and second portions may include a set of contact pads electrically connectable with the resilient contact members for use in programming the channel.

Channel programming routines section 1106 comprises an appropriate form of memory (e.g., ROM in combination with RAM) loaded with programming for execution by processor 1102 to issue native code instructions to controller 1104. The latter is configured in essentially the same manner as a prior art hard drive controller. That is, controller 1100 is configured to execute the native code of Storage Element 320 as a requirement to customizing channel IC 320. It should be appreciated that board 1100 is configured to complete its customization and test functions in an automated manner, thereafter, to provide a result from processor 1104 using an indication section 1110. As an example, a green light 1112 and a red light 1114 may give a pass/fail indication as to the status of the particular Storage Element. More detailed information may be provided, as desired, by using an LCD display (not shown), for example, to isolate problematic manufacturing concerns.

Still referring to FIGS. 2 and 13, having described test board 1100 and its general use with Storage Element 320, a number of associated advantages and features will now be described. It is important to appreciate that the functionality required to customize channel IC 500 is not required in device 300. The customization process need only be performed one time during manufacturing since the customized channel, in accordance with the present invention, remains with the Storage Element. This feature results in savings with regard to manufacturing costs associated with device 300. Moreover, any functionality of controller 1104 directed to the customization and testing process are not needed in device 300. The reader will recall that processing arrangement 320 of device 300 executes the native code of the Storage Element. Essentially, processing arrangement 302 serves in one role as a controller, without the need for test functionality which is needed in controller 1104. In this regard, any requirements for an upgraded processor in the end device, in order to execute channel programming, are avoided. It should be appreciated that the present invention contemplates a pre-existing compatibility between prior art devices and the Storage Element of the present invention. That is, as described above, processing power dedicated to the operation of the Storage Element may be deliberately limited to unused capabilities of processors already present in the architecture of a particular device. At the same time, the teachings of the present invention are readily practiced in "upgraded" devices, yet to be developed, in a way which provides even further performance enhancements in these devices.

Another advantage, with regard to test board 1100 and which is directly applicable to consideration of cost-reduction, is found on the basis that a limited number of test boards are needed within the context of any one overall manufacturing process. That is, the required number of test boards is limited by the number of Storage Elements available for channel programming at any one point in time. In this way, a single test board may be used over time to channel program and test a great number of Storage Elements. It should be appreciated that, in the absence of this arrangement, savings attendant to elimination of the need for a controller in Storage Element 320 would be offset wherein a test board was usable on only a single or very limited number of occasions.

A further advantage is provided by the present invention due to its compatibility with traditional manufacturing and test procedures. In particular, only two, almost insignificant steps are added to the manufacturing process in which test board 1100 is first physically connected with a Storage Element and then, after channel programming and testing, disconnected from that Storage Element. In this regard, it should be appreciated that cost savings provided in an end use device can be far outweighed where a sufficiently significant revamping of the manufacturing process is needed to produce that cost savings.

Figure 14:
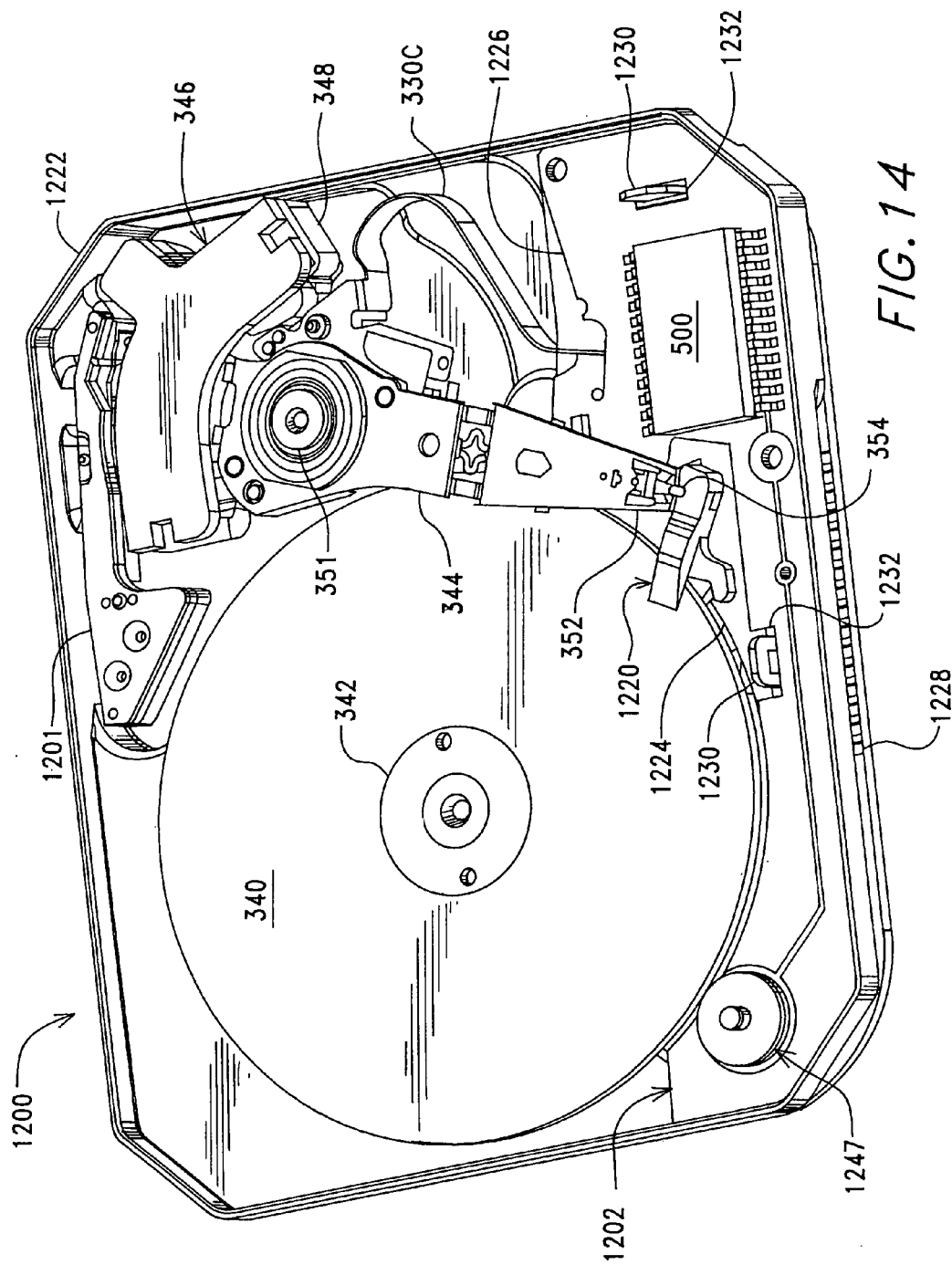
FIG. 14 is a perspective view of the base plate and interior components of another embodiment of the Storage Element of the present invention, shown here to illustrate details of its structure.

Turning now to FIG. 14, attention is now directed to another embodiment of the digital Storage Element of the present invention which is generally indicated by the reference number 1200. It is to be understood that the various figures are drawn in a way that is intended to enhance understanding and, hence, are not to scale. Moreover, descriptive positional terminology such as "upper", "lower" and "bottom" is founded only on the views seen in the various figures and in no way imposes restrictions as to actual orientations of the structures referred to either in this description or in the appended claims. To the extent that Storage Element 1200 includes components that resemble those described above, at least from a functional standpoint, such descriptions will not be repeated. Similar components may be referred to using like reference numbers or using identical nomenclature. While FIG. 14 illustrates the addition of a latching arrangement 1201, Storage Element 1200 differs from previously described Storage Element 320 primarily with respect to a base supported flexible circuit arrangement 1202 which itself supports a "floating", ramp arrangement 1220 that is nevertheless positioned with highly controlled tolerances with respect to other components, as will be described in detail immediately hereinafter.

Figure 15:
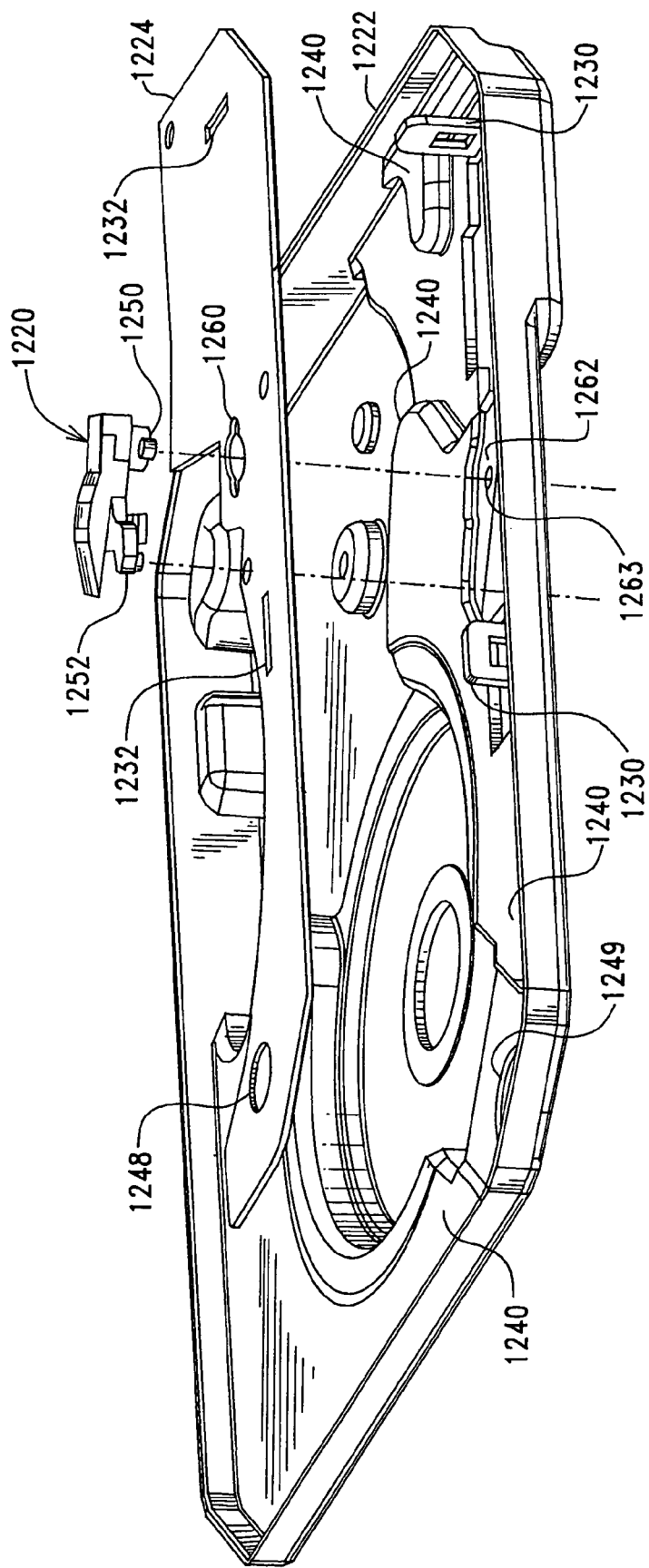
FIG. 15 is an exploded perspective view of selected components of the Storage Element of FIG. 14 illustrating its base plate, flexible circuit stiffener and a ramp arrangement in a spaced apart positional relationship.

Referring to FIG. 15 in conjunction with FIG. 14, the former is an exploded, perspective view selectively illustrating components of Storage Element 1200 including a base plate 1222, a flexible circuit stiffener 1224, forming part of flexible circuit arrangement 1202 and ramp arrangement 1220 in a spaced apart relationship in order to show details with regard to these particular components that are not readily observable in the assembly view of FIG. 14. As is visible in FIG. 14, flexible circuit stiffener 1224 supports a flexible circuit 1226 which, among other functions, extends to form dynamic loop 330c and to form an external connector 1228 (only partially visible) arranged along a side margin of the Storage Element.

Figure 16:
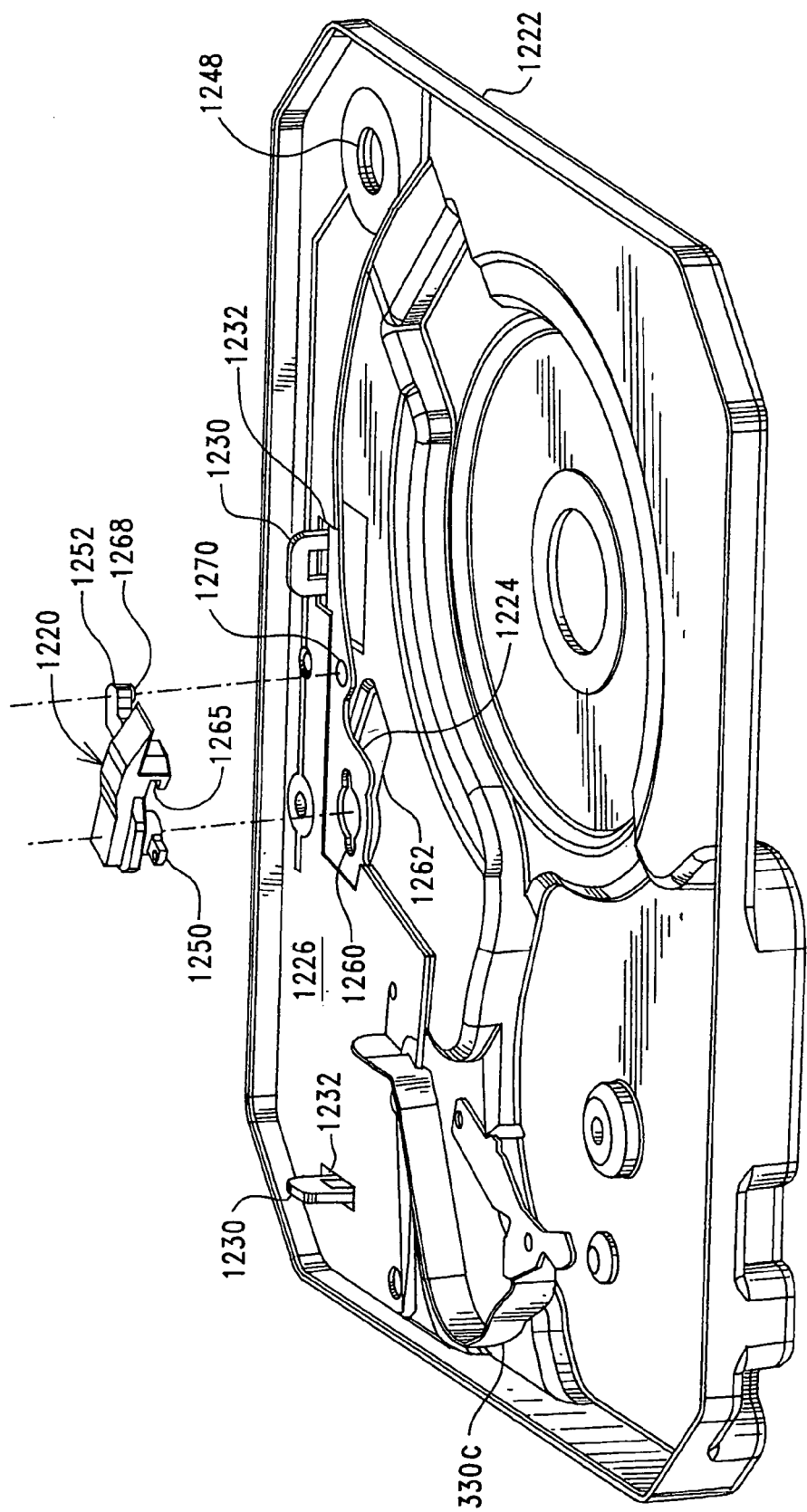
FIG. 16 is another perspective view of selected components of the Storage Element of FIG. 14 showing the flexible circuit assembly positioned in the base plate and the ramp arrangement in a spaced apart relationship thereto.

Referring to FIGS. 14–16, flexible circuit stiffener 1224 is fixedly attached to base plate 1222 by initially inserting a pair of bendable fastening tabs 1230 through corresponding tab openings 1232 that are defined in flexible circuit stiffener 1224 such that the lower surface of the stiffener rests against a number of support surfaces 1240 (FIG. 15) that are integrally formed as portions of base plate 1222. Tabs 1230 are shown in an inserted, pre-bent condition in FIGS. 14 and 16. FIG. 14 further illustrates a fastener arrangement 1247 that is inserted in a through hole 1248, seen in FIG. 16 defined by stiffener 1224 at one end thereof. Fastener arrangement 1247 extends into a fastener opening 1249 (FIG. 15), which is threaded in the present example, so as to fixedly support the associated end of the stiffener and which further serves as a ground connection to the base plate from flexible circuit 1226.

Figure 17:
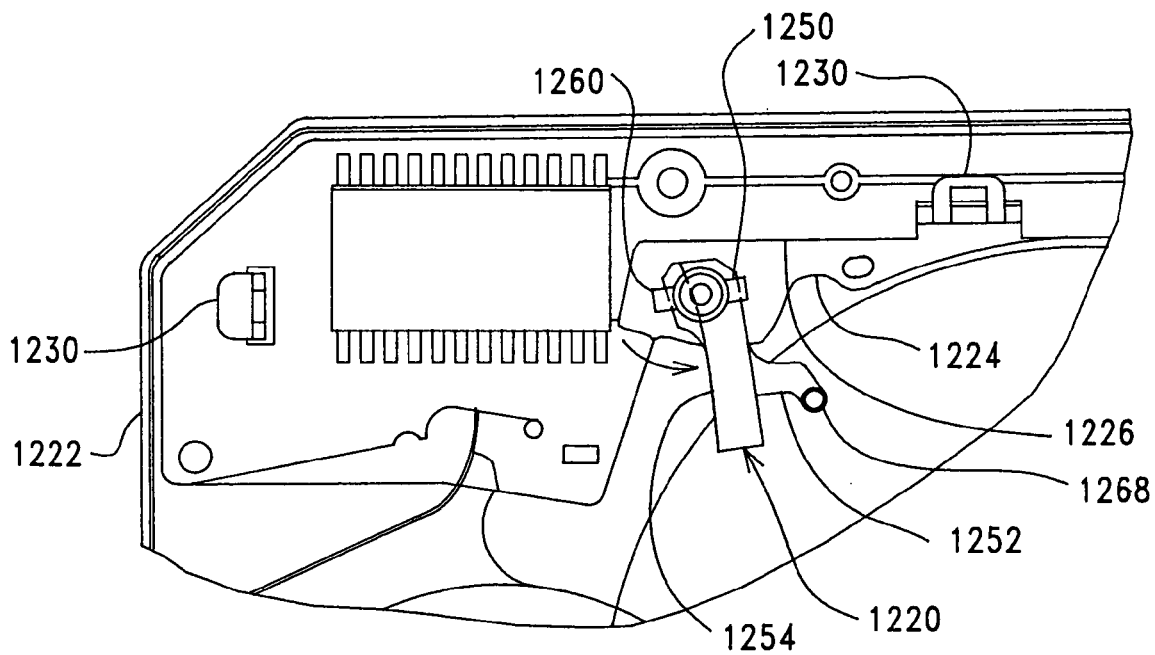
FIG. 17 is a partial cutaway plan view of the Storage Element of FIG. 14 shown here to illustrate details with regard to installation of the ramp arrangement.

Turning to FIG. 17, tabs 1230 (one of which is shown) are bent so as to capture flexible circuit 1226 and flexible circuit stiffener 1224 between an end portion of each bendable tab and support surfaces 1240 (FIG. 15) therebeneath. It should be appreciated that this arrangement is not intended to eliminate movement of the flexible circuit in a way which sets any critical tolerances with respect to ramp arrangement 1220, even though the ramp arrangement is directly supported by flexible circuit stiffener 1224 and only indirectly supported by base plate 1222. That is, ramp arrangement 1220 is permitted to float or move with a relatively low degree of tolerance control with respect to flexible circuit stiffener 1224, while the position of the ramp relative to the base plate is maintained using significantly tighter and acceptable tolerances that are controlled in other highly advantageous ways. It should be appreciated that the tolerance control available with respect to controlling the position of the flexible circuit stiffener would result in a unacceptably loose level of tolerance control if the ramp arrangement was immovably fixed onto the flexible circuit stiffener. In this regard, it is submitted that the floating ramp arrangement of the present invention may be physically implemented in an unlimited number of ways while remaining within the purview of these broad teachings. Accordingly, all of such alternative implementations are considered as being at least equivalent with respect to the appended claims. 6

Figure 18:
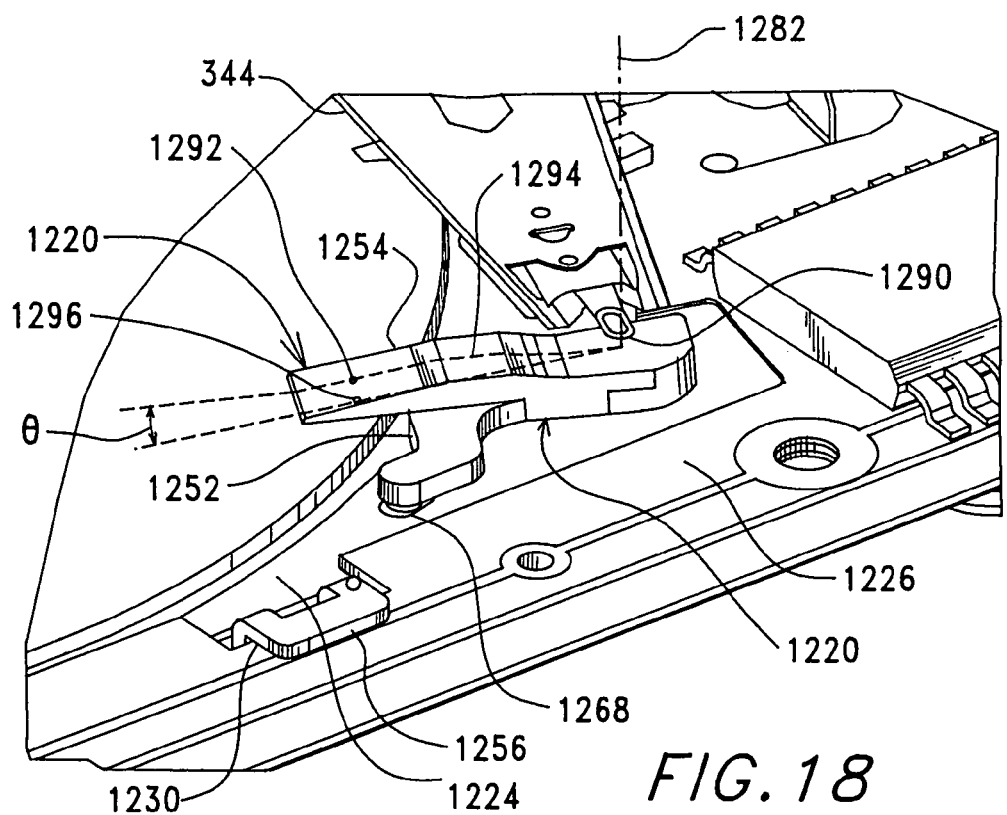
FIG. 18 is a partial cutaway view, in perspective of the Storage Element of FIG. 14 illustrating the installed ramp arrangement and its relationship to the landing point load tip on the actuator arm.
Figure 19:
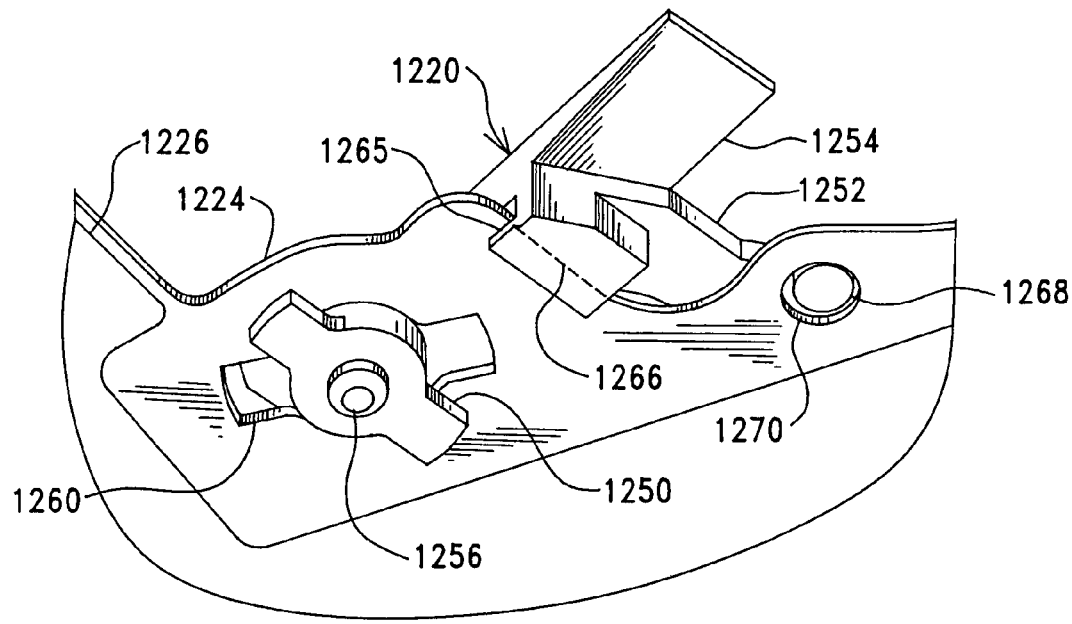
FIG. 19 is partial cutaway bottom view, in perspective, of certain components of the Storage Element of FIG. 14 including the flexible circuit arrangement and ramp arrangement shown here to illustrate details of their cooperating structures.

With collective reference to FIGS. 14–19, attention is now directed to details with regard to ramp arrangement 1220. FIGS. 15 and 16, illustrate ramp arrangement 1220 prior to installation, FIG. 17 illustrates an intermediate step in the installation of the ramp, and FIGS. 14, 18, 19 and 20 show the ramp arrangement installed at least in the flexible circuit arrangement. As best illustrated by FIGS. 17–19, ramp arrangement 1220 is formed primarily of two portions including an attachment and indexing arrangement made up of a T-lock configuration 1250 and a locking arm 1252, cooperating to attach and hold the ramp in its intended operational position on the flexible circuit stiffener, and a ramp portion 1254. The indexing arrangement includes an indexing pin 1256, seen in detail in FIG. 19, which will be described in further detail below.

Referring to FIGS. 15, 17, 19 and 20, flexible circuit stiffener 1224 defines a T-lock through hole 1260 that is configured for receiving T-lock configuration 1250 of the ramp arrangement. FIG. 17 illustrates the ramp arrangement initially inserted into T-lock through hole 1260. This insertion simultaneously causes indexing pin 1256 of the ramp arrangement to be inserted into an indexing recess 1262 (FIGS. 15 and 20) that is defined by base plate 1222 having an indexing through hole 1263 defined therein. It should be appreciated that a high level of tolerance control is generally available with respect to the dimensions seen in base plate 1222 whether formed as a casting or, as seen here, by stamping. Accordingly, indexing recess 1262 and indexing through hole 1263 are precisely located not only in the major plane of the base plate, but the dimensions of the indexing recess, including the depth of its floor 1264 (FIG. 20), are precisely controllable.

Following the initial engagement between ramp arrangement 1220 and flexible circuit stiffener 1224, as depicted in FIG. 17, the ramp arrangement is rotated in a direction that is indicated by an arrow (adjacent to the ramp arrangement in FIG. 17) to the locked position shown in FIGS. 14 and 18 as well as shown in the bottom, perspective view of FIG. 19. Ramp arrangement 1220 is formed from a material having resilient characteristics such as, for example, liquid crystal polymer (LCP) and acetal impregnated with PTFE. Rotation is terminated when a support slot 1265 (best seen in FIG. 19) engages a side margin 1266 (shown as a dashed line) of the flexible circuit stiffener. Concurrently, a locking pin 1268, which is formed on a distal end of locking arm 1252 snaps into a locking aperture 1270 that is defined by flexible circuit stiffener 1224. Prior to snapping into the locking aperture and at least during initial engagement between slot 1265 of the ramp arrangement and side margin 1266 of the stiffener, locking pin 1268 is resiliently biased against the major surface of the flexible circuit stiffener proximate to locking aperture 1270 as a result of resilient deformation of locking arm 1252. Once in the locked position, locking pin 1268, locking arm 1252 and the flexible circuit stiffener are cooperatively configured such that slot 1265 is resiliently and rotationally biased into side margin 1266 of the flexible circuit stiffener. At the same time, slot 1265, like T-lock configuration 1250, serves to limit movement of the ramp arrangement in directions having a component of motion that is normal to the plane of the flexible circuit stiffener. It should be appreciated that slot 1265 is optional, as one potential modification. Moreover, any number of alternative structural expedients may be employed to floatingly lock the ramp arrangement in place so long as the broad teachings herein are relied upon. For example, the T-lock configuration may be replaced with any suitable slot and groove arrangement. It is worthwhile to note, however, that the described locking arrangement is considered as being highly advantageous at least for the reason that it is fastenerless, as will be further described, although this is not a requirement since many techniques may rely on fasteners, such as threaded fasteners, to provide for relative movement between two attached components.

In one alternative method of assembly, with reference to FIGS. 14–19, T-lock configuration 1250 of the ramp arrangement is initially inserted into T-lock through hole 1260 in stiffener 1224. The ramp is then rotated (FIG. 19) about indexing pin 1256 such that slot 1265 engages side margin 1266 as locking pin 1268 snaps into locking pin aperture 1270. Thereafter, indexing pin 1256 engages indexing ramp indexing through hole 1263 in indexing recess 1262 as flexible circuit arrangement 1202 is positioned onto bendable tabs 1230. The latter are then bent to hold the flexible circuit assembly in position.

Figure 20:
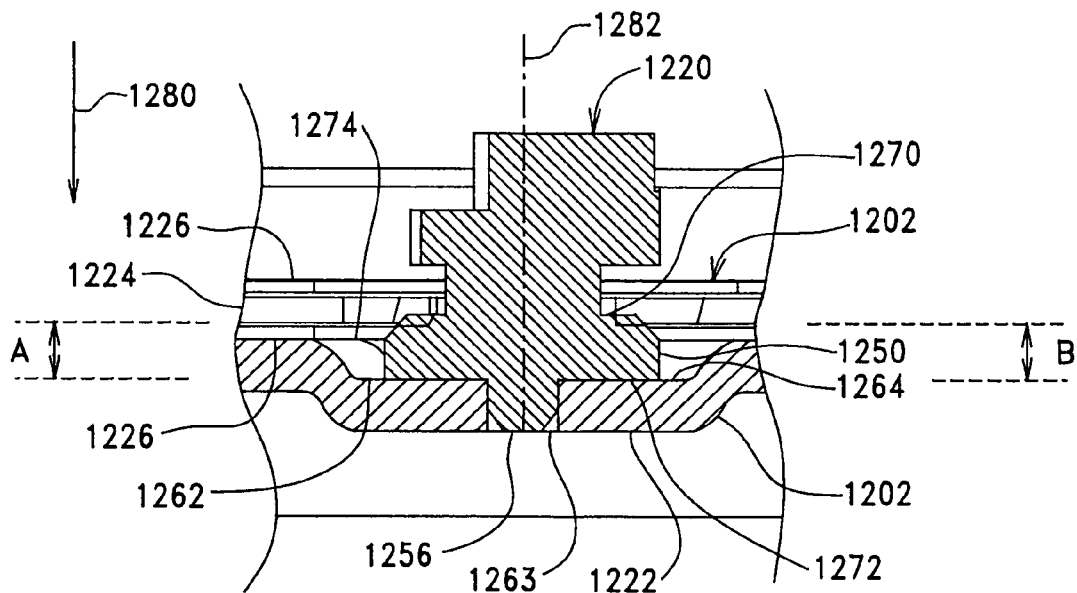
FIG. 20 is a partial diagrammatic cross-sectional view, in elevation, taken in a plane which bisects the T-lock arms of the installed ramp arrangement of FIGS. 14 and 18, shown here to illustrate further details of the structures of the flexible circuit arrangement, base plate and installed ramp assembly as well as associated advantages.

Referring to FIG. 20, attention is now directed to this greatly enlarged cross-sectional view for purposes of describing details relating to positioning tolerances that are controlled. Specifically, the opposing arms of T-lock configuration 1250 include opposing upper and lower surfaces 1270 and 1272, respectively. A first distance or thickness A, of the T-lock arms, between the upper and lower surfaces thereof, is greater than a second distance between floor 1264 of indexing recess 1262 and a lower surface 1274 of flexible circuit 1226, prior to installation of ramp arrangement 1220. That is, distance B is established with flexible circuit arrangement 1202 held against support surfaces 1240 (FIG. 15) by bendable tabs 1230 and fastener arrangement 1248. Because flexible circuit stiffener 1224 is formed from a resilient material such as, for example, stainless steel and flexible circuit 1226 is extremely flexible relative to the stiffener, rotating ramp arrangement 1220 to its locked position applies a resultant force in a direction that is indicated by an arrow 1280 so as to resiliently bias lower surfaces 1272 of the T-lock arms against floor 1264 of indexing recess 1262. At the same time, tolerance control is established laterally between the sidewall of ramp indexing through hole 1263 and the sidewall of ramp indexing pin 1256. Accordingly, a first controlled tolerance, relative to the housing and actuator arm pivot, is achieved in the plane of the flexible circuit stiffener for an axis of rotation 1282 of the ramp arrangement. Moreover, a second controlled tolerance is achieved normal to the stiffener plane, relative to the housing and actuator arm pivot, so as to control distance of ramp 1254 from base plate 1222 with no direct attachment between the two. The fastenerless attachment of ramp arrangement 1220 to flexible circuit stiffener 1224 is highly advantageous in providing the desired floating response as well as reduction of production costs and in eliminating contamination problems such as are inherent in the use of threaded fasteners. Control of rotational tolerance about axis 1282 will be described immediately hereinafter. In a sense, the floating ramp positioning arrangement of the present invention can be considered as automatically positioning the ramp arrangement since tolerance control is exclusively based on the dimensions of the base plate and ramp arrangement. No ramp alignment installation procedure is needed.

Turning to FIG. 18, ramp arrangement 1220 is shown rotated into its aforedescribed locked position. Actuator arm 344 is shown in its parked position having a load tip 1290 located approximately along axis of rotation 1282. Ramp 1254 is designed having an intended contact point 1292 at which load tip 1290 is intended to initially contact the ramp when moving to the parked position and intended to lose contact when moving away from the parked position. Intended contact point 1292 is shown arranged along a centerline 1294 of ramp 1254. Tolerances with respect to movement of an actual contact point along the sloped surface of ramp 1254 towards and away from axis 1282 are controlled directly by the aforementioned first and second control tolerances that are described with respect to FIG. 20 above. Rotational tolerance of ramp arrangement 1220 about axis 1282, however, primarily controls side to side positioning of the actual contact point on the ramp in a direction that is normal to centerline 1294 in the plane of the ramp surface. An exaggerated angle of rotation, $\theta$, illustrates an arbitrary rotation of the ramp arrangement about axis 1282 such that actual contact point 1296 is at the edge of the ramp surface. In this regard, because the contemplated rotational movement of the actual contact point is in a direction that is at least generally normal to centerline 1294, the rotational tolerance for the actual contact point about axis 1282 is responsive to the cosine of $\theta$. This arrangement is considered as being highly advantageous in providing for a third controlled tolerance of the actual contact point that is dramatically reduced for a given rotational positioning error. For example, a large value of rotational positioning error, such as 15 degrees, yields a positional error of only 0.034 multiplied by the radial distance between the target point and axis 1282.

Having described the floating ramp embodiment of the present invention in detail, it is worthwhile to now briefly consider the prior art. In this regard, Applicants are unaware of any similar ramp type structure. For example, the aforedescribed Morehouse patent describes a ramp that is fixedly, directly attached to the housing. It is submitted that prior art ramp arrangements, as exemplified by Morehouse, are directly and rigidly attached to an associated base plate as a result of a perception that such an attachment provides the only suitable mechanism for the required tolerance control. Particularly in view of such a perception, it is readily apparent that the original implementation of the floating ramp arrangement of the present invention, as well as the recognition of its attendant advantages, is neither trivial nor obvious.

Figure 22:
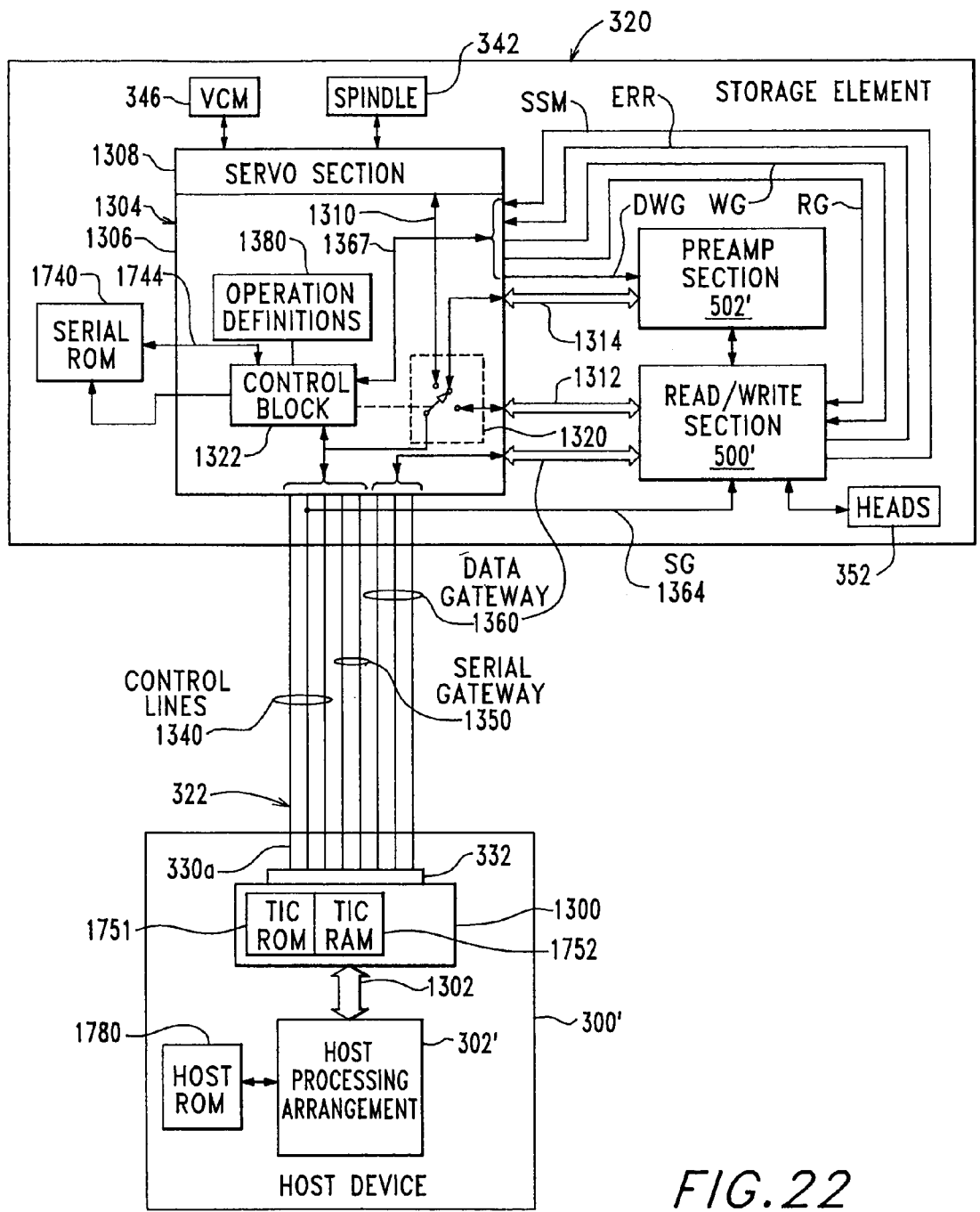
FIG. 22 is block diagram illustrating the Storage Element of the present invention interfaced with a host device, shown here to illustrate details with regard to a highly advantageous interface between the Storage Element and host device, as well as cooperating features within the Storage Element and host device.

Attention is now directed to FIG. 22 which illustrates Storage Element 320 electrically connected to a host computer or device 300' in accordance with the present invention. In particular, this embodiment of the host device includes a processing arrangement 302' that is connected with a transitional IC 1300, which may be referred to hereinafter as a TIC. Processing arrangement 302' may be connected to TIC 1300 using any suitable interface 1302 such as, for example, a CompactFlash interface. It is to be understood that any implementation described as utilizing a TIC is functionally equivalent to a host processing arrangement which is configured for executing the native code of the Storage Element. The TIC, in essence, becomes an integral part of the host processing arrangement. In the present example, a modified form of the CompactFlash interface is used between the Storage Element and TIC, as described in detail below. The TIC, in turn, is connected to interface 322 of the Storage Element. In one embodiment, free end 330a of a flexible cable provides for connection to connector a 332 (see also FIG. 2) to place TIC 1300 in electrical data communication with Storage Element interface 322, although any suitable connection scheme may be used.

Figure 21:
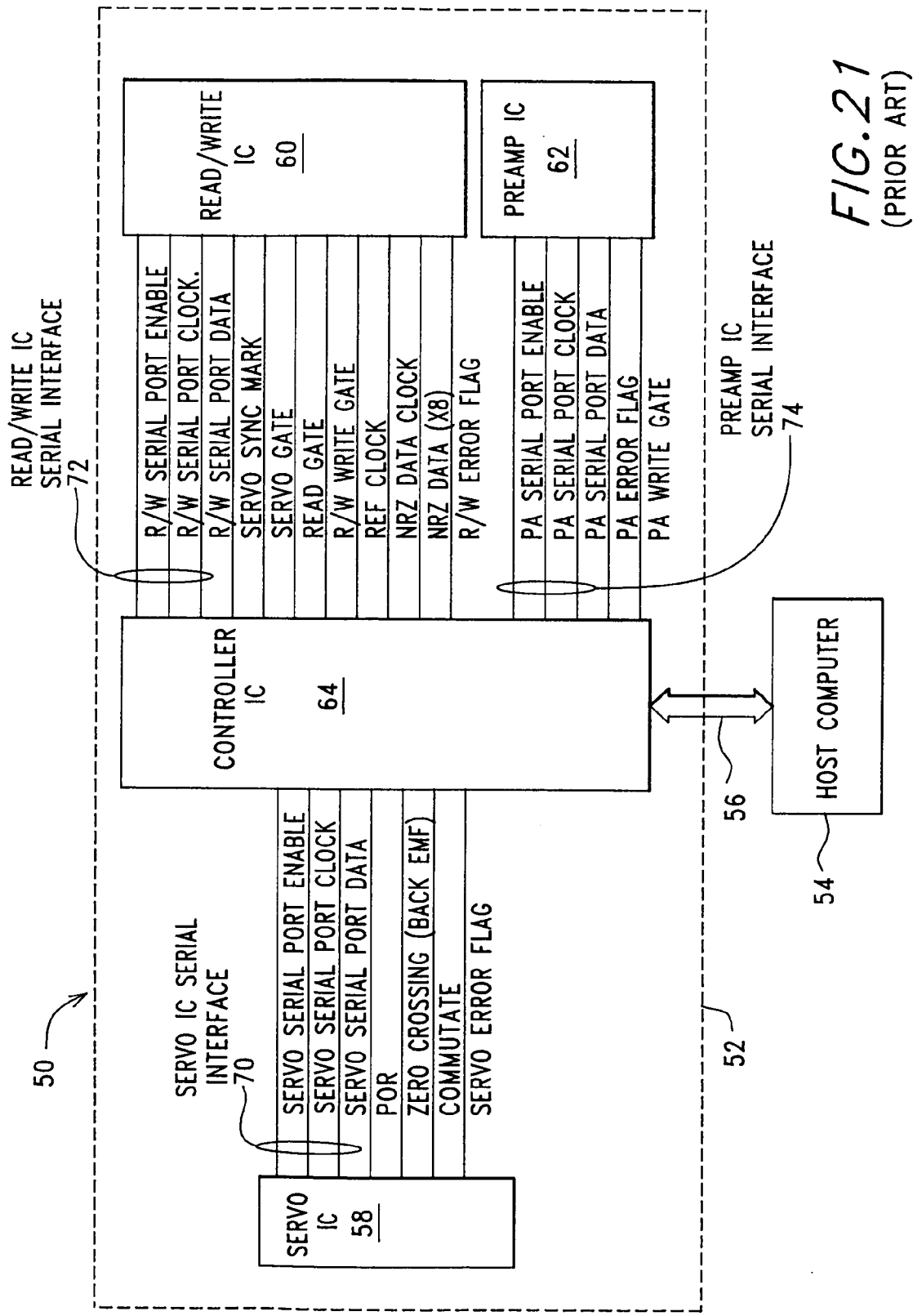
FIG. 21 is a block diagram of a prior art system showing a host computer interfaced with a conventional hard disk drive.

Still referring to FIG. 22, Storage Element 320 includes a read/write or channel section 500' and a pre-amp section 502', either of which may be provided as discrete integrated circuits. Read/write section 500' serves to transfer data to and from transducers or heads 352 in cooperation with preamp section 502'. Storage Element 320 further includes a highly advantageous servo/control IC 1304 which is made up of a management section 1306 and a servo section 1308. Servo section 1308 is in electrical communication with VCM 346 (see also FIG. 4) and spindle motor 342 in order to actuate both of these motors in a way that is known in the art. In this regard, it is appropriate to note that read/write IC 500' and preamp IC 502' may comprise conventional ICs. Moreover, servo section 1308 of IC 1304 may, likewise, be provided in the form of a separate, conventional servo IC. It is important to understand that each of these ICs or functional blocks is configured for sending and receiving control-related data using a dedicated serial interface such as those serial interfaces shown and described above with regard to FIG. 21. In the present example, servo section 1308 is controlled using a serial servo interface 1310, read/write (R/W) IC 500' is controlled using a serial R/W interface 1312 and preamp IC 502' is controlled using a serial preamp interface 1314. Thus, a plurality of device serial interfaces require bi-directional serial data control. To that end, management section 1306 includes a highly advantageous serial data router 1320 which may selectively connect with any of the serial interfaces for switching multiple conductor connections between the various device serial interfaces 1310, 1312 and 1314. In the instance of a device serial interface, these conductors generally include at least a serial clock line, an enable line and a serial data line (see FIG. 21). Serial router 1320 is switched under control of a control block 1322, as will be further described. In this regard, it should be appreciated that serial router 1320 and control block 1322 have been diagrammatically illustrated since there are essentially any number of functional equivalents. A specific implementation will be described at an appropriate point below.

Figure 23A:
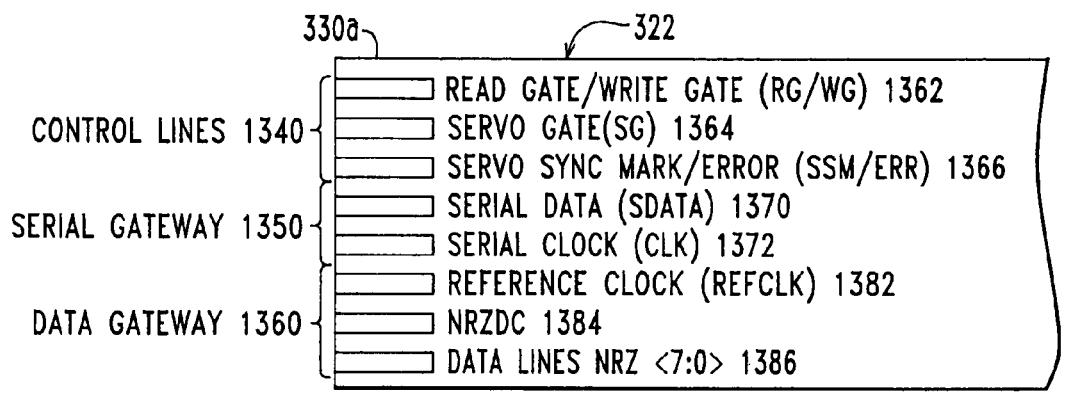
FIG. 23a is a greatly enlarged plan view which diagrammatically illustrates the signals which are present in the Storage Element to host device interface, which signals may be present, for example, in a flexible cable that extends from the Storage Element.

Turning to FIG. 23a in conjunction with FIG. 22, attention is now directed to interface 322 which electrically connects Storage Element 320 with host device 300' via TIC 1300. FIG. 23a diagrammatically illustrates free end 330a of Storage Element flexible cable 330. Power and ground lines are not shown, but are understood to form a portion of the interface. Initially, it is noted that the present invention provides a "pin-flip" feature whereby the order of the output signals in the interface can readily be reversed, as described in detail at an appropriate point below. The signals within the interface arrangement of the present invention are divided among three functional groups including a set of control lines 1340, a serial gateway 1350 and a data gateway 1360. Data gateway 1360 is connected by management section 1306 to R/W section 500'. In the present example, control lines 1340 include a read gate/write gate (RG/WG) line 1362, a servo gate (SG) line 1364 and a servo sync mark/error (SSM/ERR) line 1366. While the individual signals which make up the composite signals on RG/WG line 1362 and SSM/ERR are not new, in and of themselves, it is submitted that multiplexing read gate with write gate and servo sync mark with an error signal has not been seen in the prior art and is highly advantageous at least for the reasons to be described below. Moreover, after having accomplished this multiplexed configuration, it is clear to Applicants that this task is neither trivial nor obvious. Control block 1322 selectively interfaces control line group 1340, via interconnections 1367, indicated as an interface line, to a discrete read gate (RG) line, a discrete write gate (WG) line, a delayed write gate line (DWG), a discrete servo sync mark (SSM) line and a discrete error (ERR) line, as will be described in detail at appropriate points below with reference to subsequent ones of the figures.

Continuing with a description of FIGS. 22 and 23a, with particular emphasis on the component signals of interface 322, serial gateway 1350 includes a serial data line (SDATA) 1370 and a serial clock (CLK) 1372. Note that serial gateway 1350 does not include a serial enable line. It is important to understand that the SDATA signal travels bi-directionally between serial router 1320 and TIC 1300, carrying all serial control-related data which is required to support the serial ports of all of the device sections in the Storage Element. In the present example, these device serial interface ports correspond to servo section 1308, preamp section 502' and read/write section 500', although other specific implementations may be provided so as to serve fewer or greater numbers of device serial interfaces. As will be further described below, control block 1322, in cooperation with an operations definitions section 1380, provides for highly advantageous customization of the operation of serial router 1320 for any particular device serial interface that is employed. In this regard, it is important to remember that preamp section 502' and read/write section 500' comprise essentially off-the-shelf ICs. Moreover, servo section 1308 essentially comprises an off-the-shelf part including its standard serial port, but for its co-integration with management section 1306, which is not a requirement.

Data gateway 1360 includes a reference clock (REFCLOCK) line 1382 for use as a time base at least in writing data. An NRZDC line 1384 carries an NRZ data clock signal which is produced by a phase locked loop in Read/Write section 500'. At least one data line 1386 is provided for use in bi-directional transfer of data between media disk 340 (FIG. 3) and host device 300'. In the present example, eight parallel NRZ data lines have been employed, which may be individually indicated using the nomenclature NRZ <x>, where the value of x ranges from 0–7. Any suitable number of data lines may be utilized, including a single one, in order to implement the highly advantageous interface arrangement of the present invention. As an example, the number of NRZ lines may be selected based on the capabilities of a particular read/write IC (i.e., channel IC) that is to be used. Further, the use of differential NRZ lines is contemplated in a way which provides for reducing radiated emissions. In such an implementation, a Read/Write IC may be configured for using two conductors for serial data transfer in a single bit differential interface configuration.

In one modification, REFCLK 1382 may be eliminated from data gateway 1360 so as to reduce the size of interface 322 by one line. In place of REFCLK, serial clock (CLK) signal 1372 may be used by Read/Write section 500'. In order to provide for this modification, the CLK signal must be sufficiently stable and sufficiently jitter-free for use by the Read/Write section. In this regard, it is noted that many host devices, particularly portable devices, include a USB port having a USB clock signal that is generally crystal controlled. It has been found that this USB clock signal is suited to the contemplated purpose. Accordingly, CLK signal 1372 serves as a timebase reference for the operation of the Storage Element, including write operations. A timebase reference clock may be referred to hereinafter as SE Clock.

Figure 23B:
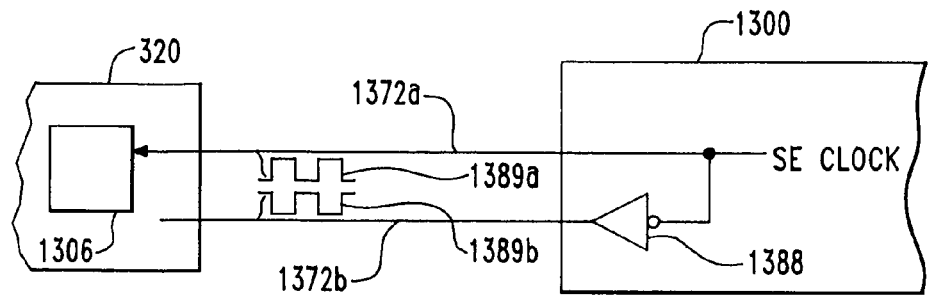
FIG. 23b is a block diagram partially showing the Storage Element and the host device for purposes of illustrating a highly advantageous differential-like clock that is implemented therebetween in accordance with the present invention.

Turning to FIG. 23b, in another modification, a highly advantageous differential-like clock signal may be provided, for example, serving as the timebase reference just described. To that end, portions of Storage Element 320 and TIC 1300 are illustrated. SE Clock is typically generated on the host side. In the present figure, SE Clock is placed directly onto a first line 1372a while being provided to an inverter/driver 1388. The latter drives a second line 1372b such that complementary signals 1389a and 1389b are present on lines 1372a and 1372b, respectively. Lines 1372 should be electromagnetically coupled as closely as possible, at least from a practical standpoint, so as to eliminate electromagnetic radiation of the clock signal. For example, referring to FIG. 23a, Serial Clock line 1372 can be replaced by lines 1372a and 1372b directly adjacent to one another. One of the lines received by operational section 1306 in the Storage Element, line 1372a in this example, serves as the timebase reference. The other line, 1372b, is unused. It is recognized that a true differential drive arrangement has not been provided. In this regard, however, such an arrangement is relatively demanding in terms of implementation and cost, requiring a differential amplifier and typically requires a dual-ended power supply. The differential-like arrangement practiced by the present invention is submitted to provide a majority of the benefits of a true differential-drive clock configuration with a fraction of its cost and complexity. It should be appreciated that a differential-like drive may be used with any of the NRZ lines and is certainly contemplated for use in providing a single-bit NRZ implementation.

Having described the components and architecture which provide for implementation of the Storage Element serial router of the present invention, it is worthwhile to now discuss certain aspects of its operation. In particular, a highly advantageous serial protocol is employed for the bi-directional transfer of serial control-related data on serial gateway 1350. To that end, a system-level device ID is applied to each device within the Storage Element having an associated serial port. In the present example, as will be further described, a two-bit device ID is utilized. While device ID's may be applied in a flexible manner, it may be advantageous to assign a fixed device ID to one or more devices in order to avoid the need for dedicated address pins on an IC which embodies operational section 1306. Alternatively, dedicated pins may be provided for use in setting device addresses. For example, a pair of pins would be provided for each device in order to implement a two bit addressing scheme. The pins are then set to high and low states so as to uniquely identify each device. When control block 1322 receives an address responsive to an incoming command, the control block compares the address specified by the command to the address specified by the pair of pins associated with each device, until the correct device is found. An interaction is then initiated with that device. As another example, device addresses may be specified using register locations in operations definitions section 1380 for use by control block 1322.

During operation, TIC 1300 receives commands from host processing arrangement 302'. These commands are generally in the form of a read command or a write command. Specific examples of commands include data commands, non-data commands and vendor unique commands. One example of a vendor unique command would be a command that reads the internal temperature of the Storage Element—one form of a read command. The TIC then processes each command in accordance with the serial protocol of interface 322. In particular, the TIC applies the device ID to the command. Additionally, information is added including a Mark bit, which initiates the transaction. The Mark bit is followed by the device ID which is then followed by a bit which indicates whether the transaction is a read or a write. Subsequent to these items is a Packet Field, all of which will be further described. The TIC then transfers these commands to the Storage Element. Upon receipt by the Storage Element, control block 1322 recognizes the device ID for use in setting serial router 1320 to appropriately route the command to a selected one of the devices. The serial router, however, does not send the system-level device ID to the selected device, since such an identification would not be recognized by the selected device. Again, it is emphasized that each serial device can be an unaltered part, continuing to be responsive only to its particular customized command set. Not only does the serial router remove the device ID prior to sending a command to a targeted device, but it further cooperates with control block 1322 and operation definitions section 1380 so as to implement the customized command set for each device. From the viewpoint of each device, at least insofar as its serial interface is concerned, it appears to be connected to a standard controller using a dedicated serial port. In accordance with the present invention, however, control of all of the device serial ports is being performed by the TIC. Further details with regard to the way in which the command set of each device is implemented will be provided immediately hereinafter.

Referring to FIG. 22, all data, in the form of commands, traveling on serial gateway 1350 outgoing from TIC 1300 is associated with system-level device ID's, which may be referred to as Device Select in subsequent discussions. The device ID is then recognized by control block 1322 in order to configure serial router 1320. In the instance of a write command, the device ID is provided along with an address field and a data field. These latter two fields include information that is intended for direct receipt by the selected/targeted device. For example, the address field is used by the targeted device to identify a particular internal register, while the data field comprises the data that is to be written into that register. Because a write command may vary from device to device within the Storage Element, in terms of both length of the address field and length of the data field, operation definitions section 1380 serves in a highly advantageous way, by storing the particular address field and data field lengths that are associated with an access (in this case, the write command) for each targetable device. Accordingly, the write command can be customized using operation definitions section 1380, in view of a particular device that is to be written to. Since data travels from the host device to the Storage Element during a write command, upon verifying that the correct data field length has been transferred, control block 1332 may release the serial gateway for another transaction. Until that time, however, the serial gateway is "captured" by the current data interchange transaction, as will be further described with regard to a read transaction. In subsequent discussions, the address field and data field, for any command, may be referred to collectively as the Packet Field while the address and data fields may be referred to individually as Header and Data portions of the Packet Field, respectively. During a write command, the entire Packet Field is sent to the targeted device. For purposes of defining a customized write command, operation definitions section 1380 includes Packet Field Duration and Header Length Registers for each targetable device. It should be appreciated that there may be address information within the Header that is internally used by a targeted device, for example, to identify a register location. In this regard, control block 1322 is under no requirement to identify or even be aware of such address information. The need for such awareness is eliminated by the customized definitions that are present in operations definitions section 1380. Once the control block determines the length of the Header, the control block need only count the number of bits that are specified for transfer. The specific purpose of those bits is irrelevant, insofar as control block 1322 directing the setting of router section 1320 to the targeted device. Similarly, if one device requires a Header having an initial read/write bit, while another, functionally equivalent device is identical in all respects, but for the fact that its Header requires a terminating read/write bit, either device is readily accommodated through the capability to specify different customized command sets for either device.

With regard to the implementation of read commands on serial gateway 1350, the command is issued in the same manner as a write command, including a device ID for the targeted device. Moreover, the address and data fields have lengths that are defined in operation definitions section 1380 to customize the command for a particular device. In a read command, however, serial control-related data traveling from Storage Element 320 to host device 300' (that is, the data that is actually read) does not carry a device ID. The present invention recognizes that all of the serial control-related data traveling in this direction is responsive to read commands that are issued by the host device. A read command, like a write command, captures serial gateway 1350 until that command has been completed. In the case of a read command, the anticipated response of the targeted device is defined within operation definitions section 1380, using Packet Field Duration and Header Length Registers for each selectable device, such that the control block and serial router wait or listen for the response of a specified length from the targeted device before releasing the serial gateway to a subsequent command initiated transaction. During a read command, only the Header portion of the Packet Field is sent to the targeted device. The targeted device then fills in the Data portion, as its response. That is, the response to a read command returns an identical Header portion with the Data portion being the read response.

Figure 24:
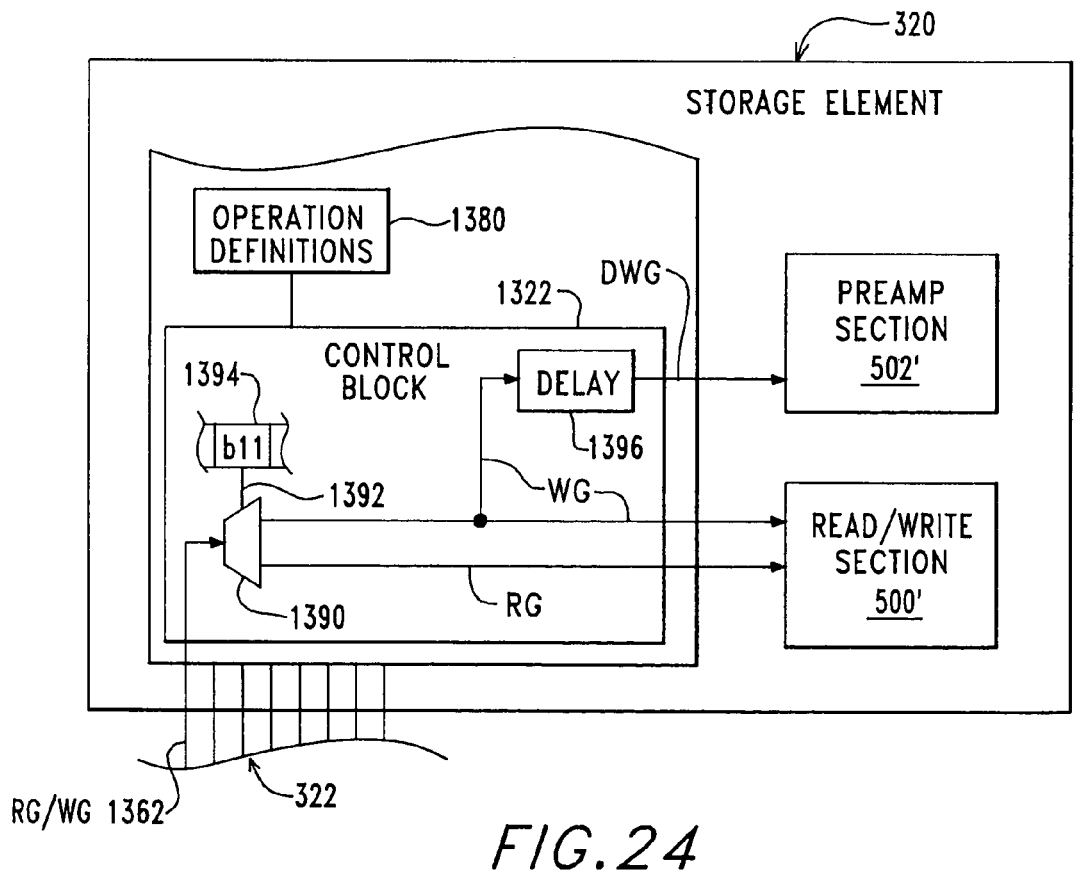
FIG. 24 is a partial block diagram of the Storage Element, shown here in order to illustrate details with respect to a highly advantageous composite RG/WG signal that is implemented as part of the Storage Element to host device in accordance with the present invention.

Referring to FIG. 24 in conjunction with FIGS. 22 and 23a, as mentioned above, one of the signals within control line group 1340 comprises a composite RG/WG signal which is thought to be novel, in and by itself. FIG. 24 illustrates one embodiment for distinguishing within the Storage Element whether Read Gate or Write Gate is being asserted and for routing a discrete signal to R/W section 500', in the instance of RG, and for routing a discrete WG signal to R/W section 500', while the DWG signal is provided to preamp section 502' responsive to assertion of WG by RG/WG line 1362. This function is accomplished by using a 1×2 demultiplexer 1390 having a selection line 1392 which is responsive to bit eleven (b11) of a gate control register 1394 which forms one portion of control block 1322. It is noted that all of the registers within management section 1306 are subject to reads and writes using the addressing protocol described herein, having the device ID set to the fixed device ID of servo section 1308, since these sections are co-integrated. The delayed write gate DWG line is produced using a programmable delay 1396 which may be set to zero (no delay) or to provide a predetermined delay value in relation to WG, based on a specified clock signal, as described in further detail below.

Figure 25:
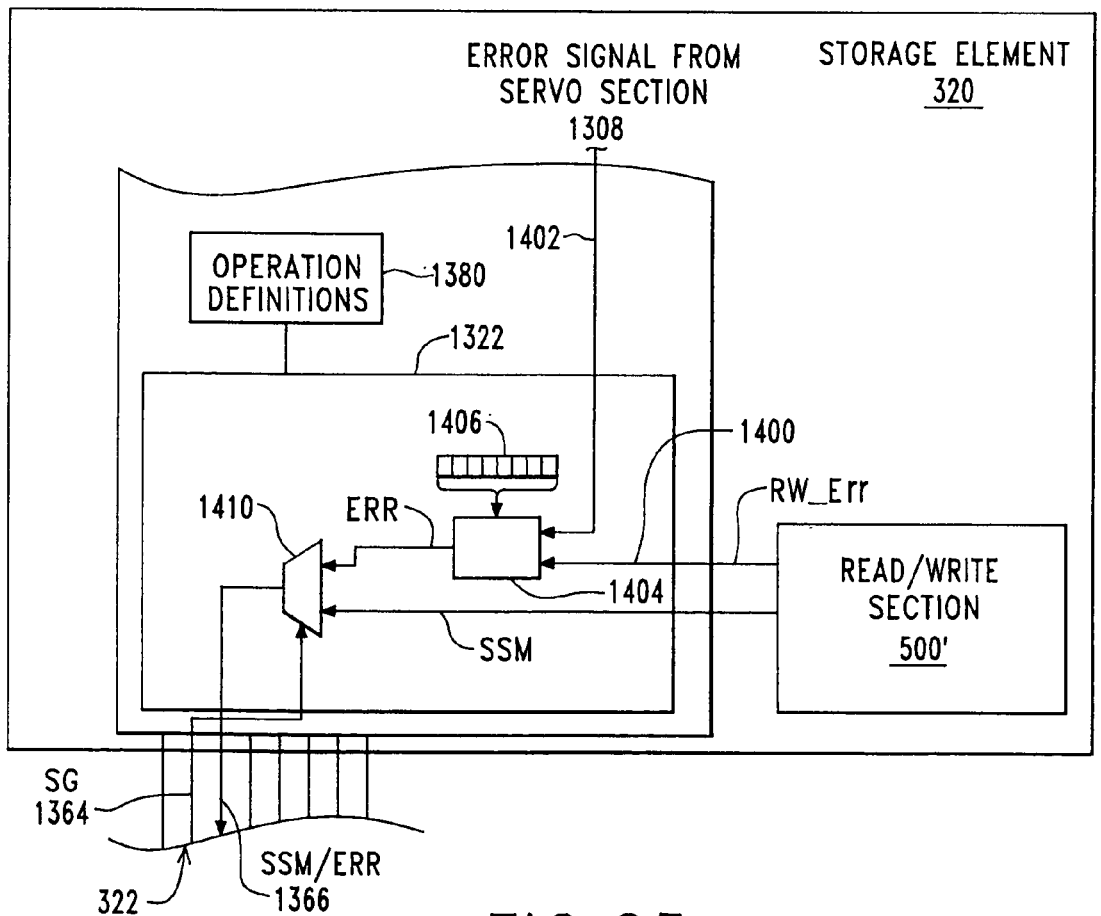
FIG. 25 is a is a partial block diagram of the Storage Element, shown here in order to illustrate details with respect to a highly advantageous composite SSM/ERR signal that is implemented as another part of the Storage Element to host device in accordance with the present invention.

Turning to FIG. 25 in conjunction with FIGS. 22 and 23a, another one of the signals within control line group 1340 comprises a composite SMM/ERR signal 1366, which, like the RG/WG signal, is submitted to be novel, in and by itself. FIG. 25 illustrates one possible embodiment for generating the SMM/ERR signal within control block 1322. Discrete SSM and ERR signals are seen to flow from Read/Write section to operations section 1306, which are used to make up the composite signal. It is submitted that this combination has not been seen in the prior art at least for the reason that these two signals are not necessarily mutually exclusive. That is, while SSM is always asserted responsive to servo data (during assertion of SG), ERR, as implemented by the present invention, can nonetheless occur during SSM. The present invention recognizes, however, that, when ERR does occur during SSM, a certain level of latency is generally acceptable in servicing the ERR signal. This latency provides for the combination of these discrete signals into one composite signal on interface 322. In this way, ERR can be asserted mutually exclusive to SSM as part of the composite signal. As inputs for producing ERR in FIG. 25, Read/Write section 500' provides a RW_ERR signal on a line 1400, while a Servo Error signal is provided from servo section 1308 on a line 1402. In this regard, it is to be understood that many different forms of error signals may be generated, in particular, by the servo section. Accordingly, servo error line 1402 is considered to represent all of these potential signals, whether multiplexed or provided using individual conductors. As examples, servo error signals may include POK (Power OK) false, detection of loss of clock, an excessive shock indication, a preamp fault and thermal asperity detection, as further described below. It is noted that the POK and excessive shock indication errors are particularly representative of situations in which the discrete ERR signal may be asserted during assertion of the discrete SSM signal, since associated events which trigger these errors are completely independent of SSM. Accordingly, the present invention receives all of these various error signals using a logic block 1404 in order to provide a great degree of flexibility with respect to which error signals are relied on as input. To that end, an error control register 1406 is used to enable no less than twelve different error modes of logic block 1404. The output of logic block 1404 comprises the discrete ERR signal which is passed to one input of a 2×1 multiplexer 1410. The other input of multiplexer 1410 is the discrete SSM signal, as produced in a conventional manner by Read/Write section 500'. The servo gate signal, SG 1364, from the host device, or TIC therein, serves as a select enable signal for multiplexer 1410. The output of multiplexer 1410 is the composite SSM/ERR signal 1366 which is fed directly into control line group 1340 of interface 322. When multiple error modes are enabled, a query is generated by TIC 1300 responsive to assertion of ERR. This query generally reads register locations that are associated with the particular error mode which originated the assertion as defined in operations definitions section 1380.

Still considering the treatment of error modes, the present invention provides for treatment of different modes with different latency. As an example, the detection of a thermal asperity is a time sensitive event in order to ascertain the particular location on the media disk at which the thermal asperity was produced. Accordingly, such a signal may be immediately directed, in real time, to associated error correcting logic within TIC 1300.

Figure 26:
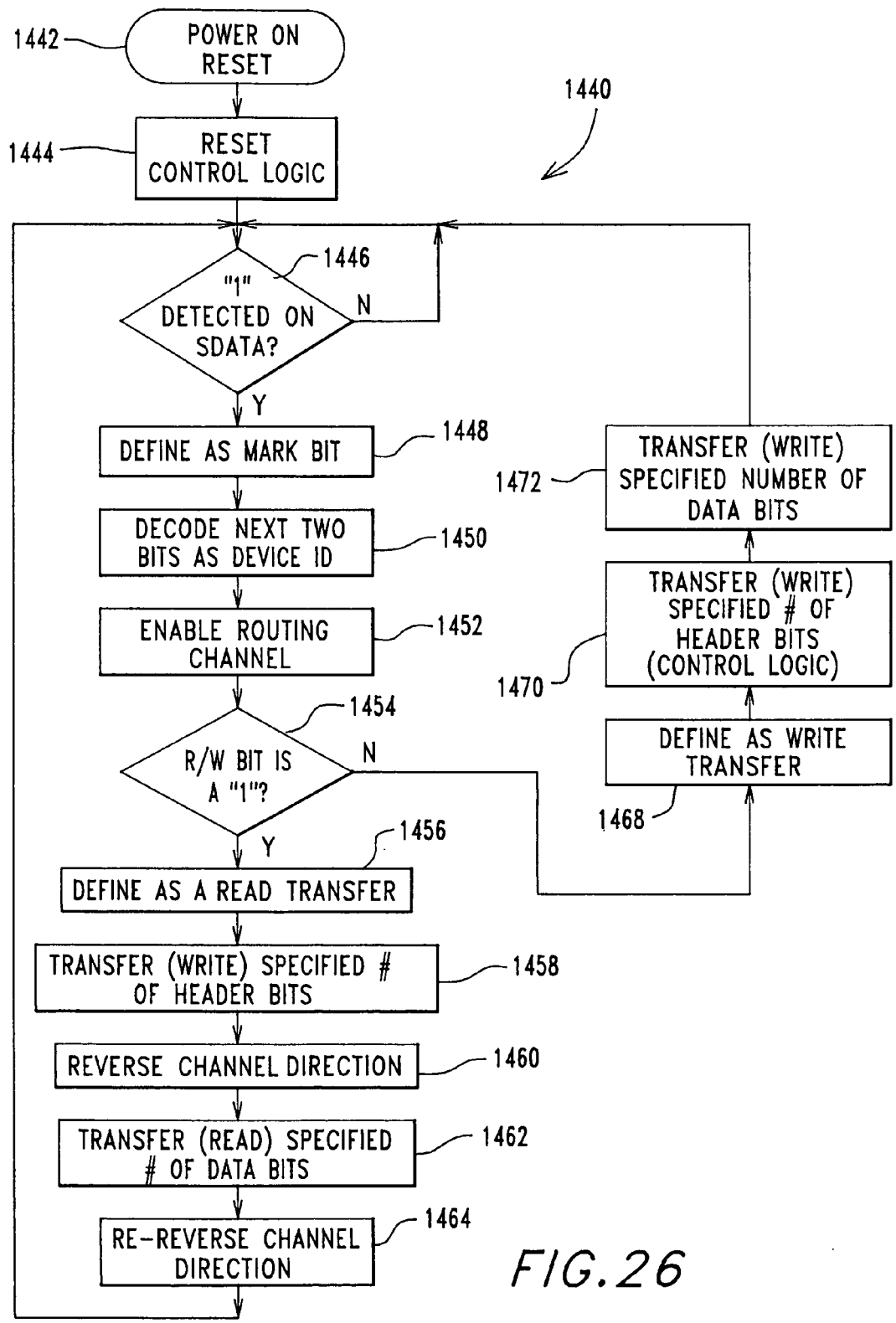
FIG. 26 is a flow diagram, shown here to illustrate details with respect to the highly advantageous serial protocol of the present invention.

Referring to FIG. 26, a flow diagram, generally indicated by the reference number 1440, illustrates the highly advantageous serial protocol of the present invention for purposes of controlling serial router 1320 (FIG. 22) as interfaced to TIC 1300 through Serial Gateway 1350. The method is initiated with a power-on reset at step 1442. Execution then moves to step 1444 which serves to reset control logic that is related to the Serial Gateway. At this point serial router 1320 listens for the aforementioned Mark bit (as a data high or "1" bit) to be asserted by looping through step 1446. Once the Mark bit is detected, operation moves to step 1448 wherein the system defines the detected bit as a Mark bit. Consequently, step 1450 decodes the two bits which immediately follow the Mark bit as device ID bits. Step 1452 then acts on the device ID to set up the serial router via control block 1322 (FIG. 22) to enable a channel or data path for routing data therealong, accompanied by setting drivers along this data path for transferring data from the TIC to a targeted device, consistent with the device ID.

In step 1454, the next bit to be decoded comprises the Read/Write bit wherein a high or "1" data state arbitrarily designates a read command. In this event, execution moves to step 1456 wherein the command is defined as a read transfer. Step 1458 then transfers the number of bits which comprise the Header portion of the Packet Field, consistent with appropriate Packet Field Duration and Header Length Registers for the targeted device. Once the Header bits are transferred, step 1460 reverses the data flow direction of the defined channel by reversing all driver circuitry therein for moving data from the targeted device to TIC 1300. Step 1462 then counts the appropriate number of bits for the Data portion (this number is equal to the Packet Field Duration minus the Header Length Register). Following step 1462, the data flow direction is again reversed, by step 1464, to its original direction from the TIC to the Storage Element in anticipation of the next command. Again, it is emphasized that the specific internal use of the counted bits by the targeted device is immaterial. What is important is that the command length is properly defined in terms of the length of its Header portion and Data portion such that correct numbers of bits are counted in both directions. 229 Returning again to step 1454, if the command is determined to be a write command, the command is defined as such at step 1468. Step 1470 then counts a specified number of bits which corresponds to that number of bits recorded in an appropriate Packet Field Duration register. That is, the Header portion and Data portion are both transferred, as described above. Bit counting is somewhat simplified, compared to a read transaction, since the write transfer flows in one data direction.

Figure 27:
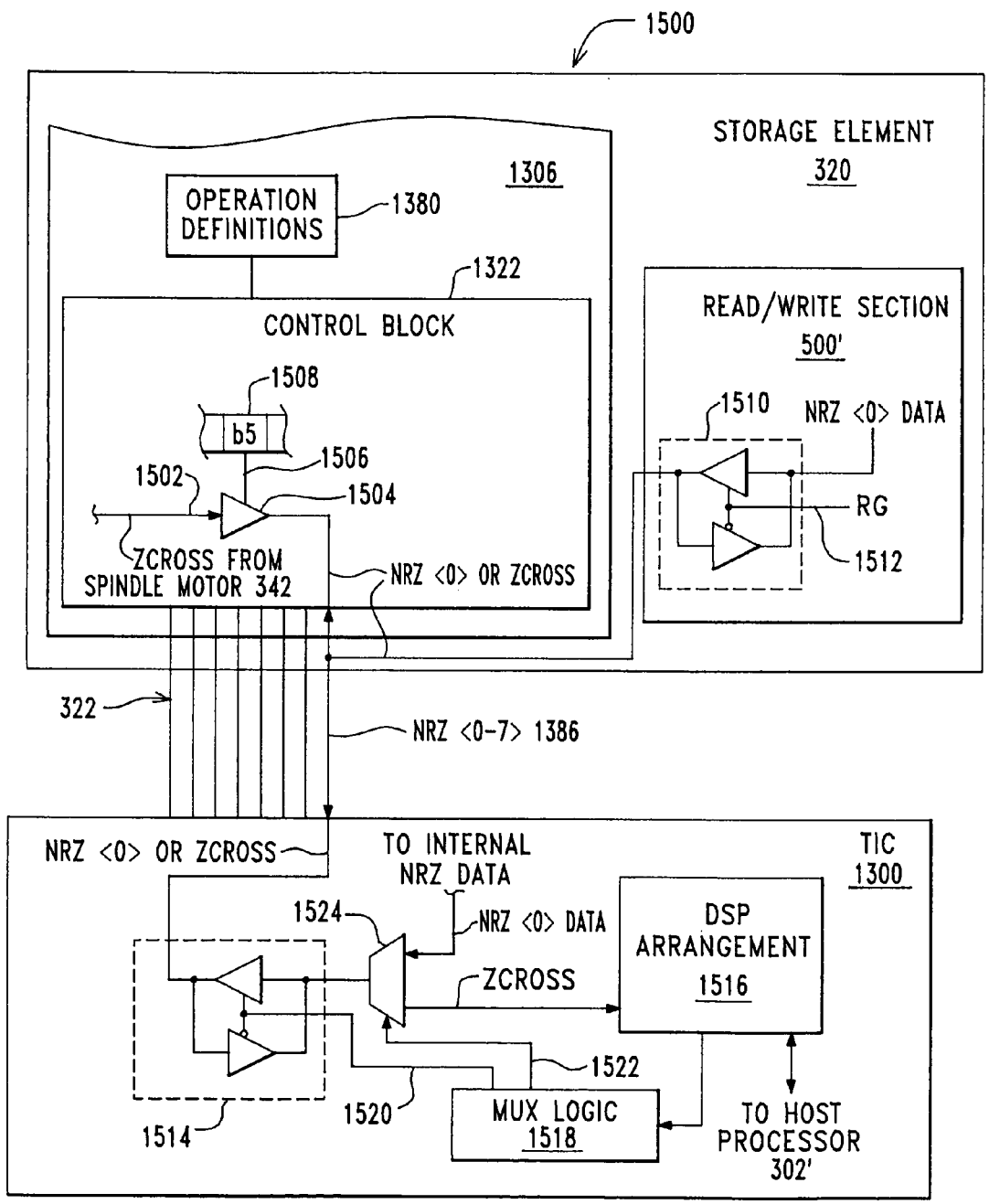
FIG. 27 is a partial block diagram of the Storage Element shown interfaced with a host device illustrating, one embodiment of an arrangement for sharing an NRZ line which forms a portion of the Storage Element to host device interface, specifically, an NRZ <0> line is used to share NRZ <0> data with zero crossing data.

Referring to FIG. 27, one embodiment of the present invention, generally indicated by the reference number 1500, including Storage Element 320 and TIC 1300, interfaced with a host processing arrangement (or a host device, where a TIC is not used), may utilize NRZ lines within interface 322 in a highly advantageous way. Specifically, it is recognized that one or more of NRZ lines 1386 may be used for alternative purposes at times when data transfers are precluded. As an example, such times include a start-up time period of the Storage Element, at least until its media disk is up to speed and the actuator is ready to access the media disk. FIG. 27 illustrates a configuration for using NRZ <0>, during this start-up period for the purpose of transferring a Zero Crossing (Zero-Xing or ZCross) signal that is produced by servo section 1308 (FIG. 22) responsive to spinning of spindle motor 342.

Referring again to FIG. 21, it should be appreciated that the ZCross signal is utilized in the spindle motor control system as follows: Disk drives typically employ brushless spindle motors to minimize particles/contamination (which would be caused by brush designs). Brushless motors require that the driver circuitry (typically implemented in a single IC) switch driving currents through the motor coils in a manner that produces torque in the desired direction of rotation. The current must be switched synchronously with the rotation of the spin motor and, therefore, some form of rotational position sensing must be employed on the spindle motor. One well-known technology consists of BEMF (Back EMF) detection circuitry in the driver circuitry which senses BEMF zero-crossings in an un-driven phase of the motor, producing the ZCross signal responsive thereto. However, the BEMF zero-crossings do not represent an optimum rotational position for switching the motor coil-driving current in terms of providing maximum torque and electrical efficiency. In order to obtain optimum efficiency, current switching must take place at some delayed time from the BEMF zero-crossing detect. The amount of delay depends on how fast the motor is spinning and, thus, during an initial spin-up operation, where the motor speed is constantly increasing, the delay must be changed as the speed increases. Calculation and adjustment of this delay is typically implemented, in a conventional hard drive, as an algorithm in the disk drive controller (item 64 in FIG. 21), and this is why the ZCross signal is generally connected/provided between the Spin/Servo Driver and the controller: it provides the input to the delay calculation algorithm. Another well-known functional use for the ZCross signal resides in sensing the rotational speed of the spindle motor. The speed is directly proportional to the frequency of the ZCross signal. The controller calculates the rotational spin speed and uses the result to calculate the appropriate delay mentioned above. Details of how to calculate the appropriate delay are well known. Once the spin motor has reached the target rotational speed, this speed measurement is also used in well known methods to control the speed to within acceptable tolerance.

Turning again to FIG. 27, system 1500 is exemplary of one embodiment, for using NRZ <0> (as part of interface 322), whereby this data gateway line can be used for other purposes when NRZ data transfer is not required. In particular, the ZCross signal is provided on a line 1502 to a tri-state driver 1504. An enable input 1506 of the tri-state driver is controlled responsive to a register setting. In the present example, bit 5 of a General Purpose I/O register 1508 is used, as will be further described. The output of tri-state driver 1504 is connected to the NRZ <0> line in operations section 1306. In Read/Write section 500', the NRZ <0> line is connected to a tri-state bi-directional driver (or receiver/driver) 1510 which is indicated within a dashed line. An enable input 1512 of bi-directional driver 1510 is connected to the discrete RG signal. In TIC 1300, an opposing end of NRZ <0> is connected to another bi-directional driver 1514. TIC 1300 includes a Digital Signal Processing Arrangement (DSP) 1516, which is programmed to control the Storage Element responsive to Host Processing Arrangement 302' (FIG. 22). DSP 1516, as one of its functions, controls a Multiplexer (MUX) Logic section 1518 which is used to implement control of an enable line 1520 that is connected to bi-directional driver 1514. MUX Logic section 1518 also controls an enable line 1522 of a bi-directional multiplexer 1524. It should be appreciated that the detailed schematic presented here should be considered as a functional, diagrammatic illustration for which there are any number of alternative equivalents that could be realized by one having ordinary skill in the art in view of this overall disclosure. As will be further described, DSP arrangement 1516 is able to selectively connect one of internal NRZ <0> Data and ZCross to the NRZ <0> line. In this regard, NRZ <0> Data is bi-directional while Zcross is unidirectional, originating in servo section 1308 (FIG. 22).

Figure 28:
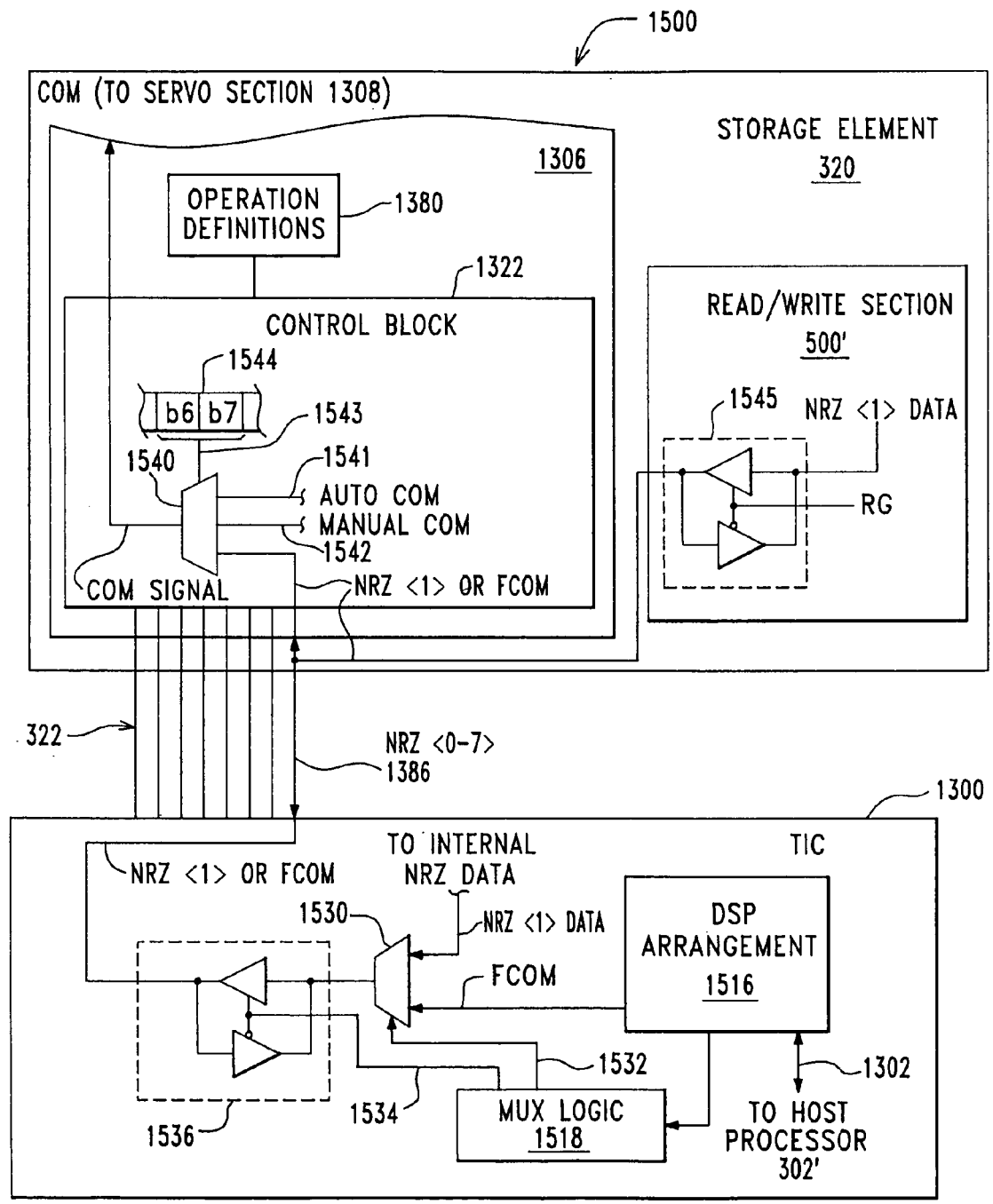
FIG. 28 is another partial block diagram of the Storage Element shown interfaced with a host device illustrating another embodiment of an arrangement for sharing another NRZ line which forms a portion of the Storage Element to host device interface, specifically, an NRZ <1> line is used to share NRZ <1> data with spindle motor commutation data.

Referring to FIG. 28, system 1500 is illustrated with respect to using another NRZ line, within the data gateway of interface 322 for an alternative purpose, at a time when the transfer of NRZ data is not required. In this regard, a commutation signal, that is designated as FCOM, is produced by DSP arrangement 1516 in TIC 1300. The FCOM signal is a unidirectional digital logic signal that travels from the Host side to Spin/Servo section 1308. This signal is typical of well-known spindle motor control systems in disk drives and is utilized to command Spin/Servo section 1308 to switch currents in the spindle motor coils. Each pulse in the FCOM signal (or in alternate implementations, each edge) indicates that the Spin/Servo Driver should switch current to the next valid state. Here, the term "state" refers to a particular combination of currents through the spindle motor coils, as is known in the art. While the present invention can implement transfer of the FCOM signal in a number of ways such as, for example, by using serial gateway 1350 of FIG. 22, one highly advantageous implementation resides in using a selected NRZ line, in this instance NRZ <1>, to transfer FCOM at times when NRZ<1> is not in use; that is, when normal data transfers are invoked which utilize all eight of the NRZ lines in concert.

FCOM is generated, in the present implementation, by DSP arrangement 1516 and is provided to a bi-directional multiplexer 1530. At the same time, multiplexer 1530 receives internal NRZ <1> data. An enable line 1532 of multiplexer 1530 is controlled by the DSP arrangement, for selection of one of NRZ data <1> and FCOM, via MUX Logic section 1518. The latter is also used by the DSP arrangement to control an enable line 1534 of a bi-directional tri-state driver 1536, shown within a dashed line. Accordingly, the NRZ data <1> signal or the FCOM signal can be placed on the NRZ <1> line of Data Gateway 1360. The NRZ <1> line is routed to Read/Write section 500' as well as to Control block 1322, in the Storage Element. In particular, a tri-state multiplexer 1540 receives the NRZ <1>/FCOM line as one of its inputs. In an actual implementation, the FCOM input to multiplexer 1540 comprises a GPIO (General Purpose Input Output) pin on Servo/Control IC 1304, as will be further described. Two remaining inputs are provided to multiplexer 1540 on lines 1541 and 1542 comprising an automatic mode commutation input and a manual mode commutation input. Details with respect to these latter two signals will be provided below. For the moment, it is sufficient to note that the multiplexer is used to select these various commutation signals during a start-up or spin-up procedure. To that end, an enable input 1543 of the tri-state driver is controlled responsive to register bits 6 and 7 of a Spin Configuration register 1544. The output of tri-state multiplexer 1540 comprises a commutation signal (COM SIGNAL) that is connected to circuitry (not shown) in servo section 1308. In Read/Write section 500', NRZ <1> Data is interfaced to the NRZ <1> line using a tri-state bi-directional driver 1545, shown within a dashed line.

Having provided details with regard to specific design configurations for permitting the NRZ <0> line and the NRZ <1> line to carry ZCross and FCOM, respectively, at times when these lines are not in use as part of the overall Data Gateway, specific operational details will now be provided with respect to one highly advantageous manner in which these design configurations are employed, during startup of the Storage Element.

Figure 29:
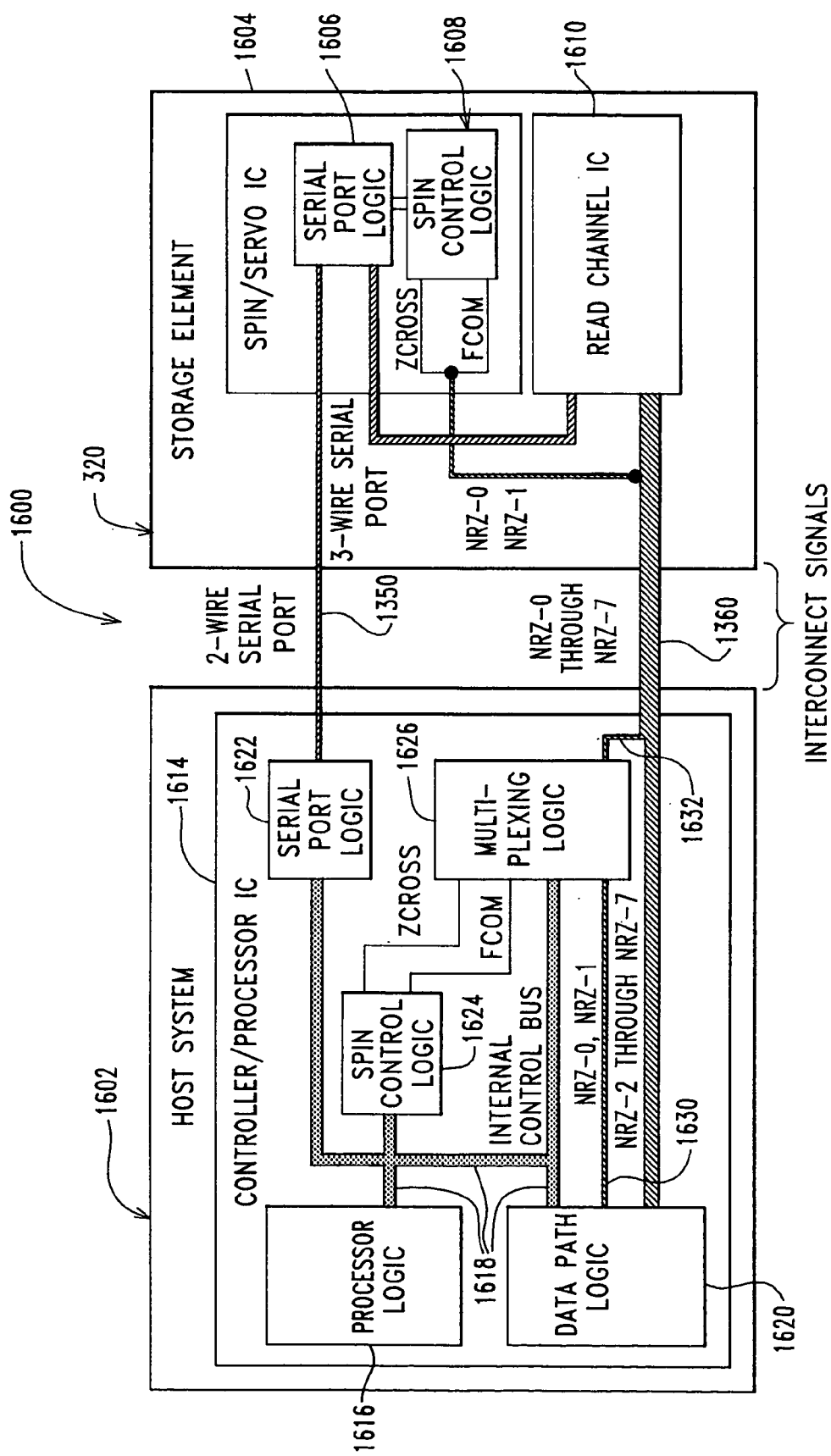
FIG. 29 is a partial functionally partitioned block diagram, illustrating the Storage Element interfaced with a host device for purposes of providing further details with respect to shared use of the NRZ lines, as implemented by the present invention.

Initially referring to FIG. 29, a system 1600 is shown, configured in accordance with the present invention, including a host system 1602 connected with Storage Element 320. The system is shown in the form of a functionally partitioned block diagram, including only those portions of the host system and Storage Element that are pertinent to the present discussion, for purposes of clarity. In the present example, the operational section (item 1306, FIG. 22) and servo section (item 1308, FIG. 22) of the Storage Element are shown co-integrated, in the form of a Spin/Servo IC 1604. The latter includes a Serial Port Logic section 1606 interfaced with a Spin Control Logic section 1608, and a Read Channel IC 1610. Host system 1602 includes a Controller/Processor IC 1614, which comprises an overall processing arrangement for controlling the Storage Element as well as all other host functions; a TIC is not used in this example. Controller/Processor IC 1614 includes Processor Logic 1616, comprising a microprocessor or Digital Signal Processor (DSP) connected to an internal control bus 1618. The latter is, in turn, interfaced to Data Path Logic 1620, Serial Port Logic 1622, Spin Control Logic 1624 and Multiplexing Logic 1626. Discrete ZCross and FCOM signal lines extend between Multiplexing Logic 1626 and Spin Control Logic 1624. Data Path Logic 1620 handles data transfers between the host and Storage Element during read and write operations. Spin Control Logic 1622 assists Processor 1616 with respect to the ZCross and FCOM signals. Multiplexing Logic 1626 is used to control signal routing between the Data Gateway NRZ <0,1> signals and the described internal connections (FIGS. 27 and 28) within the Controller/Processor IC.

Serial Port Logic 1622, within host 1602, cooperates with Serial Port Logic 1606, in the Storage Element, to implement a Serial Port Logic System which utilizes the highly advantageous serial protocol of the present invention, as described herein. Spin Control Logic 1608, within the Storage Element, is used by Processor Logic 1616, through the serial protocol and Serial Port Logic of the present invention, in controlling ZCross and FCOM. It is noted that implementations have been described above with respect to spin control and multiplexing logic, within the Storage Element, associated with each of ZCross and FCOM (see, for example, FIGS. 27 and 28).

Still referring to FIG. 29, as also described with respect to other figures, NRZ <0–7> extend between host system 1602 and Storage Element 320. In this regard, it is emphasized that the NRZ <0,1> lines can alternatively carry the ZCross and FCOM signals, respectively, notwithstanding their nominal NRZ designations within Data Gateway 1360. That is, the shared ZCross and NRZ <0> signals/functions are multiplexed as a single interface signal which retains the name NRZ <0> in the Storage Element design (the choice of naming convention is unimportant). Similarly, the shared FCOM and NRZ <1> signals/functions are multiplexed as a single interface signal which retains the name NRZ <1>. Within Controller/Processor IC 1614, NRZ <2–7> are routed directly to Data Path Logic 1620, as part of the Data Gateway from Storage Element 320. Dedicated NRZ <0,1> lines 1630 are routed, apart from the Data Gateway, from Data Path Logic 1620 to Multiplexing Logic 1626. The NRZ <0>/ZCross line and the NRZ <1>/FCOM line emerge from Multiplexing Logic 1626 on a data path 1632 which then merges with NRZ <2–7> enroute to the Storage Element. In Storage Element 320, it can be observed that the NRZ <0,1> lines are provided to Spin/Servo IC 1604 for purposes of carrying ZCross and FCOM. It is noted that the six other NRZ signals are not shared with any other signals/functions at present, but in accordance with the present invention, they could be shared, for example, to accomplish a further reduction in the number of interface lines present between the Storage Element and Host device (or TIC).

Figure 30:
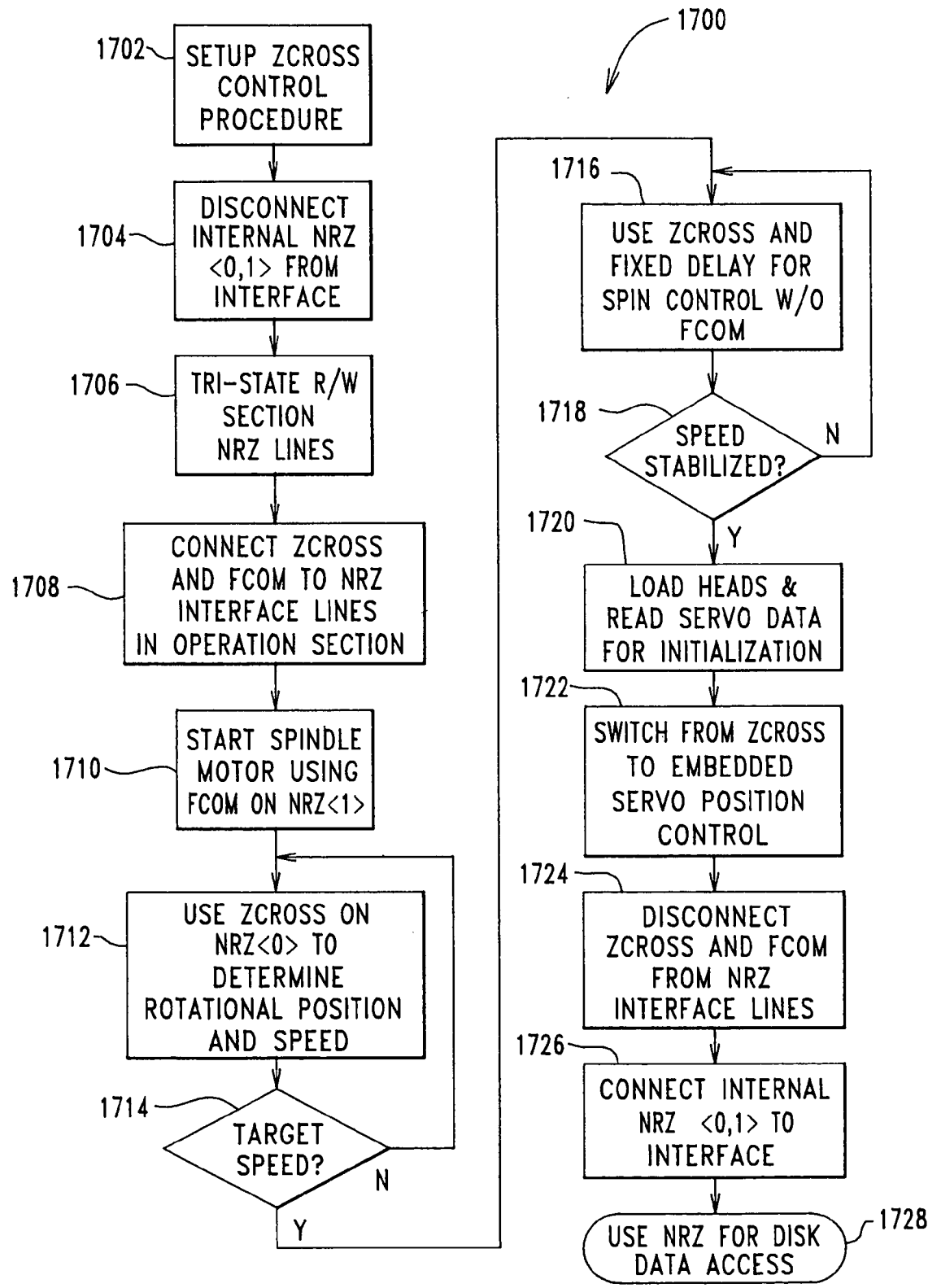
FIG. 30 is a flow diagram illustrating details of one embodiment of a process for sharing NRZ lines in which the NRZ <0> line and the NRZ <1> line are used to transfer zero crossing and commutation data, respectfully, during a start-up procedure.

Referring to FIG. 30, in conjunction with FIG. 29, a flow diagram, generally indicated by the reference number 1700 illustrates a highly advantageous startup procedure which utilizes the dual purpose capabilities of the NRZ <0> and NRZ <1> lines. Beginning at step 1702 Processor Logic 1616 accesses control registers in Spin Control Logic 1624 so that ZCross can be used as an input to certain control algorithms via an interrupt to Processor Logic 161 in a manner that is known in the art. In this regard, it is noted that the ZCross signal is needed in order to begin and complete a spin-up operation (bringing the rotational speed from a starting condition of zero up to a desired/target speed). The rotational position must be sensed in real-time in order to correctly control/switch the current through the brushless spindle motor coils, one alternative resides in the use of older and more expensive technology which employs separate positional sensor devices within the spindle motor.

In step 1704, Processor Logic 1616 accesses control registers in Multiplexing Logic 1626 to disconnect the internal, dedicated NRZ <0> and NRZ <1> signals from the external NRZ <0> and NRZ <1> Data Gateway signals, and to connect the internal ZCROSS and FCOM signals within Controller/Processor IC 1614 to NRZ <0> and NRZ <1>, respectively.

Processor Logic 1616 accesses control registers in Read Channel IC 1610 during step 1706, utilizing Serial Port Logic 1622 and 1606 on the Host and Storage Element sides, respectively, to place all of the Read Channel NRZ lines (NRZ-0 through NRZ-7) in a tri-state mode (no connection to internal Read Channel Circuitry) within Read Channel 1610. It is noted that on some read channels, tri-state may be the default operating condition for these signals when data transfers are not active and, thus, for these particular read channels, no additional access to any control registers in the Read Channel IC is required for this step.

Step 1708 causes Processor Logic 1616 to access control registers in Spin/Servo IC 1604, utilizing the Host side and Storage Element side Serial Port Logic, to connect the ZCross and FCOM signals to NRZ <0> and NRZ <1>, respectively, within the Spin/Servo IC. Further, multiplexer 1540 in FIG. 28, is set to select FCOM using register 1544.

At step 1710, Processor Logic 1610 executes a procedure, that is known in the art, to start the spindle motor spinning utilizing the FCOM signal. In accordance with the present invention, this procedure is implemented by sending FCOM on the NRZ <1> interface line. In an alternative implementation, FCOM can be provided through the Serial Port logic on the Host side and in the Storage Element.

In step 1712, at a point in the procedure initiated by step 1710, Processor Logic 1616 begins to utilize the ZCross signal (which originates in the Spin/Servo IC) for purposes which are known in the art including: (1) Measurement of rotational position of the spindle motor by using pulses or edges on the ZCross signal and providing this as an input to a delay procedure. This delay procedure results in subsequently producing a pulse or edge on the FCOM signal which then is used by the Spin/Servo IC to change the state of the spin current through the various spindle motor coils at optimum times, and (2) measurement of rotational speed by measuring the frequency of the pulses or edges on the ZCROSS signal.

The use of ZCross and FCOM signals in step 1712 is repeated, as described above, until the spin speed measurement indicates the speed has reached a value near to the final/target operating spin speed (for example: 98% of final/target speed) so as to satisfy the test of step 1714.

At this point, step 1716 is entered in which Processor Logic 1616, via a Serial Port Logic operation, enables circuitry internal to the Spin/Servo IC which utilizes the ZCross signal and a constant delay circuit to change the state of the spin current through the various spindle motor coils at optimum times. It should be appreciated that, once the spindle motor has reached target operating speed, there is no longer a need to recalculate or adjust the delay time based on the changing time between BEMF zero cross detections (on the ZCross signal) for switching the current through the motor coils. At the same time, the FCOM signal is no longer used as an input for these state changes by the Spin/Servo IC. That is, these state changes become automatic within the Spin/Servo IC and the FCOM function is no longer required such that control of the spindle motor can be more optimally shifted to a programmable fixed-delay circuit which may be referred to as an automatic mode. Accordingly, register 1544 of FIG. 28 is set to select the automatic commutation signal on line 1541. While the prior art implements this programmable fixed-delay in a conventional control IC such as Controller IC 64 of FIG. 21, the present invention advantageously implements the programmable fixed-delay function in Spin/Servo Driver IC 1604.

In step 1718, the Processor Logic continues using the ZCROSS signal to test spin speed. This measurement provides feedback to a spin speed feedback control system, in a way that is known in the art, to achieve and maintain the final/target operating rotational speed. Once the measured spin speed meets some pre-determined tolerance requirements, operation passes to step 1720.

Step 1720 causes actuator arm 344 to position transducer arrangement 352 over media disk 340 (see FIG. 3). Servo data is then read from the disk and used to initiate and, subsequently, operate the servo position control system.

Once the embedded servo position control system is fully functional, embedded Processor Logic 1616 executes a procedure, in step 1722, which switches the spin speed measurement feedback used to control/maintain the spin speed, from using the ZCROSS signal to using the rotational timing/speed information provided by the embedded servo position control system, which may be referred to as the aforementioned manual commutation mode. In FIG. 28, register 1544 is set so as to select the manual commutation signal on line 1542. Such use of the embedded servo position circuitry is known in the art.

In step 1724, Processor Logic 1616 accesses control registers in Spin/Servo IC 1604, utilizing the Serial Port Logic system, to tri-state the ZCross output, connected to NRZ <0>. Also, Processor 1616 accesses control registers in Multiplexing Logic 1626 to disconnect the internal ZCROSS and FCOM signals, on the Host side, from the external NRZ-0 and NRZ-1 Data Gateway lines.

In Controller/Processor IC 1614, internal NRZ <0> and NRZ <1> signals are connected by step 1726 to the Data Gateway external NRZ <0> and NRZ <1> lines, respectively.

Step 1728 causes Processor Logic 1616 to access control registers in Read Channel IC 1610, utilizing the Serial Port Logic system, to place all of the Read Channel NRZ I/Os (NRZ-0 through NRZ-7) in a normal operating mode for write and read operations. It is noted that, for some read channels, this step may not be necessary if in previous steps no special actions were required to tri-state the read channel's NRZ signals. The system is now ready for normal write or read data access using the NRZ <0> through NRZ <7> signals to transfer data.

The Spin Down Operation is an open-loop operation which does not require either the ZCROSS or FCOM signals, therefore no special manipulation of the control registers for these signals is necessary.

It is noted that the use of NRZ lines, in the described manner, is considered to be highly advantageous by providing the opportunity to transfer ZCross and FCOM in a way that avoids signal delays. Accordingly, commutation signals responsive to ZCross will be more precise. During start-up, this accuracy is particularly important since the time between zero crossings changes rapidly during startup. At the same time, the number of interface lines is held to a minimum. All of this is in view of minimizing the number of interface lines. In and by itself, a reduced number of interface lines and associated electrical connections will enhance reliability.

Attention is again directed to FIG. 22 for purposes of describing a highly advantageous firmware management system that is implemented in accordance with the present invention. To that end, Storage Element 320 of FIG. 22 includes a static memory section 1740. In the present example, a MICROCHIP 24AA64 SEEPROM (Serial Electrically Erasable Programmable Read Only Memory) is used, although it is to be understood that any suitable form of static memory device may be employed. The SEEPROM (or serial ROM) utilizes a 2-wire digital serial connection/communication scheme. Therefore, two signals are required: one signal comprises a serial PROM clock line 1742 and the other signal comprises a serial PROM data line 1744. In an actual implementation, a pair of GPIO pins on Servo/Control IC 1304 are used to implement both signals, although any number of alternative configurations are possible. This pair of GPIO pins is under the control of host device 300' by way of TIC 1300. The GPIO pin that is used to provide serial PROM data line 1744 can be set by TIC 1300 to serve as either a data input, for reading SEEPROM 1740, or a data output, for programming SEEPROM 1740. Essentially, accesses to the SEEPROM proceed by clocking one bit at a time into or out of the SEEPROM in a well known way that is consistent with the SEEPROM device specifications. The SEEPROM is typically programmed at the time of manufacture of Storage Element 320 using a test fixture TIC. Subsequently, during end use of the Storage Element, the SEEPROM is typically only read by host device 300' using TIC 1300. It is to be understood that one of ordinary skill in the art may implement an unlimited number of alternative arrangements for accessing static memory section 1740, for example, based on a particular type of static memory device that is used and in view of this overall disclosure. For this reason, all of these alternative arrangements are considered to fall within the scope of the invention, notwithstanding the specific implementation that is described herein.

Control of SEEPROM 1740 is implemented using the highly advantageous serial protocol and Serial Gateway 1350 of the present invention so as to form an overall bi-directional serial interface between TIC 1300 and SEEPROM 1740 via Control Block 1322. Accordingly, TIC 1300 is able to set serial PROM data line 1744 to a high or low state in an output mode and to read the serial PROM data line state in an input mode. As one alternative, it should be appreciated that TIC 1300 can access such a SEEPROM by using a device ID that is assigned to the SEEPROM such that the serial data relating to the SEEPROM is routed through serial router 1320.

As discussed above, the prior art is considered to be devoid of a practical approach with respect to flexible firmware development in new product lines. Certainly, the Storage Element of the present invention represents such a new product line. Furthermore, the Storage Element of the present invention, along with the way in which end user systems or host devices are implemented using it, brings rise to further considerations with respect to firmware. In particular, it is important to understand that the control functions, which implement native code control of the Storage Element, are not operating in the Storage Element, but rather, in the host device (irrespective of whether a TIC is used). Thus, firmware for control of the Storage Element is needed within the host device. In essence, a system implemented using the Storage Element of the present invention represents a merging of two major components: the Storage Element and a host device. Each of these major components is likely to be produced by a different entity. Since the Storage Element is currently a first generation product, the firmware that is provided within the host device is necessarily first generation firmware that has had no opportunity to undergo the typical generation-to-generation improvements that are available in later generation products, stemming from a particular product line, as discussed above. Given these circumstances, it would not be unreasonable to expect a significant evolution in generation-to-generation Storage Element firmware. Moreover, in the absence of specific provisions, the core firmware present in one generation of Storage Element may be incompatible with the core firmware of another generation, to an extent that a host having first generation firmware, with a later generation Storage Element installed therein may be unable to read magnetically stored data (including, perhaps, second generation firmware) from the Storage Element. As will be seen, the present invention is considered to have resolved these problems using a highly advantageous firmware management system that is unlike anything available heretofore.

Referring to FIG. 22, TIC 1300 includes a memory arrangement 1750 having a ROM firmware section 1751 and a RAM section 1752. The former includes firmware for operating Storage Element 320 using the native code of the Storage Element. As a point of reference, previously described FIG. 2 illustrates code within memory arrangement 304, partitioned into device code 306 and native code 308. Since a TIC is not used in the embodiment of FIG. 2, Storage Element native code 308 is executed directly by the host processing arrangement.

Figure 31:
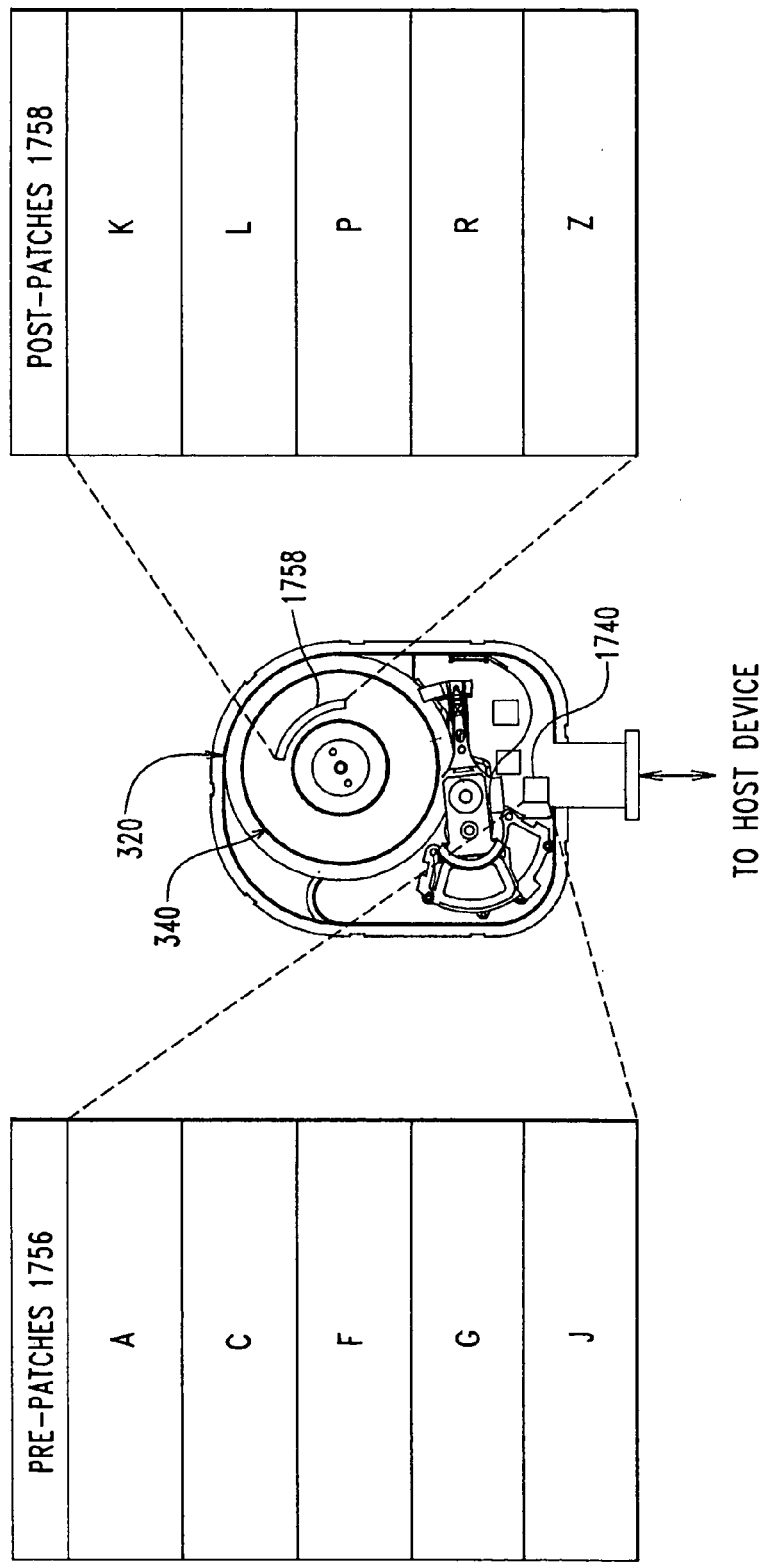
FIG. 31 is a diagrammatic illustration showing the Storage Element in relation to locations from which Patch data is provided having Pre-Patch data stored in a non-volatile electronic memory while Post-Patch data is stored on-disk in accordance with the highly advantageous firmware management system of the present invention.

Turning to FIG. 31 in conjunction with FIG. 22, Storage Element 320 is illustrated in relation to the highly advantageous way in which firmware updates are provided, ultimately for use by the host device. Specifically, one set of updates is indicated as a group of Pre-Patches 1756 that is made up of individual Pre-Patches A, C, F, G and J. Pre-Patches 1756 are preprogrammed in serial ROM 1740. At the same time, another set of updates is indicated as a group of Post-Patches 1758 that is made up of individual Post-Patches K, L, P, R and Z. Post-Patches are stored on disk 340 of the Storage Element at the time of manufacture. The significance of these nominal designations will become apparent with continuing descriptions. For the moment, it is sufficient to understand that either type of patch is intended to replace a segment of original code which forms a portion of the firmware that is incorporated in the host device. The Patches may be referred to collectively as an update set of firmware. Moreover, this firmware system is highly flexible in providing for implementation of new functions and features which could be characterized as entirely new code segments. Still further aspects of this flexibility will be brought to light below.

In order to use a Post-Patch, it must be read from disk 340 by the Storage Element. Pre-Patches, in contrast, are electronically stored and do not require disk access. That is, Pre-Patches are read directly from serial ROM 1740 using the aforedescribed Serial Gateway, without a need for disk access. In this regard, it is important to understand that an initialization procedure is performed by the host device with the Storage Element in order to provide for disk access. Until a specific point, which may be considered as a "disk-access" boundary, is reached within the initialization procedure, the host device is completely unable to read from disk 340. It is therefore recognized that any firmware that is stored on disk 340 cannot be implemented prior to availability of disk data; i.e., prior to the initialization procedure reaching the disk access boundary. As an example, a problem in the initial spin-up procedure of the Storage Element would require a Pre-Patch to correct, since failure of the spin-up means that nothing, not even Post-Patch(es) can be read from the disk. Therefore, only a Pre-Patch can be used to correct this problem. Conversely, a problem in the power-down sequencing (powering down various ICs in the Storage Element) can be solved by a Post-Patch, because the power-down sequencing only happens after some kind of operation in the Storage Element which by default will load/activate the Post-Patch.

While the prior art has provided on-disk firmware, it is considered that the objectives of the prior art were to access the disk as soon as possible and to store as much firmware as possible on the disk, rather than to implement a flexible firmware management system. Unfortunately, storing as much firmware as possible on the disk results in the need for a relative large amount of not inexpensive RAM storage in the host device. The present invention avoids this need for additional RAM by patching only those portions of original ROM firmware which must be changed; there is no need to store firmware that is not to be replaced/modified on the disk. It is important to understand that some initial firmware (pre-disk-access boundary) is necessary in order just to reach the disk access boundary. The firmware management system of the present invention presents a new paradigm, in this regard, by providing a highly advantageous Pre-Patch and Post-Patch capability whereby firmware needed to reach the disk access boundary can be updated, as well as post-disk-access firmware. Hence, the nomenclature "Pre-Patch" and "Post-Patch" (generically referred to as "Patch" or "Patches") has been applied with regard to firmware updates that are directed to opposite sides of the disk-access boundary.

Figure 32:
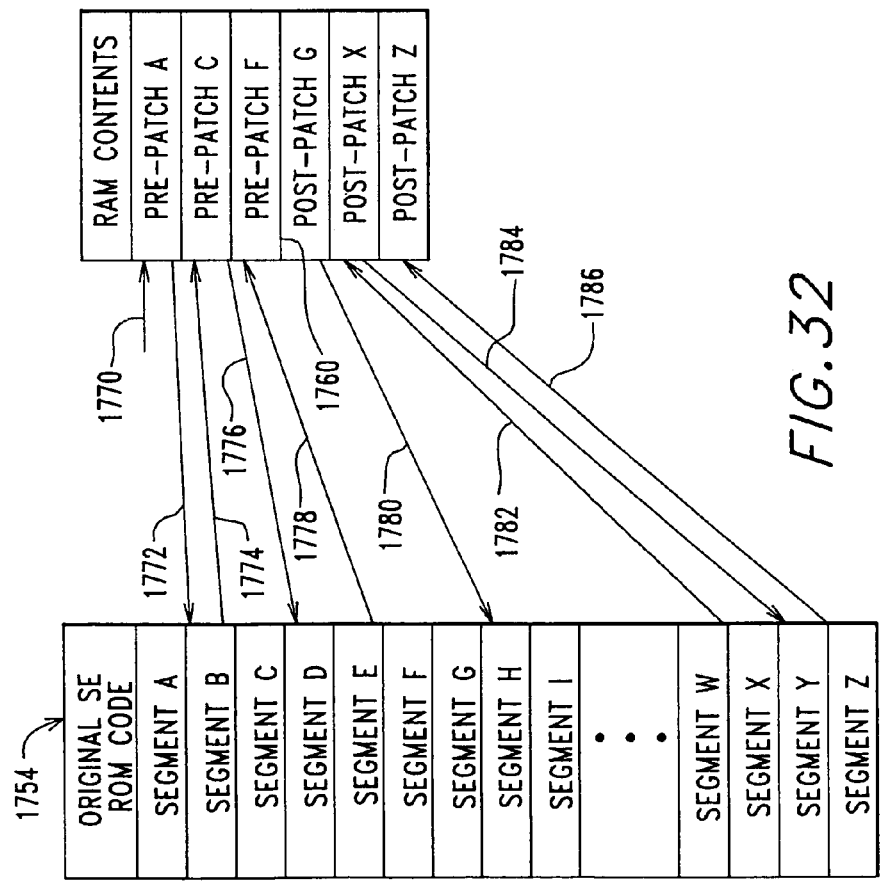
FIG. 32 is a diagrammatic illustration of the highly advantageous firmware structure of the present invention showing one method in which Patches are used in concert with original firmware that is provided with the host device.

Referring to FIGS. 22 and 32, attention is now directed to other aspects of the highly advantageous operation of the firmware management system of the present invention. In particular, FIG. 32 illustrates one implementation of this system within memory arrangement 304'. This data structure is formed using the original firmware code that is provided with the host device, along with the Pre-Patches and Post-Patches also shown in FIG. 31. For purposes of simplicity of discussion, it will be assumed that a set of original firmware code 1754 for the Storage Element is stored contiguously and is designated as code segments A–Z (selected ones of which are shown). Further, RAM memory section 1752, at least in part, is loaded with a Pre-Patch and Post-Patch structure 1756. It is noted that the code segment designations used in FIG. 32 correspond one-for-one with the Patch designations in both of FIGS. 31 and 32. Pre-Patches correspond to segments A, C and F, while Post-Patches correspond to segments G, X and Z. In the present example, the aforedescribed disk access boundary is indicated by the reference number 1760 and seen to be between Pre-Patch F and Post-Patch G. It is to be understood that the code structure that is presented is provided with the intention of facilitating the reader's understanding and is in no way intended as being limiting. Specific details with respect to how this code structure is formed will be provided at an appropriate point below.

Table 1 comprises another element of the firmware management system of the present invention which is referred to as a "Jump Table". This table is used along with the data structure of FIG. 31 to comprise the operational firmware of the Storage Element. Prior to executing any code segment, the host device or TIC queries the Jump Table. Table 1 includes three columns which designate, in turn, each code segment, a jump location which specifies whether the code segment to be used is found in ROM firmware 1751 (original firmware) or in RAM section 1752 (a Pre-Patch or Post-Patch), and a Jump Reference Number which is not part of the firmware, but is provided for purposes of directing the reader to arrows in FIG. 32 which are visual representations of each jump.

TABLE 1

(JUMP TABLE FOR FIG. 32)

| CODE SEGMENT | JUMP TO LOCATION | JUMP REFERENCE NO. |
| --- | --- | --- |
| A | RAM | 1770 |
| B | ROM | 1772 |
| C | RAM | 1774 |
| D | ROM | 1776 |
| E | ROM | * |
| F | RAM | 1778 |
| G | RAM | * |
| H | ROM | 1780 |
| I | ROM | * |
| J–V | ROM | * |
| W | ROM | * |
| X | RAM | 1782 |
| Y | ROM | 1784 |
| Z | RAM | 1786 |

(*) INDICATES CONTIGUOUS SEGMENTS IN EITHER ROM OR RAM

Execution of the overall data structure begins by determining if there is a Patch corresponding to code segment A. For code segment A, the Jump Table is indicated as being in RAM 1752 such that Pre-Patch A is to be executed, as indicated by a jump arrow 1770. Upon completion of Pre-Patch A, the Jump Table indicates that code segment B is in ROM memory 1751. Responsive thereto, a jump 1772 is performed such that code segment B is executed from original Storage Element (SE) firmware. With completion of segment B, the Jump Table requires a jump 1774 back to RAM for execution of Pre-Patch C. For segment D, execution moves back to ROM in a jump 1776. The Jump Table then indicates that segment E is in ROM and is, therefore, contiguous with ROM code segment C so that no jump is required (indicated using an asterisk (*) in the Jump Table) and execution of segment E continues in ROM. Segment F, however, is indicated as being in RAM, necessitating a jump 1778. Execution continues in this manner, and will not be described in detail for purposes of brevity, to the completion of code segment Z responsive to Jump 1786. It is of interest to note that the disk access boundary is essentially transparent within this operation, since all of the Patches have previously been loaded into RAM memory 1752. With completion of this procedure, the system is ready to complete any additional initialization tasks and then enter normal read and write operations. It is of further interest that Patches may be of any required length, either shorter or longer than the original code segment which they replace. Of course, Pre-Patch length may be limited by the capacity of serial ROM 1740 while Post-Patch length is unlimited from a practical standpoint due to the relatively large capacity of media disk 340.

With respect to dividing original firmware code into segments, there are a number of different guidelines which may be used. As one guideline, the code may be divided in accordance with its function such that different code segments will vary in length.

Referring again to Table 1, while these various segments may be partitioned, for patching purposes, on a functional basis, it is to be understood that this is not a requirement. As an example, a patch may replace only a small portion of an overall code segment that performs a particular function. The Jump Table, in this regard, may be formed so as to jump from or to any addressable location within a functional segment. In this way, even one line of original code can be replaced. This replaced code segment, as part of and for purposes of the Jump Table, is indistinguishable from any other code segment in the Jump Table. This feature is highly advantageous with respect to preserving the availability of RAM memory in the TIC by replacing a minimal portion of ROM firmware.

Figure 33:
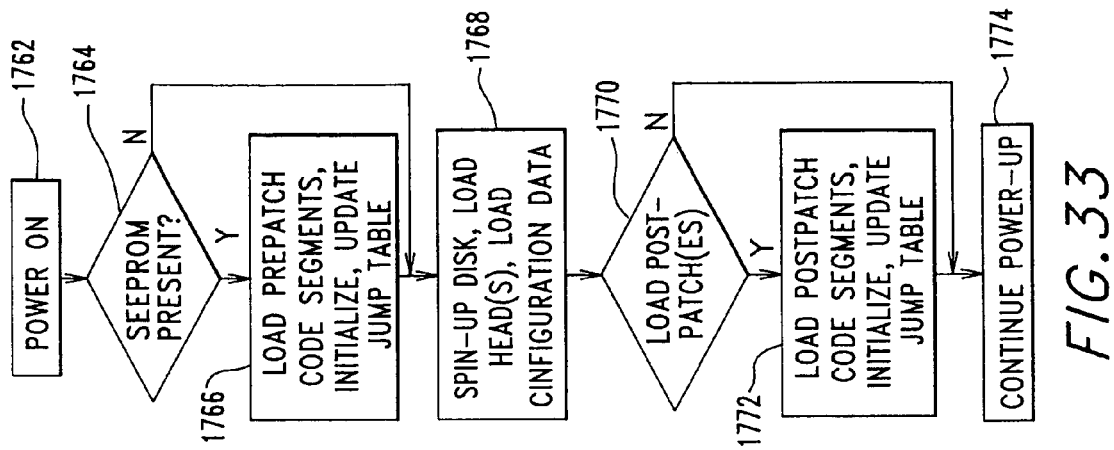
FIG. 33 is a flow diagram which illustrates one embodiment of a process for implementing the highly advantageous RAM Patch structure that is shown in FIG. 32.

Having described in detail the highly advantageous way in which the firmware management system of the present invention operates in accordance with the data structure shown in FIG. 32, attention is now directed to one automated way in which this data structure can be formed in RAM memory 1752, with reference to FIG. 33. The latter is a Patch Load flow diagram that is generally indicated by the reference number 1760. The system is powered on at step 1762. At step 1762, a two-prong test is performed to determine whether serial ROM 1740 is present and, if so, whether there are Pre-Patches stored therein. In this regard, it should be appreciated that there may be startup procedure steps intervening between power on step 1762 and step 1764, however, these intervening steps are not pertinent with respect to the current discussion. If it appears that the serial ROM is not present, step 1764 may attempt any desired number of retries. As an example, ten retries may be attempted. In the event that the serial ROM is present and contains Pre-Patch data, execution moves to step 1766. There are any number of alternative ways in which the Pre-Patch data may be stored in the serial ROM, however, in one implementation, all of the Pre-Patch data may be stored contiguously within the serial ROM. The actual Pre-Patch data may be preceded by a format data indication that indicates the length of the Pre-Patch data which follows. The length of the format data indication will depend, of course, upon the size of the serial ROM or other such non-volatile electronic storage device that is used. In the present example, 32 bits are used for a 64 KB serial ROM. Moreover, each Pre-Patch includes a header which identifies its location within the overall firmware structure. In the present example, the segment code identification serves as header information. As a further enhancement, a checksum or other such expedient, may be stored with the Pre-Patch data. Based on actual reading of the Pre-Patch data, a running checksum may be calculated for comparison with the stored checksum, in order to confirm validity of the Pre-Patch data. If the two checksums disagree, the process may return to step 1764 a predetermined number of times. If the Pre-Patch data is ultimately determined to be invalid, step 1766 will be skipped.

Still describing step 1766, certain portions of the Pre-Patch data, for example, the last Pre-Patch may be directed to initialization of the overall Pre-Patch structure that is being implemented. In this regard, certain housekeeping functions may be required such as, for example, updating the Jump Table and initializing firmware related RAM locations. It is noted that the initial Jump Table is created, by ROM firmware 1751, in RAM 1752 according to the unmodified structure of the original ROM firmware. In the event that the serial ROM is not present or there are no Pre-Patches therein, step 1764 causes step 1766 to be skipped, moving directly to step 1768. This automatic detection method allows the Storage Element to be constructed with no SEEPROM if no Pre-Patch is detected, with no change to existing circuitry or firmware, thereby representing a cost savings. Similarly, if at some particular time in the life cycle of the Storage Element Product, no Pre-Patch is required, but there is reason to expect that a Pre-Patch may be required in the near future (based, for example, on testing results not yet completed), the SEEPROM can be included, but not programmed. This arrangement advantageously allows production to continue while still facilitating very rapid deployment/implementation of a Pre-Patch, should it be found necessary. Accordingly, invaluable flexibility is provided during the early portion of the Storage Element or similar such product life cycle.

In step 1768, disk 340 spins up and any required configuration data is loaded.

A determination is made, in step 1770 as to the presence of any Post-Patches on disk 340. If so, the Post-Patches are loaded into RAM 1752 responsive to step 1772, the Post-Patches are then initialized and the Jump Table is, once again, updated. In the instance where there are no Post-Patches, step 1770 causes step 1772 to be skipped. At this point, the firmware structure described with regard to FIG. 32 has been realized and, at step 1774, any remaining power-on procedures may be completed prior to entering normal system operation.

The Patch loading procedure of FIG. 33 can be triggered, following power-on, responsive to the first command by the host to the TIC which requires data access to/from disk 340, such as, for example, a read command, a write command or an Identify Device (ID) command. It is noted that the ID command requires disk access in order to read various information such as the Storage Element Serial Number, which is stored on disk 340.

It is noted that the firmware management system of the present invention is considered as highly advantageous since the Pre-Patch can be provided with the Storage Element. Accordingly, where an entity manufactures the Storage Element, that entity can create and revise the Pre-Patch. Therefore, the Pre-Patch and subsequent revisions need not be sent/communicated to multiple other companies that incorporate the Storage Element as a component. In this way, complete control exists in terms of which Pre-Patch revision is used with which Post-Patch revision, since all can be co-located on each Storage Element. The Pre-Patch data is written into the SEEPROM in the manufacturing process by connecting each Storage Element to a TIC device which is connected to a testing system. The testing system software can communicate the Pre-Patch data to the TIC, which then writes it to the SEEPROM.

Referring again to FIG. 22, an alternative form of Pre-Patch may be utilized wherein the Pre-Patch is provided in a host ROM section 1780 of the host device. This host ROM comprises the ROM firmware for controlling the overall host device. In this implementation, the host can send/load the Pre-Patch to TIC RAM 1752, for example, using a defined vendor unique command that is initially issued to the TIC. This should be done prior to any attempted access to the Post-Patch reserve area of disk 340.

Still referring to FIG. 22, as another part of the highly advantageous firmware management system of the present invention, each Patch is created relative to a specific version of TIC ROM 1751. A Patch that is intended for a given ROM will not work with other ROM revisions. Additionally, if a Patch is loaded and initialized with an incorrect ROM version, it could corrupt the firmware and cause the Storage Element to become non-functional. To allow a Storage Element to function with multiple TIC revisions, a highly advantageous methodology is used to prevent incompatible Patches from being loaded and executed. First, at the time of manufacture, Patches for different ROM versions are stored on the Storage Element at different locations on the disk, thereby allowing one Storage Element to function with multiple TIC ROM revisions. Second, the header of a Patch is versioned so that when the Patch header is read by the firmware, the loading and/or initialization of the Patch can be aborted, if the version does not match the currently executing ROM release. This versioning prevents Patches from incompatible ROM versions from being executed and avoids the need for an installer of the Storage Element to have to modify Pre-Patch firmware responsive to transitioning from one TIC revision to another. Furthermore, Pre- and Post-patches may not necessarily be compatible with each other. Therefore, an additional version check is done between Pre- and Post-Patches when a Post-Patch is loaded. A compatibility version is placed in the Post-Patch that indicates its compatibility with Pre-Patches. If the compatibility level of the Post-Patch does not match that of the Pre-Patch, then the Post-Patch loading and/or initialization is aborted.

Using the specification to this point and FIGS. 1–33, it is considered that one of ordinary skill in the art may readily practice the present invention in view of the teachings therein. For further explanatory purposes, however, the device arrangement and method disclosed thus far will be described in more detail in conjunction with FIGS. 34–45. It is noted, in the context of the discussion which follows, that an integrated circuit which is equivalent to Servo/Control IC 1304 may be referred to using the term "Nova" or "Nova 330", while TIC 1300 may be referred to as a "Transition IC".

The Convergent Systems Solutions (CSS) Transition IC (TIC) is a companion ASIC to the CSS Storage Element (SE). When combined together, they form a uniquely high-capacity and low-cost storage system for a wide variety of electronic applications including compact, low power, and mobile applications. The TIC is a datapath/controller IC designed to simplify integration and control of the SE. The TIC is designed to reside on the customer PCBA. Host systems communicate with the TIC through an interface that is similar to a CompactFlash True IDE Mode interface. The TIC controls the Storage Element via a 20-conductor interface. The TIC combined with the SE perform all of the functions required to store and retrieve data over a "CompactFlash True IDE Mode"-like interface. The TIC functions are designed to be integrated into other logic devices contained on the host PCB. This integration is intended as a next-generation cost reduction step and is not intended for the initial application of the TIC/SE.

Features

Host transfer rates up to PIO Mode 4 (16.7 MB/s) and UDMA Mode 4 (66.7 MB/s) are supported.

16 KB buffer with read look-ahead and write buffering (normally disabled) for streaming applications.

Low-power and power-down modes for battery-powered applications.

Logical Block Addressing (LBA) mode is supported.

Automatic error detection and correction with four-way interleave Reed-Solomon ECC code capable of correcting up to 5 bytes per interleave or twenty bytes per block.

Single +3.3 Volt supply required.

144-ball Microstar BGA[1] package.

"CompactFlash True IDE Mode"-like interface for simplified customer integration.

[1] Microstar BGA is a registered trademark of Texas Instruments

Functional Overview

The CSS Transition IC (TIC) is a datapath/controller IC designed specifically for use with the CSS Storage Element (SE). The TIC combined with the SE contains all of the elements necessary for a complete data storage device. The TIC interfaces to system electronics through an interface that is similar to a CompactFlash True IDE Mode interface and to the SE through a 20 pin proprietary data and control interface. To facilitate integration into systems the TIC has been designed so that the pin ordering of both interfaces can be reversed. The TIC contains a high performance DSP, "CompactFlash True IDE Mode"-like interface, Buffer Manager, Formatter/Sequencer, Error Correction Code and Detection circuitry, Servo Logic, and the serial port circuitry. Core logic operates at 1.8V and is supplied by on-chip regulators from the 3.3V supply.

Figure 34:
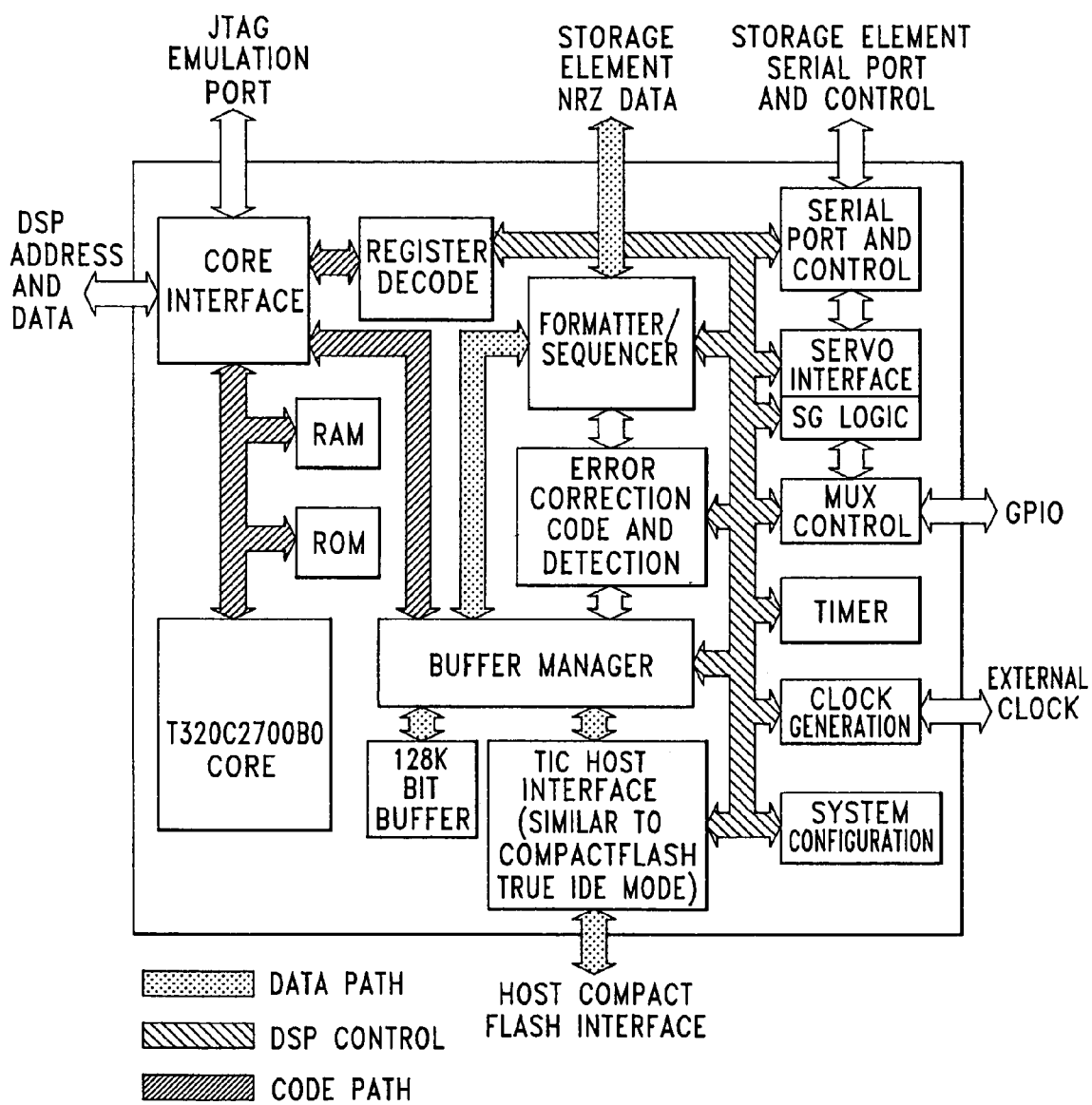
FIG. 34 is a block diagram of one embodiment of the Transition IC of the present invention, shown here to illustrate details with respect to its structure.

Attention is now directed to a description of FIG. 34 which is a functional block diagram of the TIC. A T320C2700B0 core is included having a 16-bit fixed point digital signal processor (DSP) optimized for mass storage mechanical and interface control applications. This device controls the functions of all the internal blocks of the TIC and the Storage Element. Code for the DSP is stored in the internal mask programmable ROM. This device draws from the best features of digital signal processing, reduced instruction set computing (RISC), micro-controller architectures, firmware and tool sets. The DSP features 66K words of internal fast static random-access memory (SRAM), 48K words of read-only memory (ROM), single-cycle instruction execution and fast 32 bit read access to buffer memory.

The TIC interfaces to host electronics through an interface that is similar to a CompactFlash True IDE Mode interface (referred to as the TIC Host interface throughout this document). The TIC Host interface is the communication and data transfer connection between the host and the SE. The interface is configurable and supports programmed input/output (PIO) and Ultra DMA transfers.

A Buffer Manager is the central control and interface between buffer memory RAM embedded in the TIC and the other blocks in the TIC that access the RAM. The Buffer Manager performs all accesses to buffer memory and generates appropriate data, address, and control signal timing. It handles buffer memory access requests from the Formatter/Sequencer, the DSP core, the ECC logic, and the TIC Host interface.

A Formatter/Sequencer controls and performs the reading and writing of data between the TIC internal Buffer Manager and the Storage Element. This block prepares the user data for delivery to the Storage Element during write. The block also receives the data from the storage element during read-back and extracts the user data. It interfaces with the read channel, Servo Logic, ECC, DSP and Buffer. The block coordinates operation between the blocks during the different modes of operation.

An ECC Logic block is designed to ensure user data saved in the Storage Element is accurately delivered to the host during read-back. During a write operation, the circuitry generates ECC information for storage with the user data in the SE. During read back, the ECC information is used to check the data for any errors and if errors are detected, a correction is applied. The ECC is a four-way interleave Reed-Solomon ECC code capable of correcting up to 5 bytes per interleave or twenty bytes per block.

A Servo Logic block in combination with code running in the DSP controls the mechanical aspects of the Storage Element including: spin, head load/unload, head positioning, and seeking. The Servo Logic contains timing measurement functions for spin control and servo synchronization, error detection logic to quickly identify and process servo related errors, and sequencer logic to provide precisely timed control signals to the SE.

The Serial Port or Gateway provides command and control to the Storage Element (SE). The serial port provides communication with the read channel, preamplifier, and servo device within the SE. The control lines RG/WG (Read Gate/Write Gate), SG (Servo Gate) and SSM/ERR (Servo Sync Mark/Error) control the operational mode of the SE.

With reference to FIG. 35, the Transition IC is designed for ease of integration into the host system. Several configuration options provide flexibility in adapting the TIC to the host electronics. The primary required connections to the host are the TIC Host interface to Host CompactFlash Interface, external clock, system reset, 3.3V power and ground. To obtain the lowest possible power dissipation when the SE is not in use, the optional power down control line (TIC_OFF) should be utilized. The Host system can monitor the SE state by checking the optional PG (Power Good) pin. The TIC connects to a 20 pin ZIF connector that the Storage Element is attached to. Both the TIC Host interface and the TIC/SE interface pin orderings can be reversed to simplify PCB layout.

Figure 36A:
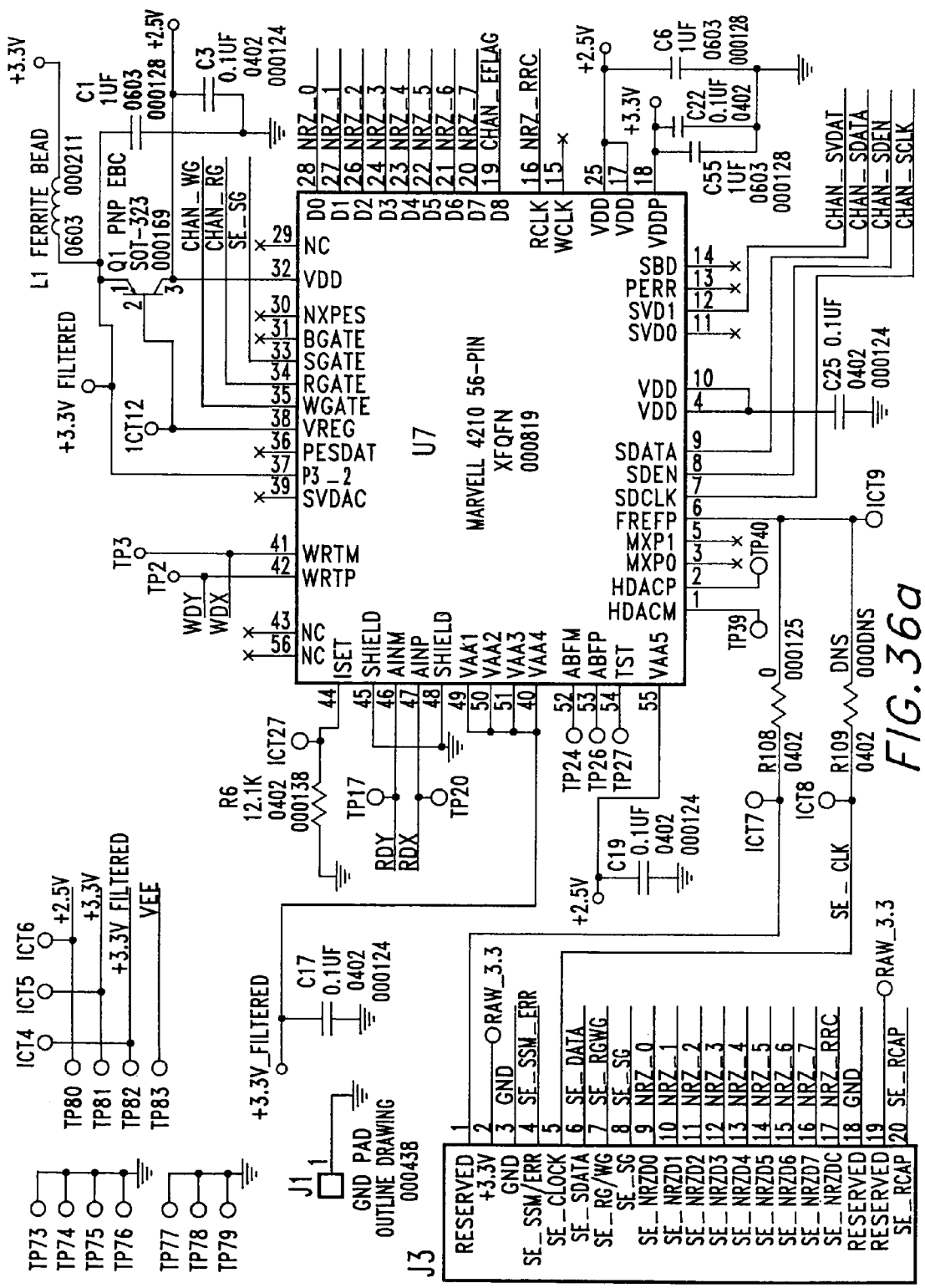
FIGS. 36a–c, in combination, comprise an overall system schematic in which the Storage Element is interfaced to the TIC.

The TIC interfaces to the host electronics through the TIC Host Interface. This interface is similar to the CompactFlash True IDE Mode interface. To simplify board layout, the pin order of this interface can be reversed on the Transition IC. The Pin Flip signal +CF_PF/−CF_PF defines the pin ordering of the TIC Host interface. FIGS. 36a–comprise an overall system schematic. See also the Pin Descriptions section for details.

On the other hand, the TIC interfaces to the Storage Element through a 20 signal interface (referred to as the SE/TIC interface). To simplify board layout, the pin order of this interface can be reversed on the Transition IC. The Pin Flip signal +SE_PINFLIP/−SE_PINFLIP defines the pin ordering of the SE/TIC interface. See the Pin Descriptions for details.

Several additional signals are available to optimize system integration and performance. These signals include CF_DMARQ, CF_DMAACK, CF_PDAIG, CF_DASP. CF_DMARQ and CF_DMAACK are handshaking sign in UDMA transfer modes. CF_PDIAG and CF_DASP are used in the Master/Slave handshake protocol (see the CF+ specification). More information on each of these topics is provided in the following sections.

The Transition IC (TIC) host interface is very similar to the CompactFlash Specification Revision 1.4 True IDE mode implementation. The TIC and Storage Element are intended for embedded, non-removable, applications only. The following section details the supported commands and electrical connections.

Table 2 lists the host commands supported by the TIC:

TABLE 2

| Command Name | Command Code (Hex) |
|---|---|
| Check Power Mode | 98/E5 |
| Exec. Device Diagnostic | 90 |
| Flush Cache | E7 |
| Format Track | 50 |
| Identify Device | EC |
| Idle | 97/E3 |
| Idle Immediate | 95/E1 |
| Init. Device Parameters | 91 |
| Read DMA | C8–C9 |
| Read Multiple | C4 |
| Read Sector Buffer | E4 |
| Read Sector(s) | 20–23 |
| Read Verify Sector(s) | 40–41 |
| Recalibrate | 1X |
| Seek | 7X |
| Set Features | EF |
| Set Multiple Mode | C6 |
| Sleep | 99/E6 |
| Standby | 96/E2 |
| Standby Immediate | 94/E0 |
| Vendor Unique | FC |
| Write DMA | CA–CB |
| Write Multiple | C5 |
| Write Sector Buffer | E8 |
| Write Sector(s) | 30–33 |

Vendor Unique (OXFC)—Special TIC/SE Functions

The following subcommand functions are supported by placing the appropriate value in the Feature Register. Any unsupported subcommands will result in an Aborted Command error status.

Load Code Patch (Feature Register=0×A0)

If a supplement is required for the internal masked ROM code of the TIC, a code patch can be downloaded by the host system to the TIC memory. This command is also called a Pre-patch. If a Pre-patch is required, this command should be sent before any other commands are sent (after power up). A binary code patch file would be provided by CSS for the host system to download into the TIC with this single command. The file transferred should be the provided file padded out to a modulo of 512 bytes. The host is responsible for placing a proper count in the Sector Count Register and transferring all the data when the TIC clears Busy and asserts the DRQ bits.

Get Defect List (Feature Register=0×A3)

This will return the factory defect list to the host system. The host can determine the number of blocks to transfer by reading the Sector Count Register when the TIC clears the Busy and asserts the DRQ bits or by continuing transferring blocks until the DRQ status bit is no longer asserted. The defect list consists of 32 bit entries. The first entry is the defect count. All other entries consist of a list of defects by LBA in ascending order.

Set Patch Number (Feature Register=0×A5)

If a supplement is required for the internal masked ROM code of the TIC, a code patch can be loaded into the Transition IC from the Storage Element at first access. If required, this command should be sent before any other commands are sent (after power on). If a Pre-patch is also required (see Load Code Patch above), Set Patch Number should be the second command sent after the load code patch. This command instructs the TIC/SE to load a factory installed patch from the Storage Element that is not the default patch.

Additional Vendor Unique commands are being developed. The documentation for these commands is under development and will be added to this specification in future revisions.

While the TIC host interface is very similar to the CompactFlash Specification Rev 1.4 True IDE mode, it is not fully compliant with that spec. The following is a list of the major differences:

No mechanical connector, the TIC is designed into the system PCBA with hard-wired interface connections.

No PCMICA PC Card capability, not removable, True IDE mode ONLY.

Master only, the TIC cannot support a slave device or be configured as a slave.

DRQ timing requirements may not be met, especially if Write Cache is enabled.

Standby and Sleep Power modes are different. Sleep tri-states the CF interface.

The Standby Timer defaults to 2 seconds. For the Standby and Idle commands, each count of the Sector Count Register represents 100 millisec when setting the Standby Timer. A value of 0x00 does not disable the Standby timer, but sets a maximum value of 256 or 25.6 seconds. The transition into the Idle mode will occur after ¼ of the Standby Timer has elapsed.

Vendor Unique command (0xFC) supports TIC/SE special functions

Not all specified CF commands are implemented. See below.

Not all specified CF signals are implemented. See below.

CompactFlash commands NOT supported by the TIC are given in Table 3:

TABLE 3

| Command Name | Command Code (Hex) |
| --- | --- |
| Erase Sectors | C0 |
| Request Sense | 03 |
| Security Commands | F1–F6 |
| Translate Sector | 87 |
| Wear Level | F5 |
| Write Multiple w/o Erase | CD |
| Write Sectors w/o Erase | 38 |
| Write Verify | 3C |

CompactFlash signals NOT supported by the TIC are given in Table 4:

TABLE 4

| CF Pin number | Signal Name |
| --- | --- |
| 8 | A10 |
| 9 | -ATASEL |
| 10 | A09 |
| 11 | A08 |
| 12 | A07 |
| 14 | A06 |
| 15 | A05 |
| 16 | A04 |
| 17 | A03 |
| 25 | -CD2 |
| 26 | -CD1 |
| 33 | -VS1 |
| 36 | -WE |
| 40 | -VS2 |
| 43 | -INPACK |
| 44 | -REG |

Standby Timer

The Standby Timer defaults to 2 seconds. For the Standby and Idle commands, each count of the Sector Count Register represents 100 millisec when setting the Standby Timer. A value of 0x00 does not disable the Standby timer, but sets a maximum value of 256 or 25.6 seconds. The transition into the Idle mode will occur after ¼ of the Standby Timer has elapsed.

Power Modes and Associated Commands

The TIC and SE support four different low power modes. Idle, Standby, and Sleep are defined in the CF+ specification. The Idle mode causes the head to unload and the disk remains spinning. The Standby mode unloads the head and causes the disk to spin down. The Sleep mode unloads the head, spins down the disk and tri-states the TIC host interface circuitry. The fourth mode is a unique non-operational mode where the only power consumed is the leakage current. Whenever the SE is not in use, it should be placed in the non-operational mode. This mode is initiated by first issuing the Standby, Standby Immediate or Sleep command to place the SE in Standby or Sleep mode, then asserting the TIC_OFF signal only after the Standby/Standby Immediate/Sleep command has completed. After being asserted, TIC_OFF must not be de-asserted within the first 10 µs. This non-operational mode is equivalent to removing power, so resumption of operation is the same as a power-on.

The Transition IC supports five different commands associated with the above discussed power modes. The Idle and Idle immediate commands both cause the Storage Element to enter the Idle mode, but the Idle command also sets the Standby Timer. The Standby and Standby Immediate commands both cause the Storage Element to enter the Standby Mode, but the Standby command also sets the Standby Timer. The Sleep command causes the Storage Element and Transition IC to enter the Sleep mode.

Proper Use of Power Modes

When using an adequate buffer and streaming data, the host should immediately command the SE to go to a low-power mode (Standby or Sleep) after the host's buffer is either full (read) or empty (write). This may be followed by asserting the TIC_OFF signal and entering the non-operational mode. This minimizes current consumption whenever the TIC/SE are not accessing data.

Before signaling the TIC/SE to go to the non-operational mode (asserting TIC_OFF) or removing power from the TIC or SE, a Standby, Standby Immediate or Sleep command must be issued and completed to ensure the head has unloaded off of the disk. Otherwise, a less reliable mode of head retract/unload will be used and there will be a greater chance of SE failure.

The user is advised to carefully consider appropriate use of the above mentioned power modes. The response time (time to access data) for each mode is different. Response time from the non-operational mode is significantly longer (approximately 1.5 s total) than response time from Idle (approximately 300 ms total) and response time from Standby mode (approximately 1 s total). These times should be considered during system design to ensure acceptable customer interface performance.

Transition IC Clock

The TIC requires an external low jitter clock signal for proper operation. The clock signal should be supplied to pin C1 (CLK_CLKIN) of the Transition IC and must also be supplied to the SE via the 20 conductor ZIF connector. Refer to the Pin Descriptions and Electrical Specifications sections of this document for further details. A reference schematic of the Transition IC is included as FIG. 35.

The GPIO_8 and GPIO_C pins are reserved for future possible clocking options. CSS recommends inclusion of footprints for resistors connecting these pins to ground. The resistors are not populated at this time. Refer to the Pin Descriptions sections of this document for further details.

Channel Clock Mode

The Channel Clock Mode is used to configure the internal operation of the Transition IC for the clock signals supplied to the Transition IC and Storage Element. The Transition IC determines the Channel Clock Mode by reading the GPIO_7 pin at power up. This pin should have a 3.3K ohm pull-down resistor to ground.

Transition IC Power-on and Reset

There are two methods that may be used to bring the TIC from a powered down mode to being ready to accept data from the CF interface. Both methods require that power be stable and good for 300 μs and that the CLK_CLKIN signal be stable for at least 32 cycles after that.

The preferred method is to make use of the TIC_OFF signal. Hold the Reset line inactive and the TIC_OFF signal active. Ensure the power is stable and good for 300 μs and the CLK_CLKIN signal is stable for at least 32 cycle after that. Then TIC_OFF should be deasserted. Internally, the TIC will automatically wait for its power regulators to come up and for its internal resets to propagate. At that point, the internal processor core will activate and begin executing code that will get the TIC ready to accept commands over the CF interface. A status register on the host side must be polled to know when the TIC is ready to accept commands. The time frame from deassertion of TIC_OFF to this time is about 0.1 second.

The other method of bringing the TIC from a non-power state to ready is to manually use the Reset line and monitor the PG (Power Good) signal. With this method, TIC_OFF should be held inactive and the Reset line should be held active. Ensure the power is stable and good for 300 μs and the CLK_CLKIN signal is stable for at least 32 cycles after that. PG will assert approximately halfway through the required 300 μs waiting period. After reset is deasserted, the processor core will activate and begin the startup procedure for the TIC as above. Again, the user should poll the CF status register on the host side before sending commands over the CF interface. This will take about 0.1 second.

Figure 36B:
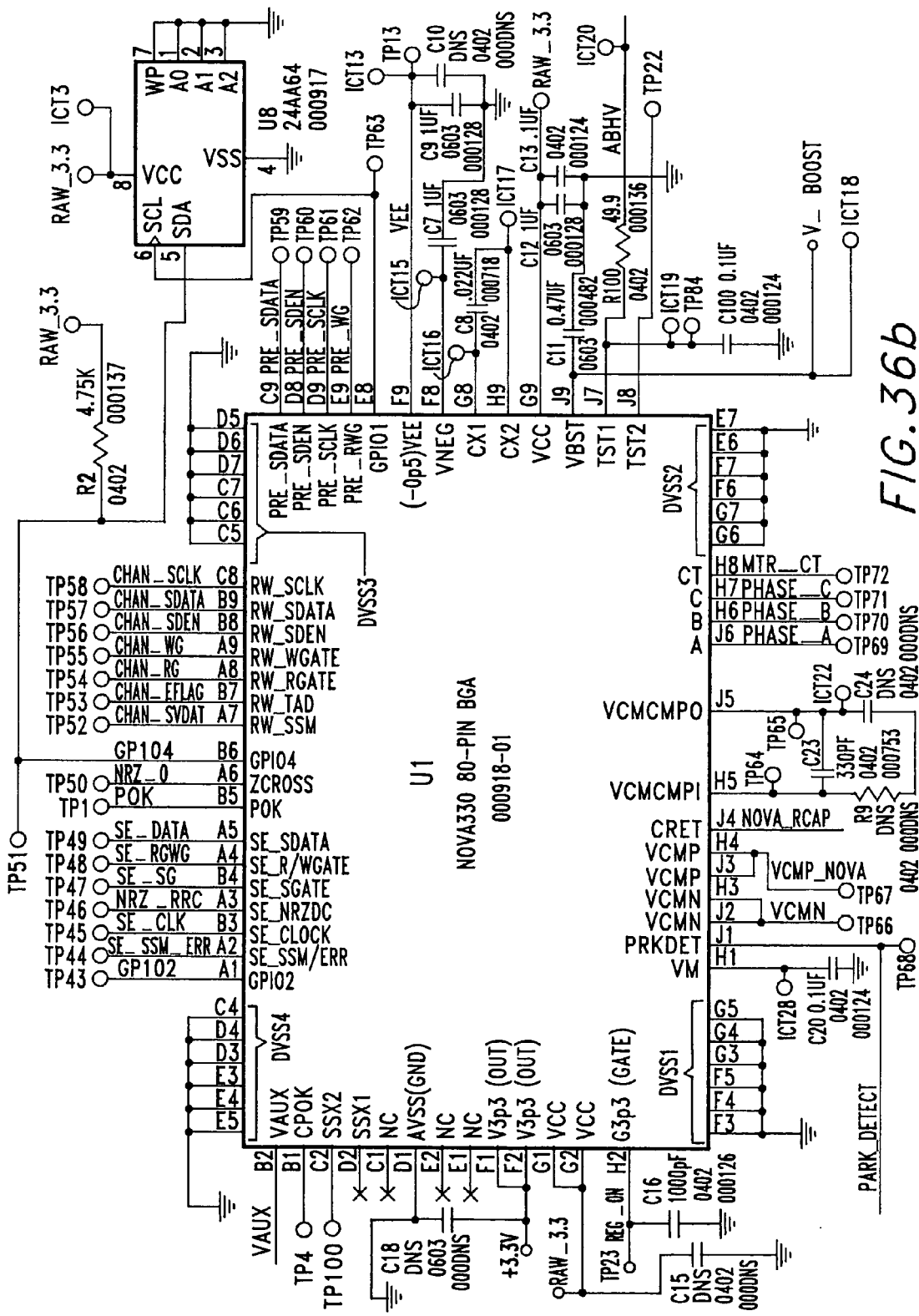
Figure 36C:
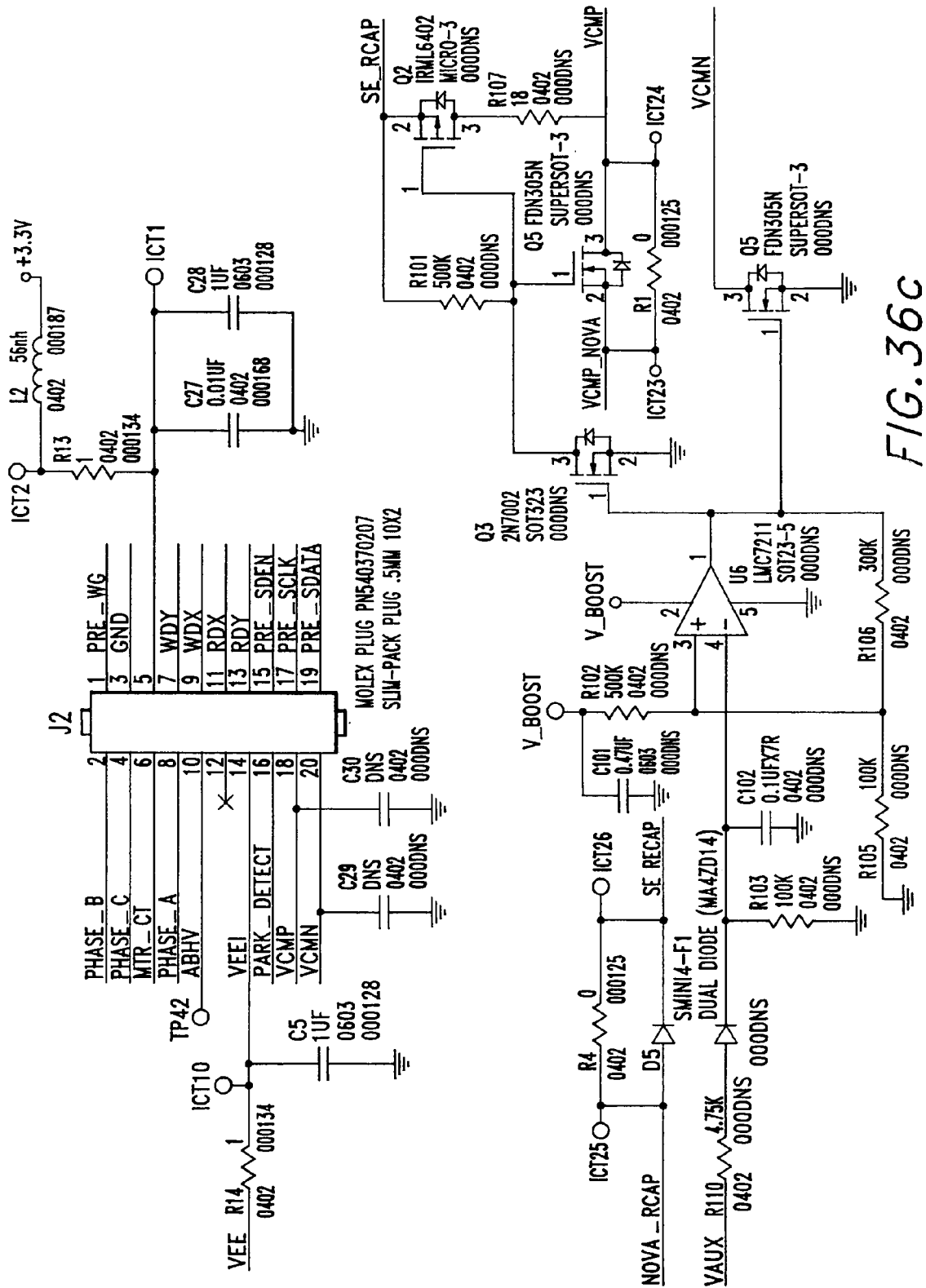

Table 5 describes each pin of the TIC with reference to the system schematic of FIGS. 36a–c.

TABLE 5

TIC Pin Descriptions
(A "1" represents a high voltage (i.e. greater than 2.1 V), and a "0" represents a low voltage (i.e. less than 1.08 V).)

| Signal Name | BGA Pin | Type | Description | |
|---|---|---|---|---|
| Power | | | | |
| VDDSHV | A11, D7, E4, G4, H10, K5, K6 | Power, VDDS | Supply voltage input. +3.3 V ± 10% | |
| VDDSHVREGx | G3, K7, G10, D8 | Power, VDDS | Supply voltage input to internal 1.8 V regulator. +3.3 V ± 10% | |
| VSS | D5, D6, D9, E10, F4, F10, H4, J4, J10, K4, K8, K9 | Ground, VSS | System Ground | |
| TIC Host Interface ("CompactFlash True IDE Mode" - like interface) | | | | |
| +CF_PF/−CF_PF | C8 | I, 5 VT | Pin Flip. Reverses the order of the TIC Host Interface. For example, if +CF_PF/−CF_PF = 1, then CF_D00 is pin E13. If +CF_PF/−CF_PF = 0, then CF_D00 is pin A5[2] | |
| | | | +CF_PF/−CF_PF = 1[2] | +CF_PF/−CF_PF = 0[2] |
| CF_D00/CF_D06 | E13 | I/O, 5 VT | CF_D00 | CF_D06 |
| CF_D01/CF_D13 | F13 | I/O, 5 VT | CF_D01 | CF_D13 |
| CF_D02/CF_D12 | G13 | I/O, 5 VT | CF_D02 | CF_D12 |
| CF_D03/CF_D10 | A2 | I/O, 5 VT | CF_D03 | CF_D10 |
| CF_D04/CF_D09 | A3 | I/O, 5 VT | CF_D04 | CF_D09 |
| CF_D05/CF_D08 | A4 | I/O, 5 VT | CF_D05 | CF_D08 |
| CF_D06/CF_D00 | A5 | I/O, 5 VT | CF_D06 | CF_D00 |
| CF_D07/CF_DMARQ | A6 | I/O, 5 VT | CF_D07 | CF_DMARQ[3] |
| CF_D08/CF_D05 | G12 | I/O, 5 VT | CF_D08 | CF_D05 |
| CF_D09/CF_D04 | H12 | I/O, 5 VT | CF_D09 | CF_D04 |
| CF_D10/CF_D03 | J13 | I/O, 5 VT | CF_D10 | CF_D03 |
| CF_D11/CF_IOCS16b | B3 | I/O, 5 VT | CF_D11 | CF_IOCS16b |
| CF_D12/CF_D02 | B4 | I/O, 5 VT | CF_D12 | CF_D02 |
| CF_D13/CF_D01 | B5 | I/O, 5 VT | CF_D13 | CF_D01 |
| CF_D14/CF_A00 | B6 | I/O, 5 VT | CF_D14 | CF_A00 |
| CF_D15/CF_A01 | B7 | I/O, 5 VT | CF_D15 | CF_A01 |
| CF_A00/CF_D14 | D13 | I/O, 5 VT | CF_A00 | CF_D14 |
| CF_A01/CF_D15 | C13 | I/O, 5 VT | CF_A01 | CF_D15 |
| CF_A02/CF_CS1b | B13 | I, 5 VT | CF_A02 | CF_CS1b |
| CF_RESETb/CF_IOWRb | B10 | I, 5 VT | CF_RESETb | CF_IOWRb |
| CF_CS0b/CF_DMAACKb | A7 | I, 5 VT | CF_CS0 | CF_DMAACKb[3] |
| CF_CS1b/CF_A02 | B8 | I, 5 VT | CF_CS1b | CF_A02 |

TABLE 5-continued

TIC Pin Descriptions
(A "1" represents a high voltage (i.e. greater than 2.1 V), and a "0" represents a low voltage (i.e. less than 1.08 V).)

| Signal Name | BGA Pin | Type | Description | |
|---|---|---|---|---|
| CF_IORDb/CF_IORDY | A8 | I, 5 VT | CF_IORDb | CF_IORDY |
| CF_IOWRb/CF_RESETb | B9 | I, 5 VT | CF_IOWRb | CF_RESETb |
| CF_IORDY/CF_IORDb | A10 | O, 5 VT | CF_IORDY | CF_IORDb |
| CF_IOCS16b/CF_D11 | H13 | I/O, 5 VT | CF_IOCS16b | CF_D11 |
| CF_DMAACKb/CF_CSOb | D12 | I, 5 VT | CF_DMAACKb$^3$ | CF_CSOb |
| CF_DMARQ/CF_D07 | C12 | I/O, 5 VT | CF_DMARQ$^3$ | CF_D07 |
| CF_INTRQ | A9 | O, 5 VT | Interrupt Request | |
| CF_DASPb | E12 | I/O, 5 VT | Disk Active/Slave Present | |
| CF_PDIAGb | F12 | I/O, 5 VT | Pass Diagnostic | |
| *SE/TIC Interface* | | | | |
| +SE_PINFLIP/−SE_PINFLIP | F11 | I, 3.3 V | Reverses the order of the SE/TIC interface. For example, if +SE_PINFLIP/−SE_PINFLIP = 1, then SE_SSM/ERR is pin M1. If +SE_PINFLIP/−SE_PINFLIP = 0, then SE_SSM/ERR is pin M13$^1$ | |
| | | | +SE_PINFLIP/−SE_PINFLIP = 1$^1$ | +SE_PINFLIP/−SE_PINFLIP = 0$^1$ |
| SE_SSM/ERR/SE_NRZDC | M1 | I/O, 3.3 V | SE_SSM/ERR | SE_NRZDC |
| SE_CLOCK/SE_NRZD7 | N1 | O, 3.3 V | SE_CLOCK | SE_NRZD7 |
| SE_DATA/SE_NRZD6 | N2 | I/O, 3.3 V | SE_DATA | SE_NRZD6 |
| SE_RG/WG/SE_NRZD5 | N3 | O, 3.3 V | SE_RG/WG | SE_NRZD5 |
| SE_SG/SE_NRZD4 | N4 | O, 3.3 V | SE_SG | SE_NRZD4 |
| SE_NRZD0/SE_NRZD3 | N5 | I/O, 3.3 V | SE_NRZD0 | SE_NRZD3 |
| SE_NRZD1/SE_NRZD2 | N6 | I/O, 3.3 V | SE_NRZD1 | SE_NRZD2 |
| SE_NRZD2/SE_NRZD1 | N7 | I/O, 3.3 V | SE_NRZD2 | SE_NRZD1 |
| SE_NRZD3/SE_NRZD0 | N8 | I/O, 3.3 V | SE_NRZD3 | SE_NRZD0 |
| SE_NRZD4/SE_SG | N9 | I/O, 3.3 V | SE_NRZD4 | SE_SG |
| SE_NRZD5/SE_RG/WG | N10 | I/O, 3.3 V | SE_NRZD5 | SE_RG/WG |
| SE_NRZD6/SE_DATA | N11 | I/O, 3.3 V | SE_NRZD6 | SE_DATA |
| SE_NRZD7/SE_CLOCK | N12 | I/O, 3.3 V | SE_NRZD7 | SE_CLOCK |
| SE_NRZDC/SE_SSM/ERR | M13 | I/O, 3.3 V | SE_NRZDC | SE_SSM/ERR |
| *TIC Clock and Control* | | | | |
| CLK_XIN | G1 | I, 1.8 V | No Connection | |
| CLK_XOUT | G2 | O, 1.8 V | No Connection | |
| CLK_CLKSEL | F3 | I, 3.3 V | Connect to +3.3 V | |
| CLK_CLKIN | C1 | I, 3.3 V | 3.3 V clock input | |
| RESETb | B1 | I, 3.3 V | Master reset. Connect to system reset | |
| TIC_OFF | M10 | I, 3.3 V | Places system into lowest power state | |
| PG | N13 | O, 3.3 V | Power Good - State of internal Power On Reset (POR) Circuit | |
| INHIBIT_PGb | A1 | I, 3.3 V | Active low. When asserted, inhibits the internal POR circuit from affecting the circuit | |
| *JTAG Signals For Integration Debug* | | | | |
| JTAG_TMS | L1 | I/O, 3.3 V | Test Mode Select | |
| JTAG_TRST | K2 | I/O, 3.3 V | Test Reset | |
| JTAG_TDI | K1 | I/O, 3.3 V | Test Data In | |
| JTAG_TD0 | J2 | I/O, 3.3 V | Test Data Out | |
| JTAG_TCK | J1 | I/O, 3.3 V | Test Clock | |
| JTAG_EMU0 | H2 | I/O, 3.3 V | Emulation 0 | |
| JTAG_EMU1 | H1 | I/O, 3.3 V | Emulation 1 | |
| *TIC Internal DSP Signals (USED FOR DEVELOPMENT PURPOSES ONLY)* | | | | |
| DSP_D00 | M6 | I/O, 3.3 V | No Connection | |
| DSP_D01 | M5 | I/O, 3.3 V | No Connection | |
| DSP_D02 | M4 | I/O, 3.3 V | No Connection | |
| DSP_D03 | M3 | I/O, 3.3 V | No Connection | |
| DSP_D04 | M7 | I/O, 3.3 V | No Connection | |
| DSP_D05 | L9 | I/O, 3.3 V | No Connection | |
| DSP_D06 | L10 | I/O, 3.3 V | No Connection | |
| DSP_D07 | M11 | I/O, 3.3 V | No Connection | |
| DSP_D08 | M12 | I/O, 3.3 V | No Connection | |
| DSP_D09 | K10 | I/O, 3.3 V | No Connection | |
| DSP_D10 | L8 | I/O, 3.3 V | No Connection | |
| DSP_D11 | C6 | I/O, 3.3 V | No Connection | |

TABLE 5-continued

TIC Pin Descriptions
(A "1" represents a high voltage (i.e. greater than 2.1 V), and a "0" represents a low voltage (i.e. less than 1.08 V).)

| Signal Name | BGA Pin | Type | Description |
| --- | --- | --- | --- |
| DSP_D12 | D10 | I/O, 3.3 V | No Connection |
| DSP_D13 | D11 | I/O, 3.3 V | No Connection |
| DSP_D14 | C9 | I/O, 3.3 V | No Connection |
| DSP_D15 | C10 | I/O, 3.3 V | No Connection |
| DSP_A00 | L7 | I/O, 3.3 V | No Connection |
| DSP_A01 | L6 | I/O, 3.3 V | No Connection |
| DSP_A02 | L5 | I/O, 3.3 V | No Connection |
| DSP_A03 | L4 | I/O, 3.3 V | No Connection |
| DSP_A04 | L3 | I/O, 3.3 V | No Connection |
| DSP_A05 | L11 | I/O, 3.3 V | No Connection |
| DSP_A06 | K3 | I/O, 3.3 V | No Connection |
| DSP_A07 | K11 | I/O, 3.3 V | No Connection |
| DSP_A08 | J3 | I/O, 3.3 V | No Connection |
| DSP_A09 | J11 | I/O, 3.3 V | No Connection |
| DSP_A10 | H3 | I/O, 3.3 V | No Connection |
| DSP_A11 | H11 | I/O, 3.3 V | No Connection |
| DSP_A12 | G11 | I/O, 3.3 V | No Connection |
| DSP_A13 | F2 | I/O, 3.3 V | No Connection |
| DSP_A14 | E11 | I/O, 3.3 V | No Connection |
| DSP_A15 | E3 | I/O, 3.3 V | No Connection |
| DSP_CLK | C11 | I/O, 3.3 V | No Connection |
| DSP_CS0 | C5 | I/O, 3.3 V | No Connection |
| DSP_WE | D4 | I/O, 3.3 V | No Connection |
| DSP_RD | D3 | I/O, 3.3 V | No Connection |
| DSP_RDY | C3 | I/O, 3.3 V | No Connection |
| DSP_DISCON | C4 | I/O, 3.3 V | No Connection |
| TIC General Purpose I/O | | | |
| GPIO_0 | C2 | I/O, 3.3 V | No Connection |
| GPIO_1 | D2 | I/O, 3.3 V | No Connection |
| GPIO_2 | D1 | I/O, 3.3 V | No Connection |
| GPIO_3 | E2 | I/O, 3.3 V | No Connection |
| GPIO_4 | E1 | I/O, 3.3 V | No Connection |
| GPIO_5 | F1 | I/O, 3.3 V | No Connection |
| GPIO_6 | L12 | I/O, 3.3 V | No Connection |
| GPIO_7 | L13 | I/O, 3.3 V | Channel Clock Mode. Connect to ground through a 3.3k ohm resistor. |
| GPIO_8 | K12 | I/O, 3.3 V | Reserved for future possible clocking options. Connect to a footprint for a small resistor to ground. See the reference schematic in the Application Note - System Integration of the Storage Element and Transition IC |
| GPIO_9 | K13 | I/O, 3.3 V | No Connection |
| GPIO_A | J12 | I/O, 3.3 V | No Connection |
| GPIO_B | B12 | I/O, 3.3 V | No Connection |
| GPIO_C | A13 | I/O, 3.3 V | Reserved for future possible clocking options. Connect to a footprint for a small resistor to ground. See the reference schematic in the Application Note - System Integration of the Storage Element and Transition IC |
| GPIO_D | A12 | I/O, 3.3 V | No Connection |
| GPIO_E | B11 | I/O, 3.3 V | External Flash Mode. Used for prototypes developed with early versions of the TIC (prior to TIC version 1.2, available approximately January, 2003). Load program code from the internal ROM if left unconnected. Load program code from the external flash device if tied to ground through 3.3k ohm resistor. See the errata sheet - Use of the Transition IC with an External Flash. |
| GPIO_F | B2 | I/O, 3.3 V | No Connection |
| IC Test (used for IC test purposes only) | | | |
| REGOFFBIASZ | M9 | Test, 3.3 V | No Connection |
| VDD | C7, M8 | Test, VDD | No Connection (1.8 V internal regulator output) |

TABLE 5-continued

TIC Pin Descriptions
(A "1" represents a high voltage (i.e. greater than 2.1 V), and a "0" represents a low voltage (i.e. less than 1.08 V).)

| Signal Name | BGA Pin | Type | Description |
|---|---|---|---|
| IC_TEST_TMS | L2 | I/O, 3.3 V | No Connection |
| IC_TEST_TRST | M2 | I/O, 3.3 V | No Connection |

[1] A "1" represents a high voltage (i.e. greater than 2.1 V), and a "0" represents a low voltage (i.e. less than 1.08 V).
[2] A "1" represents a high voltage (i.e. greater than 2.1 V), and a "0" represents a low voltage (i.e. less than 1.08 V). Connect to +3.3 V or Ground.
[3] DMA handshake lines (DMA request, DMA acknowledge). Refer to ATA/ATAPI-4 spec. Used for Multi word DMA modes and UDMA modes.

Compact Flash to TIC Cross Reference

The TIC Host Interface is similar to the CompactFlash True IDE Mode interface with the exceptions previously noted. Table 6 lists the signals used in the CompactFlash specification and their equivalent connections for the Transition IC.

TABLE 6

| Compact Flash True IDE Mode | | Transistion IC BGA Pin # | | |
|---|---|---|---|---|
| Pin Number | Signal Name | +CF_PF/−CF_PF = 1 | +CF_PF/−CF_PF = 0 | Signal Name |
| 1 | GND | | | |
| 2 | D03 | A2 | J13 | CF D03 |
| 3 | D04 | A3 | H12 | CF D04 |
| 4 | D05 | A4 | G12 | CF D05 |
| 5 | D06 | A5 | E13 | CF D06 |
| 6 | D07 | A6 | C12 | CF D07 |
| 7 | -CS0 | A7 | D12 | CF CS0b |
| 8 | NC (A10) | | | |
| 9 | NC (-ATA SEL) | | | |
| 10 | NC (A9) | | | |
| 11 | NC (A8) | | | |
| 12 | NC (A7) | | | |
| 13 | VCC | | | |
| 14 | NC (A6) | | | |
| 15 | NC (A5) | | | |
| 16 | NC (A4) | | | |
| 17 | NC (A3) | | | |
| 18 | A02 | B13 | B8 | CF A02 |
| 19 | A01 | C13 | B7 | CF A01 |
| 20 | A00 | D13 | B6 | CF A00 |
| 21 | D00 | E13 | A5 | CF D00 |
| 22 | D01 | F13 | B5 | CF D01 |
| 23 | D02 | G13 | B4 | CF D02 |
| 24 | -IOCS16 | H13 | B3 | CF IOCS16b |
| 25 | GND (-CD2) | | | |
| 26 | GND (-CD1) | | | |
| 27 | D11 | B3 | H13 | CF D11 |
| 28 | D12 | B4 | G13 | CF D12 |
| 29 | D13 | B5 | F13 | CF D13 |
| 30 | D14 | B6 | D13 | CF D14 |
| 31 | D15 | B7 | C13 | CF D15 |
| 32 | -CS1 | B8 | B13 | CF CS1b |
| 33 | GND (-VS1) | | | |
| 34 | -IORD | A8 | A10 | CF IORDb |
| 35 | -IOWR | B9 | B10 | CF IOWRb |
| 36 | NC (-WE) | | | |
| 37 | INTRQ | A9 | A9 | CF INTRQ |
| 38 | VCC | | | |
| 39 | NC (-CSEL) | | | |
| 40 | NC (-VS2) | | | |
| 41 | -RESET | B10 | B9 | CF RESETb |
| 42 | IORDY | A10 | A8 | CF IORDY |
| 43 | Optional (DMARQ) | C12 | A6 | CF DMARQ |
| 44 | Optional (-DMAACK) | D12 | A7 | CF DMAACKb |
| 45 | Optional (-DASP) | E12 | E12 | CF DASPb |
| 46 | Optional (-PDIAG) | F12 | F12 | CF PDIAGb |
| 47 | D08 | G12 | A4 | CF D08 |
| 48 | D09 | H12 | A3 | CF D09 |

TABLE 6-continued

| | | Transistion IC | | |
|---|---|---|---|---|
| Compact Flash True IDE Mode | | BGA Pin # | | |
| Pin Number | Signal Name | +CF_PF/−CF_PF = 1 | +CF_PF/−CF_PF = 0 | Signal Name |
| 49 | D10 | J13 | A2 | CF D10 |
| 50 | GND | | | |

Figure 37A:
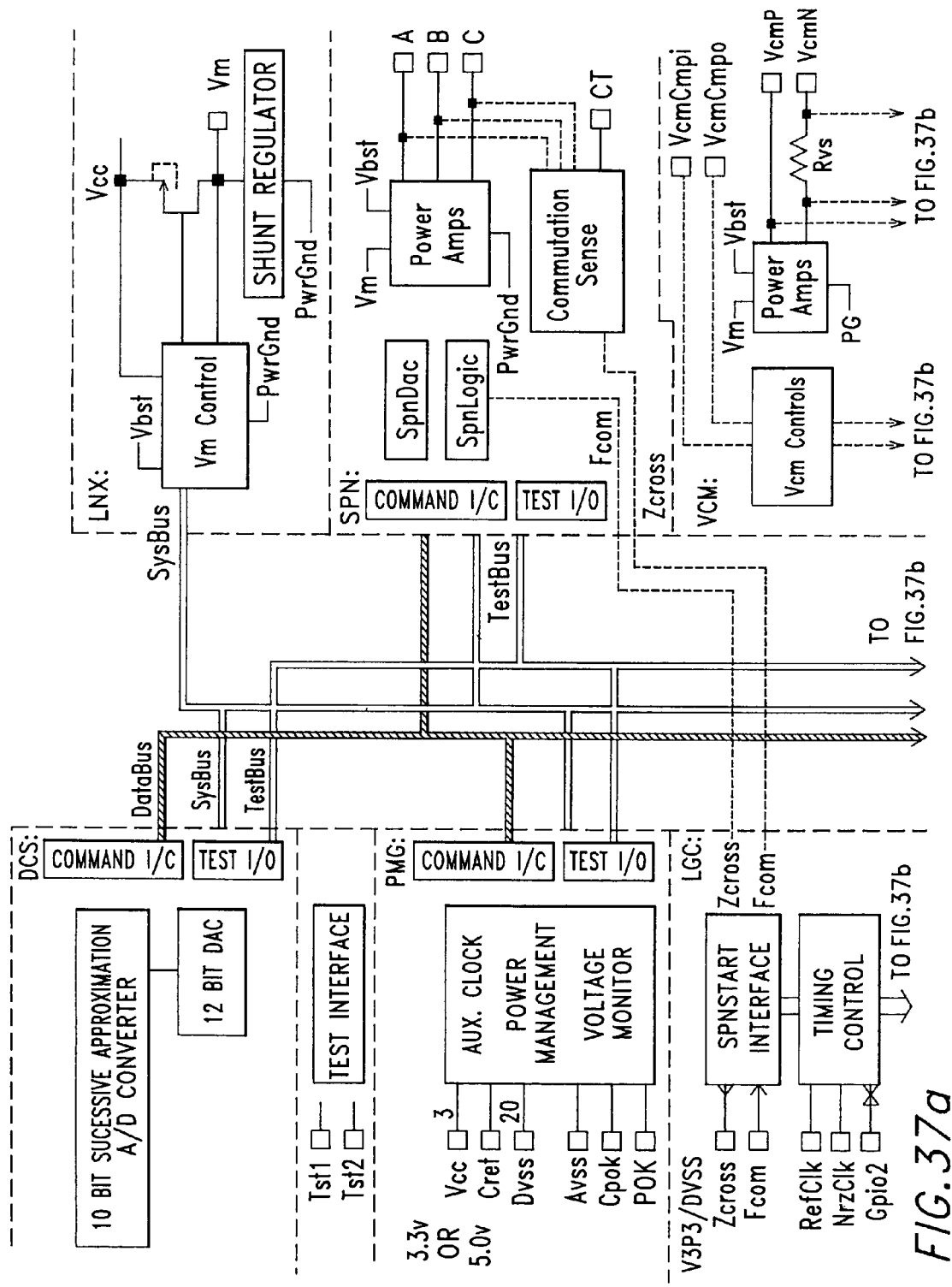
Figure 37B:
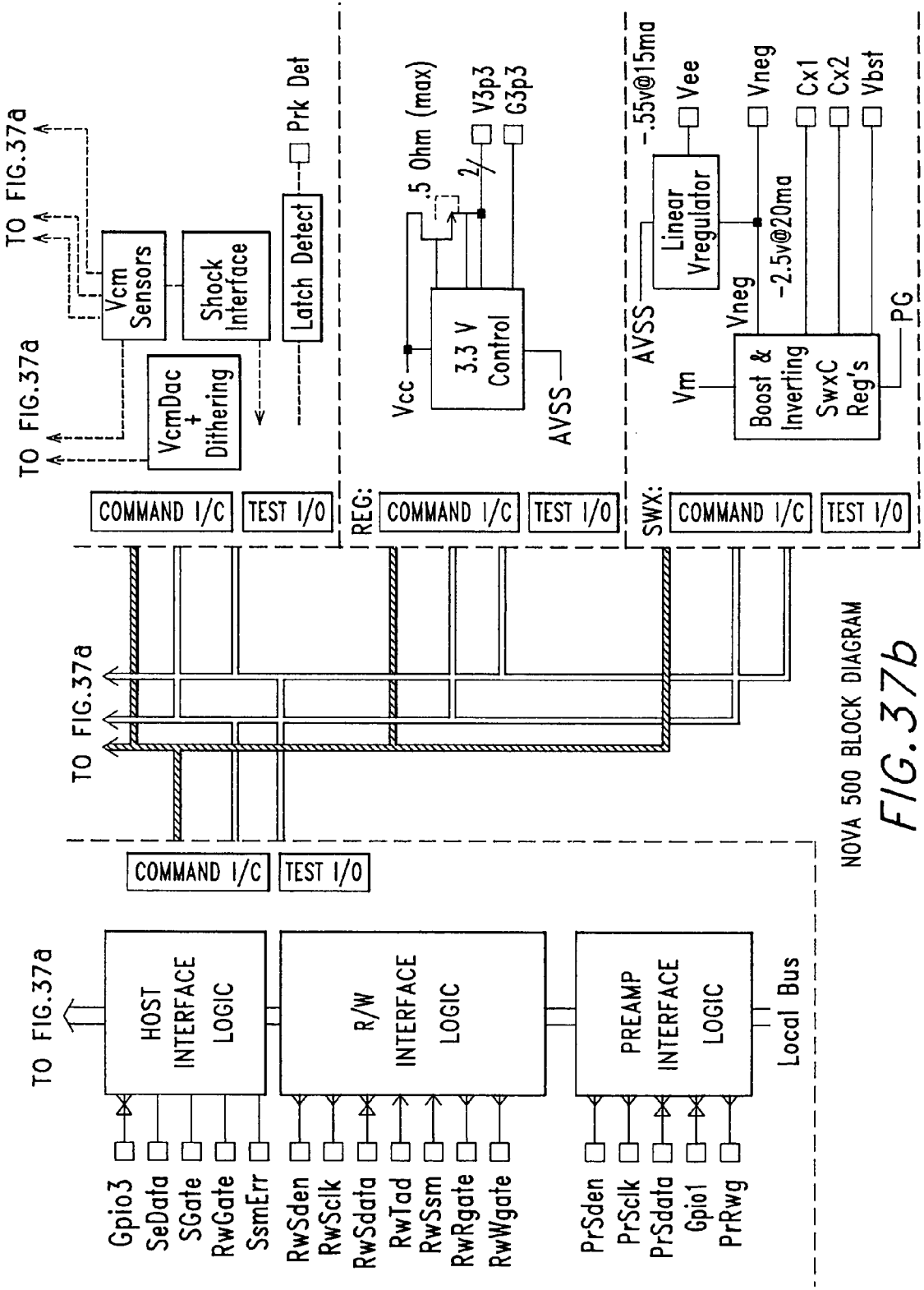
Figure 38A:
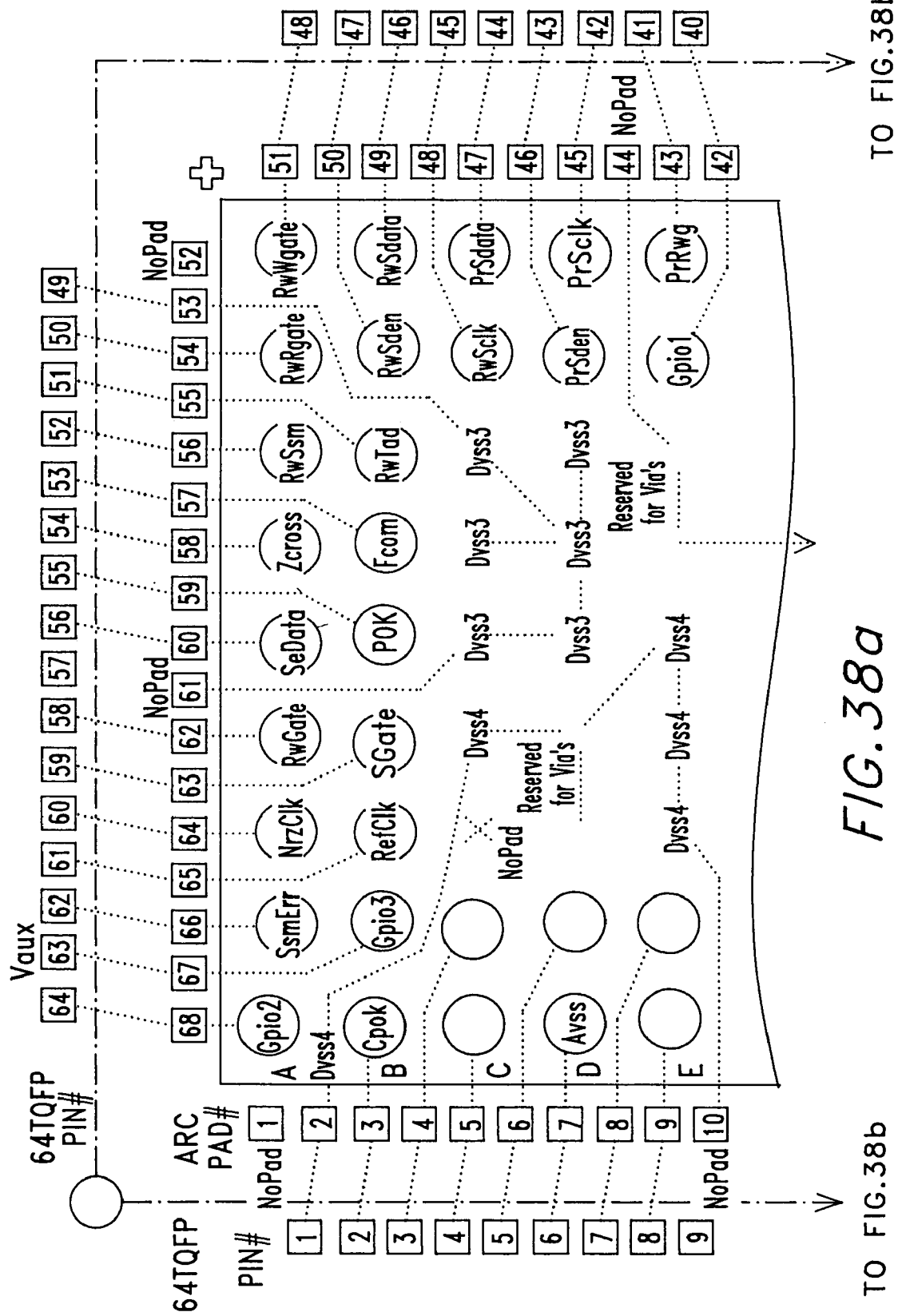
FIGS. 38a–c are a plan view of the pinout of the IC of FIGS. 37a–c.
Figures 38B, 38C:
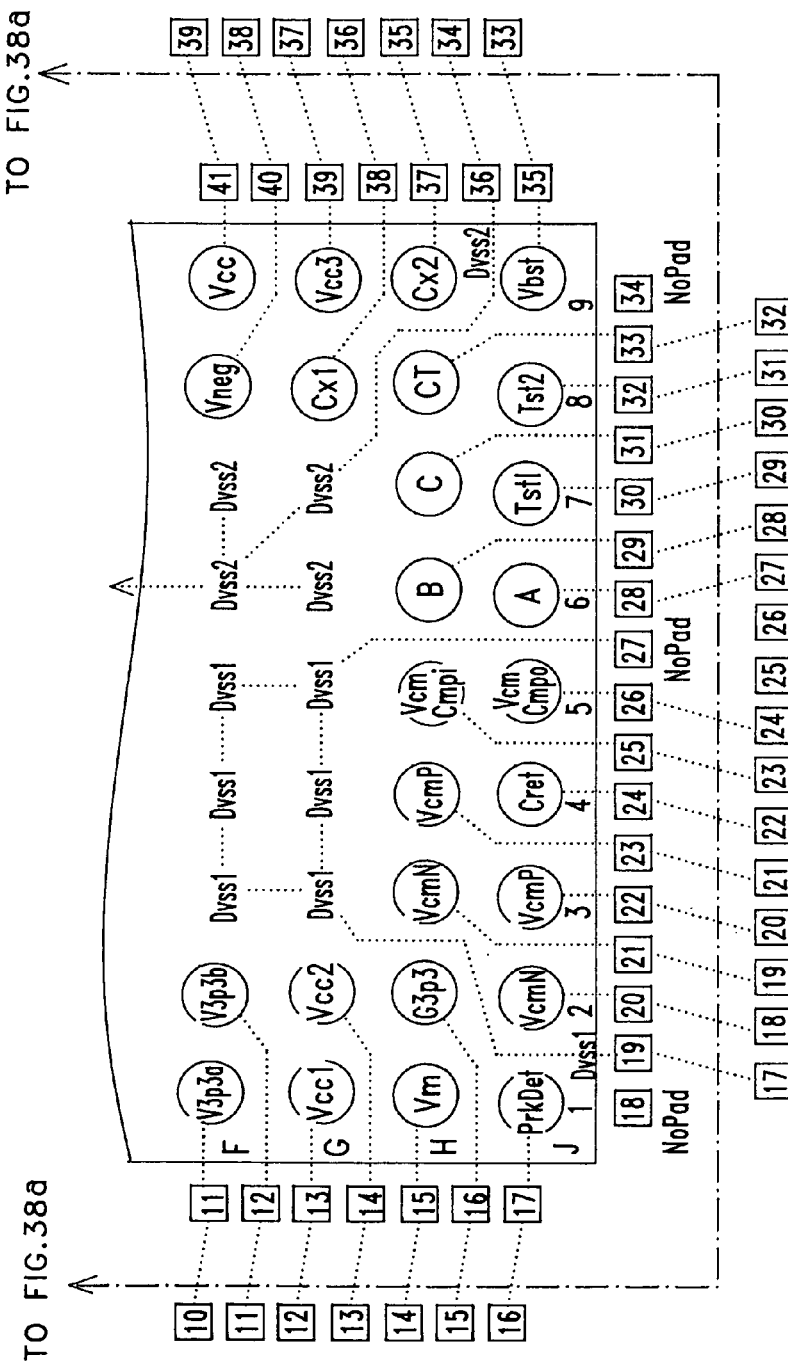
Figure 39A:
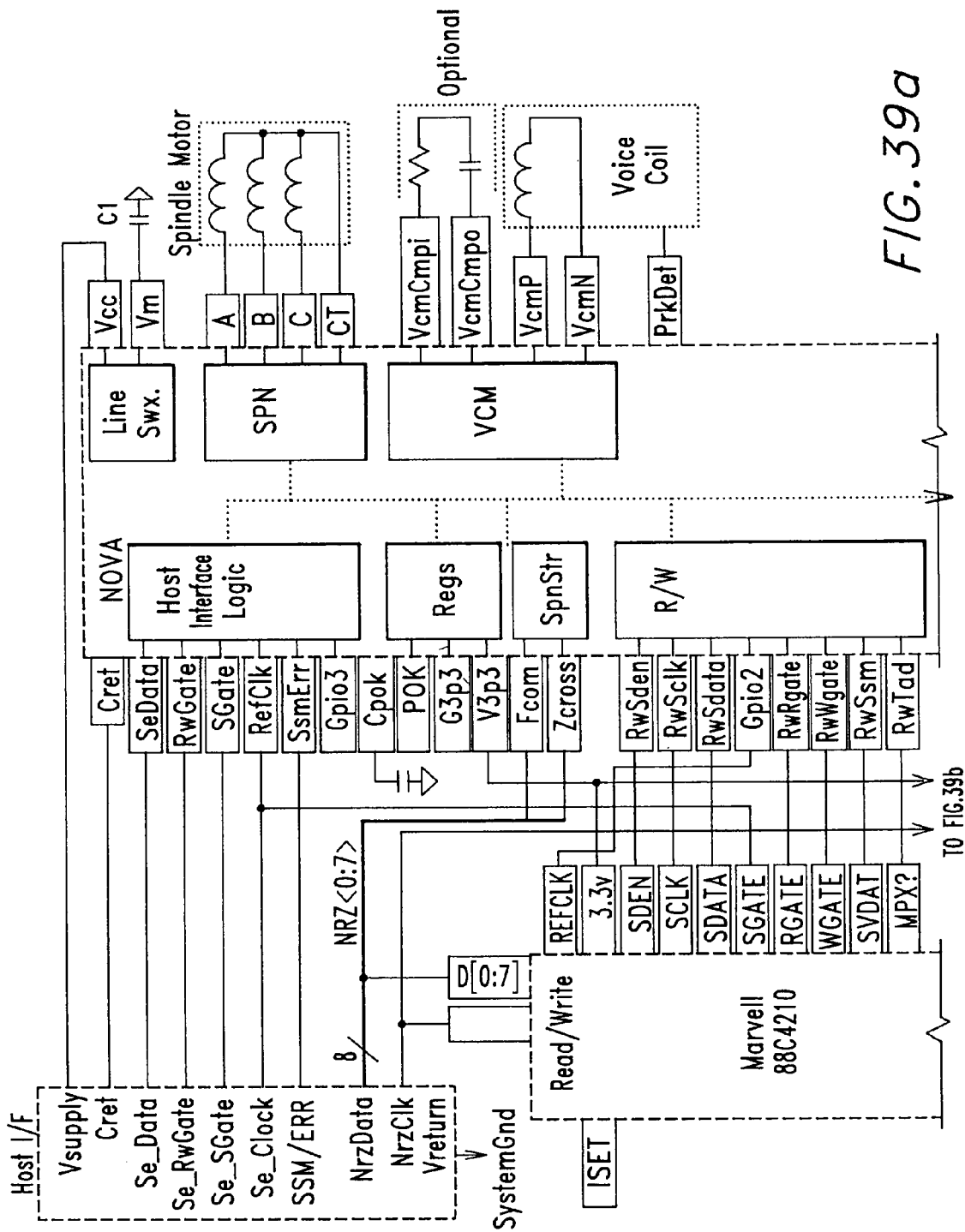

Having described TIC 1300 in further detail, attention is now directed to further discussions with respect to Servo/Control IC 1304 with reference to FIGS. 37*a–c*. The latter is a block diagram of the Servo/Control IC. Table 7, in conjunction with a package illustration in FIGS. 38*a–c*, gives the pinout of this IC. FIGS. 39*a–c* comprise a block diagram representation of the overall system, showing the servo/control IC interfaced therein as well as signal routing.

TABLE 7

| # | Name | Pin # | SubSvs | Type | Imax | Vrange | EsdCell | Description |
|---|---|---|---|---|---|---|---|---|
| 1 | Vcc1 | G1 | All | Power In | .25 A | 0/5.5 | | Host Power: 3.3 or 5.0 |
| 2 | Vcc2 | G2 | All | Power In | .25 A | 0/5.5 | | Host Power: 3.3 or 5.0 |
| 3 | Vcc3 | G9 | All | Power In | .25 A | 0/5.5 | | Host Power: 3.3 or 5.0 |
| 4 | Vm | H1 | All | Power In | .25 A | 0/5.5 | | Motor Supply Voltage |
| 5 | Avss | D1 | All | Gnd | | 0 | | Analog Return |
| 6 | Cpok | B1 | POK | Analog In | | 0/5.5 | | POK charging cap |
| 7 | POK | B5 | PMG | Logic Out | | 0/3.3 | | POK |
| 8 | Vbst | J9 | SWX | PwrOut | 10 ma | 0/10 | | Boost Output |
| 9 | Cx1 | G8 | SWX | PwrOut | 30 ma | −3/10 | | SwxC Transfer Cap. |
| 10 | Cx2 | H9 | SWX | PwrOut | 30 ma | −3/10 | | SwxC Transfer Cap. |
| 11 | Vneg | F8 | SWX | PwrOut | 15 ma | −3/10 | | Inverting SwxC Regulator |
| 12 | Vee | F9 | SWX | PwrOut | 15 ma | −1/0 | | Negative .55 v Regulator |
| 13 | V3p3a | F1 | REG | Analog In | | 0/3.3 | | 3.3 Regulator Output |
| 14 | V3p3b | F2 | REG | Analog In | | 0/3.3 | | 3.3 Regulator Output |
| 15 | G3p3 | H2 | REG | Analog Out | | 0/5.5 | | 3.3 Regulator Output Gate |
| 16 | Cret | J4 | PMG | Pwr I/O | .4 A pk | 0/6 | | Retract Capacitor |
| 17 | A | J6 | SPN | PwrOut | .15 A | 0/5.5 | | Spn Phase A Output |
| 18 | B | H6 | SPN | PwrOut | .15 A | 0/5.5 | | Spn Phase B Output |
| 19 | C | H7 | SPN | PwrOut | .15 A | 0/5.5 | | Spn Phase C Output |
| 20 | CT | H8 | SPN | Analog In | | 0/5.5 | | Spn Center Tap Sense |
| 21 | Fcom | B6 | SPN | Logic In | | | | Hardware FCOM input |
| 22 | Zcross | A6 | SPN | Logic Out | | | | zero cross output |
| 23 | VcmP | J3 | VCM | Power Out | | 0/5.5 | | Vcm Positive Output |
| 24 | VcmP | H4 | VCM | Power Out | | 0/5.5 | | Vcm Positive Output |
| 25 | VcmN | J2 | VCM | Power Out | | 0/5.5 | | Vcm Negative Output |
| 26 | VcmN | H3 | VCM | Power Out | | 0/5.5 | | Vcm Negative Output |
| 27 | VcmCmpi | H5 | VCM | Analog In | | | | VCM current loop comp. |
| 28 | VcmCmpo | J5 | VCM | Analog In | | | | VCM current loop comp. |
| 29 | RefClk | B3 | LGC | Logic In | | 0/3.3 | | System Reference Clock |
| 30 | SeData | A5 | LGC | Logic I/O | | 0/3.3 | | SE Host Serial Data |
| 31 | SGate | B4 | LGC | Logic In | | 0/3.3 | | SE Host Servo Gate Signal |
| 32 | RwGate | A4 | LCG | Logic In | | 0/3.3 | | SE Host R/W Gate Signal |
| 33 | SsmErr | A2 | LGC | Logic In | | 0/3.3 | | SE Host Signal |
| 34 | RwSden | B8 | LGC | Logic Out | | 0/3.3 | | Read Channel Serial Port |
| 35 | RwSclk | C8 | LGC | Logic Out | | 0/3.3 | | Read Channel Serial Port |
| 36 | RwSdata | B9 | LGC | Logic I/O | | 0/3.3 | | Read Channel Serial Port |
| 37 | RwTad | B7 | LGC | Logic In | | 0/3.3 | | Read Channel Thermal Asp. |
| 38 | RwSsm | A7 | LGC | Logic In | | 0/3.3 | | Read Channel Servo Mark |
| 39 | RwRgate | A8 | LGC | Logic Out | | 0/3.3 | | Read Channel Read Gate |
| 40 | RwWgate | A9 | LGC | Logic Out | | 0/3.3 | | Read Channel Write |
| 41 | PrSden | D8 | LGC | Logic Out | | 0/3.3 | | Preamp Serial Data Enable |
| 42 | PrSclk | D9 | LGC | Logic Out | | 0/3.3 | | Preamp Serial Data Clock |
| 43 | PrSdata | C9 | LGC | Logic I/O | | 0/3.3 | | Preamp Serial Data |
| 44 | PrRwg | E9 | LGC | Logic Out | | 0/3.3 | | Preamp Read/Write Gate |
| 45 | Gpio1 | E8 | LGC | Logic I/O | | 0/3.3 | | General purpose I/O |
| 46 | Gpio2 | A1 | LGC | Logic I/O | | 0/3.3 | | General purpose I/O |
| 47 | Gpio3 | B2 | LGC | Logic I/O | | 0/3.3 | | General purpose I/O |
| 48 | PrkDet | J1 | LGC | Logic In | | 0/3.3 | | Park detect input |
| 49 | NrzClk | A3 | LGC | Logic In | | 0/3.3 | | NRZ clock |
| 50 | Tst1 | J7 | All | Analog I/O | | | | IC test pin 1 |
| 51 | Tst2 | J8 | All | Analog I/O | | | | IC test pin 2 |

Table 9 comprises a register map of the Nova Servo/Control IC of the present invention.

TABLE 9

| Reg Addr | Register Name | Field Name | Bit(s) | Field Description |
|---|---|---|---|---|
| | | | | Signal Router Registers |
| 00h | ErrStatus | PokErrCur | 0 | Current POK error status. Reset state = 0. (r) |
| | | — | 1 | Always set to 1 (r) |
| | | — | 2 | Always set to 0 (r) |
| | | TaErrCur | 3 | Current TA error status. Reset state = 0. (r) |
| | | ShkErrCur | 4 | Current shock/environment sensor error status. Reset state = 0. (r) |
| | | ClkFltCur | 5 | Current clock loss error status. Reset state = 0. (r) |
| | | PokErrLt | 6 | Latched POK error status, cleared by read. Reset state = 1. (r) |
| | | TaErrLt | 7 | Latched TA error status, cleared by read. Reset state = 0. (r) |
| | | SgWgLt | 8 | Latched servo gate/preamp write gate overlap error status, cleared by read. Reset state = 0. (r) |
| | | ShkErrLt | 9 | Latched shock/environment sensor error status, cleared by read. Reset state = 0. (r) |
| | | ClkFltLt | 10 | Latched clock loss error status, cleared by read. Reset state = 0. (r) |
| | | PokErrCur | 11 | Current POK error status. Reset state = 0. (r) |
| 01h | ErrCtrl | TaErr | 0 | Control reporting of RwTad errors on the SsmErr signal. (w/r) 0 - inhibit (reset), 1 - enable |
| | | TaLtch | 1 | Specify which form of the TA error to report. (w/r) 0 - real-time (reset), 1 - latched |
| | | ShkErr | 2 | Control reporting of shock/environment sensor errors on the SsmErr signal. (w/r) 0 - inhibit (reset), 1 - enable |
| | | ShkLtch | 3 | Specify which form of the shock error to report. (w/r) 0 - real-time (reset), 1 - latched |
| | | PokErr | 4 | Control reporting of POK errors on the SsmErr signal. (w/r) 0 - inhibit, 1 - enable (reset) |
| | | PokLtch | 5 | Specify which form of POK to report. (w/r) 0 - real-time (reset), 1 - latched |
| | | ClkFltErr | 6 | Control reporting of clock loss errors on the SsmErr signal. (w/r) 0 - inhibit (reset), 1 - enable |
| | | ClkFltLtch | 7 | Specify which form of clock loss error to report. (w/r) 0 - real-time (reset), 1 - latched |
| | | SgWgErr | 8 | Control reporting of servo gate/preamp write gate errors on the SsmErr signal. (w/r) 0 - inhibit (reset), 1 - enable |
| | | — | 9 | <not used> |
| | | PullPrWg | 10 | Determines if occurance of SgWgErr pulls write gate to the preamp. (w/r) 0 - inhibit (reset), 1 - enable |
| | | TaPol | 11 | Controls the polarity of the RwTad input pin. (w/r) 0 - high =asserted (reset), 1 - low =asserted |
| 02h | GateCtrl | R1st | 0:1 | Enables the ability to interpret 1st RwGate pulse as read gate and subsequent pulses as write gate. Requires WgRg = 1. (w/r) 0 - all gates are write gates (reset) 1 - 1st gate [after this register is written] is read gate; rest are write gates 2 - 1st gate after SGate is read gate; rest are write gates 3 - <unused> |
| | | DlyClk | 2:3 | Determine which clock to use for delaying preamp writegate (w/r) 0 - RefClk (reset) 1 - NrzClk 2 - Se_xclk 3 - <unused> |
| | | PrRwDly | 4:9 | Number of clock cycles by which write gate to the preamp will be delayed from write gate to the read channel. Reset state = 0. (w/r) |
| | | PrWgEn | 10 | Enables the write gate signal to the preamp. Until this bit is set, the preamp's write gate pin is tri-stated. (w/r) 0 - preamp WG tristated (reset), 1 - preamp WG enabled |
| | | WgRg | 11 | Determines whether RwGate signals get routed to RwRgate or RwWgate. (w/r) 0 - Apply gate pulses to read gate (reset) 1 - Apply gate pulses to write gate |
| 03h | GatePol | RwgPol | 0 | Controls the polarity of the RwGate input pin. (w/r) 0 - high = asserted (reset), 1 - low = asserted |
| | | RwRgPol | 1 | Controls the polarity of the RwRgate output pin. (w/r) 0 - high = asserted (reset), 1 - low = asserted |
| | | RwWgPol | 2 | Controls the polarity of the RwWgate output pin. (w/r) 0 - high = asserted (reset), 1 - low = asserted |

TABLE 9-continued

| Reg Addr | Register Name | Field Name | Bit(s) | Field Description |
|---|---|---|---|---|
| | | PrRwPol | 3 | Controls the polarity of the PrRwg output pin. (w/r)<br>0 - high = asserted (reset), 1 - low = asserted |
| | | SgPol | 4 | Controls the polarity of the SGate input pin. (w/r)<br>0 - high = asserted (reset), 1 - low = asserted |
| | | SsmPol | 5 | Controls the polarity of the RwSsm input pin. (w/r)<br>0 - high = asserted (reset), 1 - low = asserted |
| | | FcomPol | 6 | Controls the polarity of the Fcom input. (w/r)<br>0 - high = asserted (reset), 1 - low = asserted |
| | | ZcrPol | 7 | Controls the polarity of the z-cross output. (w/r)<br>0 - high = asserted (reset), 1 - low = asserted |
| | | — | 8:9 | <not used> |
| | | SpDPd | 10 | Controls the pulldown on the serial port data pin, SeData. (w/r)<br>0 - Disable (reset), 1 - Enable |
| | | SpDPu | 11 | Controls the pullup on the serial port data pin, SeData. (w/r)<br>0 - Disable (reset), 1 - Enable |
| 04h | Gpio1Ctl | — | 0 | <not used> |
| | | Gp1Out | 1 | Controls the state of the Gpio1 pin when it is an output. Reset state = 0. (w/r) |
| | | Gp1In | 2 | Reads the current state of the Gpio1 pin (r) |
| | | Gp1Pd | 3 | Controls the pulldown on the Gpio1 pin (w/r)<br>0 - Disable, 1 - Enable (reset) |
| | | Gp1Pu | 4 | Controls the pullup on the Gpio1 pin (w/r)<br>0 - Disable (reset), 1 - Enable |
| | | Gp1Io | 5 | Configures the mode of the Gpio1 pin (w/r)<br>0 - pin is input (reset), 1 - pin is output |
| | | PrSpIn | 6 | Determines the state of the preamp serial port pins while they are inactive. (w/r)<br>0 - High-Z (reset), 1 - Active low |
| | | — | 7 | <not used> |
| | | RwTadPd | 8 | Controls the pulldown on the RwTad pin. (w/r)<br>0 - Disable, 1 - Enable (reset) |
| | | PwTadPu | 9 | Controls the pullup on the RwTad pin. (w/r)<br>0 - Disable (reset), 1 - Enable |
| | | RwSdataPd | 10 | Controls the pulldown on the RwSdata pin. (w/r)<br>0 - Disable, 1 - Enable (reset) |
| | | RwSdataPu | 11 | Controls the pullup on the RwSdata pin. (w/r)<br>0 - Disable (reset), 1 - Enable |
| 05h | Gpio2Ctl | Gp2Mode | 0 | Controls whether the Gpio2 pin is RefClk output or Se_xclk input. (w/r)<br>0 - Se_xclk input (reset), 1 - RefClk output |
| | | Gp2Out | 1 | Controls the state of the Gpio2 pin when it is an output. (w/r) |
| | | Gp2In | 2 | Reads the current state of the Gpio2 pin (r) |
| | | Gp2Pd | 3 | Controls the pulldown on the Gpio2 pin (w/r)<br>0 - Disable, 1 - Enable (reset) |
| | | Gp2Pu | 4 | Controls the pullup on the Gpio2 pin (w/r)<br>0 - Disable (reset), 1 - Enable |
| | | Gp2Io | 5 | Configures the mode of the Gpio2 pin (w/r)<br>0 - pin is input (reset), 1 - pin is output |
| | | — | 6:11 | <not used> |
| 06h | Gpio3Ctl | — | 0 | <not used> |
| | | Gp3Out | 1 | Controls the state of the Gpio3 pin when it is an output. (w/r) |
| | | Gp3In | 2 | Reads the current state of the Gpio3 pin (r) |
| | | Gp3Pd | 3 | Controls the pulldown on the Gpio3 pin (w/r)<br>0 - Disable, 1 - Enable (reset) |
| | | Gp3Pu | 4 | Controls the pullup on the Gpio3 pin (w/r)<br>0 - Disable (reset), 1 - Enable |
| | | Gp3Io | 5 | Configures the mode of the Gpio3 pin (w/r)<br>0 - pin is input (reset), 1 - pin is output |
| | | — | 6:7 | <not used> |
| | | RwSsmPd | 8 | Controls the pulldown on the RwSsm pin. (w/r)<br>0 - Disable (reset), 1 - Enable |
| | | RwSsmPu | 9 | Controls the pullup on the RwSsm pin. (w/r)<br>0 - Disable (reset), 1 - Enable |
| | | PrSdataPd | 10 | Controls the pulldown on the PrSdata pin. (w/r)<br>0 - Disable (reset), 1 - Enable |
| | | PrSdataPu | 11 | Controls the pullup on the PrSdata pin. (w/r)<br>0 - Disable (reset), 1 - Enable |
| 07h | PrSctl | PsDur | 0:4 | Preamp serial select pulse duration. Reset state = 0. (w/r) |
| | | PsHlen | 5:9 | Preamp serial header length. Reset state = 0. (w/r) |
| | | PsPol | 10 | Preamp serial select pulse polarity. (w/r)<br>0 - high = asserted (reset), 1 - low = asserted |
| | | PcPol | 11 | Preamp serial clock polarity. (w/r)<br>0 - high = asserted (reset), 1 - low = asserted |
| 08h | RwSctl1 | RsDur1 | 0:4 | Channel serial select pulse #1 duration. Reset state = 0. (w/r) |
| | | RsHlen1 | 5:9 | Channel serial header #1 length. Reset state = 0. (w/r) |

TABLE 9-continued

| Reg Addr | Register Name | Field Name | Field Bit(s) | Description |
|---|---|---|---|---|
| | | RsPol | 10 | Channel serial select pulse #1 polarity. (w/r)<br>0 - high = asserted (reset), 1 - low = asserted |
| | | RcPol | 11 | Channel serial clock #1 polarity. (w/r)<br>0 - high = asserted (reset), 1 - low = asserted |
| 09h | RwSctl2 | RsDur2 | 0:4 | Channel serial select pulse #2 duration. Reset state = 0. (w/r) |
| | | RsHlen2 | 5:9 | Channel serial header #2 length. Reset state = 0. (w/r) |
| | | — | 10:11 | <not used> |
| 0Ah | PdCtrl | PdCur | 0 | Reads the current the state of the PrkDet pin. (r)<br>0 - Park detect switch is open<br>1 - Park detect switch is closed |
| | | PdLtch | 1 | Latched state of the PdCur bit. Cleared by a read. (r)<br>0 - PdCur has not be set since the last read.<br>1 - PdCur has been set since the last read. |
| | | PdBounce | 2 | Indicates that the switch opened after being closed. Cleared by a read. (r) |
| | | PdPuEn | 3 | Controls the pullup on the PrkDet pin. (w/r)<br>0 - pullup disabled<br>1 - Pullup enabled (reset) |
| | | — | 4:7 | <not used> |
| | | Tst | 8:10 | Test mode. Reset state = 0. (w/r)<br>0–4, 6–7 - Unused<br>5 - Speeds up the shock fault counter so that it increments by 40 instead of 1. |
| | | — | 11 | <not used> |
| 0Bh | Gpio4Ctl | Gp4Mode | 0 | Controls whether the Fcom pin is configured as Gpio4 or Fcom. (w/r)<br>0 - Gpio4 (reset), 1 - Fcom |
| | | Gp4Out | 1 | Controls the state of the Fcom pin when it is configured as a Gpio4 output. (w/r) |
| | | Gp4In | 2 | Reads the current state of the Fcom pin when it is configured as a Gpio4 input. (r) |
| | | Gp4Pd | 3 | Controls the pulldown on the Fcom pin. (w/r)<br>0 - Disable (reset), 1 - Enable |
| | | Gp4Pu | 4 | Controls the pullup on the Fcom pin. (w/r)<br>0 - Disable (reset), 1 - Enable |
| | | Gp4Io | 5 | When Fcom pin is configured to be Gpio4, this bit determines if the pin is an input or an output. (w/r)<br>0 - pin is input (reset), 1 - pin is output |
| | | FcomCtl | 6 | When the Gp4Mode = 0, this bit can be used to control the state of the Comm output. |
| | | — | 7:11 | <not used> |
| 0Ch | Gpio5Ctl | Gp5Mode | 0 | Controls whether the Zcross pin is configured as Gpio5 or Zcross. (w/r)<br>0 - Gpio5 (reset), 1 - Zcross |
| | | Gp5Out | 1 | Controls the state of the Zcross pin when it is configured as a Gpio5 output. (w/r) |
| | | Gp5In | 2 | Reads the current state of the Zcross pin when it is configured as a Gpio5 input. (r) |
| | | Gp5Pd | 3 | Controls the pulldown on the Zcross pin. (w/r)<br>0 - Disable (reset), 1 - Enable |
| | | Gp5Pu | 4 | Controls the pullup on the Zcross pin. (w/r)<br>0 - Disable (reset), 1 - Enable |
| | | Gp5Io | 5 | When Zcross pin is configured to be Gpio5, this bit determines if the pin is an input or an output. (w/r)<br>0 - pin is input (reset), 1 - pin is output |
| | | Zcross | 6 | Reflects the state of the Zcross pin when it is configured to output the zero crossing signal. (r) |
| | | — | 7:11 | <not used> |
| 0Dh | ShkFilter | ShkFilt | 0:11 | Establishes duration that shock sensor input pulse must be before it is treated as a shock error (w/r). Reset state = 0. |
| 0Eh, 0Fh | | | | Reserved signal router registers. |
| | | | | Analog section registers |
| 20h | TimingCfg | TimeAwake | 0 | Enable timing control system. (w/r) |
| | | RefCkSel | 1 | SeClock Divider Option. (w/r)<br>0 - Pass Through<br>1 - Divide by 2 |
| | | ComRfCk | 2:3 | Commutation Delay Clock. (w/r)<br>0 - ComRfCk = 10 Mhz<br>1 - ComRefCk = 5 Mhz<br>2 - ComRfCk = 2.5 Mhz<br>3 - ComRfCk = 1.25 Mhz |
| | | BlkDly | 4:5 | Commutation Blanking Delay. (w/r)<br>0 - 8<br>1 - 64 |

TABLE 9-continued

| Reg Addr | Register Name | Field Name | Field Bit(s) | Description |
|---|---|---|---|---|
| | | | | 2 - 512 |
| | | | | 3 - 1024 |
| | | DlyPhase | 6 | Commutation Delay Phase. (w/r) |
| | | — | 7 | <not used> |
| | | TstAdr | 8:9 | Select test mux output. (w/r) |
| | | | | 0 - Vtst1 = Fcom, Vtst2 = Blanking |
| | | | | 1 - Vtst1 = ComRefClk (commutation reference clock), Vtst2 = EnaDlyCnt (count enable for the commutation reference clock) |
| | | EnaTst1 | 10 | Enables the test mux output to the Vtst1 bus. (w/r) |
| | | EnaTst2 | 11 | Enables the test mux output to the Vtst2 bus. (w/r) |
| 21h | PmgCfg | PmgAwake | 0 | Enable PMG. (w/r) |
| | | EnaV3p3 | 1 | Enable 3.3 Volt Switch. (w/r) |
| | | EnaClkDet | 2 | Enable Loss of Clock Detector. (w/r) |
| | | Retract | 3:5 | BandGap Voltage Supplied to Vcm Ckt. (w/r) |
| | | | | 0 - 0.15 |
| | | | | 1 - 0.19 |
| | | | | 2 - 0.22 |
| | | | | 3 - 0.26 |
| | | | | 4 - 0.30 |
| | | | | 5 - 0.33 |
| | | | | 6 - 0.37 |
| | | | | 7 - 0.40 |
| | | ClrRetLch | 6 | Clear The Vcm Retract latch. (w/r) |
| | | TestCode1 | 7 | Do Not Clear SIO and Register on Vcc Fault. (w/r) |
| | | TstAdr | 8:9 | Select test mux output. (w/r) |
| | | | | 0 - Vtst1 = Vtemp, Vtst2 = VrefBuf |
| | | | | 1 - Vtst1 = Vmrf, Vtst2 = gnd |
| | | | | 2 - Vtst1 = gnd, Vtst2 = gnd |
| | | | | 3 - Vtst1 = Iref, Vtst2 = Iref_ ups |
| | | EnaTst1 | 10 | Enables the test mux output to the Vtst1 bus. (w/r) |
| | | EnaTst2 | 11 | Enables the test mux output to the Vtst2 bus. (w/r) |
| 22h | SwxcCfg | SwxAwake | 0 | Enable Bias and Clock Logic. (w/r) |
| | | Mode | 1:2 | Mode. (w/r) |
| | | | | 0 - Disable |
| | | | | 1 - 2X Boost Mode, Charge Cret |
| | | | | 2 - Enable Vneg, 2X Boost Mode at Duty Cycle |
| | | | | 3 - Enable Vneg, 3X Boost Mode at Ducty Cycle |
| | | CkSel | 3:4 | Clock select. (w/r) |
| | | | | 0 - Fcycle = RefClk/8 |
| | | | | 1 - Fcycle = (RefClk/16 |
| | | | | 2 - Not Implemented, Place Holder |
| | | | | 3 - Not Implemented, Place Holder |
| | | DcSel | 5:6 | Duty cycle select. (w/r) |
| | | | | 0 - Boost/Neg Duty Cycle = .016(1/64) |
| | | | | 1 - Boost/Neg Duty Cycle = .031(1/32) |
| | | | | 2 - Boost/Neg Duty Cycle = .0625(1/16) |
| | | | | 3 - Boost/Neg Duty Cycle = .5 |
| | | EnaVee | 7 | Enable - .55 Volt Regulator. (w/r) |
| | | TstAdr | 8:9 | Select test mux output. (w/r) |
| | | | | 0 - Vtst1 = phck, Vtst2 = phase1 |
| | | | | 1 - Vtst1 = phck, Vtst2 = phase2 |
| | | | | 2 - Vtst1 = phase1, Vtst2 = edc |
| | | | | 3 - Vtst1 = pmp, Vtst2 = dmp |
| | | EnaTst1 | 10 | Enables the test mux output to the Vtst1 bus. (w/r) |
| | | EnaTst2 | 11 | Enables the test mux output to the Vtst2 bus. (w/r) |
| 23h | VcmCfg | VcmMode | 0:1 | Controls VCM mode. (w/r) |
| | | | | 0 - VCM disabled (default) |
| | | | | 1 - Calibration mode |
| | | | | 2 - Operational - internal Rcmp gain option |
| | | | | 3 - Operational - external Rcmp option |
| | | VcmIr | 2 | Actuator current sense gain option (w/r) |
| | | — | 3 | <not used> |
| | | Rcmp | 4:5 | Resistance added to feedback path in VCM compensation loop. (w/r) |
| | | | | 0 - 1K (default), 1 - 20K, 2 - 40K, 3 - 80K |
| | | VcmTrk | 6:7 | Controls gain of VCM tracking DAC. (w/r) |
| | | TstAdr | 8:9 | Controls what signals get routed to the Tst pins. (w/r) |
| | | | | 0 - Vtst1 = Vis_ a1 (default), Vtst2 = ViVcm |
| | | | | 1 - Vtst1 = VdacOff, Vtst2 = VdacTrk |
| | | | | 2 - Vtst1 = VcmRef_ b, Vtst2 = VcmRef |
| | | | | 3 - Vtst1 = VcmCmpo, Vtst2 = VdacDth |
| | | EnaTst1 | 10 | Enables the test mux output to the Vtst1 bus. (w/r) |
| | | EnaTst2 | 11 | Enables the test mux output to the Vtst2 bus. (w/r) |
| 24h | SpnCfg | SpnAwk | 0 | Enable bias controls. (w/r) |
| | | | | 0 - disable (default), 1 - enable |
| | | SpnEna | 1 | Enable commutation. (w/r) |

TABLE 9-continued

| Reg Addr | Register Name | Field Name | Field Bit(s) | Description |
|---|---|---|---|---|
| | | | | 0 - disable (default), 1 - enable |
| | | SpnSlew | 2:3 | Slew rate control. (w/r) |
| | | | | 0 - .3 ua |
| | | | | 1 - .8 ua |
| | | | | 2 - 1.3 ua |
| | | | | 3 - 1.8 ua |
| | | SpnTrk | 4 | Control the gain range of the tracking DAC. (w/r) |
| | | | | 0 - ¼ full range (default), 1 - 1/64 full range |
| | | SpnIr | 5 | Current range. (w/r) |
| | | ComSel | 6:7 | Selects commutation mode. (w/r) |
| | | | | 0 - Manual, Software control via register |
| | | | | 1 - Automatic, Commutation from Commutation Delay Circuit |
| | | | | 2 - External, Commutation from Fcom Device Pin |
| | | | | 3 - <not used> |
| | | TstAdr | 8:9 | Controls what signals get routed to the Tst pins. (w/r) |
| | | | | 0 - Vtst1 = Vdacoff, Vtst2 = Vdactrk (default) |
| | | | | 1 - Vtst1 = Vic, Vtst2 = Vif |
| | | | | 2 - Vtst1 = Vudf, Vtst2 = Vudf_a1 |
| | | | | 3 - Vtst1 = Vis, Vtst2 = VspnRef |
| | | EnaTst1 | 10 | Enables the test mux output to the Vtst1 bus. (w/r) |
| | | EnaTst2 | 11 | Enables the test mux output to the Vtst2 bus. (w/r) |
| 25h | DacSysCfg | DacAwake | 0 | Enable Analog Electronics. (w/r) |
| | | DiEna | 1 | Enable Dac Multiplexing. (w/r) |
| | | | | 0 - System is reset in state 0, |
| | | | | 1 - System Enabled |
| | | DiMode | 2 | Dithering Dac Mode. (w/r) |
| | | | | 0 - Free Running according to timer registers |
| | | | | 1 - One Shot Mode |
| | | TdPri | 3 | VcmDacTrk Priority mode. (w/r) |
| | | | | 0 - Normal Cycles |
| | | | | 1 - Next state after writing the VcmDacTrk is state 0 |
| | | CkSel | 4 | Clock select. (w/r) |
| | | | | 0 - Select RefClk = PhaseClk |
| | | | | 1 - Select RefClk/2 = PhaseClk |
| | | — | 5:7 | <not used> |
| | | TstAdr | 8:9 | Controls what signals get routed to the Tst pins. (w/r) |
| | | | | 0 - Vtst1 = Vdac, Vtst2 = Slot0 |
| | | | | 1 - Vtst1 = Vdac, Vtst2 = Slot5 |
| | | | | 2 - Vtst1 = VdacFs, Vtst2 = Vref |
| | | | | 3 - Vtst1 = VdacHs, Vtst2 = Avss |
| | | EnaTst1 | 10 | Enables the test mux output to the Vtst1 bus. (w/r) |
| | | EnaTst2 | 11 | Enables the test mux output to the Vtst2 bus. (w/r) |
| 26h | SpnCom | | | Writes to this register force spin motor commutations to occur when in the manual commutation mode. (w) |
| 27h | ShkCfg | SsAwake | 0 | Enable Shock Bias. (w/r) |
| | | SsEna | 1 | Enable Shock Sensor. (w/r) |
| | | | 2 | <not used> |
| | | SsVt | 3:4 | Shock High Threshold. (w/r) |
| | | SsRcal | 5:7 | Vcm Bemf resistor Cal. (w/r) |
| | | | | 0 - Ract = 13, 7 - Ract = 22 |
| | | TstAdr | 8:9 | Controls what signals get routed to the Tst pins. (w/r) |
| | | | | 0 - Vtst1 = ViVcm, Vtst2 = VcmVref |
| | | | | 1 - Vtst1 = SchDet, Vtst2 = Venv |
| | | | | 2 - Vtst1 = Avss, Vtst2 = Va1 |
| | | | | 3 - Vtst1 = TrkAuxDac, Vtst2 = VdacAux |
| | | EnaTst1 | 10 | Enables the test mux output to the Vtst1 bus. (w/r) |
| | | EnaTst2 | 11 | Enables the test mux output to the Vtst2 bus. (w/r) |
| 28h | VcmTrkDac | D | 0:9 | VCM Tracking DAC. Default = 0. (w/r) |
| | | DacRng | 10:11 | VCM Tracking DAC range. Default = 0. (w/r) |
| 29h | VcmOffDac | D | 0:9 | VCM Offset DAC. Default = 0. (w/r) |
| | | DacRng | 10:11 | VCM Offset DAC range. Default = 0. (w/r) |
| 2Ah | VcmDthDac1 | D | 0:9 | VCM Dither DAC 1. Default = 0. (w/r) |
| | | DacRng | 10:11 | VCM Dither DAC 1 range. Default = 0. (w/r) |
| 2Bh | VcmDthDac2 | D | 0:9 | VCM Dither DAC 2. Default = 0. (w/r) |
| | | DacRng | 10:11 | VCM Dither DAC 2 range. Default = 0. (w/r) |
| 2Ch | VcmDthDac3 | D | 0:9 | VCM Dither DAC 3. Default = 0. (w/r) |
| | | DacRng | 10:11 | VCM Dither DAC 3 range. Default = 0. (w/r) |
| 2Dh | VcmDthDac4 | D | 0:9 | VCM Dither DAC 4. Default = 0. (w/r) |
| | | DacRng | 10:11 | VCM Dither DAC 4 range. Default = 0. (w/r) |
| 2Eh | SpnTrkDac | D | 0:9 | Spin Tracking DAC. Default = 0. (w/r) |
| | | DacRng | 10:11 | Spin Tracking DAC range. Default = 0. (w/r) |
| 2Fh | SpnOffDac | D | 0:9 | Spin Offset DAC. Default = 0. (w/r) |
| | | DacRng | 10:11 | Spin Offset DAC range. Default = 0. (w/r) |
| 30h | VcmTdth1-2 | Tdth1 | 0:5 | Dither time 1. (w/r) |
| | | Tdth2 | 6:11 | Dither time 2. (w/r) |
| 31h | VcmTdth3-4 | Tdth3 | 0:5 | Dither time 3. (w/r) |

TABLE 9-continued

| Reg Addr | Register Name | Field Name | Field Bit(s) | Description |
|---|---|---|---|---|
| | | Tdth4 | 6:11 | Dither time 4. (w/r) |
| 32h | VdacAux | D | 0:9 | Auxilliary DAC. Default = 0. (w/r) |
| | | DacRng | 10:11 | Auxilliary DAC range. Default = 0. (w/r) |
| 33h | SpnComDly | D | 0:11 | Commutation delay. (w/r) |
| 34h | AdcSysCfg | AdcAwake | 0 | Enable Adc System. (w/r) |
| | | AdcCh | 1 | Adc Channel Conversion. (w/r) |
| | | | | 0 - VTST1 |
| | | | | 1 - VTST2 |
| | | DacRng | 2:3 | Adc Dac Range Select. (w/r) |
| | | AdcClkSel | 4:5 | Adc Clock Frequency Select. (w/r) |
| | | EnaTstPin1 | 6 | Connect Tst1 pin to Vtst2. (w/r) |
| | | EnaTstPin2 | 7 | Connect Tst2 pin to Vtst1. (w/r) |
| | | TstAdr | 8:9 | Controls what signals get routed to the Tst pins. (w/r) |
| | | | | 0 - Vtst1 = AdcClk, Vtst2 = BUSY |
| | | | | 1 - Vtst1 = AdcClk, Vtst2 = EOC |
| | | | | 2 - Vtst1 = AdcClk, Vtst2 = COMPARE |
| | | | | 3 - Vtst1 = AdcClk, Vtst2 = SAMPLE |
| | | EnaTst1 | 10 | Enables the test mux output to the Vtst1 bus. (w/r) |
| | | EnaTst2 | 11 | Enables the test mux output to the Vtst2 bus. (w/r) |
| 35h | AdcRead | D | 0:9 | Data from Adc. (r) |
| | | DataValid | 10 | Indicates that the conversion is complete. (r) |
| | | Busy | 11 | Indicates that the conversion is in progress. (r) |

Serial communications between the host and Nova chip take place using the RefClk and the SeData pins. The clock runs continuously as it is shared with the read channel's REFCLK input. Data is asserted onto the SeData pin and must be done so synchronously with the RefClk signal. Note that this is a requirement on the host. All serial communications are initiated by the host. Table 10 shows the general format of the serial communications with the Nova.

TABLE 10

| Mark | Device Select | R/Wb | Header | Data |
|---|---|---|---|---|
| | | | Packet Field | |

All bits are valid on the rising edges of the RefClk signal.

Mark

Since there is no separate "enable" or "select" signal, all serial transactions begin with a single Mark bit. It is defined by the assertion of a "1" on the SeData line.

Device Select (DS)

After the Mark bit, the next two bits, Device Select, determine which device is being communicated with by the host. The signal router interprets this field as shown in Table 11.

TABLE 11

| Device Select | Device chosen to communicate with |
|---|---|
| 0 | Nova registers |
| 1 | Preamp |
| 2 | Read channel (length A) |
| 3 | Read channel (length B) |

If the selected device is an external chip (read channel or preamp), the appropriate select line for that device (RwSden or PrSden) will be asserted and the data bits passed though the appropriate interface (RwSdata or PrSdata). The clock signal to the channel or preamp (RwSclk or PrSclk) will only be active when a serial transaction is in progress.

R/Wb

The R/Wb bit indicates the format of the Packet Field to follow.

During a write transaction (R/Wb=0), the entire Packet Field is sent to the target.

During a read transaction (R/Wb=1), only the Header portion of the Packet Field is sent to the target. The remainder of the Packet Field is supplied by the target. Nova must know the Data portion length so the bi-directional data pin can change from write to read mode. Nova contains configuration registers for Packet Field length and Header portion length (see discussion below).

The select line (RwSden or PrSden) for the selected external chip is asserted at the beginning of the R/Wb field to allow one clock of setup on the target device. The external chip's select line is deasserted when the pre-programmed number of clock cycles for that device has elapsed (see discussion below).

Packet Field

Only the bits in the Packet field are presented to the selected device; the target never sees the Mark, Device Select or R/Wb bits.

The number of bits in the Packet field depends upon the Device Select setting. The number of bits for the case of Nova being selected (DS=0) is fixed. The number of bits transferred when an external chip is selected is determined by the Packet Field Duration and Header Length registers for the selected device. There is a separate pair of Packet Field Duration and Header Length registers for each non-Nova device. The Packet Field Duration is the total number of data bits to transfer for the serial transaction. The Header Length register is always smaller than the Packet Field Duration and indicates how much of the packet is allocated to header bits. The Header Length register indicates where in the Packet Field the direction should change from write to read during serial read transactions. The programmable number of bits to be transferred should be established prior to attempting communications with those devices.

For the preamp (DS=1) the Packet Field Duration register is PsDur and the Header Length register is PsHlen. The polarity of the PrSden signal is controlled by the setting of the PsPol bit. The polarity of the PrSclk signal is controlled by the setting of the PcPol bit.

The state of the serial interface pins to the preamp while the preamp is not being communicated with is programmable. The PrSpIn register specifies the behavior. While inactive, these pins can either be put into a high-z state or asserted active low.

There are two device select settings that result in communications with the read channel (DS=2 and DS=3). An example of how these two can be used is for one of the device selects to be set up for accessing 8 bit wide registers and to have the other device select set up for accessing 12 bit wide registers. The Packet Field Duration registers are RsDur1 and RsDur2. The Header Length registers are RsHlen1 and RsHlen2. The polarity of the RwSden signal is controlled by the setting of the RsPol bit. The polarity of the RwSclk signal is controlled by the setting of the RcPol bit.

The host is responsible for data bit setup and hold relative to the clock for the target device. For example, if the host has a rising clock edge in the middle of a bit window, but the target has an inverted clock, a setup or hold issue could occur. The host should have the capability to align the clock and data so the target then sees its active clock edge in the middle of the bit window.

Figure 40:
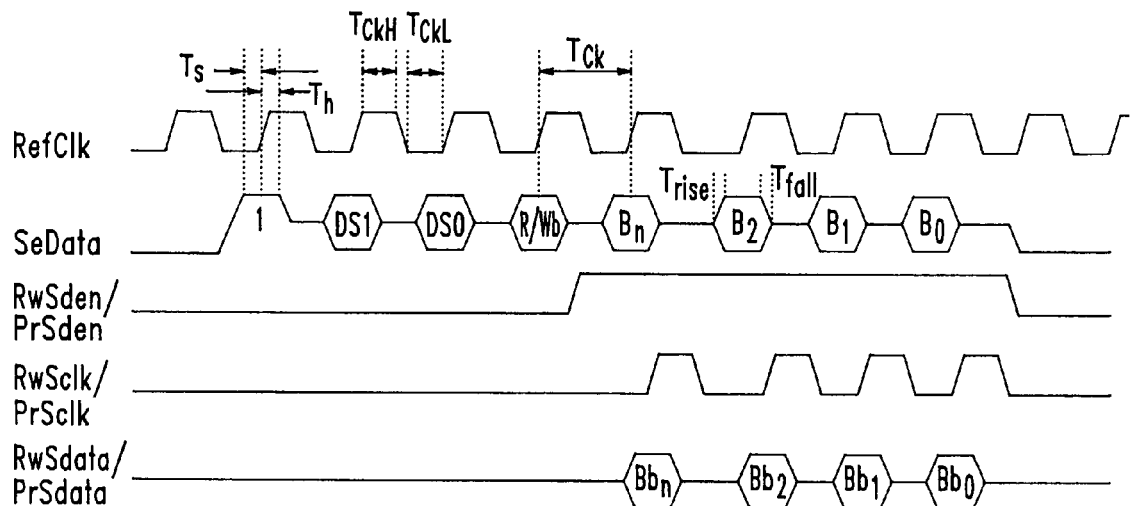
FIG. 40 is a timing diagram illustrating the highly advantageous serial protocol of the present invention

FIG. 40 is a timing diagram for the highly advantageous serial interface of the present invention, using the serial protocol of Table 10 while Table 12 defines the various parameters that are designated.

TABLE 12

| Parameter | Conditions 0° C. to 70° C. min | typ | max | Units |
|---|---|---|---|---|
| $T_s$, setup time | 2.6 | 2.75 | 2.9 | ns |
| $T_h$, hold time | | 10 | | ns |
| $T_{CkH}$, clock high time | | | | ns |
| $T_{CkL}$, clock low time | 3.9 | 4.15 | 4.4 | ns |
| $1/T_{Ck}$, clock frequency | 10 | | 40 | MHz |
| $T_{rise}$, read bit rise time | 8 | 8.5 | 9 | ns |
| $T_{fall}$, read bit fall time | | 50 | | ns |

Serial Interface to Nova Registers

When the device select field is set to select the Nova chip, then the data bits following the device select have the format specified by Table 13.

TABLE 13

| Addr | R/W | Data |
|---|---|---|
| 5 4 3 2 1 0 | 0 | 11 10 9 8 7 6 5 4 3 2 1 0 |

A six bit address field (allows direct addressing of up to 64 registers) is used with one R/W bit followed by a twelve bit data field.

SGate is the servo gate input. This same signal is normally routed directly to the read channel.

The polarity of the SGate input is controlled by the setting of the SgPol bit.

The RwGate pin is used to control the assertion of the read channel's RwRgate and RwWgate pins and the preamp's PrRwg pin.

Read Channel

If the WgRg bit is cleared, then RwGate is used as the read gate and is simply passed through to the RwRgate pin.

If the WgRg bit is set, then the usage of the RwGate signal can be affected by the setting of the R1st field. If R1st=0 then RwGate is used as the write gate and is simply passed through to the RwWgate pin.

If R1st=1, the first assertion of RwGate is applied to the RwRgate pin and then all subsequent assertions are applied to the RwWgate pin. The purpose of this system is to allow a single data sector to be read (to obtain, for example, repeatable runout correction data) and then all subsequent sectors to be written.

If R1st=2, the first assertion of RwGate is applied to the RwRgate pin and then subsequent assertions are applied to the RwWgate pin until SGate is asserted, which resets the entire process. The purpose of this system is to allow the first data sector of each servo wedge to be read and the other sectors in the servo wedge to be written.

The polarity of the RwRgate pin is controlled by the setting of the RwRgPol bit and the polarity of the RwWgate pin is controlled by the setting of the RwWgPol bit.

Preamp

While the read channel's write gate signal is deasserted, the preamp's PrRwg signal is kept so that the preamp is held in the read mode.

When the read channel's write gate gets asserted, the preamp's PrRwg signal transitions to put the preamp into write mode. The timing of the transition can be so that PrRwg is identical to the read channel's RwWgate signal or it can be a delayed version of that signal. The amount of the delay is controlled by the setting of the PrRwDly register. A setting of zero corresponds to no delay. If PrRwDly has a nonzero setting, the PrRwg assertion is delayed by the number of clock ticks specified. The clock used is determined by the setting of the DlyClk bit. If it is cleared, the RefClk is used. If it is set, the NrzClk is used.

If the assertion of the PrRwg signal is delayed so long that it is still asserted when the servo gate (SGate) signal gets asserted, PrRwg will be forced into a deasserted state and an error condition will be flagged. The error condition flag is SgWgErr.

The PullPrWg bit allows assertion of SgWgErr to pull write gate to the preamp.

The polarity of the PrRwg pin is controlled by the setting of the PrRwPol bit.

SsmErr

The SsmErr pin has two modes of operation. The active mode depends upon the state of the SGate (servo gate) pin. It is always an output from Nova to the host.

Sync Mode

While SGate is asserted, the SsmErr pin is in the sync mode. It passes through the signal received from the read channel on the RwSsm pin. The polarity of the RwSsm input is determined by the setting of the SsmPol bit.

Error Mode

While SGate is deasserted, the SsmErr pin is in the error mode and is used to signal error conditions to the host.

The following is a list of events that can generate an error condition:
1. Assertion of the RwTad pin (thermal asperity detection) by the read channel.
2. Servo gate asserted while the preamp write gate was still asserted (available only in latched form).
3. Detection of an event from the VCM shock/environment sensor.

4. Detection of clock loss.
5. Power fault (POK deasserted).

Whether or not a particular error source is enabled is selected by the setting of that source's enable bit in the ErrCtrl register. Furthermore, most error signals can be applied to SsmErr in either their real-time form or latched form. This is controlled by bits in the ErrCtrl register that individually correspond to each error source. If the latched form is chosen, SsmErr remains asserted until the ErrStatus register is read, clearing the latched bit and deasserting SsmErr. The latching circuits are level sensitive so, if the error condition is active at the time the latched bit is read, that bit will remain set. The ErrStatus register contains bits that indicate both the real-time and latched status of each error source.

If an error occurs while SGate is asserted, the condition is not reflected on the SsmErr pin until after SvGate has been deasserted. If a real-time error signal is selected and the error condition asserts and subsequently deasserts—all while servo gate is asserted, the error is never signaled on SsmErr.

All enabled error sources are ORed together on the SsmErr signal. The host must look at the ErrStatus register to determine which error condition(s) occurred.

The power-on default is for the real-time POK error to be the only one enabled.

GPIO Pins

The GPIO pins are highly configurable pins that can be used as inputs or outputs. They can optionally be configured to have a pullup, a pulldown or neither. Several pins have additional, alternate functions.

The Gpio1 pin has no function other than Gpio1.

Gpio2 cannot really be used as a GPIO pin. The analog portion of the Nova chip gets its clock from this pin. It must be either be configured so that it drives RefClk as an output or as in input with a clock applied to the pin. The configuration of the Gpio2 pin is controlled by the Gp2Mode register.

The Gpio3 pin has no function other than Gpio3.

Gpio4 is an alternate function that the Fcom pin can be used for. The configuration of the Fcom pin is controlled by the Gp4Mode register.

Gpio5 is an alternate function that the Zcross pin can be used for. The configuration of the Zcross pin is controlled by the Gp5Mode register.

Voltage Monitor

The POK (Power OK) signal from Nova is an indication that the 3.3 volt supply has risen above its threshold voltages plus the hysteresis voltage, and has remained above its threshold voltages plus the hysteresis voltage, for a specified time period. The POK signal in the high state indicates that the power supply is ready. The Nova chip will monitor the 3.3 volt supply by internally dividing the supply down to its threshold level. Once POK is high, if the power supply goes below its threshold voltage, the POK signal will go to its low state, which will reset the Nova chip. The POK signal is an open drain with a 10K internal pull-up resistor.

In the absence of a capacitor connected to the Cpok pin, the time delay from when power is good to when the POK signal is asserted is fixed by Nova. When a capacitor is connected to the Cpok pin, the delay is extended. The duration of the extension is determined by the size of the capacitor used. The capacitor is charged with a fixed current. POK is asserted after the voltage on the capacitor has reached the threshold level.

If no external Cpok capacitor is being used, the pin should not be connected to anything.

When POK is deasserted, an autoretract is triggered. After POK has deasserted, all registers will be to their power-on default settings. POK deassertion asserts the POK error condition. Table 15 recites various parameters relating to Power OK.

TABLE 15

| Parameter | Conditions 0° C. to 70° C. | min | typ | max | Units |
|---|---|---|---|---|---|
| 3.3 V POK threshold | | 2.6 | 2.75 | 2.9 | V |
| 3.3 V POK hysteresis | | | 10 | | mV |
| POK delay (Cpok open) | | | 1 ms | | |
| POK pull-up resistor | | | 10 | | Kohms |
| POK output low voltage | Ipok = 7 mA | | | TBD | V |
| POK output high voltage | Ipok = 1 uA | TBD | | | V |
| POK rise time (10% to 90%) | POK pin to gnd capacitance = 40 pf | | | 1 | μsec |
| Cpok charging current (Ipok) | | 3.6 | 4.5 | 5.4 | μA |
| Tpok coefficient (Kpok) | | 1.125 | 1.5 | 1.875 | |

Notes:
1. POK Delay - length of time that POK stays low after Vcc is valid (above threshold)
2. Tpok = Kpok * Cpok/Ipok Thermal Monitoring Nova also has an internal temperature sensor (diode) that can be used to monitor the junction temperature of the chip. The internal temperature diode is connected to the ADC. The signal is converted when the Vtempi register is read. Vtempi has a typical room temperature (25 deg C.) voltage of TBD volts and an approximate temperature coefficient of −7.4 mV/deg C.

Regulators

While this version of Nova (Nova 330) does not include a 3.3V regulator, the Nova supports the implementation of a switchable 3.3V power supply for use by external chips (read channel and preamp). There is a choice of two different implementations.

First, there is an internal switch. When the internal switch is used, the switchable 3.3V supply for the external chips is provided on the V3p3*a* and V3p3*b* pins. The state of the switch is controlled by the setting of the 3p3Sw bit in the serial registers.

Alternatively, if a switch with even lower Rdson is required, Nova can be configured to control an external switch. If an external switch is used, it is controlled with the G3p3 pin. The 3p3Sw bit is used to control the state of the external switch. See Table 16.

TABLE 16

| Parameter | Conditions 0° C. to 70° C. | min | typ | max | Units |
|---|---|---|---|---|---|
| Rdson or internal 3.3 V switch FET | I$_{switch}$ = 300 mA | | 0.2 | 0.3 | ohms |

The Nova chip provides a −0.55 volt output. A bit, EnaVee, allows this regulator to be disabled.

Single DAC System

Although there are multiple DAC registers that can be written, the Nova performs all conversions with a single DAC. The DAC cycles through each of the DAC registers performing a conversion on each one at a time.

In most cases, the Nova functionally appears to have separate DACs for each DAC register, and the true nature of the single DAC architecture is of no consequence to the application. Discussion in the spec may suggest that there are individual, separate DACs. The fact that there is no discrete DAC for each DAC register will not normally be pointed out.

The main operational difference that will occur in this system (vs. a system with a separate DAC for each register) is that there may be some delay between the time that a DAC register is written and the time that the conversion begins. This delay will vary depending upon where in the conversion sequence the DAC is at the time the register is written. The maximum amount of the delay depends upon the RefClk frequency.

VCM Driver

Figure 41:
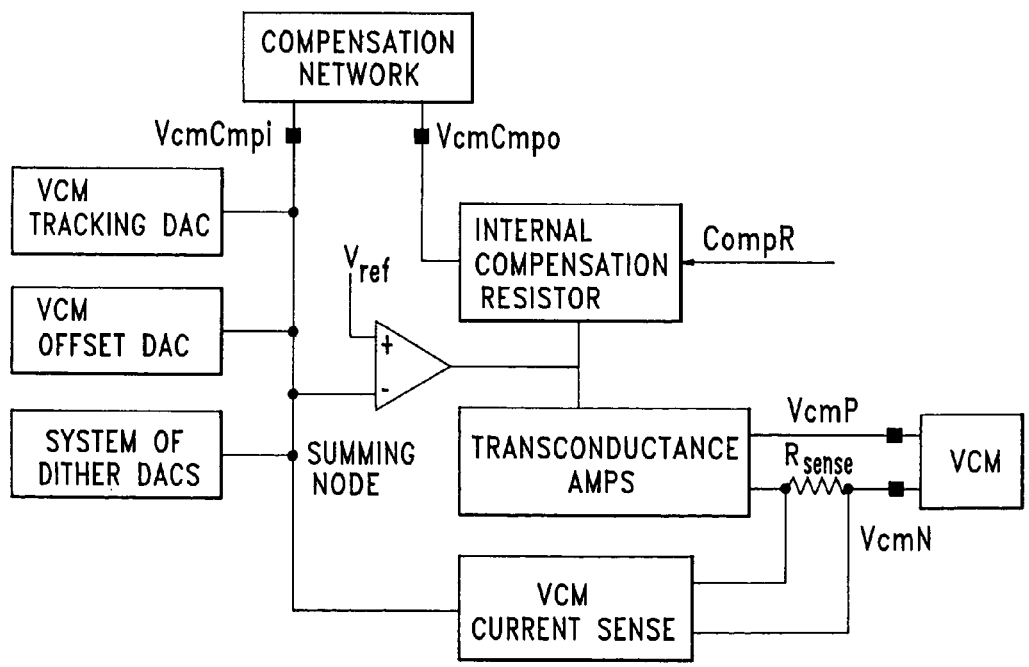
FIG. 41 is a block diagram of one embodiment of an integrated Voice Coil Motor driver that is provided in the Servo/Control IC.

FIG. 41 shows a block diagram of one embodiment of an integrated VCM driver in the Nova.

VCM DACs

There are two independent VCM DACs, tracking and offset. The two DACs are provided so that while the VCM tracking DAC is being used for track following, the VCM offset can be used to set a fixed offset against whatever bias is present. This is useful if the gain range desired for track following does not have sufficient range to null out the bias. Table 17 shows how the gain range setting affects the VCM tracking DAC output.

Priority of Tracking DAC Writes

Normally, the single physical DAC in the Nova chip goes through the conversion of each of the different DAC registers (VCM tracking and offset, spindle tracking and offset, etc.) in a fixed sequence. In this "normal" mode, the VCM tracking DAC register has no special priority over any of the others. So, just as with all the other DAC registers, there may be a delay from the time the DAC register is written to the time that the value is converted and the new value appears in the analog system.

Recognizing that this delay could introduce significant problems in the track following control loop, Nova provides an ability for writes to the VCM tracking DAC registers to be converted as soon as possible. This is referred to as the "priority" mode. In this mode, the normal DAC conversion cycle is interrupted by a write to the VCM tracking DAC register. Whatever conversion is in progress is allowed to complete and then the VCM tracking DAC register is converted next (regardless of where the system was in the sequence prior to the interruption).

After the VCM tracking DAC register is converted, the normal DAC conversion sequence resumes at the point where it was interrupted.

The choice between the normal mode and the priority mode for the tracking DAC writes is controlled by the TdPri bit in the serial port registers.

TABLE 17

| DacRng Setting | DacRng Multiplier | VcmTrkR Setting | VcmTrkR Multiplier | Net Multiplier | Range | LSB |
|---|---|---|---|---|---|---|
| 0 | 1 | 0 | 1 | 1 | ±250 mA | 0.48 mA |
| 1 | ½ | 0 | 1 | ½ | ±125 mA | 0.24 mA |
| 2 | ¼ | 0 | 1 | ¼ | ±62.5 mA | 0.12 mA |
| 0 | 1 | 1 | ½ | ½ | ±125 mA | 0.24 mA |
| 1 | ½ | 1 | ½ | ¼ | ±62.5 mA | 0.12 mA |
| 2 | ¼ | 1 | ½ | ⅛ | ±31.3 mA | 61 μA |
| 0 | 1 | 2 | ¼ | ¼ | ±62.5 mA | 0.12 mA |
| 1 | ½ | 2 | ¼ | ⅛ | ±31.3 mA | 61 μA |
| 2 | ¼ | 3 | ¼ | 1/16 | ±15.6 mA | 31 μA |
| 0 | 1 | 3 | ⅛ | ⅛ | ±31.3 mA | 61 μA |
| 1 | ½ | 3 | ⅛ | 1/16 | ±15.6 mA | 31 μA |
| 2 | ¼ | 3 | ⅛ | 1/32 | ±7.8 mA | 15 μa |

The VCM offset DAC always has a fixed multiplier of ½ (i.e., it commands half the range of current). VCM Offset DAC Gain Options are shown in Table 18.

TABLE 18

| DacRng Setting | DacRng Multiplier | Fixed Multiplier | Net Multiplier | Range | LSB |
|---|---|---|---|---|---|
| 0 | 1 | ½ | ½ | ±125 mA | 0.24 mA |
| 1 | ½ | ½ | ¼ | ±62.5 mA | 0.12 mA |
| 2 | ¼ | ½ | ⅛ | ±31.3 mA | 61 μA |

When the midrange value (200 h) is written to a VCM DAC register, the corresponding current output is zero. 3FFh results in maximum positive current (for the specified gain range). 000 h results in maximum negative current (for the specified gain range).

The gain range for the VCM tracking DAC is shared with the dither system (see below).

Dither

The dither system is designed to improve the VCM performance in the face of high static friction. It is implemented as a set of 4 pairs of VCM current amplitudes and timer values. Each pair is associated with a dither state as shown in Table 19.

TABLE 19

| State | Amplitude | Time |
|---|---|---|
| 1 | VcmDthDac1 | Tdth1 |
| 2 | VcmDthDac2 | Tdth2 |
| 3 | VcmDthDac3 | Tdth3 |
| 4 | VcmDthDac4 | Tdth4 |

When the dither system is enabled by setting the DiEna bit, it is initially in state 0.

When a dither state is entered, the current specified by the state's amplitude register is added to commanded VCM current. The dither system remains in that state until the time indicated in the state's time register has elapsed. Then the next dither state is entered. The system progresses through the dither states sequentially; i.e., 1 to 2 to 3 to The action taken after the final timer (state 4) has expired depends upon the setting of the DiMode bit. A setting of 0 corresponds to the free-running mode. In this mode, the dither system simply goes back to the first dither state (state 1) and repeats the entire sequence continuously. A DiMode setting of 1 corresponds to the restart mode. In the restart mode, the dither system restarts at state 1 every time the VCM DAC register is written.

The DAC outputs resulting from the dither register settings are added to the other VCM DAC outputs at the current control loop summing node.

The gain of the dither DAC output is the same as whatever is selected for the VCM tracking DAC.

The entire dither system can be disabled by clearing the DiEna bit.

Each LSB of the dither timer registers corresponds to 1 full cycle of the DAC.

Interaction of VCM Tracking DAC, VCM Offset DAC and the Dither DACs

The output of the VCM tracking DAC, the VCM offset DAC and the currently active dither DAC (if enabled) are all summed together. If the settings of these DACs are such that a voltage greater than the reference is commanded, the system simply saturates at the maximum available current.

VCM Compensation Network

Compensation of the VCM current control loop is provided by an external network connected to the VcmCmpi and VcmCmpo pins. An internal resistance in series with this network can be provided by the Nova chip. The resistance is controlled by the setting of the CompR register according to Table 20.

TABLE 20

| Rcmp | Resistance |
|---|---|
| 0 | 1K |
| 1 | 20K |
| 2 | 40K |
| 3 | 80K |

Integrated Spindle Driver

Figure 42:
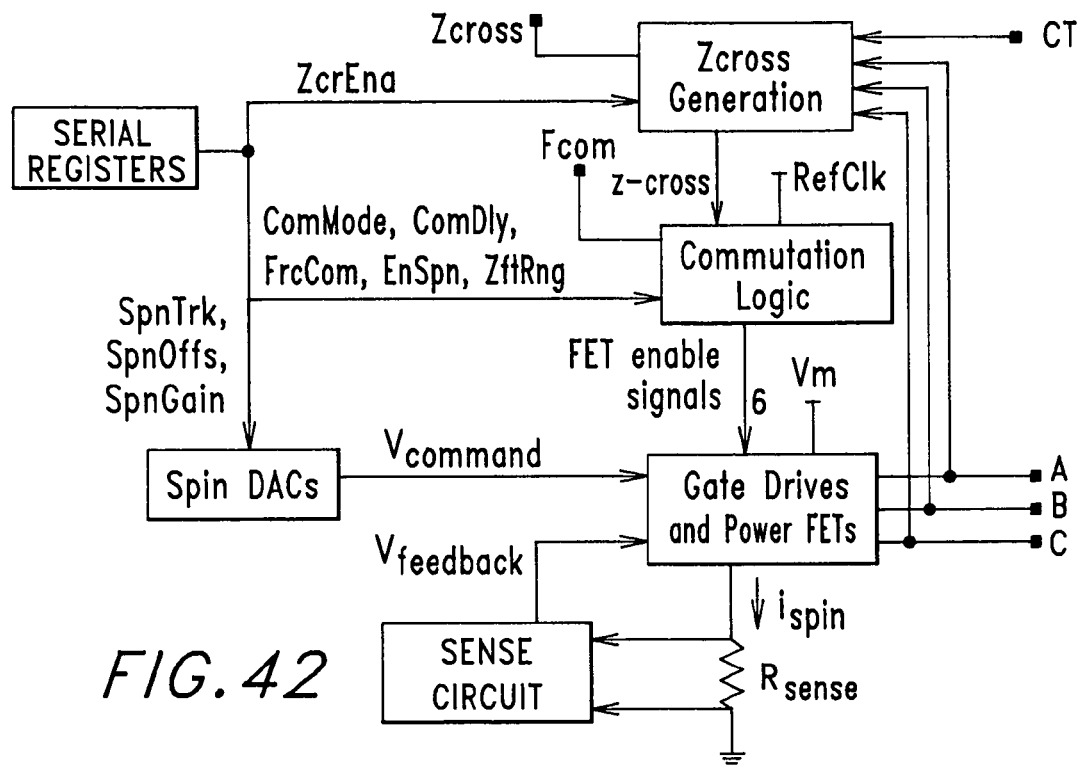
FIG. 42 is a block diagram showing one embodiment of a spindle driver system in accordance with the present invention.

The integrated spindle driver consists of the following subsystems:
Spin DACs
Current sense circuit
Gate drivers and power FETs
Back EMF sensor and Z-cross generator
Commutation logic FIG. 42 shows a block diagram of the spindle driver system.

Commutation control—The spindle driver controls a 3 phase motor. The power FETs are selectively turned on and off to energize the motor phases in a sequence that results in spindle rotation. The process of advancing through this sequence (commutation) can be controlled by software, the zero crossings of the motor back-EMF or by an external pin.

Spin current control—The current applied to the selected pair of motor phases is carefully controlled. The spin DACs provide the reference input to the spin current control system. The "plant" is the gate drivers and power FETs and the sensor is implemented by the sense resistor and current sensing circuit.

Center tap—The spindle driver is capable of working with motors that have no center tap connection. Nova will internally generate a "phantom" center tap to support these motors. If a motor is used that does have a center tap connection, Nova can utilize it instead of the phantom center tap system.

Spin DACs

There are two 10-bit spin DAC registers (converted into analog signals by a single physical DAC). One is normally adjusted to maintain spin speed (SpnTrkDac) and the other is used to offset up to the run current (SpnOffDac). The converted outputs are summed together.

The fine spin DAC (SpnTrkDac) has higher resolution but less range than the offset DAC. It can span ¼ of the full range. Table 21 shows the Spin offset DAC ranges.

TABLE 21

| DacRng Setting | DacRng Multiplier | Trk bit setting | Trk bit Multiplier | Net Multiplier | Range | LSB |
|---|---|---|---|---|---|---|
| 0 | 1 | 0 | ¼ | ¼ | 0 to 65 mA | 63 μA |
| 0 | 1 | 1 | 1/16 | 1/16 | 0 to 16 mA | 16 μA |
| 3 | ¼ | 0 | ¼ | 1/16 | 0 to 16 mA | 16 μA |
| 3 | ¼ | 1 | 1/16 | 1/64 | 0 to 4 mA | 3.9 μA |

Referring to Table 22, DNL is defined as the deviation from an ideal 1 LSB step (1 LSB+/−DNL). INL is defined as the deviation from the ideal steps between the real (measured) voltage end points. LSB is defined as (3FF hex voltage−000 hex voltage)/(2^bits−1).

TABLE 22

| Parameter | Conditions 0° C. to 70° C. | min | typ | max | Units |
|---|---|---|---|---|---|
| Integral linearity error (INL) | | | | +/−1 | LSB |
| Differential linearity error (DNL) | | | | +/−0.75 | LSB |
| Zero scale voltage | Code = 000 hex | | 0 | 0.04 | V |
| Full scale voltage (High range) | Code = 3FF hex | 1.86 | 2.0 | 2.14 | V |

Current Sense Circuit

The current sense circuit has as its input the voltage across the sense resistor. This voltage is scaled so that when the maximum current is flowing through the sense resistor, the output of the circuit is a voltage that is the same as the maximum commanded spin DAC voltage. Related parameters are described in Table 23.

TABLE 23

| Parameter | Conditions 0° C. to 70° C. | min | Typ | max | Units |
|---|---|---|---|---|---|
| Sense resistance | | | 0.6 | | ohms |
| Sense gain | | tbd | 8 | tbd | |
| Zero current output voltage | ispin = 0 mA | | 0 | 0.04 | V |
| Full current output voltage | ispin = 250 mA | tbd | 1.2 | tbd | V |

Gate Drivers and Power FETs

A spin current error signal is created by linearly comparing the summed output of the spin DACs ($V_{command}$) to the scaled voltage from the current sense circuit ($V_{feedback}$). This error signal is used to drive the "low side driver" gate of the power FETs. The gate drive modulates the power FET in such a manner that drives the spin motor current to the desired value. In this linear mode, the "low side driver" is basically used as a variable resistor. The current control loop bandwidth must be high enough that the closed loop phase loss, at 15 Hz, is less than 5 degrees.

The "high side drivers" are operated as on/off switches, based on the commutation state.

Figure 43:
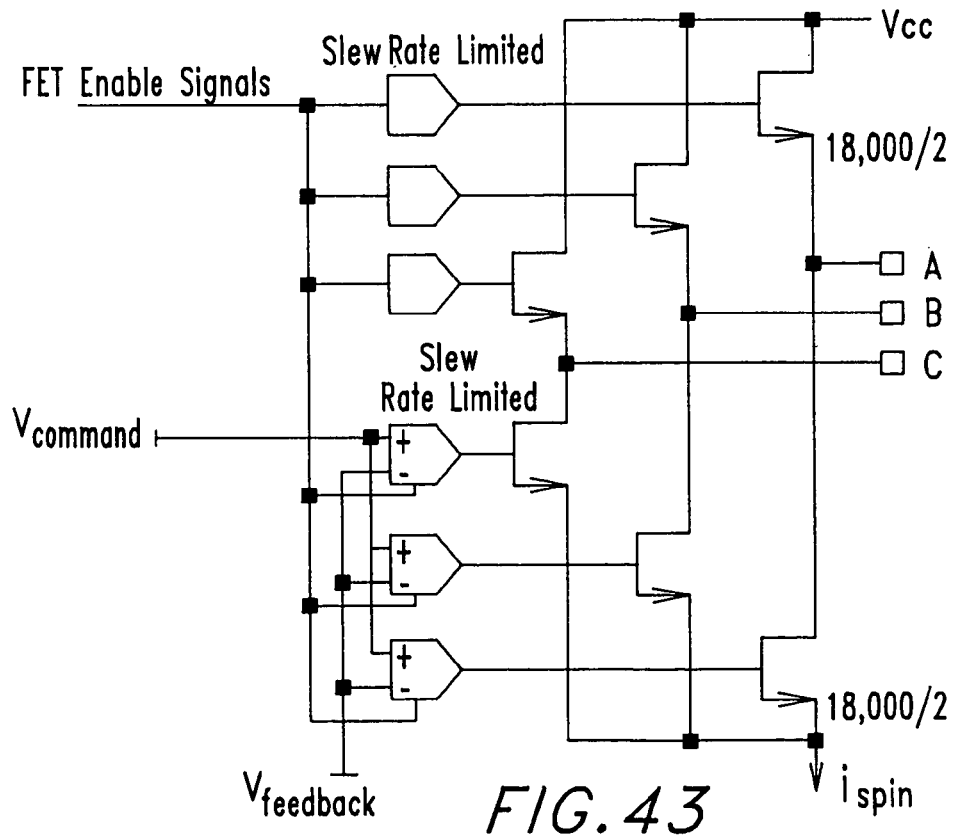
FIG. 43 is a schematic diagram showing one implementation of gate drivers and power FETs for the spindle driver system of FIG. 42.

The power FETs are internal to the Nova chip. FIG. 43 shows a diagram of the gate drivers and the power FETs.

There is a deadband built into the current loop command. The deadband is just enough to guarantee a low leakage current when zero amps is commanded. Related parameters are given in Table 24.

TABLE 24

| Parameter | Conditions 0° C. to 70° C. | min | typ | max | Units |
|---|---|---|---|---|---|
| Full scale (FS) current accuracy, digital DAC input to current output | 0% Rsense, High gain | −9 | 0 | 9 | % |
| Gal, Gbl, Gcl zero current voltage (for spin leakage current) | DAC = 000 hex | | | 0.4 | V |
| Deadband voltage | | 40 | 50 | 60 | MV |
| Transconductance error amp gain (OTA gain) | For reference only | | 1.5 | | mA/volt |
| Rdson, high side | 25° C. | | 0.32 | 0.36 | Ohms |
| | 125° C. | | 0.51 | 0.55 | Ohms |
| Rdson, low side | 25° C. | | 0.33 | 0.48 | Ohms |
| | 125° C. | | 0.48 | 0.6 | Ohms |

Notes: See the section "Reference Voltage" for Vrefi

Slew Rate Limiting

The power FET gate drivers have a slew rate limiting capability to control the voltage spike when turning off current in one motor coil and turning on the current in the next motor coil during commutation. The slew rate limiting eliminates the need for an external snubbing circuit.

Slew rate is controlled by a constant current being driven into the gate capacitance of the power FETs. The commutation slew current is designed to prevent voltage overshoots from occurring when the motor coils have the specifications given in the Table 25.

The commutation slew current may be reduced by ½ by setting the Sslew bit.

TABLE 25

| Parameter | Conditions 0° C. to 70° C. | min | typ | Max | Units |
|---|---|---|---|---|---|
| Motor coil resistance | phase-to-phase | 20.7 | 23.0 | 25.3 | Ohms |
| Motor coil inductance | phase-to-phase | | 1.2 | 1.5 | MH |

BEMF Sensing and Z-Cross Generation

The BEMF of the undriven motor phase (at any given time, one phase is high, a second phase is low, and the third phase is undriven) is sensed by the Nova chip. The chip generates a logic signal that has an edge corresponding to each zero crossing of the BEMF signal.

The z-cross signal can be applied to the Zcross pin so that it is available for use by external devices. This is enabled by setting the Gp5Mode bit in the serial registers. The polarity of the z-cross output is controlled by the setting of the ZcrPol bit.

Commutation Logic

The commutation logic determines which pair of power FETs is being employed at any given time. Each motor phase output has two FETs associated with it: a "high" and "low". When the high side FET is selected, it is turned completely on. When the low side FET is selected, its associated gate drive circuit is enabled. There are six different configurations, or commutation states, that the power FETs can be in. Table 26 shows, for each commutation state, which (if any) FET is employed for each motor phase:

TABLE 26

| Commutation State | A | B | C |
|---|---|---|---|
| 0 | low | high | off |
| 1 | low | off | high |
| 2 | off | low | high |
| 3 | high | low | off |
| 4 | high | off | low |
| 5 | off | high | low |

All of the FETs are off when EnSpn is zero. Transitioning the EnSpn bit from 0 to 1 causes the commutation state to reset to 0. To put the Nova chip into a known commutation state, the spin drivers must first be disabled and then enabled.

The commutation advance sequence is 0, 1, 2, 3, 4, 5, 0, 1, 2, 3, 4, 5, 0, 1, 2, etc. There are three methods for advancing the commutation state: manual, automatic and external. The selected method is determined by setting of the ComSel field in the serial registers. See Table 27.

TABLE 27

| ComSel | Commutation Mode | Event that advances the commutation state |
|---|---|---|
| 0 | Manual | The SpnCom serial register gets written |
| 1 | Automatic | The z-cross to FCOM timer reaches SpnComDly |
| 2 | External | The Fcom input pin is transitioned |
| 3 | <unused> | n/a |

In the automatic commutation mode (ComSel=1) the z-cross to FCOM timer (ZFT) is reset every time a z-cross edge occurs. The timer is incremented until it reaches the value specified in the SpnComDly register. The rate at which the ZFT increments depends upon the ComRfCk registers setting (see Table 28). Once the ZFT has incremented up to where it is equal to the SpnComDly setting, the commutation signal is generated and the timer stops.

TABLE 28

| ComRfCk | Number of RefClk cycles per Timer Increment |
| --- | --- |
| 0 | 1 |
| 1 | 2 |
| 2 | 4 |
| 3 | 8 |

During initial spin motor start, the manual commutation mode can be used with the commutation state machine advanced by writing to the SpnCom register. The manual advance will bring the spin motor speed to approximately 5 to 15 percent of the final speed. Once 5 to 15 percent of speed is achieved, the automatic commutation mode can be selected.

The polarity of the Fcom input (used in the external commutation mode) is controlled by the setting of the FcomPol bit.

Figure 44:
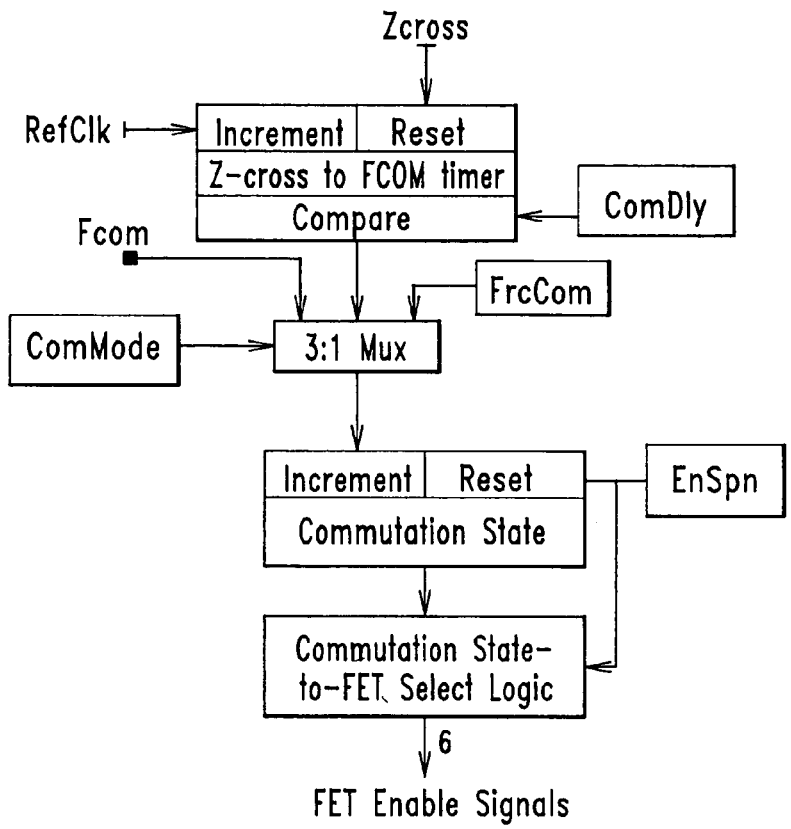
FIG. 44 is a block diagram illustrating one implementation of the Nova commutation control logic.

FIG. 44 shows the Nova commutation control logic. Table 29 provides details with regard to various signals under discussion.

TABLE 29

| Parameter | Conditions 0° C. to 70° C. | min | typ | Max | Units |
| --- | --- | --- | --- | --- | --- |
| High level input voltage, FCOM | TBD | | | | V |
| Low level input voltage, FCOM | | | | 0.8 | V |
| High level input current, FCOM | | | | 2.0 | μA |
| Low level input current, FCOM | | | | −2.0 | μA |
| BEMF sense gain | | | 0.65 | | |
| High level output voltage, ZCROSS | Io = 0.5 uA | Vcc-0.8 | | | V |
| Low level output voltage, ZCROSS | Io = 0.5 uA | | | 0.4 | V |

FIG. 44 shows the Nova commutation control logic. Table 29 provides details with regard to various signals under discussion.

Autoretract

Power-loss autoretract—When a power fault occurs (indicated by deassertion of POK), Nova automatically retracts the VCM using energy stored in an external capacitor. The capacitor is connected to the Nova chip on the Cret pin.

There is presently no provision for extracting energy from the rotating spindle. If no capacitor connected to the Cret pin, no autoretract capability is provided in the event of a power loss.

In normal operation (i.e., prior to performing the retract), Nova charges the retract capacitor to a specified voltage. The capacitor may initially be in a discharged state and some time will be required for it to become fully charged to its full voltage. The time required to fully charge the retract capacitor depends upon its size.

During the retract, Nova actively controls the voltage applied to the VCM. This is to provide control over the maximum velocity the actuator can attain during the retract process. The voltage limit is selected through the Retract serial port register.

There is no provision for controlling the duration of the retract (other than by changing the capacitance of the retract cap). The retract process continues until the voltage on the capacitor falls below the circuit's ability to continue operation.

If the power returns before the retract is completed, Nova forces the retract cycle to complete. After the retract cycle completes, Nova begins the normal power up cycle with the normal POK delay, coming up in the sleep mode.

Clock-loss autoretract—There is an optional capability to cause an autoretract to occur if no edges are detected on the RefClk pin for more than a specified period of time. This capability can be enabled by setting the NoCkAr bit (default it disabled). When an autoretract is triggered by the loss of RefClk, the power is taken from Vcc rather than the retract capacitor.

The clock-loss autoretract will be superceded the power-loss autoretract. Specifically, if the RefClk is lost, initiating a clock-loss autoretract drawing power from Vcc and then, shortly after, the power is lost, the autoretract circuit will immediately switch over to taking power from the retract cap. Various autoretract related parameters are described in Table 30.

TABLE 30

| Parameter | Conditions 0° C. to 70° C. | min | typ | Max | Units |
| --- | --- | --- | --- | --- | --- |
| Cret voltage when fully charged | | | 6 | | Volts |
| Cret charging current | | | TBD | | MA |
| Retract voltage range | VcmP to gnd | 0.5 | | 2.0 | Volts |
| Retract voltage accuracy | | −10 | | +10 | % |
| Retract voltage resolution | Selected through the serial port | | 3 | | Bits |
| RefClk lost detect time | | | 100 | | Us |

A/D Converter

Referring to Table 31, the Nova chip has a 10-bit A/D converter. The AdcCh register determines which signal is to be converted. The conversion process is initiated by writing to the AdcCh register. The converted result is obtained by reading the AdcRead register. This register also contains the Busy bit, which indicates whether or not the conversion has completed yet.

TABLE 31

| AdcCh | Input Channel |
| --- | --- |
| 0 | Tst1 |
| 1 | Tst2 |

A/D Converter Input Choices

The ADC can be configured to accommodate 3 different ranges of voltage. The range is controlled by the setting of the AdcRng register. In all cases, the midrange is centered at the reference voltage of 0.9 volts. See Table 32.

TABLE 32

| AdcRng | Low | High | LSB |
|---|---|---|---|
| 0 | 0 V | 1.800 V | 1.76 mV |
| 1 | 0.450 V | 1.350 V | 0.88 mV |
| 2 | 0.675 V | 1.125 V | 0.44 mV |
| 3 | — | — | — |

DNL is defined as the deviation from an ideal 1 LSB step (1 LSB+/−DNL). INL is defined as the deviation from the ideal steps between the real (measured) voltage end points. LSB is defined as (1FF hex voltage−00 hex)/(2^bits−1). See Table 33.

TABLE 33

| Parameter | Conditions 0° C. to 70° C. | min | typ | Max | Units |
|---|---|---|---|---|---|
| Input leakage current | | | | 2 | µA |
| Input resistance | Pin to ground | 10 | | | Mohms |
| Input capacitance | Pin to ground | | | 13 | Pf |
| Integral linearity error (INL) | | | | +/−1 | LSB |
| Differential linearity error (DNL) | | | | +/−0.75 | LSB |
| Zero scale voltage | Code = 00 hex | | 0 | 0.1 | V |
| Full scale voltage (see Reference Voltages) | Code = 1FF hex | TBD | TBD | TBD | V |

Park Detect

The PrkDet pin has a weak pullup resistor on it. The "park" condition is signaled by pulling this pin down to ground. The pullup can be enabled and disabled with a bit (PdPuEn).

Information about activity on the PrkDet pin is made available to the host via the PdCur and PdLtch bits in the serial port registers. The PdCur bit reflects the instantaneous state of the pin. When PrkDet is pulled down (asserted), the PdCur bit is set to 1.

The PdLtch bit latches the state of the PdCur bit. When PdCur gets set, the PdLtch bit gets set and remains set until the register containing it gets read. The PdLtch bit remains set until read even if the PrkDet bit deasserts. Whenever the register containing the PdLtch bit is read, the PdLtch bit gets cleared to zero. It remains cleared until the PrkDet pin gets asserted again.

The PdBounce bit indicates that the park detect switch closed, then opened and the finally closed again.

BEMF Measurement

Figure 45:
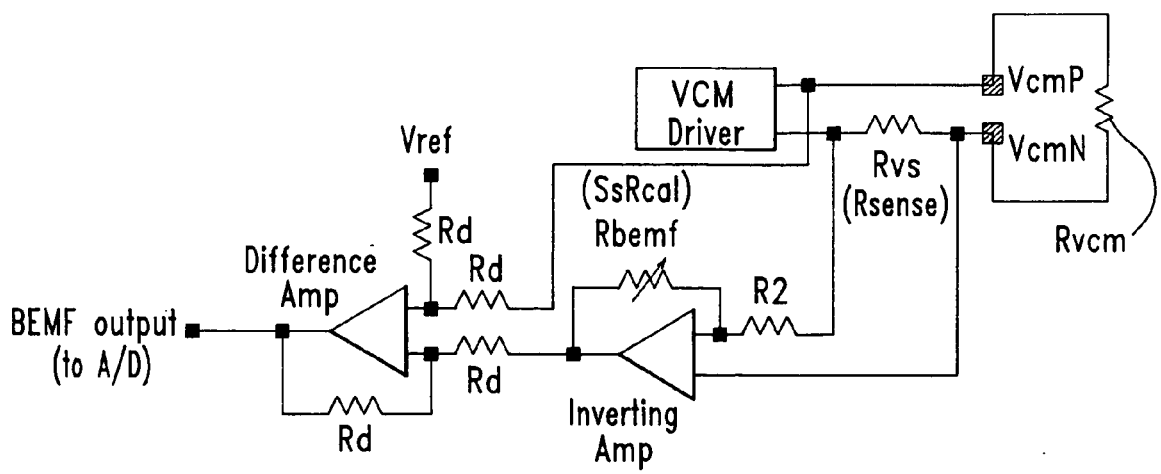
FIG. 45 is a schematic diagram showing one implementation of a highly advantageous Back EMF measurement circuit.

With reference to FIG. 45, the Nova chip provides a circuit that allows precise measurement of the BEMF on the VCM. The general approach is to subtract the voltage due to the applied current from the raw voltage appearing across the VCM. The remaining voltage is due to BEMF and is available as an input to the ADC. It is considered that one of ordinary skill in the art may implement circuitry directed to this purpose in any number of alternative ways in view of this disclosure; one suitable implementation is shown in FIG. 45 and is further described immediately below.

SsRcal is register that is adjustable so as to control the value of a resistor designated as Rbemf and has a range that allows the ratio of SsRcalR2 to closely approximate the ratio of Rvcm to Rsense, where Rvcm is a DC resistance of a coil in the voice coil motor and Rsense is a series resistor that may also be designated as Rvs. The max SsRcal setting available is 125K ohms. R2 is 5K ohms giving a maximum Rvcm/Rsense ratio of 25:1. The Nova's Rsense is 1 ohm so the Nova will accommodate VCM coil resistances up to 25 ohms. The minimum SsRcal is 50 K ohms providing accommodation of VCM coil resistances as low as 10 ohms. The resistors in the difference amp circuit are 10 Kohms each.

It is noted that portions of the foregoing descriptions are presented in terms of symbolic representations of operations on data bits within an electronic device. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, manipulations performed may be referred to in terms, such as adding or comparing, which are commonly associated with mental operations performed by a human operator. No such capability of a human operator is necessary or desirable in most cases in any of the operations described herein which form part of the present invention; the operations are machine operations. In all cases, the distinction between the method operations in operating a computer and the method of computation itself should be borne in mind. The present invention relates to an apparatus and to a method for operating an electromechanical arrangement in processing electrical or other (e.g., magnetic) physical signals to generate other desired physical signals.

Since the Storage Element, devices in which the Storage Element is used and associated method disclosed herein may be provided in a variety of different configurations and the method may be practiced in a variety of different ways, it should be understood that the present invention may be embodied in many other specific ways without departing from the spirit or scope of the invention. Therefore, the present examples and methods are to be considered as illustrative and not restrictive, and the invention is not to be limited to the details given herein, but may be modified within the scope of the appended claims.

What is claimed is:

1. In a system including a host device having a host processing arrangement for controlling the overall host device and for operational support of an electromechanical storage arrangement, which is initially provided separate from the host device, and which stores digital data on a rotatable disk, and a particular firmware configuration is used for controlling a particular version of the storage arrangement such that a first portion of the particular firmware configuration is required to allow the storage arrangement to access any digital data that is stored on the rotatable disk, and said storage arrangement may be provided in an updated version which requires an updated firmware configuration that changes at least the first portion of the updated firmware configuration, compared to the first portion of the particular firmware configuration, in a way which precludes access to the digital data that is stored on the rotatable disk of said undated version when using only the first portion of the particular firmware configuration, a method comprising:

electrically interfacing the updated version of the storage arrangement with said host processing arrangement of the host device, said storage arrangement including at least the first portion of the particular firmware configuration for use in controlling the particular version of the storage arrangement;

storing a first firmware update in the host device that is limited to a difference between the first portion of the particular firmware configuration and the first portion of the updated firmware configuration; and transferring the first firmware update to the storage arrangement, using the host processing arrangement, and thereafter, operating the storage arrangement by executing the difference between the first portion of the updated firmware configuration and the particular firmware configuration, along with cooperatively executing at least a part of the first portion of the particular firmware configuration, that is exclusive of said difference, for accessing the digital data that is stored on said disk and without replacing the first portion of the particular firmware configuration in the storage arrangement.

2. The method of claim 1 including storing a second firmware update on the rotatable disk, approximately at a time of manufacture of the storage arrangement, that is limited to an additional difference between a second portion of the particular firmware configuration, as compared to a second portion of the updated firmware configuration, and the second firmware update to the storage arrangement, after transfer of the first firmware update and, thereafter, operating the storage arrangement by execution of the additional difference between the second portion of the updated firmware configuration in cooperation with executing some of the second portion of the particular firmware configuration in the storage arrangement that is exclusive of said additional difference and without replacing the second portion of the particular firmware configuration in the storage arrangement.

3. In a system including a host device having a host processing arrangement for controlling the overall host device and for operational support of an electromechanical storage arrangement, which is initially provided separate from the host device, and which stores digital data on a rotatable disk, and a particular firmware configuration is used for controlling a particular version of the storage arrangement such that a first portion of the particular firmware configuration is required to allow the storage arrangement to access any digital data that is stored on the rotatable disk, and said storage arrangement maybe provided in an updated version which requires an updated firmware configuration that changes at least the first portion of the updated firmware configuration, compared to the first portion of the particular firmware configuration, in a way which precludes access to the digital data that is stored on the rotatable disk of said updated version when using only the first portion of the particular firmware configuration, a firmware control arrangement, comprising;

a storage arrangement control configuration electrically interfaced with said host processing arrangement of the host device and with the updated version of the storage arrangement, said storage arrangement control configuration including at least the first portion of the particular firmware configuration stored for execution by the storage arrangement control configuration in controlling the particular version of the storage arrangement;

a firmware update stored in the host device that is limited to a difference between the first portion of the particular firmware and the first portion of the updated firmware configuration for access by the host processing arrangement; and an instruction set for transferring the firmware update to the storage arrangement control configuration in a way that causes the storage arrangement control configuration to, thereafter, execute the difference between the first portion of the updated firmware configuration and the particular firmware configuration along with cooperatively executing at least a part of the particular firmware configuration, that is exclusive of said difference, for accessing the distal data that is stored on said disk and without completely replacing the first portion of the particular firmware configuration for controlling the storage arrangement.

4. The firmware control arrangement of claim 3 wherein a second firmware update is stored on the rotatable disk, approximately at a time of manufacture of the storage arrangement, corresponding to an additional difference between a second portion of the particular firmware configuration, as compared to a second portion of the updated firmware configuration, and said storage arrangement control configuration is configured for accessing the second firmware update from safe disk so that the storage arrangement control configuration executes the additional difference between the second portion of the updated firmware configuration in cooperating with executing at least some of the second portion of the particular firmware configuration in the storage arrangement and without replacing the second portion of the particular firmware configuration in he storage arrangement.

5. The method of claim 1 including storing the fun portion of the particular firmware configuration in a read only memory section of said storage arrangement control configuration and providing a random acme memory section in the storage arrangement control configuration for thereafter saving at last the updated firmware configuration as the difference between the particular firmware configuration and the updated firmware configuration.

6. The method of claim 5 including executing the difference between the particular firmware configuration and the updated firmware configuration directly from said random access memory section and for cooperatively executing a remaining and unmodified portion of the particular firmware configuration directly from the read only memory section.

7. The method of claim 4 wherein transferring includes retrieving a selected pact of the second portion of the particular firmware configuration from the disk and saving the selected part in said random access memory section and, thereafter, executing the difference between the particular firmware configuration and the updated firmware configuration directly from said random access memory section and cooperatively configuration the selected part of the particular firmware configuration directly foam the random access memory section.

8. The method of claim 1 wherein said updated firmware configuration replaces only a portion of the particular firmware configuration.

9. The method of claim 1 wherein said particular firmware configuration is divided into a plurality of original code segmental and said difference includes one or more individual update segments that correspond to individual ones of the plurality of original code segments such that each update segment replaces one of the original code segments.

10. The method of claim 9 wherein, prior to using any specific one of the original code segments of the particular firmware configuration, the host processor performs a query to determine if that specific code segment is replaced in the updated firmware configuration.

11. The method of claim 10 including using a jump table, as part of performing said query, such that the jump table specifies each update segment of the updated firmware configuration.

12. The method of claim 11 wherein, upon determining that a specific code segment has been replaced, executing that specific code segment as provided by the updated firmware configuration.

13. The method of claim 9 wherein at least one of the update segments is of a different length than a corresponding one of the original code segments.

14. The method of claim 1 wherein said storage arrangement control configuration includes a non-volatile electronic memory and providing the updated firmware configuration in said storage arrangement, before said interfacing, by loading the first portion of the code segments into said non-volatile electronic memory and a second portion ethic code segments onto said disk such that upon mart-up of the storage arrangement and following said interfacing, said first portion of the code segments relate to initialization of the storage arrangement to, thereafter, enable reading digital data, including said second portion of the code segments from the disk.

15. The firmware control arrangement of claim 3 wherein said storage arrangement control configuration includes a read only memory section for storing said first portion of the particular firmware configuration and a random access memory section at least for storing the updated firmware configuration as five difference between the particular firmware configuration and the updated firmware configuration.

16. The firmware control arrangement of claim 3 wherein said storage arrangement is configured for executing the difference between the particular firmware configuration and the updated firmware configuration directly front said random access memory section and for cooperatively executing a remaining and unmodified portion of the particular firmware configuration directly from the read only memory section.

17. The firmware control arrangement of claim 3 wherein said storage arrangement control configuration is configured for retrieving a selected part of the second portion of the particular firmware configuration from the disk and saving the selected part in said random access memory section and thereafter, said storage arrangement controller is configured for executing the difference between the particular firmware configuration and the updated firmware configuration directly from said random access memory section and for cooperatively executing a remaining and unmodified portion of the particular firmware configuration directly front the random access memory section.

18. The firmware control arrangement of claim 3 wherein said update firmware configuration replaces only a portion of the particular firmware configuration.

19. The firmware control arrangement of claim 3 wherein said particular firmware configuration is divided into a plurality of original code segments and said update firmware configuration includes one or more individual update segments that correspond to individual ones of the plurality of original code segments, as said difference, such that each update augment of the updated firmware configuration replaces one of the original code segments.

20. The firmware control arrangement of claim 19 wherein, prior to using any specific one of the original code segments of the particular firmware configuration, the storage arrangement control configuration is configured to perform a query to determine if that specific code segment is replaced in the updated firmware configuration.

21. The firmware control arrangement of claim 20 wherein the updated firmware configuration includes a jump table that specifies each update segment of the updated firmware configuration.

22. The firmware control arrangement of claim 20 wherein, upon determining that a specific code segment has bean replaced, the host device is configured to execute that spec code segment as provided by the updated firmware configuration.

23. The firmware control arrangement of claim 22 wherein the specific code segment, as past of the updated firmware configuration, includes a different length than corresponding one of the original code segments, as part of the particular firmware configuration.

24. The firmware control arrangement of claim 3 wherein said storage arrangement includes a non-volatile electronic memory Section far storing a first portion of the update set of firmware as s first group of update code segments and a second portion of said updated firmware set is stored as a second group of update code segments an said disk such that, upon start-up of the storage arrangement, said first portion of the update code segments relate to initialization of the storage arrangement to, thereafter, enable reading digital data, including said second portion of the update code segments, from the disk.

25. In a system including a host device having a host processing arrangement for controlling the overall host device and for operational support of an electromechanical storage arrangement which is initially provided separate from the host device, and which stores digital data on a rotatable disk, and a particular firmware configuration is used for controlling a particular version of the storage arrangement and said storage arrangement may be provided in an updated version which requires an updated firmware configuration, a firmware control arrangement, comprising:

a firmware ROM section in the host device which stores at least first portion of the particular firmware configuration for controlling the particular version of the storage arrangement;

a firmware update stored in the storage arrangement, separate from said first portion of the particular firmware configuration, that is limited to a difference between the first portion of the particular firmware configuration and the updated firmware configuration for access by the host processing arrangement; and an instruction set that causes the host processing arrangement to retrieve the firmware update from the storage arrangement and, thereafter, to execute said firmware update as said difference along with executing an unmodified part of the first portion of the particular firmware configuration from said firmware ROM section to thereby implement said updated firmware configuration without a need to replace the first portion of the particular firmware configuration, as stored in the firmware ROM section;

wherein said first portion of the particular firmware configuration is required to allow the storage arrangement to access a second portion of the particular firmware configuration that is stored on the rotatable disk and said firmware update includes said difference in the first portion of the updated firmware configuration such that the firmware update is required to access any data that is stored the disk of said updated version of the storage arrangement.

* * * * *